(12) United States Patent
Quigley et al.

(10) Patent No.: US 7,843,847 B2
(45) Date of Patent: *Nov. 30, 2010

(54) COMPENSATING FOR NOISE IN A WIRELESS COMMUNICATION SYSTEM

(75) Inventors: Thomas J. Quigley, Lawrenceville, GA (US); Jonathan S. Min, Buena Park, CA (US); Lisa V. Denney, Suwanee, GA (US); Henry Samueli, Corona Del Mar, CA (US); Sean F. Nazareth, Anaheim Hills, CA (US); Feng Chen, Irvine, CA (US); Fang Lu, Irvine, CA (US); Christopher R. Jones, Newport Beach, CA (US)

(73) Assignee: Broadcom Corporation, Irvine, CA (US)

( * ) Notice: Subject to any disclaimer, the term of this patent is extended or adjusted under 35 U.S.C. 154(b) by 980 days.

This patent is subject to a terminal disclaimer.

(21) Appl. No.: 11/584,676

(22) Filed: Oct. 23, 2006

(65) Prior Publication Data

US 2007/0109995 A1 May 17, 2007

Related U.S. Application Data

(63) Continuation of application No. 11/292,098, filed on Dec. 2, 2005, now Pat. No. 7,519,082, which is a continuation of application No. 09/714,713, filed on Nov. 16, 2000, now Pat. No. 7,103,065, which is a continuation of application No. 09/574,558, filed on May 19, 2000, now Pat. No. 6,650,624, which is a continuation-in-part of application No. 09/430,821, filed on Oct. 29, 1999, now abandoned.

(60) Provisional application No. 60/106,264, filed on Oct. 30, 1998, provisional application No. 60/106,427, filed on Oct. 30, 1998, provisional application No. 60/106,438, filed on Oct. 30, 1998, provisional application No. 60/106,439, filed on Oct. 30, 1998, provisional application No. 60/106,440, filed on Oct. 30, 1998, provisional application No. 60/106,441, filed on Oct. 30, 1998.

(51) Int. Cl.
H04J 1/16 (2006.01)
H04J 3/00 (2006.01)
H04J 3/16 (2006.01)

(52) U.S. Cl. .................. 370/252; 370/337; 370/468
(58) Field of Classification Search ................. 370/252, 370/337, 347, 468
See application file for complete search history.

(56) References Cited

U.S. PATENT DOCUMENTS 3,839,678 A 10/1974 Bell
4,383,272 A 5/1983 Netravali et al.

(Continued)

FOREIGN PATENT DOCUMENTS

EP 0 353 779 2/1990

(Continued)

OTHER PUBLICATIONS

"Data-Over-Cable Service Interface Specifications: Radio Frequency Interface Specification" SP-RFI-I02-971008, 1997 Cable Television Laboratories, Inc., Oct. 8, 1997, 198 pgs.

(Continued)

*Primary Examiner*—Andrew Lee
(74) *Attorney, Agent, or Firm*—Sterne, Kessler, Goldstein & Fox P.L.L.C.

(57) ABSTRACT

A number of features for enhancing the performance of a communication system, in which data is transmitted between a base station and a plurality of subscriber stations located different distances from the base station, are presented. The power transmission level, slot timing, and equalization of the subscriber stations are set by a ranging process. Data is transmitted by the subscriber stations in fragmented form. Various measures are taken to make transmission from the subscriber stations robust. The uplink data transmission is controlled to permit multiple access from the subscriber stations.

22 Claims, 82 Drawing Sheets

U.S. PATENT DOCUMENTS

| | | | |
|---|---|---|---|
| 4,520,490 A | 5/1985 | Wei | |
| 4,617,676 A | 10/1986 | Jayant et al. | |
| 4,928,272 A | 5/1990 | Ohue | |
| 4,941,154 A | 7/1990 | Wei | |
| 4,958,226 A | 9/1990 | Haskell et al. | |
| 5,115,453 A | 5/1992 | Calderbank et al. | |
| 5,206,864 A | 4/1993 | McConnell | |
| 5,227,878 A | 7/1993 | Puri et al. | |
| 5,276,706 A | 1/1994 | Critchlow | |
| 5,339,384 A | 8/1994 | Chen | |
| 5,341,457 A | 8/1994 | Hall, II et al. | |
| 5,488,633 A | 1/1996 | Laroia | |
| 5,491,725 A | 2/1996 | White | |
| 5,533,004 A | 7/1996 | Jasper et al. | |
| 5,553,064 A | 9/1996 | Paff et al. | |
| 5,572,511 A | 11/1996 | Ouyang et al. | |
| 5,579,513 A | 11/1996 | Strohmer | |
| 5,600,651 A | 2/1997 | Molle | |
| 5,612,975 A | 3/1997 | Becker et al. | |
| 5,627,938 A | 5/1997 | Johnston | |
| 5,631,846 A | 5/1997 | Szurkowski | |
| 5,640,424 A | 6/1997 | Banavong et al. | |
| 5,666,358 A * | 9/1997 | Paratore et al. | 370/347 |
| 5,684,791 A * | 11/1997 | Raychaudhuri et al. | 370/310.2 |
| 5,696,765 A | 12/1997 | Safadi | |
| 5,703,539 A | 12/1997 | Gillig et al. | |
| 5,710,765 A | 1/1998 | Lee et al. | |
| 5,742,591 A * | 4/1998 | Himayat et al. | 370/286 |
| 5,793,802 A * | 8/1998 | Kanada et al. | 375/220 |
| 5,859,671 A | 1/1999 | Kim | |
| 5,881,363 A | 3/1999 | Ghosh et al. | |
| 5,903,231 A | 5/1999 | Emelko | |
| 5,909,564 A | 6/1999 | Alexander et al. | |
| 5,943,604 A | 8/1999 | Chen et al. | |
| 5,963,557 A | 10/1999 | Eng | |
| 5,995,916 A | 11/1999 | Nixon et al. | |
| 6,005,854 A | 12/1999 | Xu et al. | |
| 6,011,970 A | 1/2000 | McCarthy | |
| 6,018,767 A | 1/2000 | Fijolek et al. | |
| 6,028,860 A | 2/2000 | Laubach et al. | |
| 6,031,866 A * | 2/2000 | Oler et al. | 375/219 |
| 6,032,019 A | 2/2000 | Chen et al. | |
| 6,055,242 A | 4/2000 | Doshi et al. | |
| 6,108,713 A | 8/2000 | Sambamurthy et al. | |
| 6,137,793 A | 10/2000 | Gorman et al. | |
| 6,205,170 B1 * | 3/2001 | Nunez Leon De Santos et al. | 375/219 |
| 6,208,656 B1 | 3/2001 | Hrastar et al. | |
| 6,215,792 B1 | 4/2001 | Abi-Nassif | |
| 6,246,713 B1 | 6/2001 | Mattisson | |
| 6,298,098 B1 | 10/2001 | Krasner et al. | |
| 6,353,604 B2 | 3/2002 | Grimwood et al. | |
| 6,438,174 B1 | 8/2002 | Isaksson et al. | |
| 6,459,703 B1 | 10/2002 | Grimwood et al. | |
| 6,473,036 B2 * | 10/2002 | Proctor, Jr. | 342/372 |
| 6,480,477 B1 | 11/2002 | Treadaway et al. | |
| 6,529,520 B1 | 3/2003 | Lee et al. | |
| 6,546,017 B1 | 4/2003 | Khaunte | |
| 6,563,829 B1 | 5/2003 | Lyles et al. | |
| 6,614,799 B1 | 9/2003 | Gummalla et al. | |
| 6,647,069 B1 | 11/2003 | Segal et al. | |
| 6,647,070 B1 | 11/2003 | Shalvi et al. | |
| 6,650,624 B1 | 11/2003 | Quigley et al. | |
| 6,650,698 B1 | 11/2003 | Liau et al. | |
| 6,704,932 B1 | 3/2004 | Matsunaga et al. | |
| 6,741,643 B1 * | 5/2004 | McGibney | 375/229 |
| 6,785,252 B1 | 8/2004 | Zimmerman et al. | |
| 6,961,314 B1 | 11/2005 | Quigley et al. | |
| 6,965,616 B1 | 11/2005 | Quigley et al. | |
| 7,103,065 B1 | 9/2006 | Quigley et al. | |
| 7,120,123 B1 | 10/2006 | Quigley et al. | |
| 7,519,082 B2 | 4/2009 | Quigley et al. | |
| 2001/0055319 A1 | 12/2001 | Quigley et al. | |
| 2005/0055233 A1 | 3/2005 | Wenzlau et al. | |
| 2006/0088056 A1 | 4/2006 | Quigley et al. | |
| 2007/0036176 A1 | 2/2007 | Quigley et al. | |
| 2007/0086484 A1 | 4/2007 | Quigley et al. | |

FOREIGN PATENT DOCUMENTS

| | | |
|---|---|---|
| EP | 0 548 318 | 6/1993 |
| EP | 0 748 120 A1 | 12/1996 |
| EP | 0 768 769 A2 | 4/1997 |
| GB | 2 312 362 A | 10/1997 |
| JP | 10-243371 | 9/1998 |
| WO | WO 97/10553 | 3/1997 |
| WO | WO 97/15129 | 4/1997 |
| WO | WO 97/16046 | 5/1997 |
| WO | WO 97/41691 | 11/1997 |
| WO | WO 98/47236 A1 | 10/1998 |

OTHER PUBLICATIONS

Bharat T. Doshi, et al., "A Broadband Multiple Access Protocol for STM, ATM, and Variable Length Data Services on Hybrid Fiber-Coax Networks", Bell Labs Technical Journal, Jun. 1996, pp. 36-65.

Declaration of Lisa V. Denney, dated Aug. 14, 2002, (8 pages) with Exhibits 1-3.

Declaration of Lisa V. Denney, dated Mar. 22, 2004, (8 pages) with Exhibits 1-5.

Declaration of Lisa V. Denney, dated Mar. 22, 2004, (7 pages), with Exhibits 1-4.

Erup, L. et al., "Interpolation in Digital Modems—Part II: Implementation and Performance," *IEEE Transactions on Communications*, vol. 41, No. 6, pp. 998-1008 (Jun. 1993).

Franks, L.E., "Evaluation of the Effects of Notch Filters on Digital Data Transmission," *IEEE Transactions on Communication Technology*, pp. 447-449 (Aug. 1970).

Gardner, F.M., "Interpolation in Digital Modems—Part I: Fundamentals," *IEEE Transactions on Communications*, vol. 41, No. 3, pp. 501-507 (Mar. 1993).

International Search Report dated Jul. 28, 2000 relating to corresponding International Application No. PCT/US99/25675, 6 pages.

International Search Report, dated Oct. 9, 2000, from PCT Patent Appl. No. PCT/US99/25675, 8 pages.

James E. Dail, et al., "Adaptive Digital Access Protocol: A MAC Protocol for Multiservice Broadband Access Networks", AT&T Bell Laboratories, 2460 IEEE Communications Magazine 34, Mar. 1996, pp. 104-112.

John O. Limb, "A Protocol for Efficient Transfer of Data Over Hybrid Fiber/Coax System", IEEE/ACM Transactions on Networking, vol. 5, No. 6, Dec. 1997, pp. 872-881.

Office Action, dated Aug. 5, 2004, from U.S. Appl. No. 09/430,821, filed Oct. 29,1999, 25 pages.

Quigley, T.J. et al., U.S. Appl. No. 09/710,238, filed Nov. 9, 2000, entitled "Pre-Equilization Technique for Upstream Communication Between Cable Modem and Headend".

Quigley, T.J. et al., U.S. Appl. No. 09/714,713, filed Nov. 16, 2000, entitled "Data Packet Fragmentation in a Cable Modem System".

Robert Wolters, et al., "An Initialisation for a Burst-Mode Transport HFC System with Delay Determination by Power Distribution Measurement", Alcatel Telecom Research Division, SPIE vol. 3233, Nov. 1997, pp. 353-360.

Thomas J. Kolz, "Upstream HFC Channel Modeling and Physical Layer Design", General Instruments Corporation, SPIE vol. 2917, Nov. 1996, pp. 240-251.

Written Opinion, dated Nov. 15, 2000, from PCT Patent Appl. No. PCT/US99/25675, 10 pages.

\* cited by examiner

FIG. 6E

| UPDATE RATE | COARSE COEFFS | FINE COEFFICIENTS |
|---|---|---|
| 1kHz(1ms) | $K0=2^{-11}$<br>$K1=2^{-15}$<br>(BW=50Hz) | $K0=2^{-16}$<br>$K1=2^{-25}$<br>(BW=1Hz) |
| 300Hz(3.3ms) | $K0=2^{-12}$<br>$K1=2^{-15}$<br>(BW=20Hz) | $K0=2^{-16}$<br>$K1=2^{-23}$<br>(BW=1Hz) |
| 100Hz(10ms) | $K0=2^{-13}$<br>$K1=2^{-16}$<br>(BW=10Hz) | $K0=2^{-16}$<br>$K1=2^{-22}$<br>(BW=1Hz) |
| 50Hz(20ms) | $K0=2^{-14}$<br>$K1=2^{-17}$<br>(BW=5Hz) | $K0=2^{-16}$<br>$K1=2^{-21}$<br>(BW=1Hz) |
| 30Hz(33ms) | $K0=2^{-15}$<br>$K1=2^{-18}$<br>(BW=3Hz) | $K0=2^{-17}$<br>$K1=2^{-21}$<br>(BW=1Hz) |
| 10Hz(100ms) | $K0=2^{-17}$<br>$K1=2^{-20}$<br>(BW=1Hz) | $K0=2^{-17}$<br>$K1=2^{-20}$<br>(BW=1Hz) |
| 5Hz(200ms) | $K0=2^{-18}$<br>$K1=2^{-20}$<br>(BW=1Hz) | $K0=2^{-18}$<br>$K1=2^{-20}$<br>(BW=1Hz) |

FIG.52

RNG. OFFSET 7 BYTES

| STATUS 2 BYTES | TIMESTAMP 4 BYTES | CH. ID 1 BYTE | SID 2 BYTES | PWR. 2 BYTES | FREQ. 2 BYTES | TIME 3 BYTES |
|---|---|---|---|---|---|---|

FIG.53

RNG. OFFSET 7 BYTES

| STATUS 2 BYTES | TIMESTAMP 4 BYTES | CH. ID 1 BYTE | SID 2 BYTES | PWR. 2 BYTES | FREQ. 2 BYTES | TIME 3 BYTES | EQUALIZER COEFFS. 32 BYTES |
|---|---|---|---|---|---|---|---|

FIG.54

BASED ON THE STATUS BYTES[7:5] BITS, THE FOLLOWING STATISTICS ARE KEPT USING COUNTERS.

| SLOT DEFINITION | STATISTICS | CALCULATION |
|---|---|---|
| DATA | 1.NUMBER OF SLOTS<br>2.NUMBER OF SLOTS WITH POWER BUT NO DATA<br>3.NUMBER OF SLOTS WITH BAD DATA<br>4.NUMBER OF GOOD DATA-SLOTS<br>5.TOTAL NUMBER OF FEC BLOCKS<br>6.NUMBER OF FEC BLOCKS WITH CORRECTABLE ERRORS.<br>7.NUMBER OF UNCORRECTABLE FEC BLOCKS | NO UW<br>UW AND (BAD FEC OR BAD HEC)<br>UW AND GOOD HEC |
| REQUEST(CONTENTION) | 1.NUMBER OF REQUESTS RECEIVED<br>2.NUMBER OF COLLIDED REQUESTS<br>3.NUMBER OF CORRUPTED REQUESTS | NO UW<br>NO UW OR BAD FEC OR BAD HEC |
| REQUEST/DATA (CONTENTION) | 1.NUMBER OF PACKETS RECEIVED<br>2.NUMBER OF COLLIDED PACKETS<br>3.NUMBER OF CORRUPTED PACKETS | NO UW<br>NO UW OR BAD FEC OR BAD HEC |
| RANGING | 1.NUMBER OF RANGING MESSAGES RECEIVED<br>2.NUMBER OF COLLIDED RANGING MESSAGES RECEIVED<br>3.NUMBER OF CORRUPTED RANGING MESSAGES | NO UW<br>NO UW OR BAD FEC OR BAD HEC |

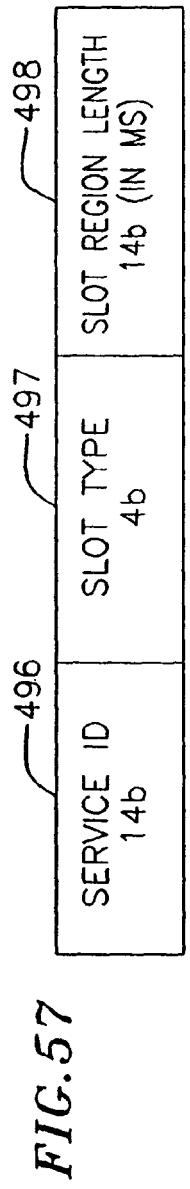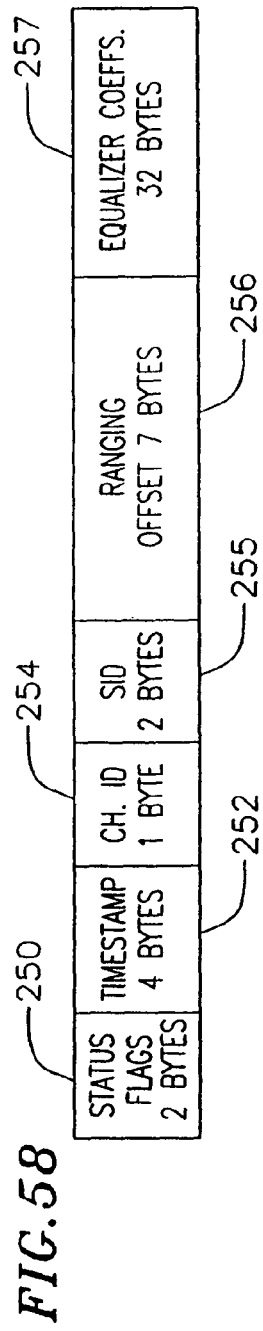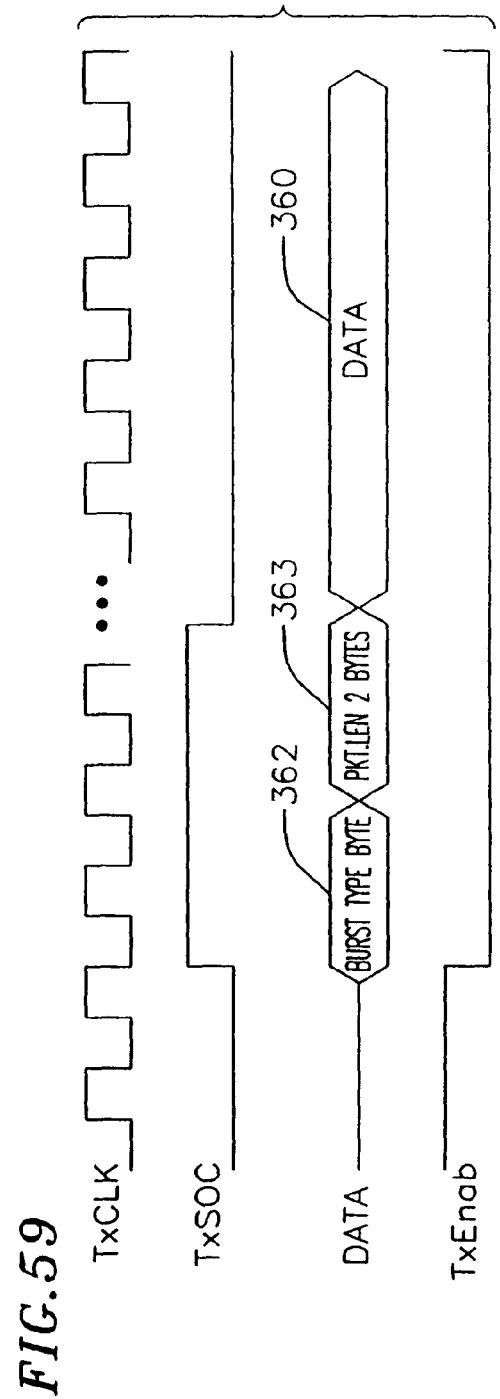

FIG.63

| BIT FIELD | DEFINITION IF BIT[11]=1 | DEFINITION IF BIT[11]=0 |
|---|---|---|
| BIT[15:12] | DOCSIS IUC | RESERVED |
| BIT[11] | 1:INDICATES 1ST. BLOCK OF TRANSMISSION | 0:INDICATES NOT 1ST. BLOCK OF TRANSMISSION |
| BIT[10] | 1:INDICATES LAST BLOCK OF TRANSMISSION | 1:INDICATES LAST BLOCK OF TRANSMISSION |
| BIT[9] | 1:INDICATES RANGING REQUIRED | RESERVED |
| BIT[8] | RESERVED | RESERVED |
| BIT[7:5] | 000:FEC OK<br>001:CORRECTABLE FEC ERROR<br>010:UNCORRECTABLE FEC ERROR<br>011:NO UNIQUE WORD DETECTED<br>100:COLLIDED PACKET<br>101:NO ENERGY<br>110:PACKET LENGTH VIOLATION | 000:FEC OK<br>001:CORRECTABLE FEC ERROR<br>010:UNCORRECTABLE FEC ERROR<br>011:NO UNIQUE WORD DETECTED<br>100:COLLIDED PACKET<br>101:NO ENERGY<br>110:PACKET LENGTH VIOLATION |
| BIT[4] | 1:VALID MINISLOT COUNT PREPENDED | RESERVED |
| BIT[3] | 1:VALID CHANNEL ID PREPENDED | RESERVED |
| BIT[2] | 1:VALID SID PREPENDED | RESERVED |
| BIT[1] | 1:RANGING INFO PREPENDED | RESERVED |
| BIT[0] | 1:EQUALIZER COEFFICIENTS PREPENDED | RESERVED |

| FIELD | USAGE | SIZE |
|---|---|---|
| FC | FC_TYPE=11;MAC-SPECIFIC HEADER FC_PARM [4:0]=00011;FRAGMENTATION MAC HEADER EHDR_ON = 1;FRAGMENTATION EHDR FOLLOWS | 8 BITS |
| MAC_PARM | ELEN = 6 BYTES;LENGTH OF FRAGMENTATION EHDR | 8 BITS |
| LEN | LEN = n+10;TOTAL LENGTH OF THIS FRAGMENT INCLUDING PAYLOAD, EHDR, FCRC | 16 BITS |

FIG. 74

| FIELD | USAGE | SIZE | |
|---|---|---|---|
| EHDR | EH_TYPE=3;SAME TYPE AS BP_UP | 4 BITS | 6 BYTES |
| | EH_LEN=5;LENGTH OF THIS EHDR | 4 BITS | |
| | KEY_SEQ;SAME AS IN BP_UP | 4 BITS | |
| | VER=0001;VERSION NUMBER FOR THIS EHDR | 4 BITS | |
| | ENABLE | 1 BIT | |
| |   IF ENABLE=0, BPI DISABLED | | |
| |   IF ENABLE=1, BPI ENABLED | | |
| | TOGGLE BIT;SAME AS IN BP_UP | 1 BIT | |
| | SID;SERVICE ID ASSOCIATED WITH THIS FRAGMENT | 14 BITS | |
| | REQ;NUMBER OF MINI-SLOTS FOR A PIGGYBACK REQUEST | 8 BITS | |
| | RESERVED;MUST BE SET TO ZERO | 2 BITS | |
| | FIRST_FRAG;SET TO ONE FOR FIRST FRAGMENT ONLY | 1 BIT | |
| | LAST_FRAG;SET TO ONE FOR LAST FRAGMENT ONLY | 1 BIT | |
| | FRAG_SEQ;FRAGMENT SEQUENCE COUNT, INCREMENTED FOR EACH FRAGMENT, SET TO ZERO FOR FIRST FRAGMENT | 4 BITS | |
| FHCS | MAC HEADER CHECK SEQUENCE | | 2 BYTES |
| PAYLOAD | FRAGMENT PAYLOAD;PORTION OF TOTAL MAC PDU BEING SENT | | n BYTES |
| FCRC | CRC ACROSS FRAGMENT PAYLOAD | | 4 BYTES |
| | LENGTH OF A MAC FRAGMENT FRAME | | n + 16 BYTES |

16-QAM CONSTELLATION
BEFORE NOISE REJECTION

16-QAM CONSTELLATION
AFTER NOISE REJECTION

COMPENSATING FOR NOISE IN A WIRELESS COMMUNICATION SYSTEM

CROSS-REFERENCE TO RELATED APPLICATIONS

This application is a continuation of U.S. patent application Ser. No. 11/292,098, filed Dec. 2, 2005, which is a continuation of U.S. patent application Ser. No. 09/714,713, filed Nov. 16, 2000, now U.S. Pat. No. 7,103,065, which is a continuation of U.S. patent application Ser. No. 09/574,558, filed May 19, 2000, now U.S. Pat. No. 6,650,624, which is a continuation-in-part of U.S. patent application Ser. No. 09/430,821, filed Oct. 29, 1999, which claims the benefit of U.S. Provisional Patent Application No. 60/106,264, filed Oct. 30, 1998, U.S. Provisional Patent Application No. 60/106,427, filed Oct. 30, 1998, U.S. Provisional Patent Application No. 60/106,438, filed Oct. 30, 1998, U.S. Provisional Patent Application No. 60/106,439, filed Oct. 30, 1998, U.S. Provisional Patent Application No. 60/106,440, filed Oct. 30, 1998, and U.S. Provisional Patent Application No. 60/106,441, filed Oct. 30, 1998, all of which are incorporated herein by reference in their entireties.

BACKGROUND OF THE INVENTION

1. Field of the Invention

The present invention relates generally to communication systems, and more specifically to noise compensation in a wireless communication system.

2. Background Art

The desired solution for high speed data communications appears to be cable modem. Cable modem is capable of providing data rates as high as 56 Mbps, and is thus suitable for high speed file transfer, video teleconferencing and pay-per-view television. Further, cable modems may simultaneously provide high speed Internet access, digital television (such as pay-per-view) and digital telephony.

Although cable modems are used in a shared access system, wherein a plurality of subscribers compete for bandwidth over a common coaxial cable, any undesirable reduction in actual data rate is easily controlled simply by limiting the number of shared users on each system. In this manner, each user is assured of a sufficient data rate to provide uninterrupted video teleconferencing or pay-per-view television, for example.

BRIEF SUMMARY OF THE INVENTION

In a bidirectional communication system, subscriber stations are connected by uplink channels to a receiver at a base station. The individual uplink channels are impaired by user specific noise associated with the respective subscriber stations such as multi-path reflections and the like. In addition, the uplink channels are also impaired by common noise, such as ingress noise, during uplink transmission. Embodiments of the present invention reduce the common noise and/or the individual noise.

According to one exemplary embodiment, a base station includes a media access controller (MAC) that generates for downlink transmission MAP messages that assign time slots in which subscriber stations may transmit signal bursts on an uplink channel. The MAP messages include idle slots that are assigned to no subscriber stations. The base station further includes a transmitter and an adaptive notch filter. The transmitter transmits the MAP messages with the idle slots to subscriber stations. The adaptive notch filter has coefficients that are adjusted to suppress noise on the uplink channel sensed during the idle slots.

In another exemplary embodiment, a base station includes a notch filter connected to a demodulator. The notch filter has coefficients that are adjustable to cancel noise applied to the demodulator. The base station further includes a MAC and a decision feedback equalizer. The MAC processes binary data and generates for downlink transmission MAP messages. The decision feedback equalizer is coupled to the demodulator and includes a feedforward filter for establishing pre-equalization coefficients.

According to another exemplary embodiment, a base station includes means for transmitting on a downlink channel to a plurality of subscriber stations MAP messages that assign time slots in which subscriber stations may transmit signal bursts on an uplink channel. The MAP messages include idle slots that are assigned to no subscriber stations. The base station further includes means for monitoring conditions on the uplink channel during the idle slots. Means for compensating for the monitored conditions on the uplink channel and means for receiving signal bursts on the uplink channel in response to such compensation are also included.

In yet another exemplary embodiment, a base station includes means for compensating for noise on an uplink channel and means for receiving on the compensated uplink channel a ranging signal from a subscriber station of a plurality of subscriber stations. The base station further includes means for adjusting filter coefficients to compensate for intersymbol interference on the uplink channel based on the received ranging signal and means for transmitting the adjusted coefficients on a downlink channel to the subscriber station for the purpose of pre-equalization of the uplink channel.

In still another exemplary embodiment, a subscriber station includes a transmitter, a receiver, and a transmit equalizer. The transmitter transmits a ranging signal to a base station. The receiver receives pre-equalization coefficients from the base station. The pre-equalization coefficients are based on the ranging signal. The transmit equalizer compensates for noise associated with the subscriber station based on the pre-equalization coefficients.

BRIEF DESCRIPTION OF THE DRAWINGS/FIGURES

These and other features, aspects and advantages of the present invention will be more fully understood when considered with respect to the following detailed description, appended claims and accompanying drawings wherein:

FIG. 3 is a simplified block diagram showing the use of a fractional symbol timing loop, a carrier phase correction loop and a conventional amplitude estimator to enhance the rate at which acquisition of data packets is performed in a burst receiver of a cable modem termination system or the like;

FIG. 6E is a table showing an example of loop filter coarse coefficients and fine coefficients which provide specified bandwidths at the listed update rates;

Figure 1:
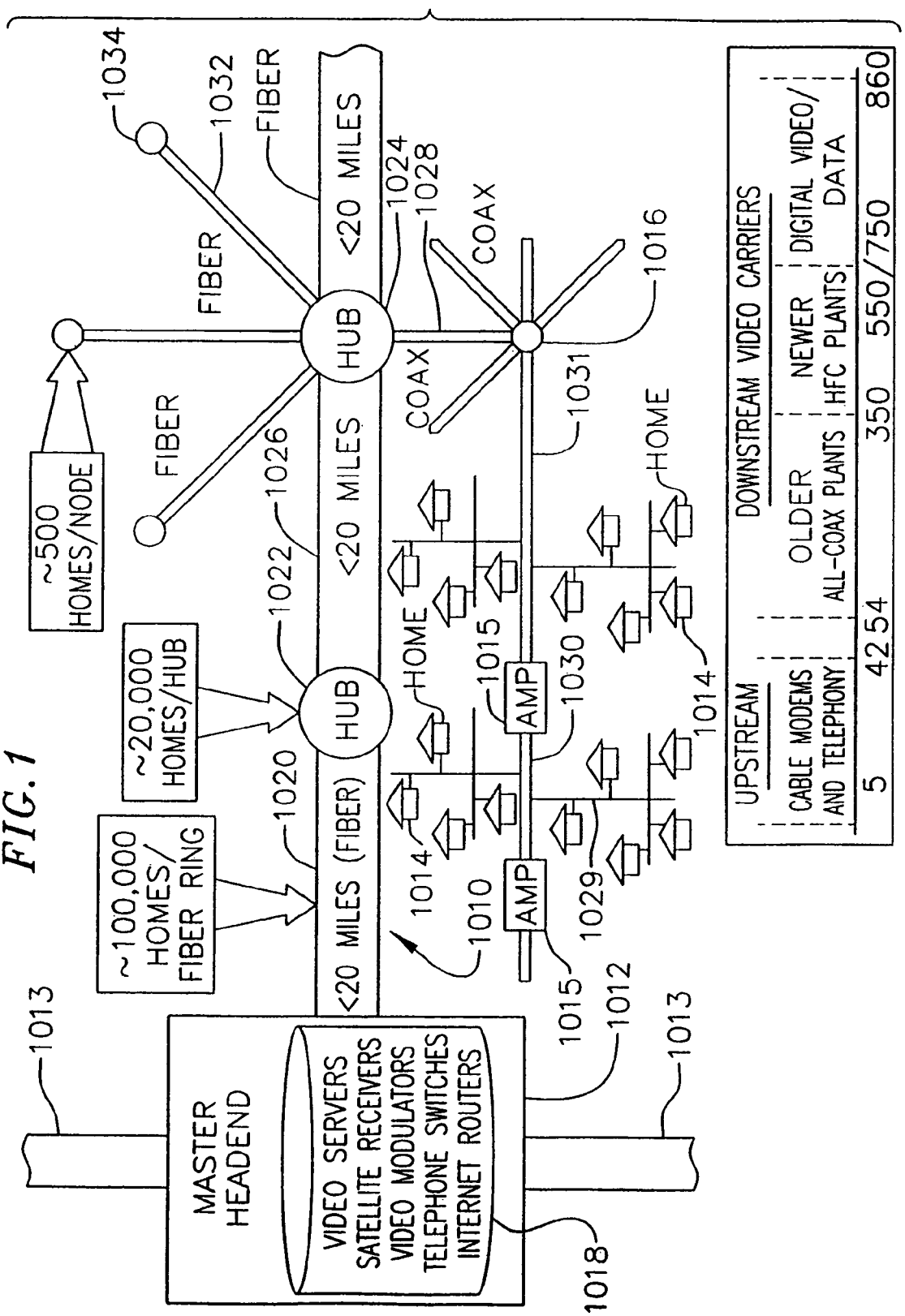
FIG. 1 is a schematic diagram of a hybrid fiber coaxial (HFC) network showing typical pathways for data transmission between the headend (which contains the cable modem termination system) and a plurality of homes (each of which contain a cable modem)
Figure 2:
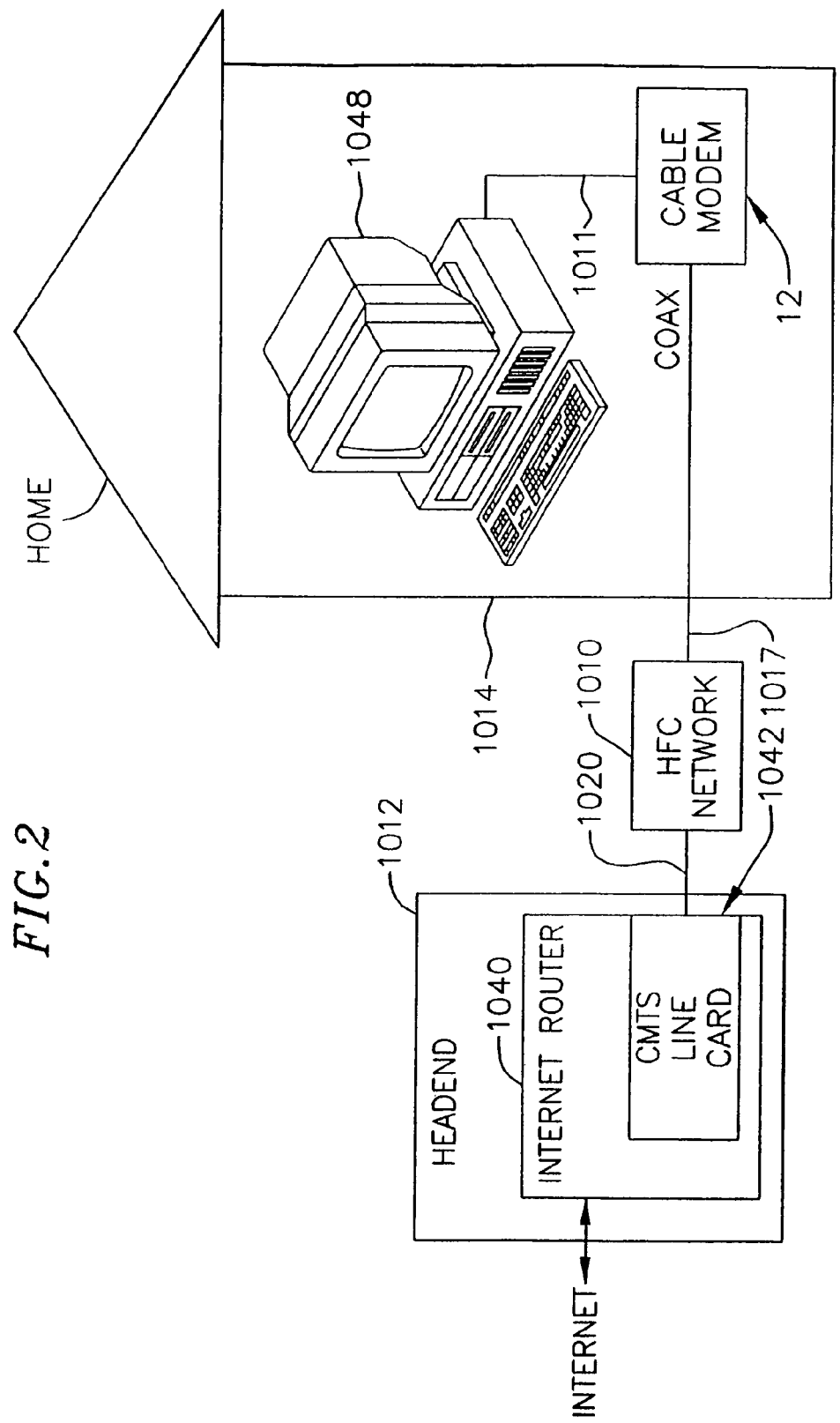
FIG. 2 is a simplified block diagram of a cable modem system wherein a line card which defines a cable modem termination system CMTS) is disposed at the headend and a cable modem is disposed within a representative home.
Figure 4:
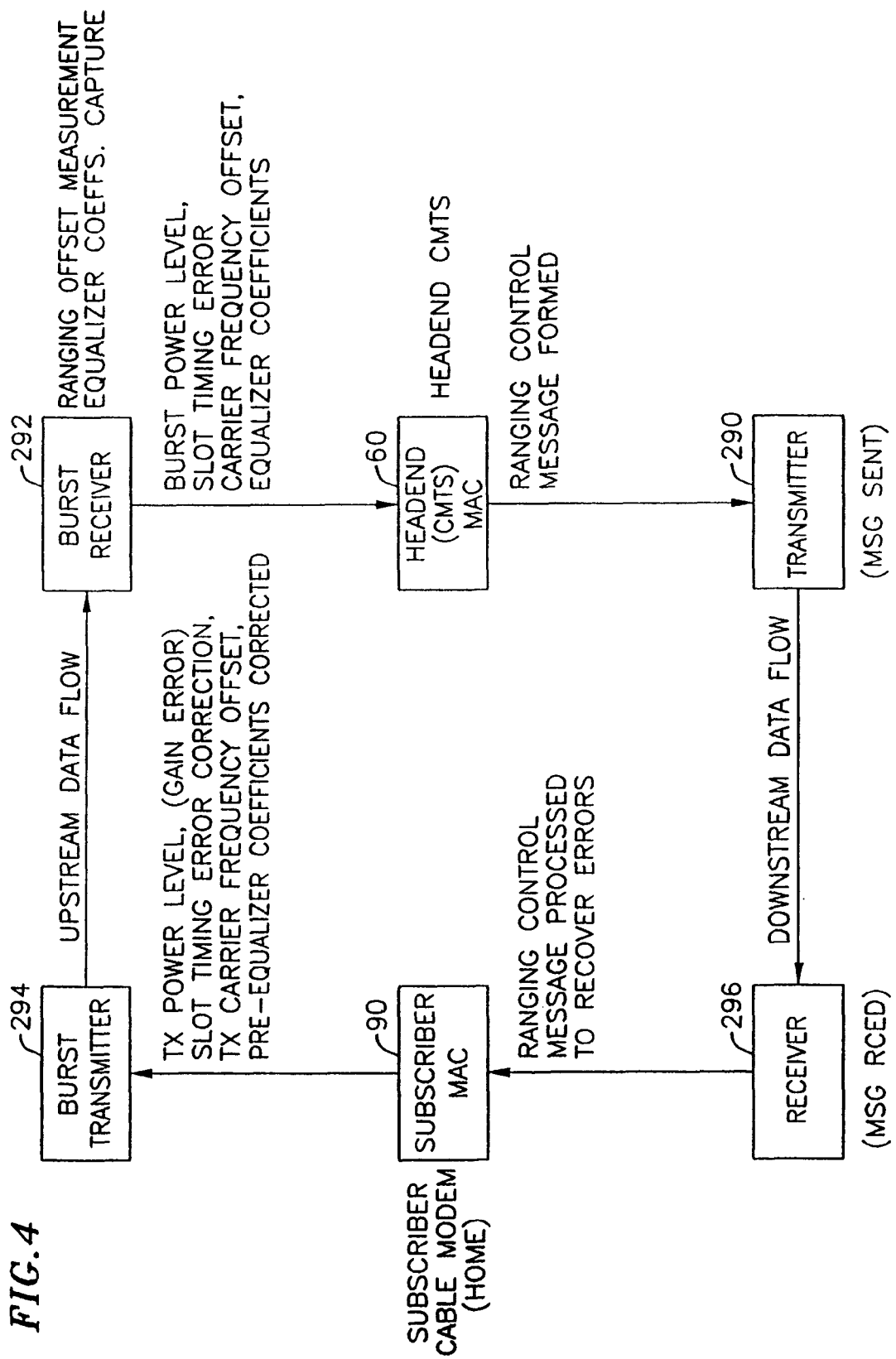
FIG. 4 is a block diagram showing the interrelationships of the burst transmitter, subscriber medium access control (MAC) and receiver of the cable modem with the burst receiver, medium access control (MAC) and transmitter of the cable modem termination system.
Figure 7A:
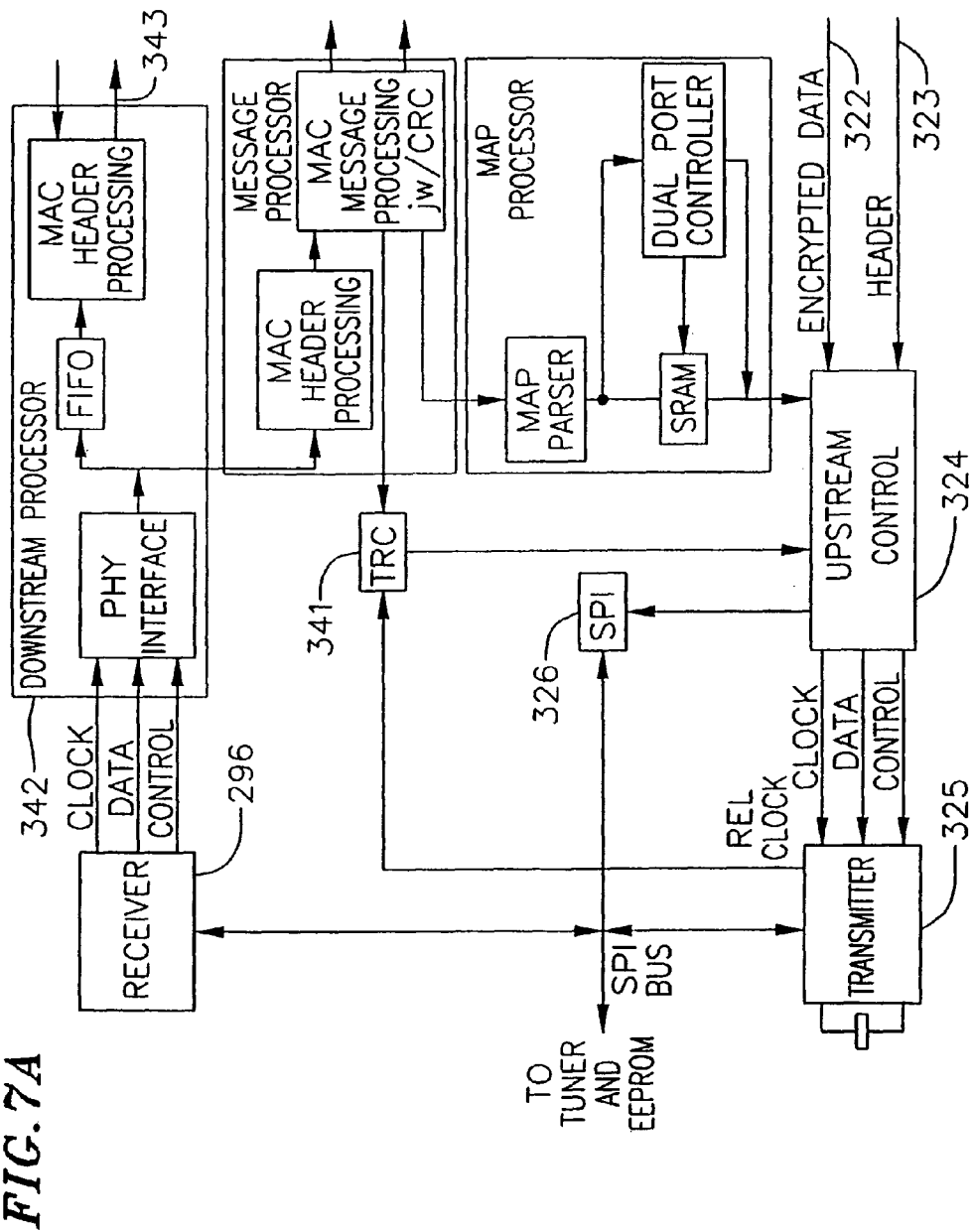
Figure 7B:
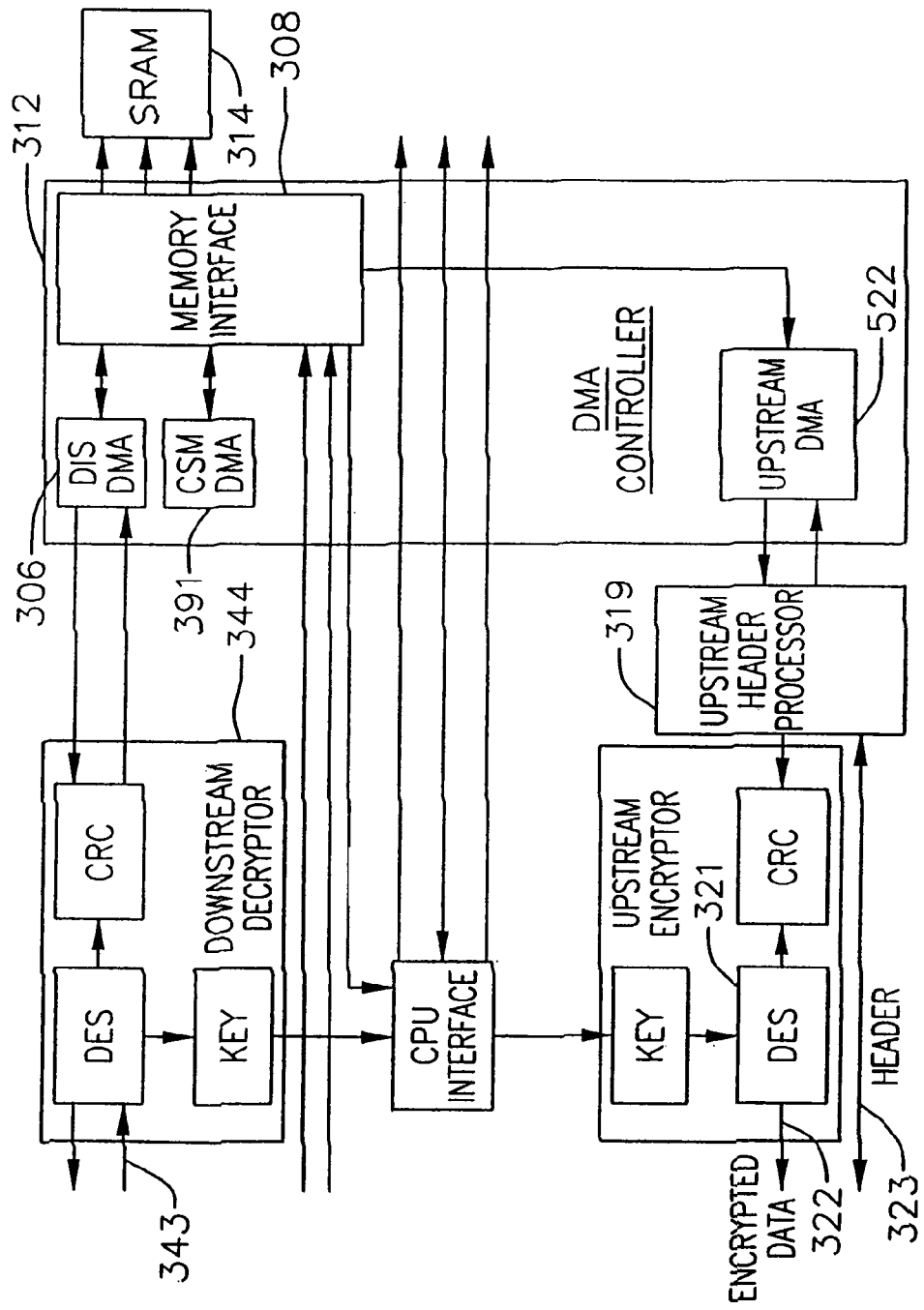
Figure 8A:
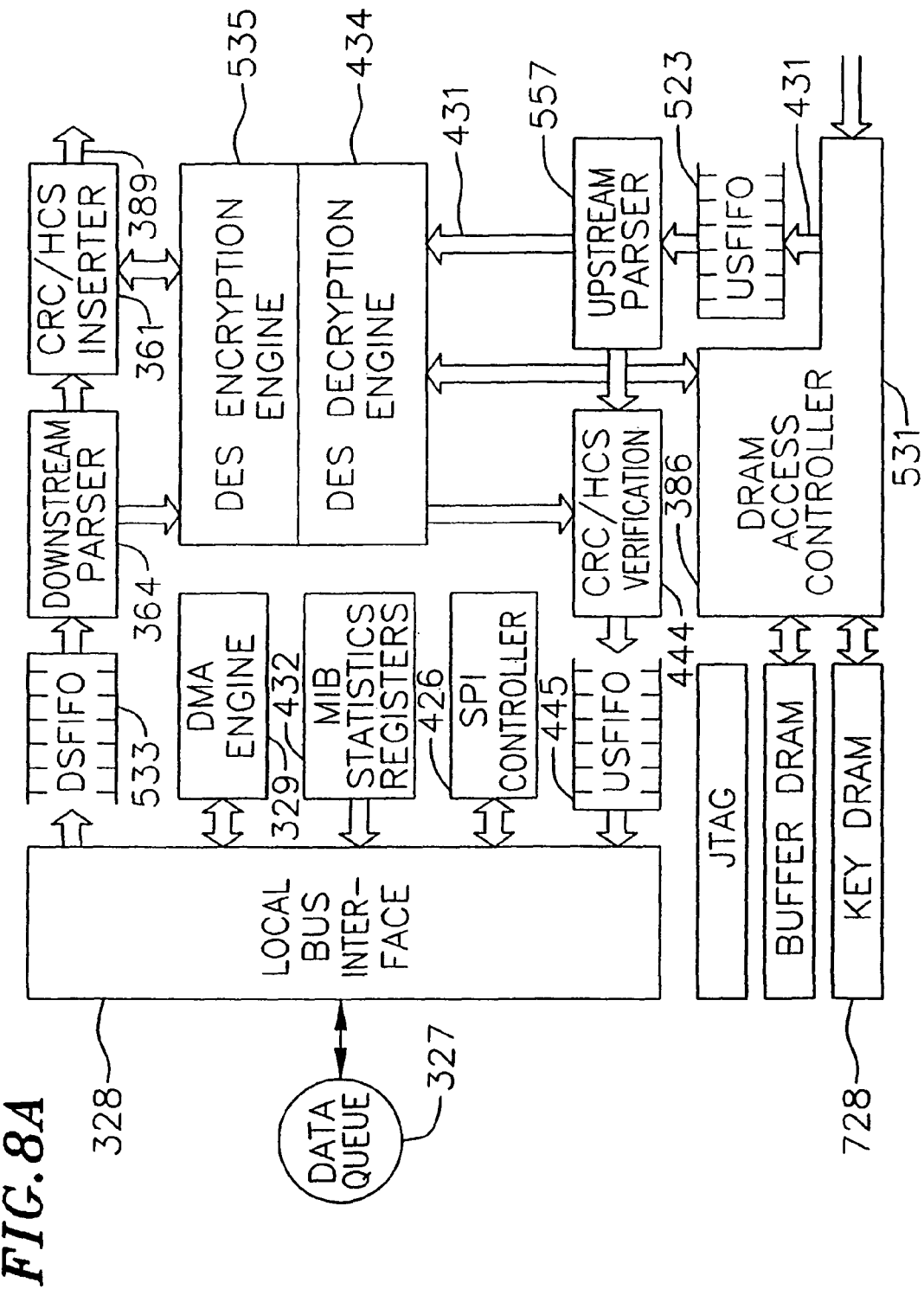
Figure 8B:
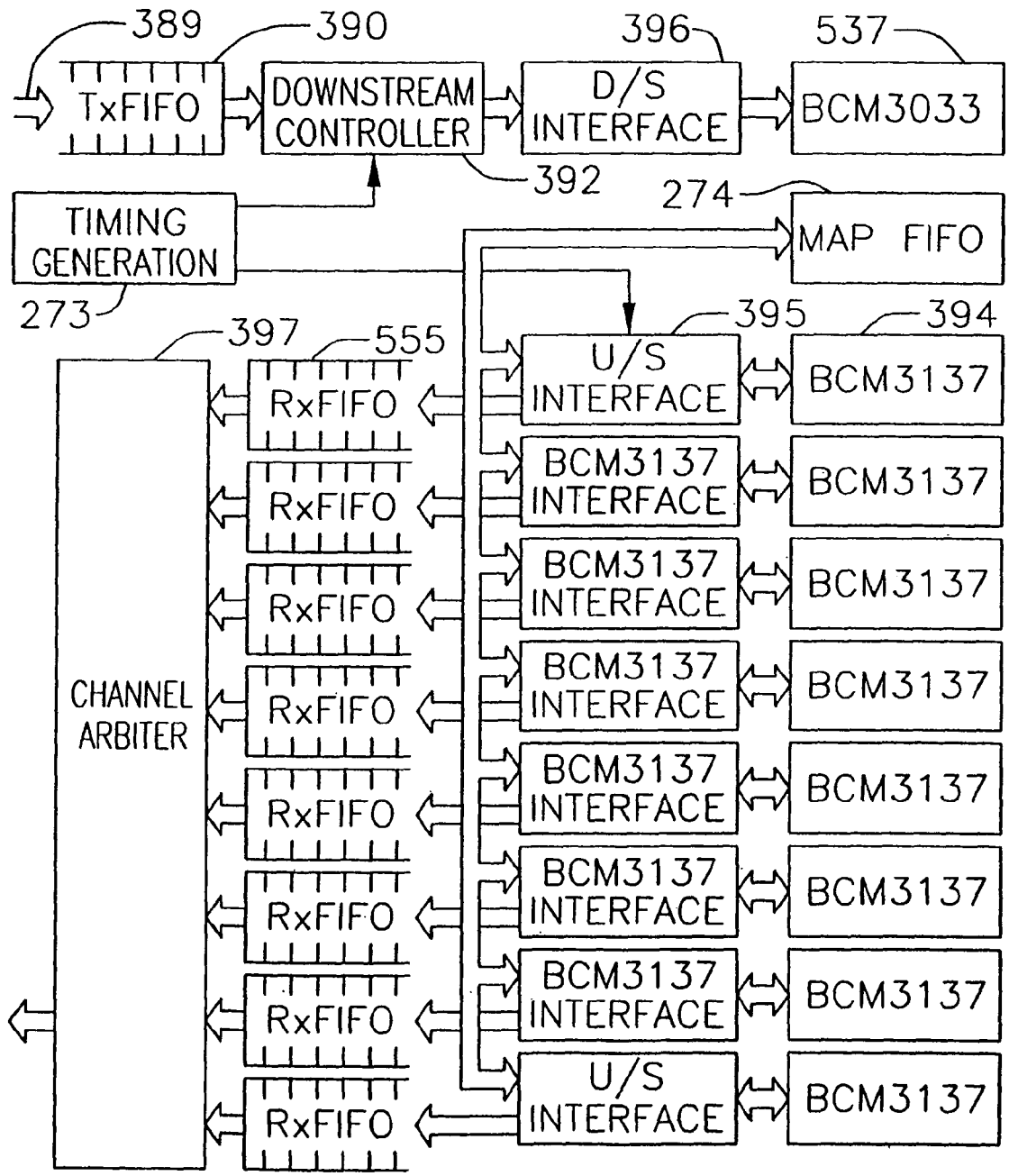
Figure 9:
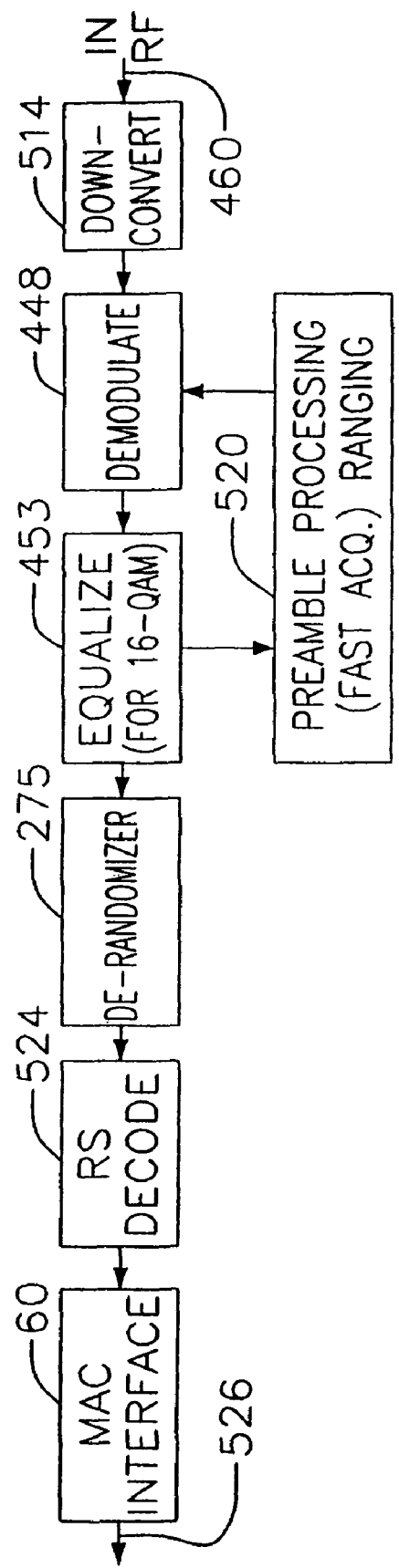
Figure 10:
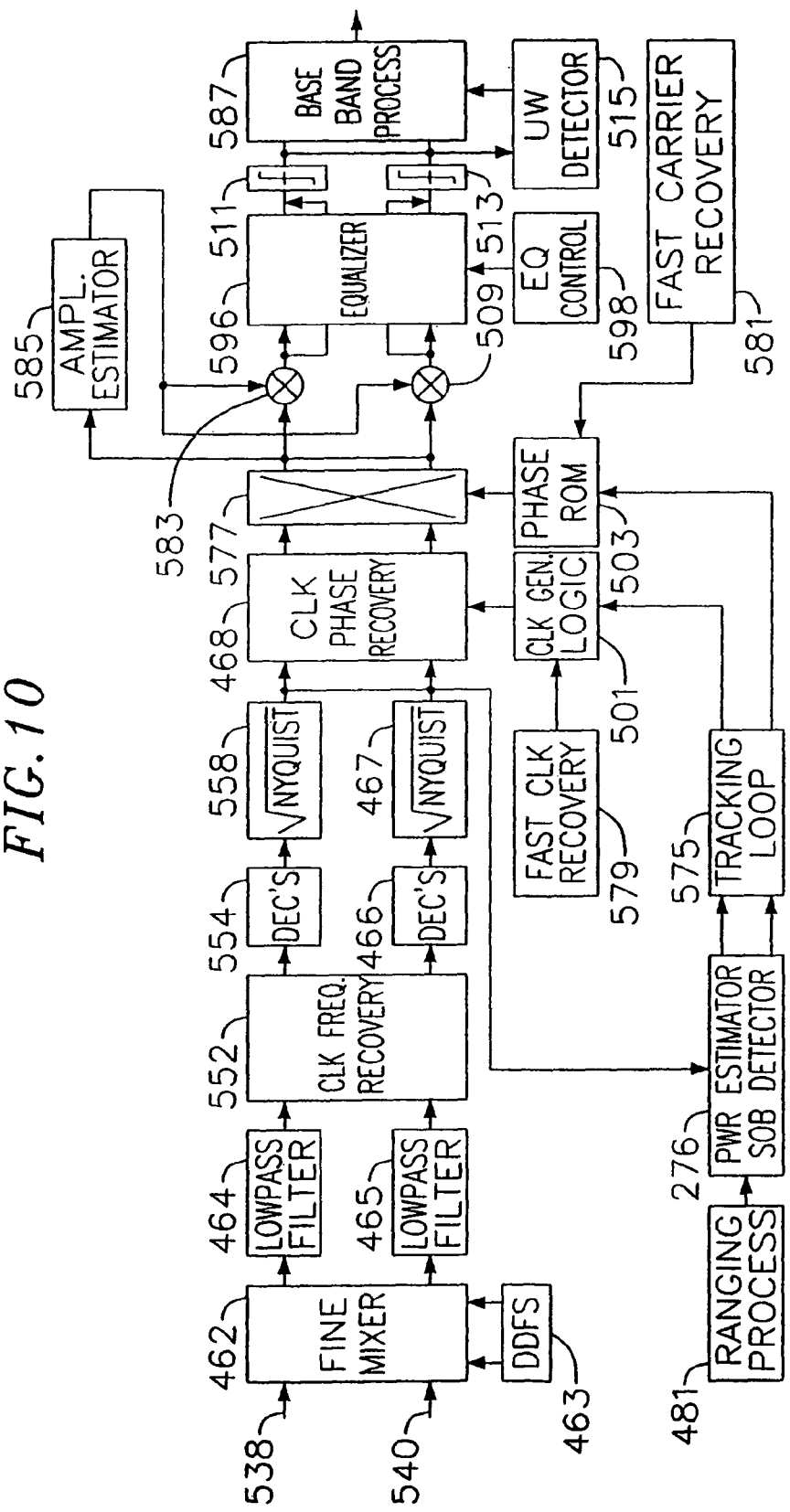
Figure 11:
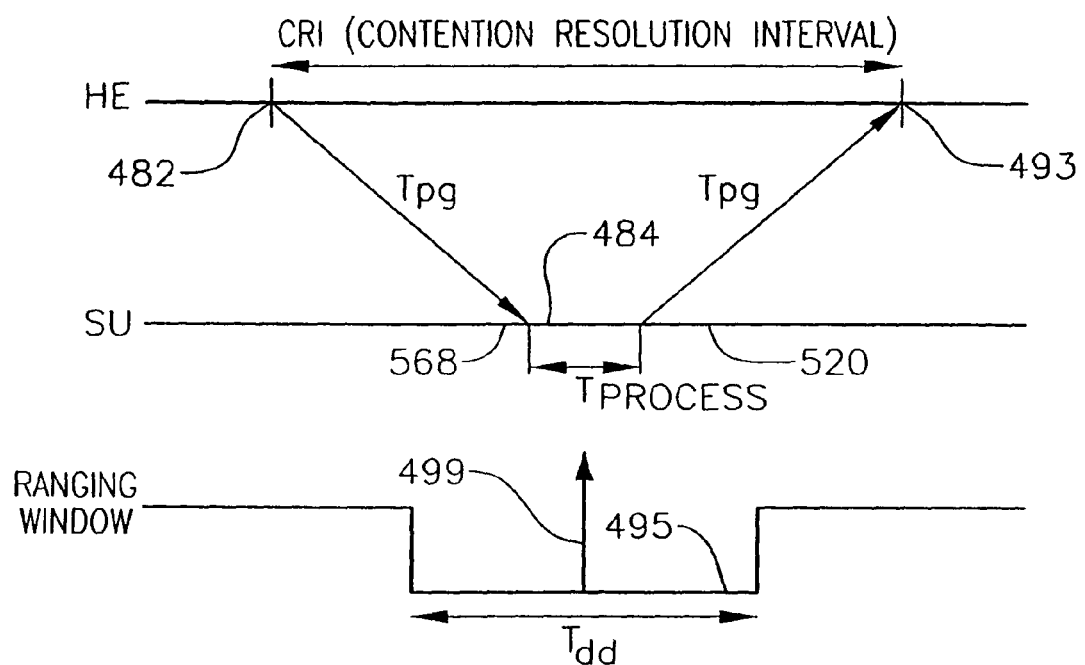
Figure 12:
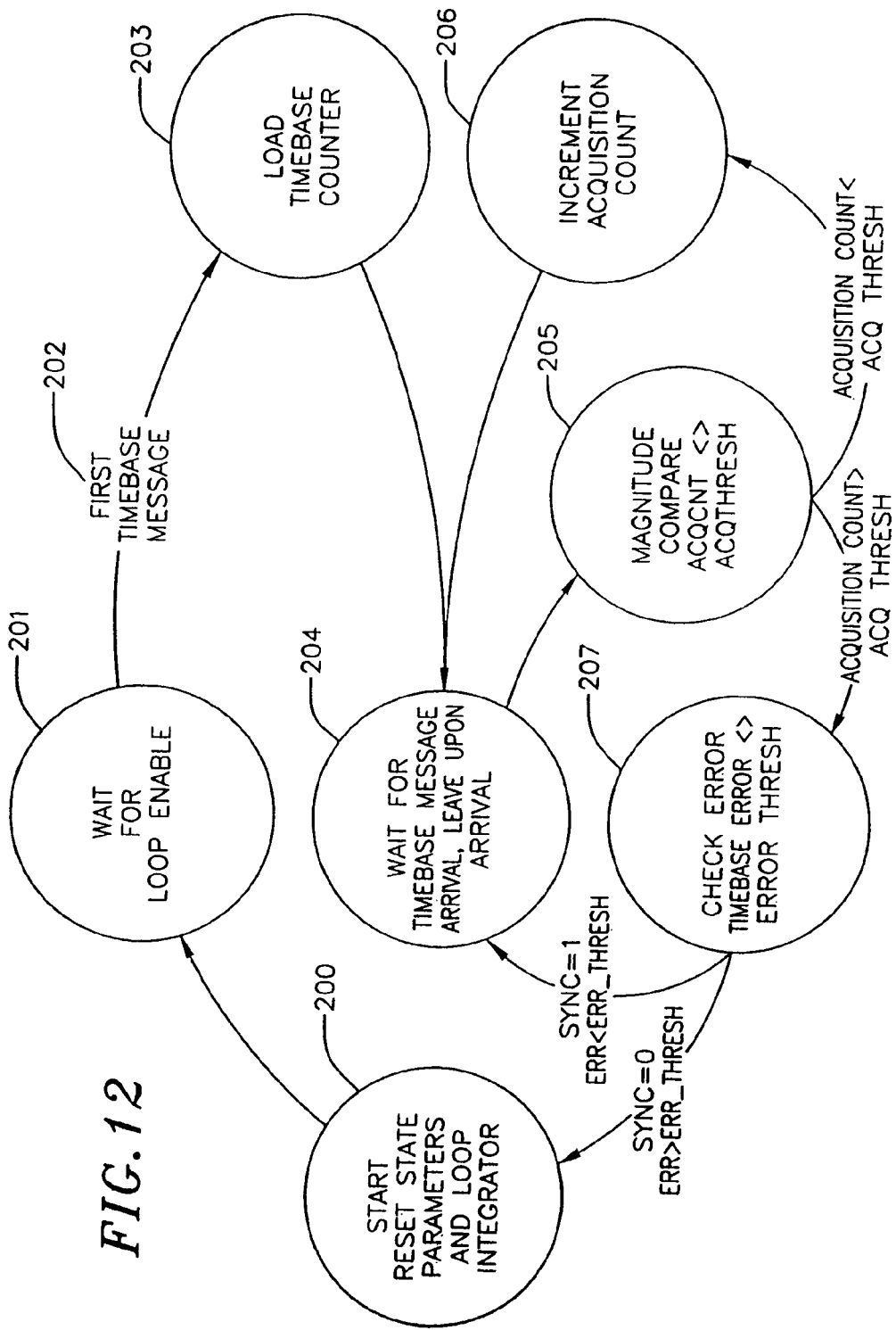
Figure 13:
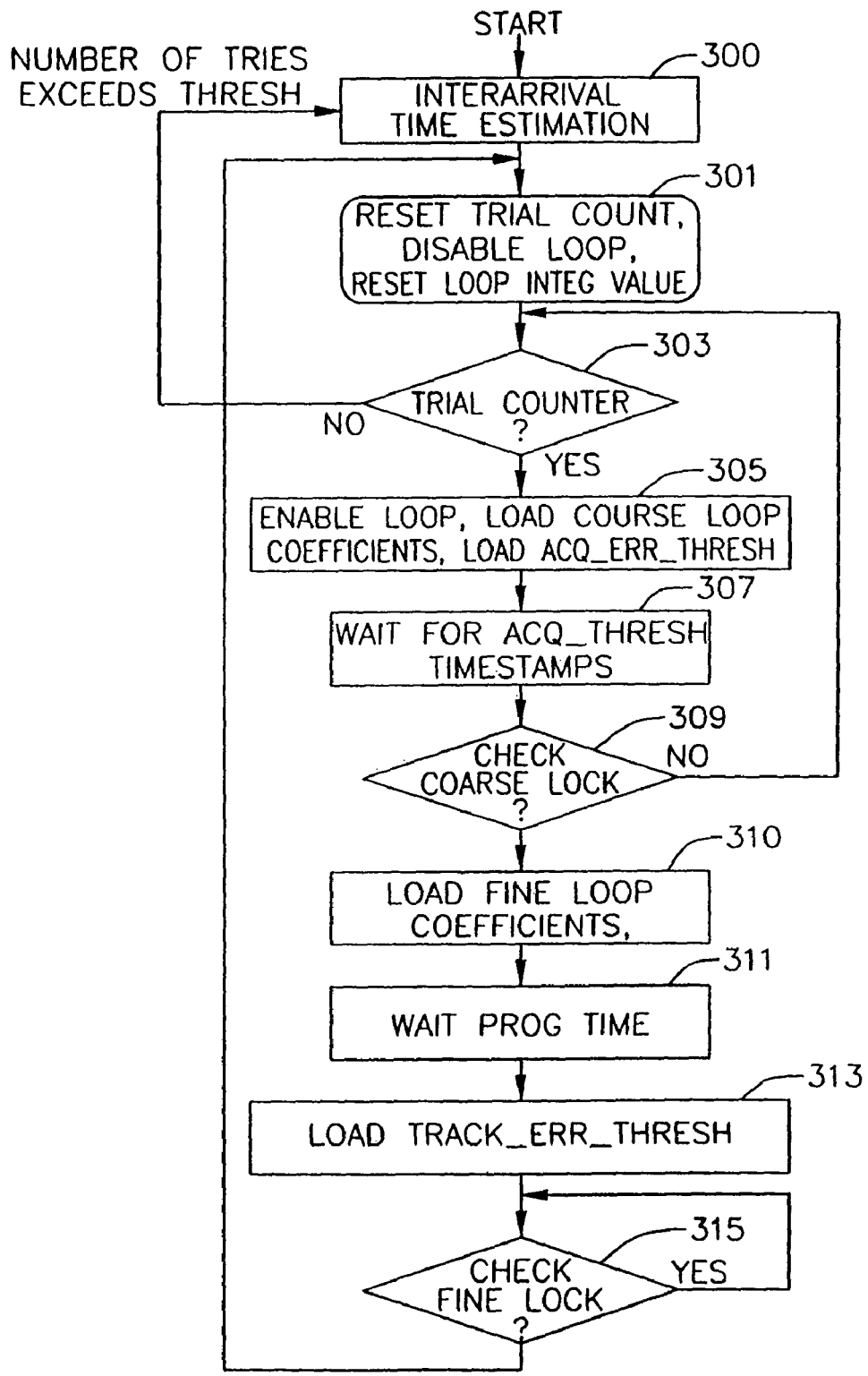
Figure 14:
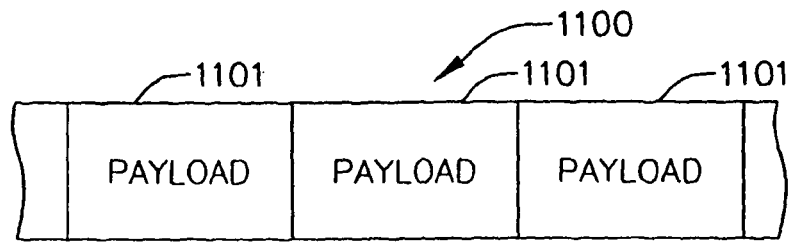
Figure 15:
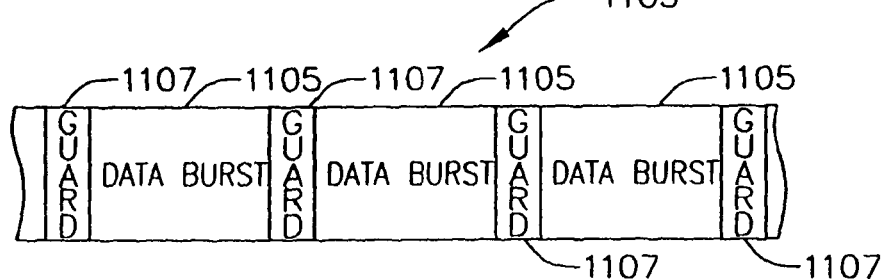
Figure 16:
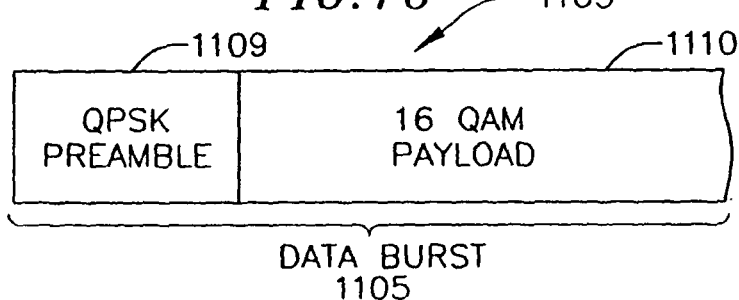
Figure 17:
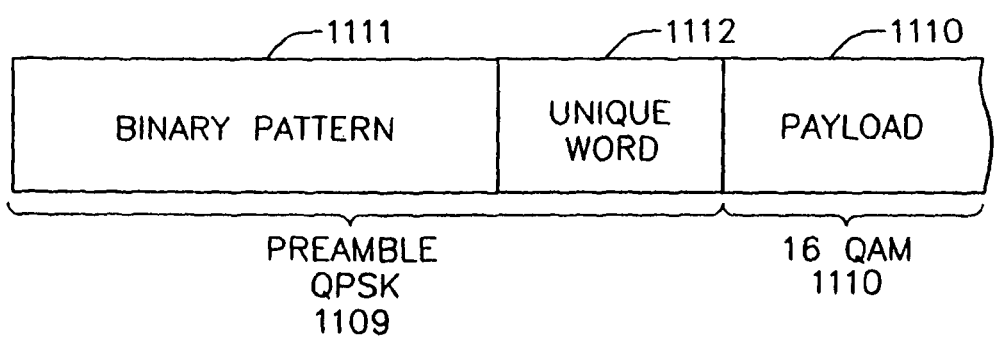
Figure 18:
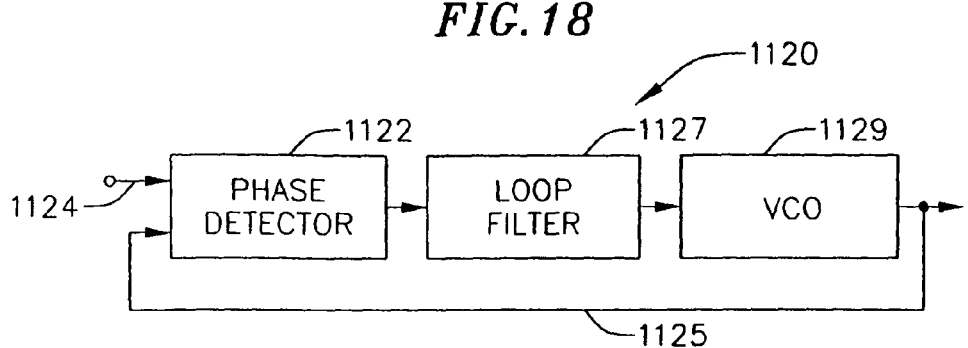
Figure 19:
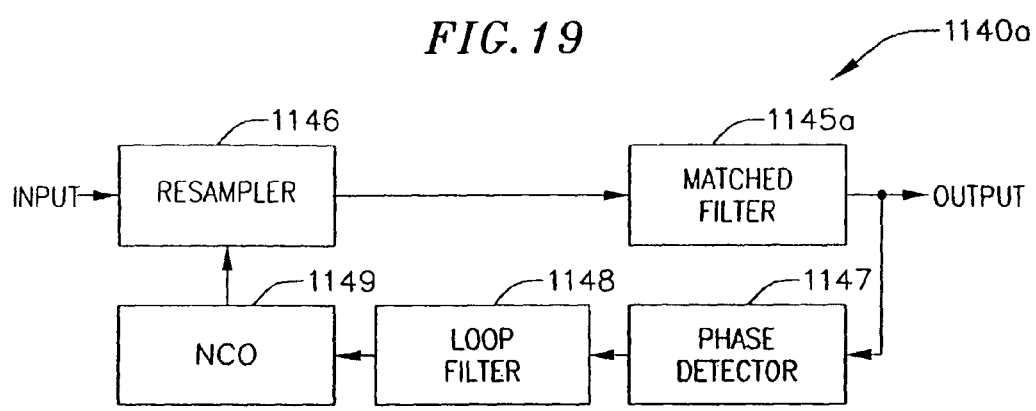
Figure 20:
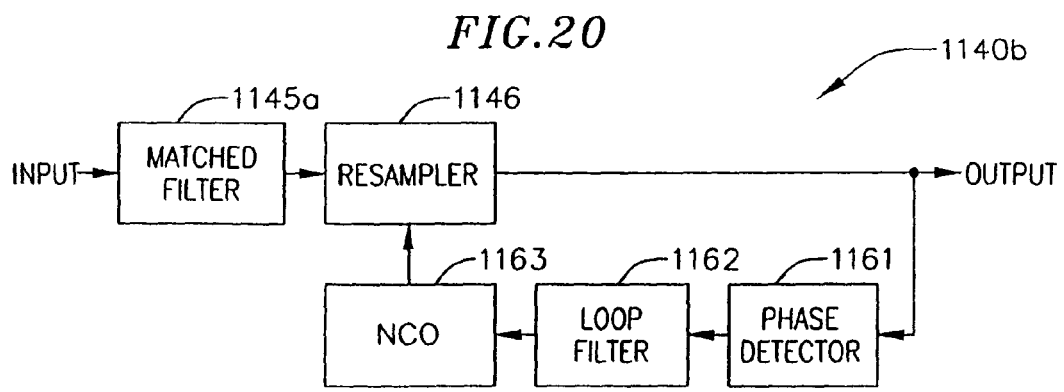
Figure 21:
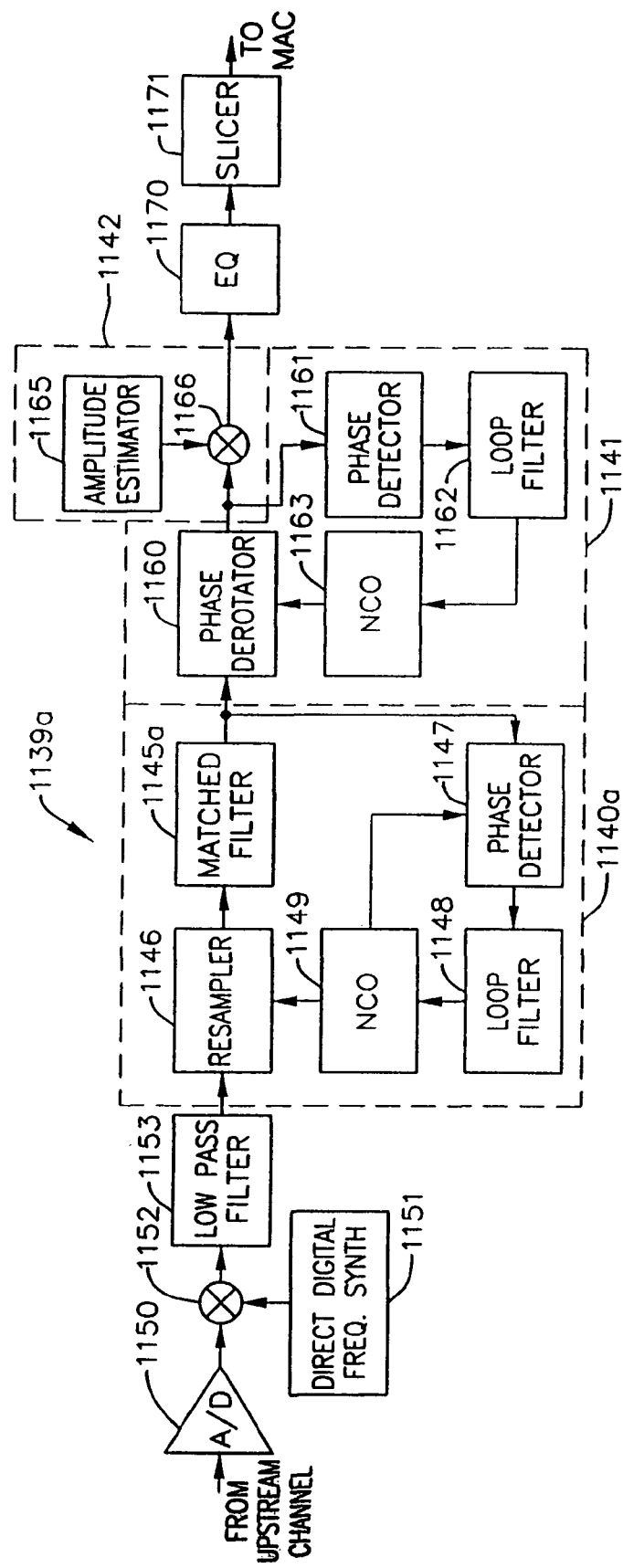
Figure 22:
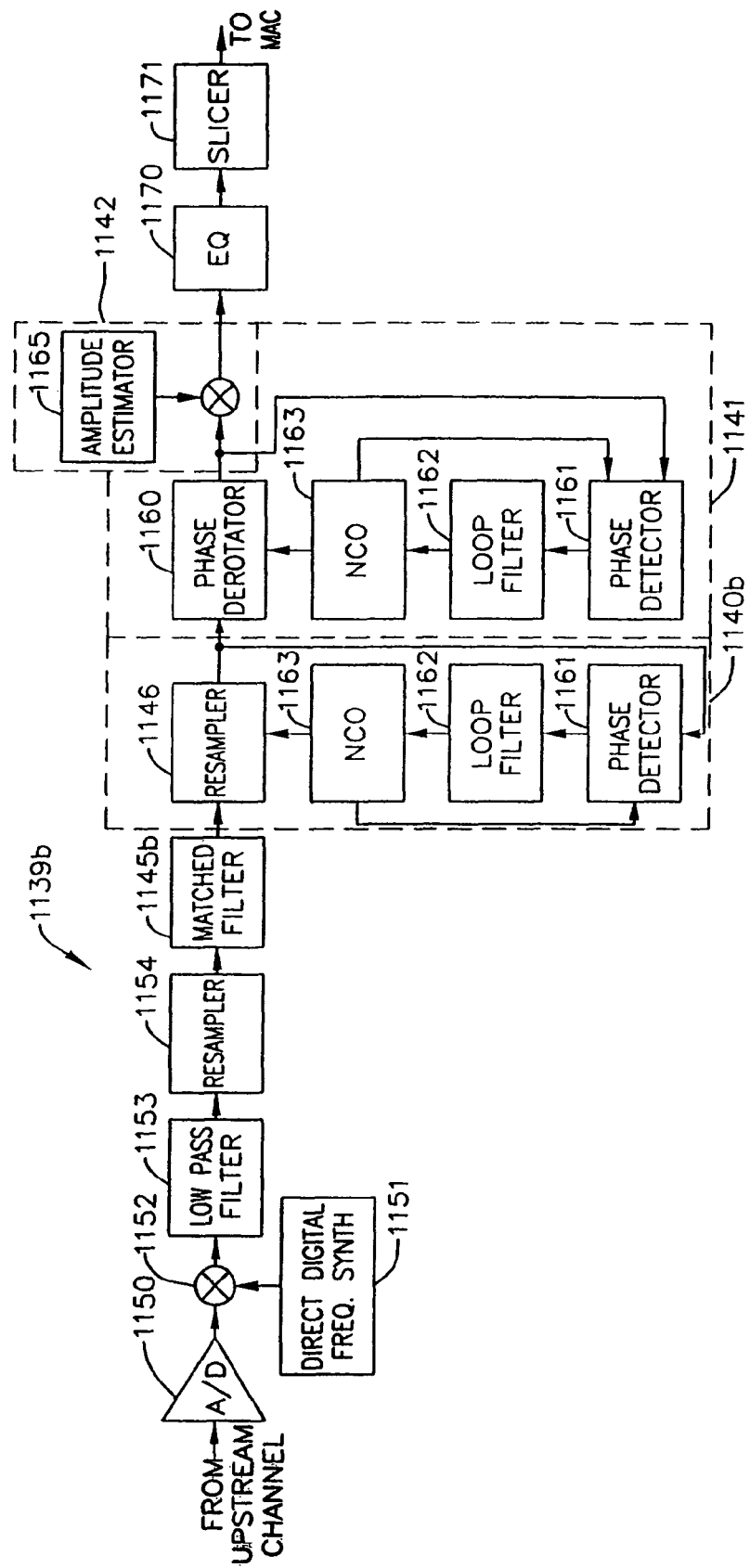
Figure 23:
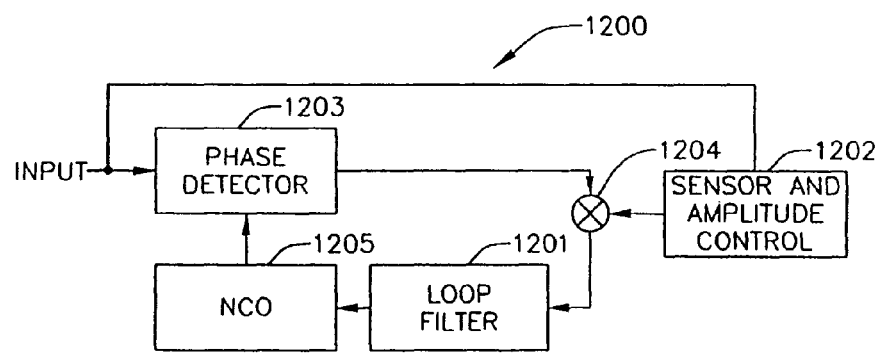
Figure 24:
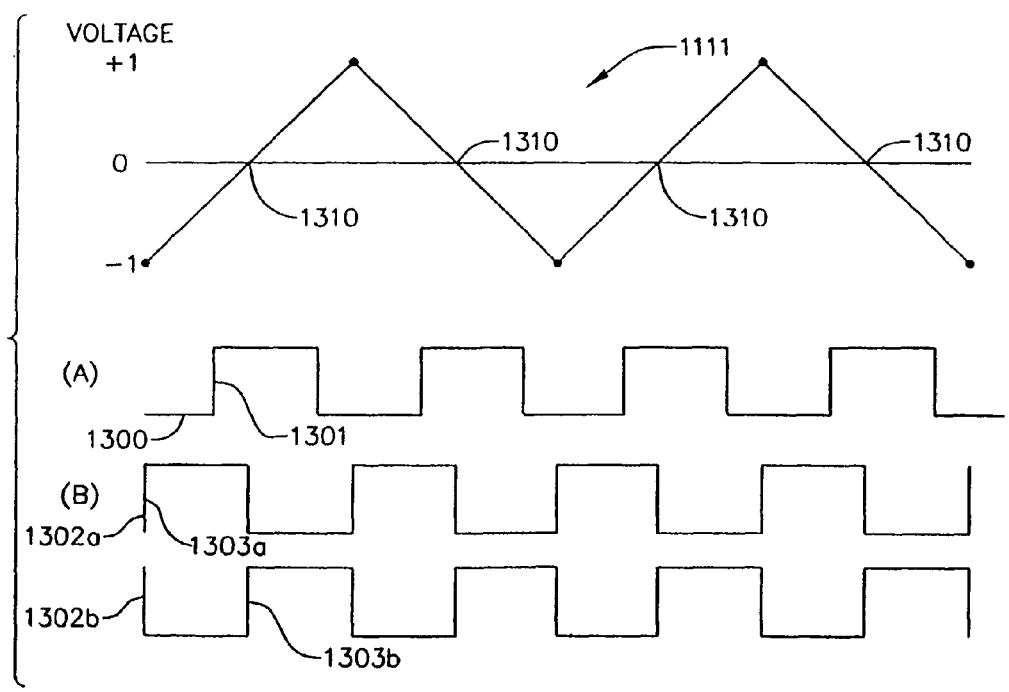
Figure 25A:
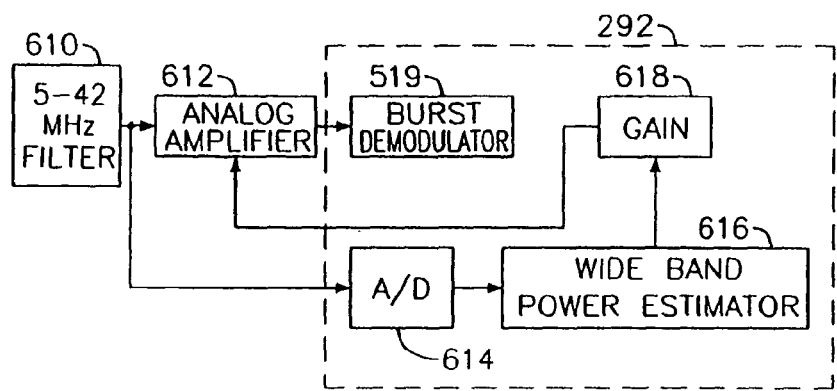
Figure 25B:
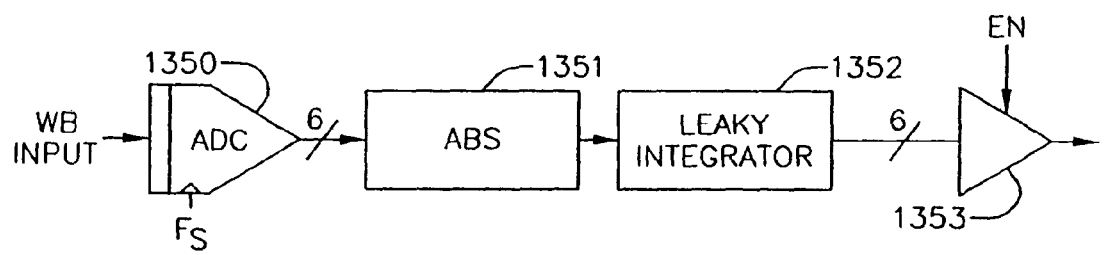
Figure 26:
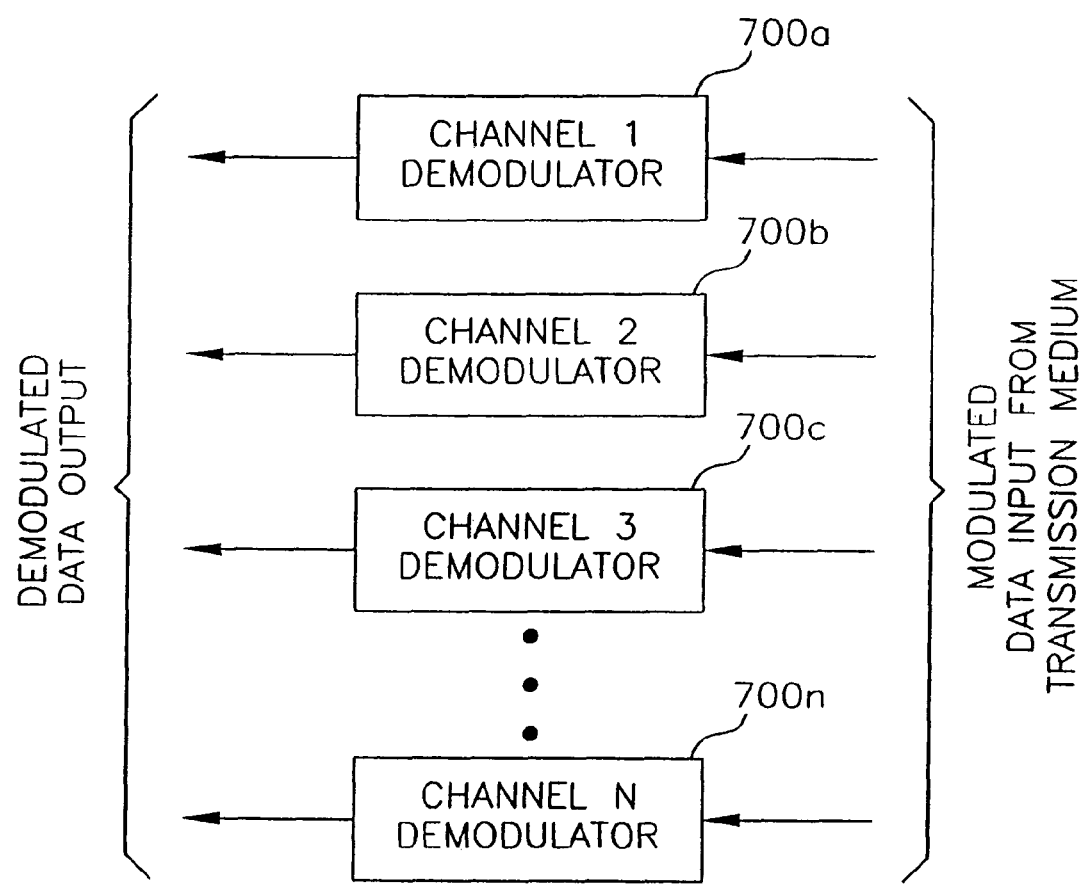
Figure 27:
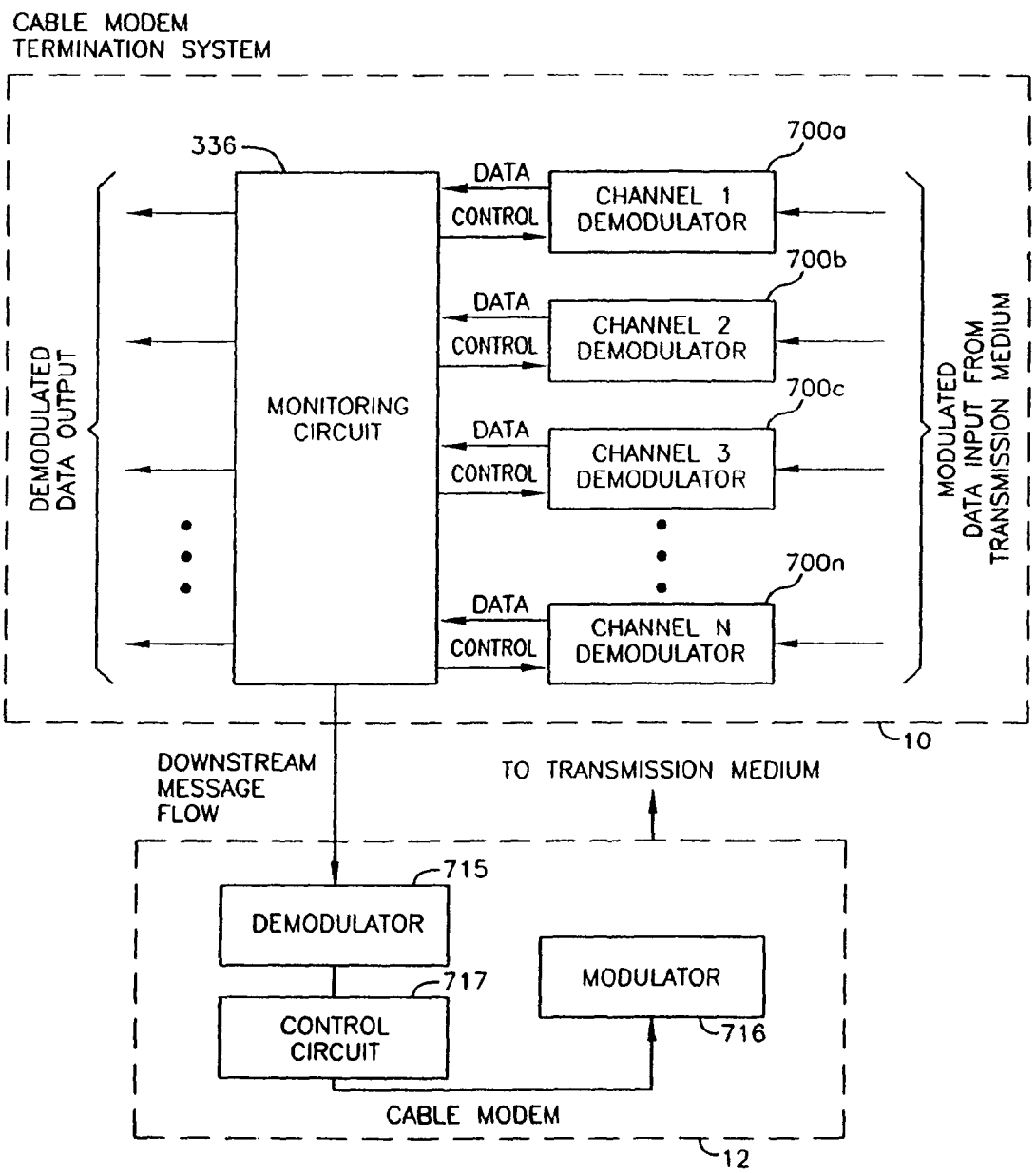
Figure 28:
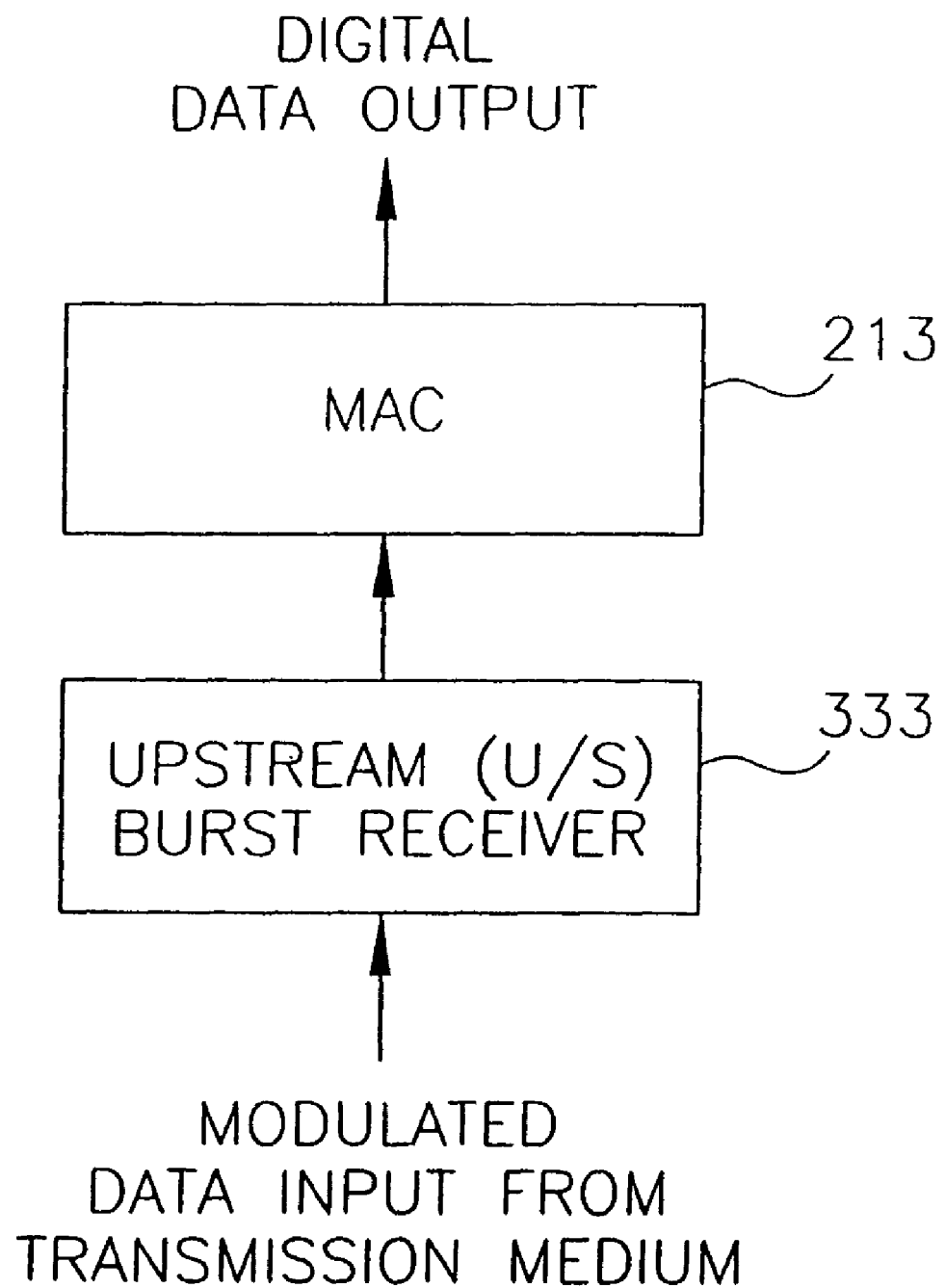
Figure 29:
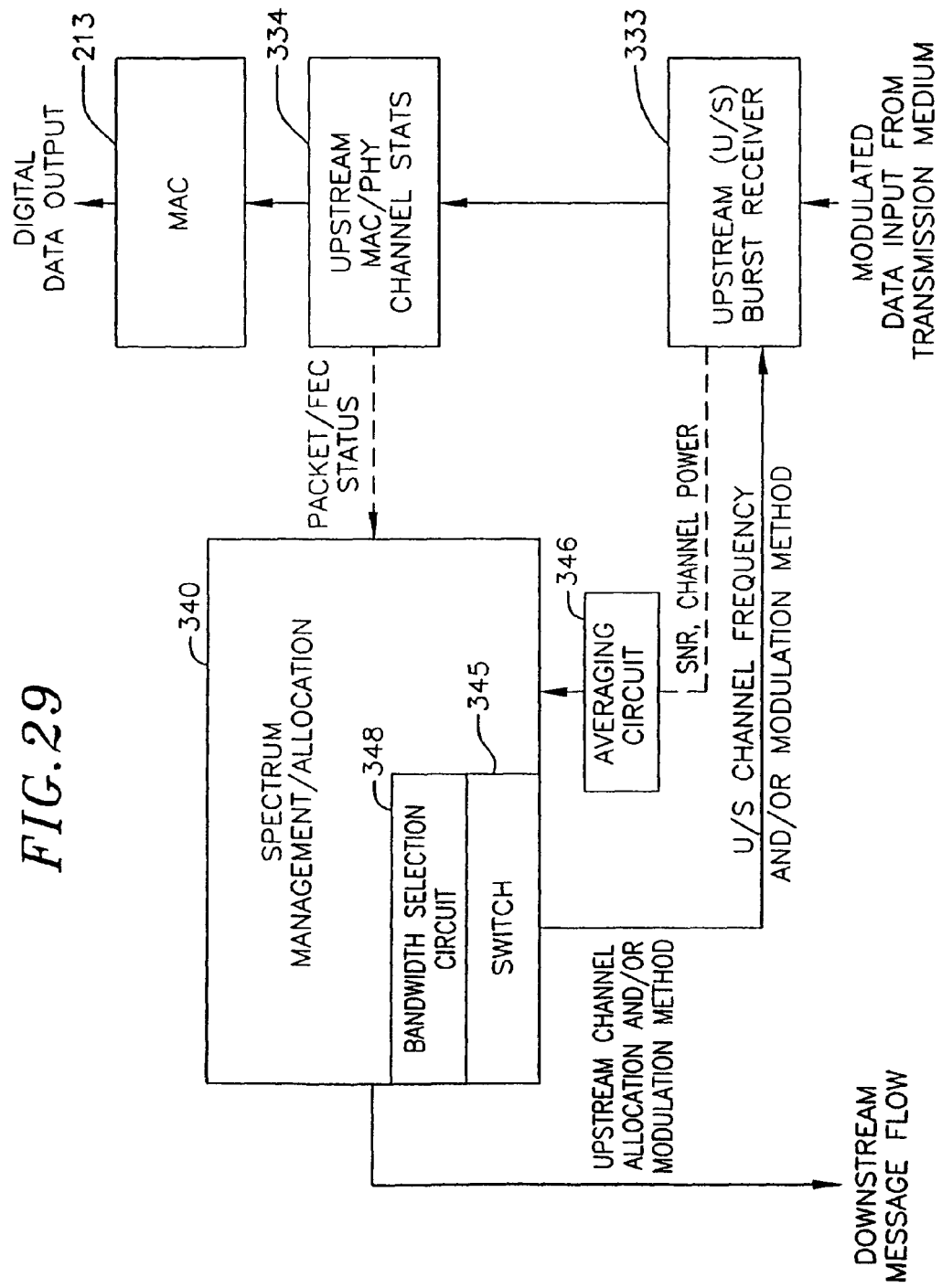
Figure 30:
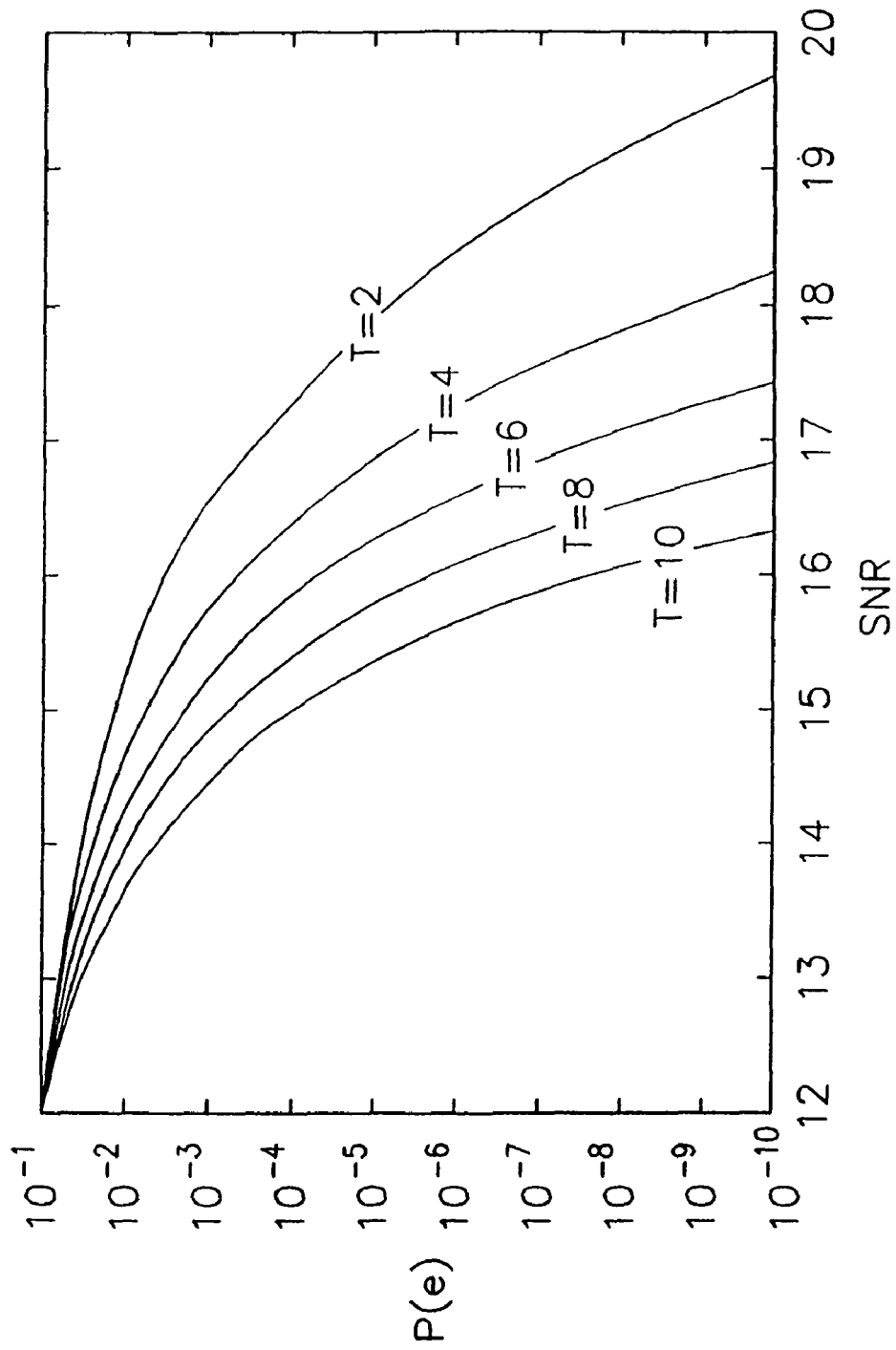
Figure 31:
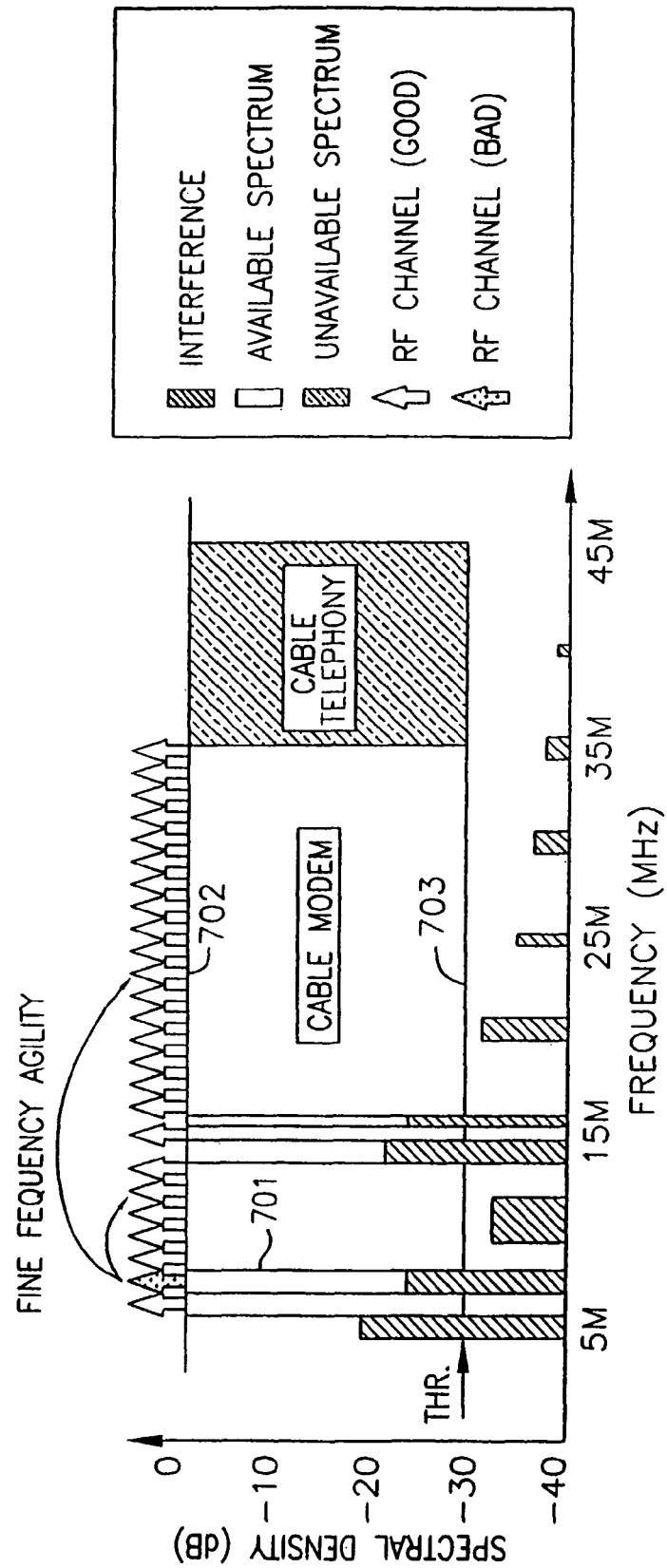
Figure 32:
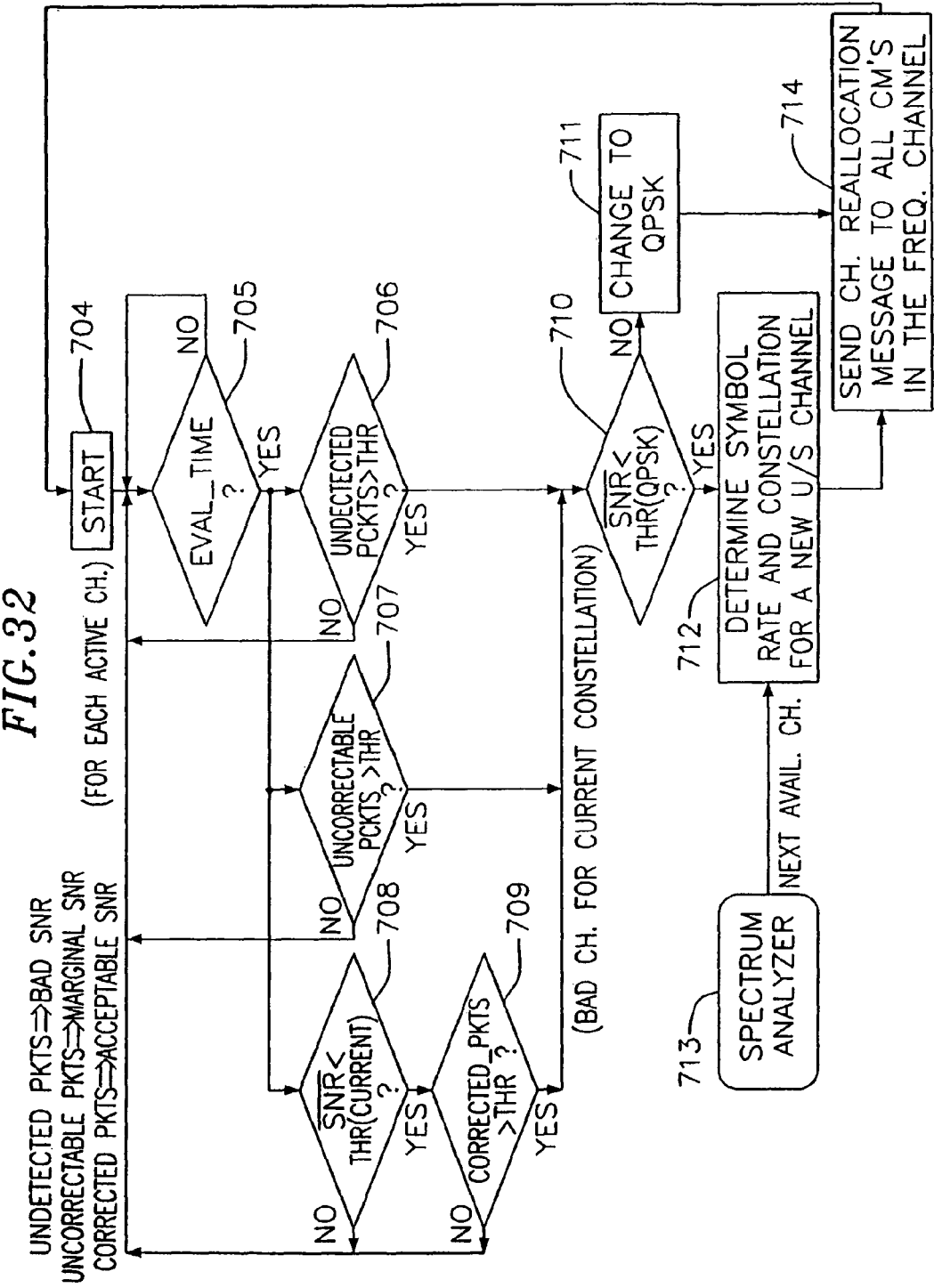
Figure 33:
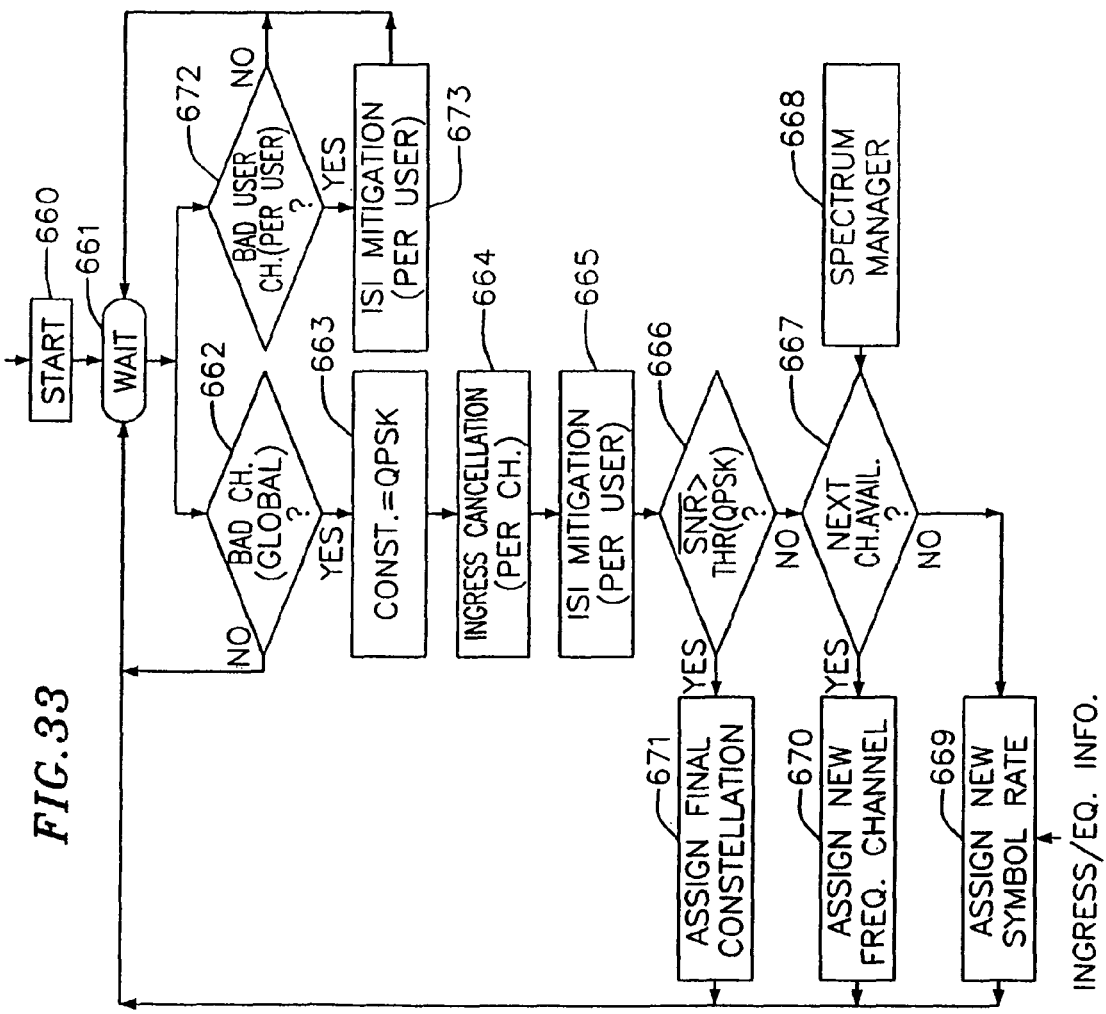
Figure 34:
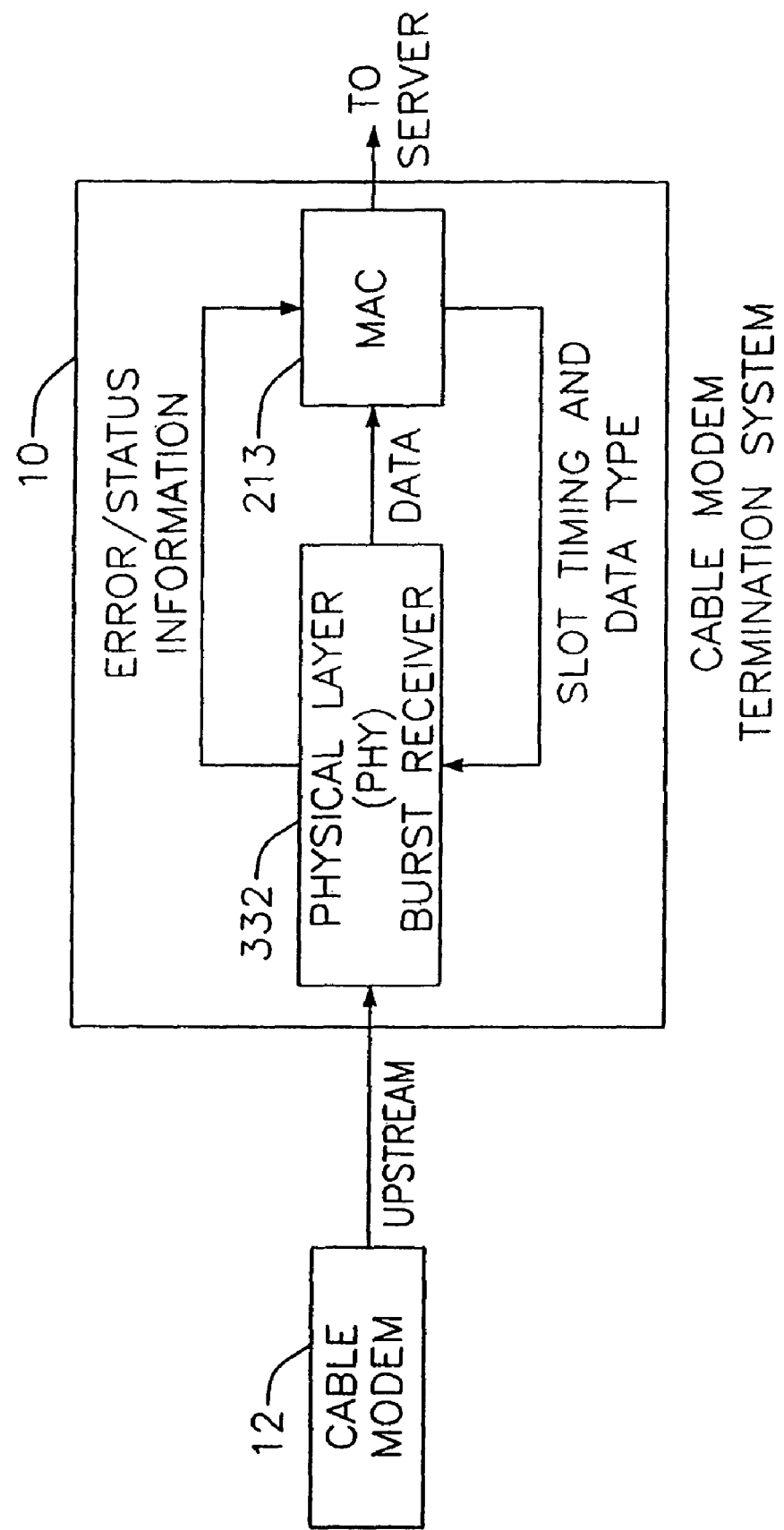
Figure 35:
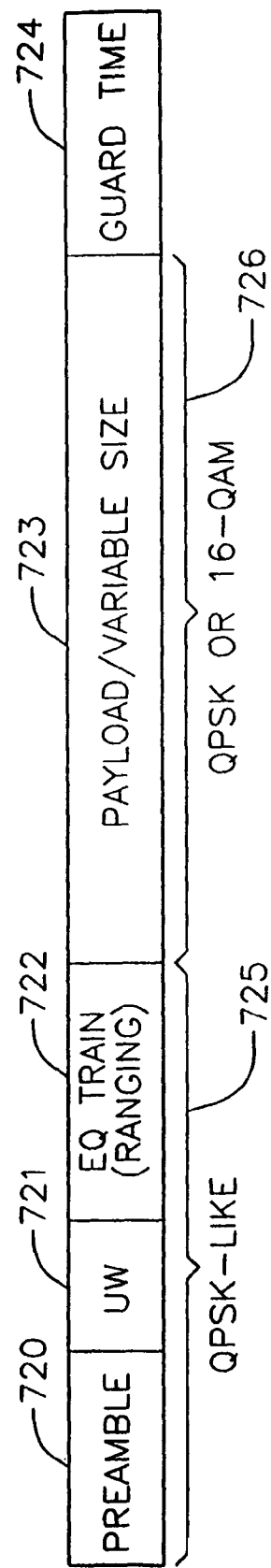
Figure 36:
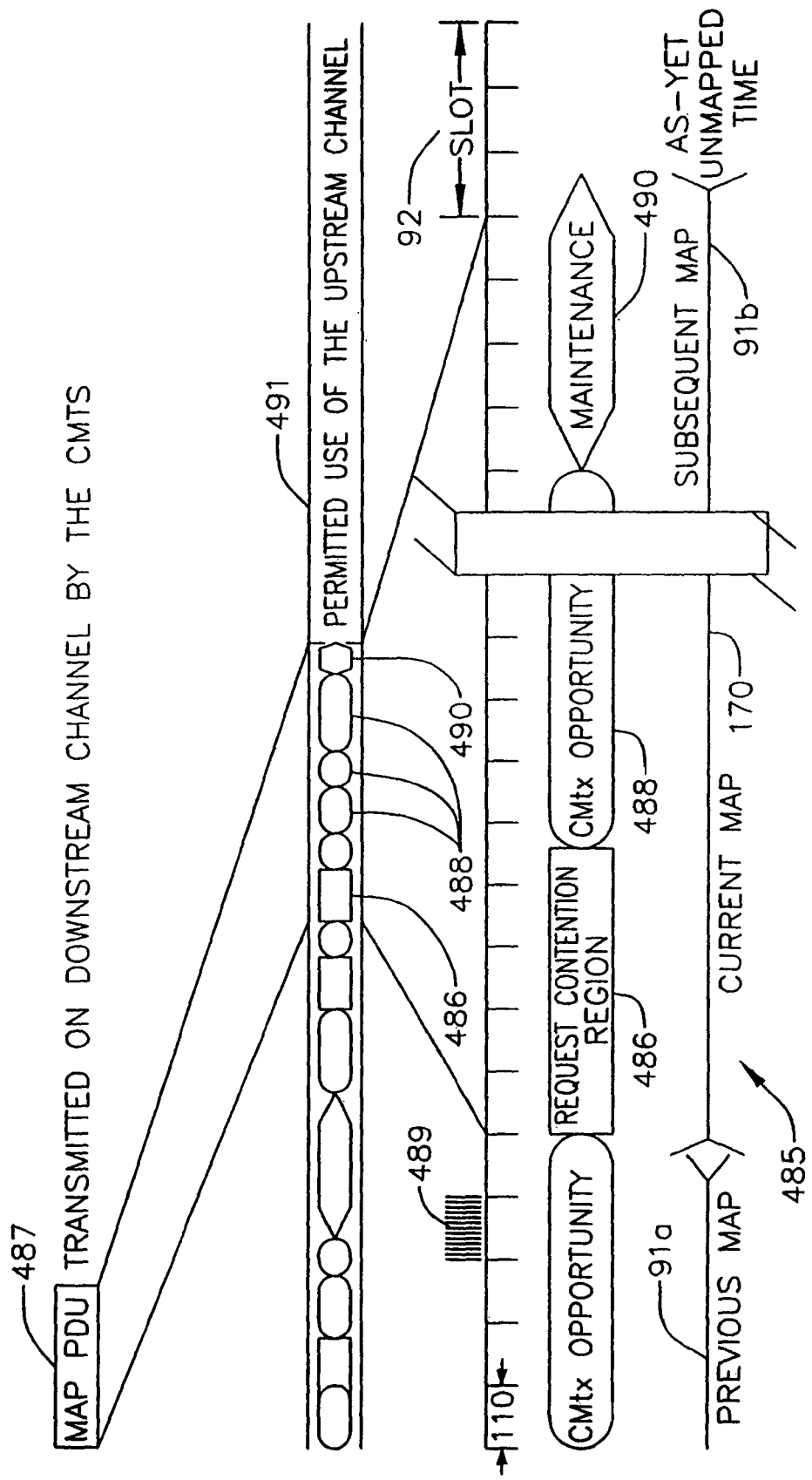
Figure 37:
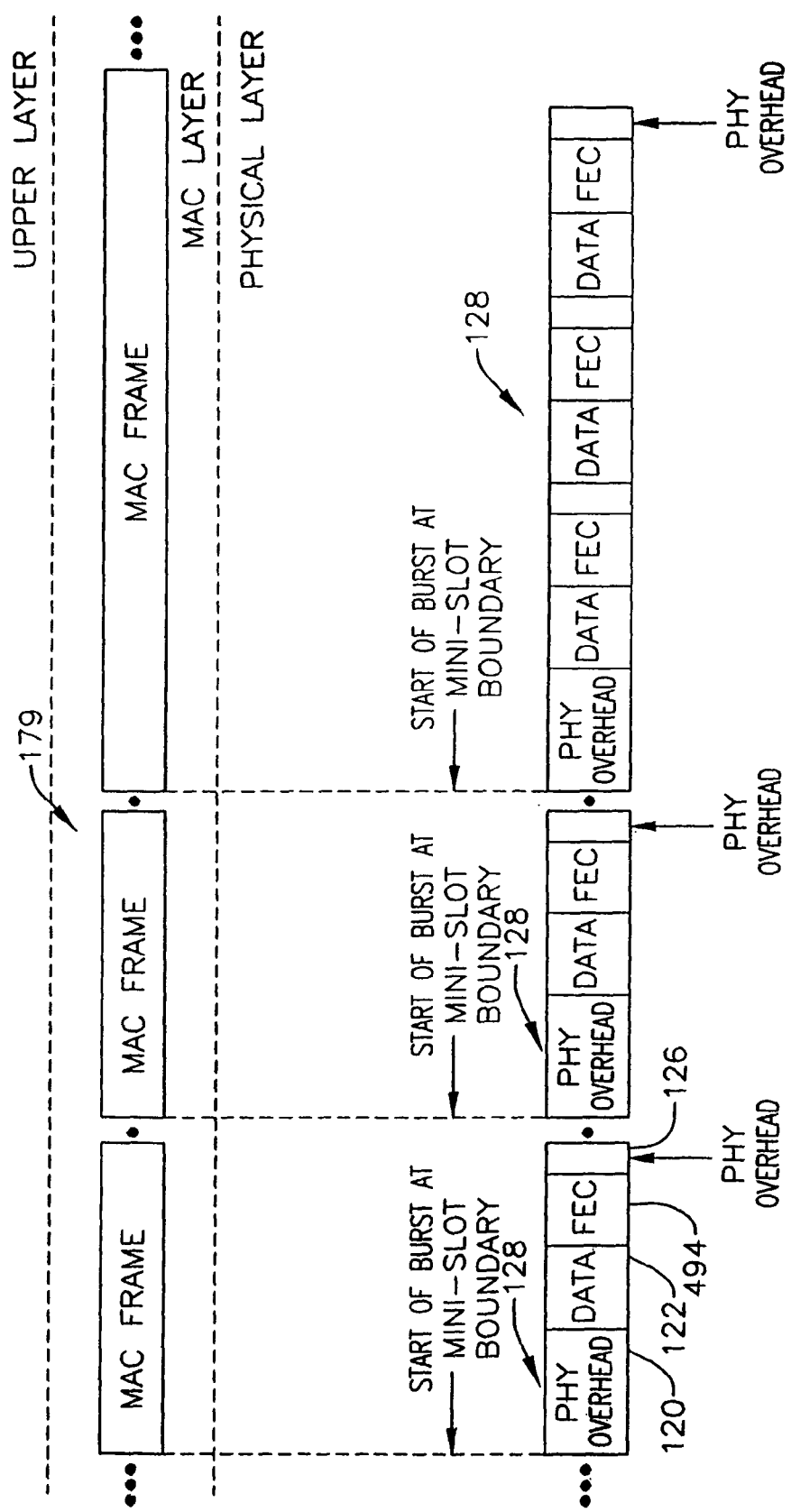
Figure 38:
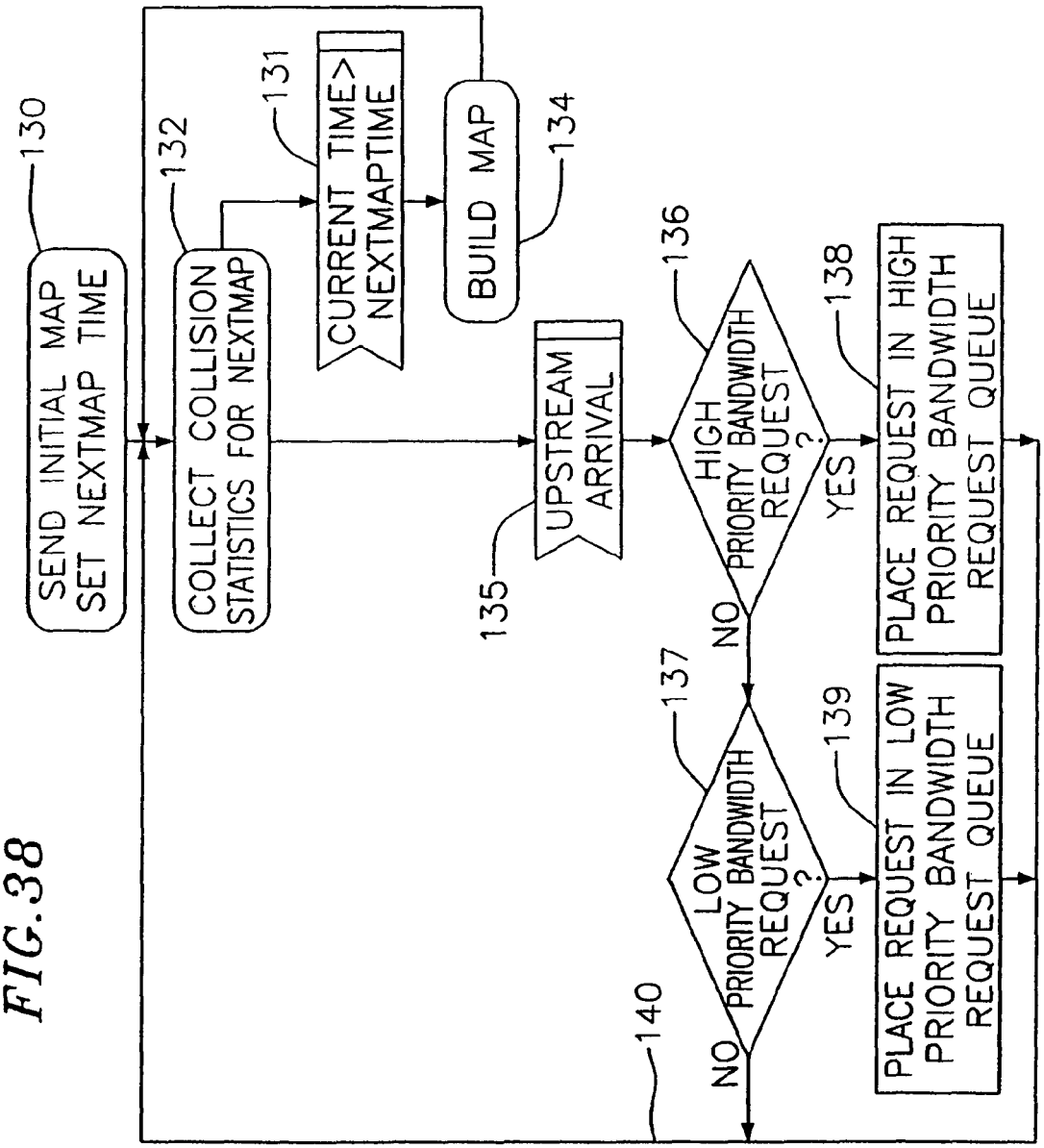
Figure 39:
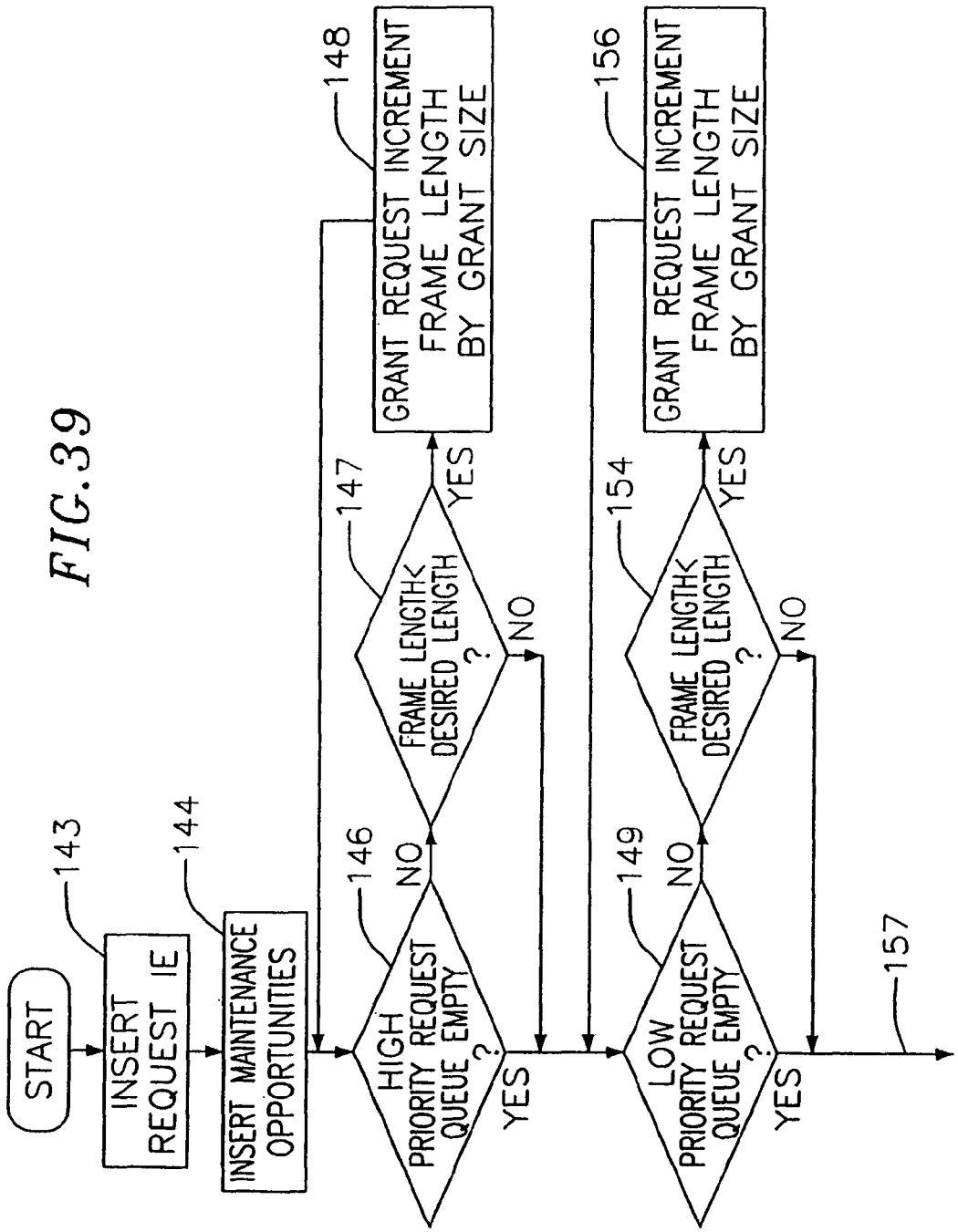
Figure 40:
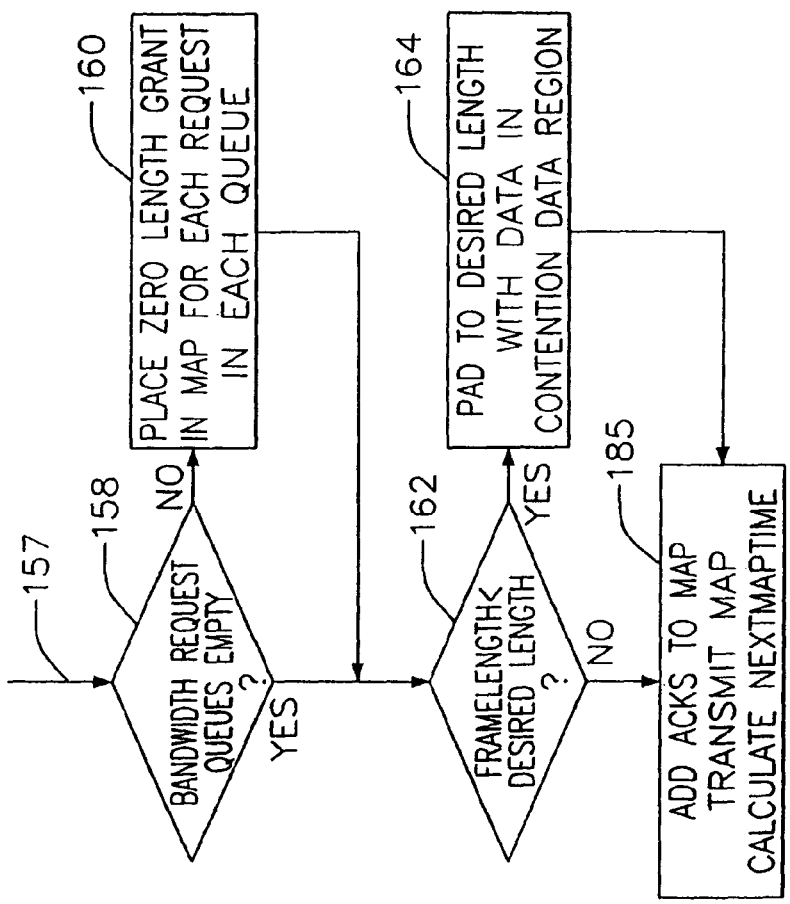
Figure 41:
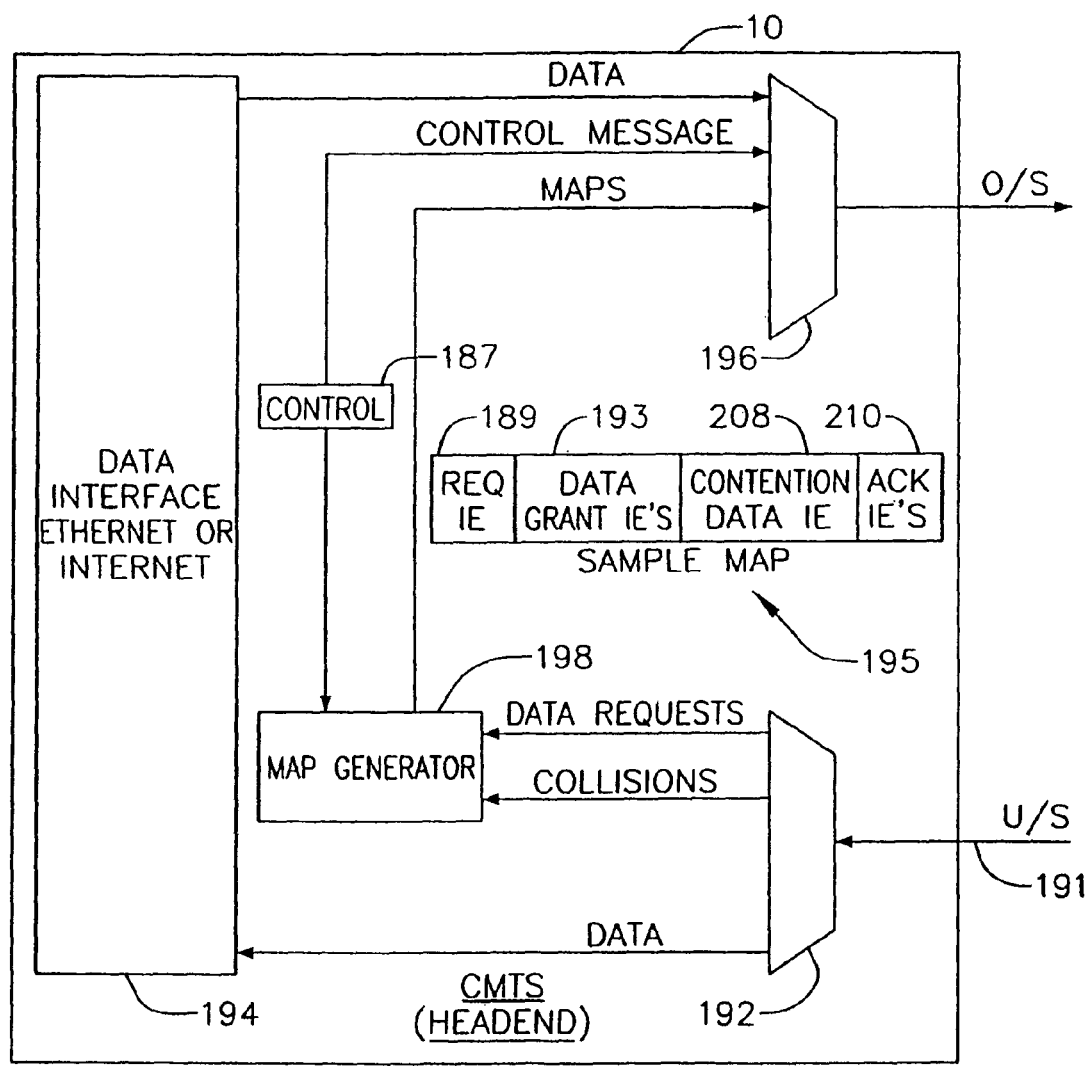
Figure 42:
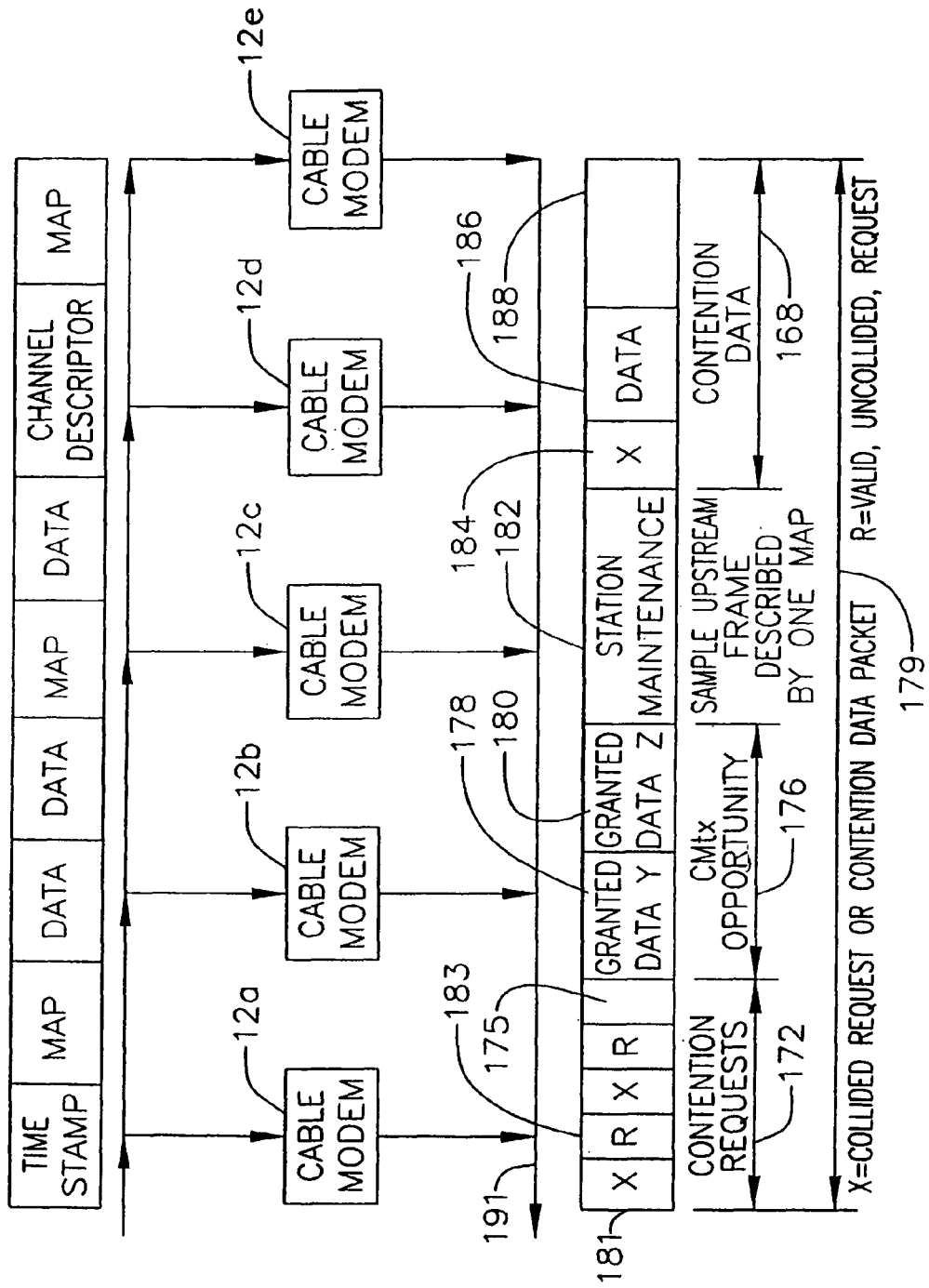
Figure 43:
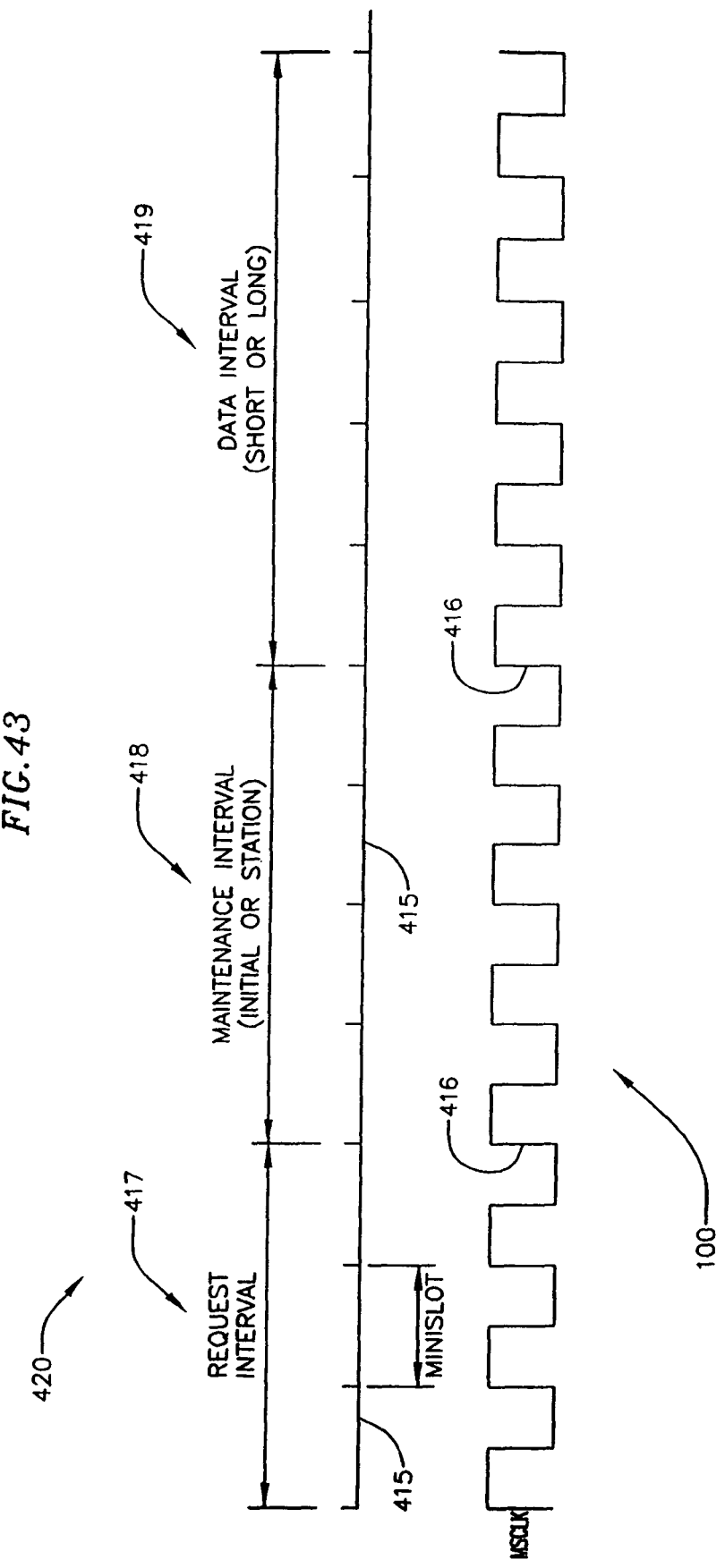
Figure 44:
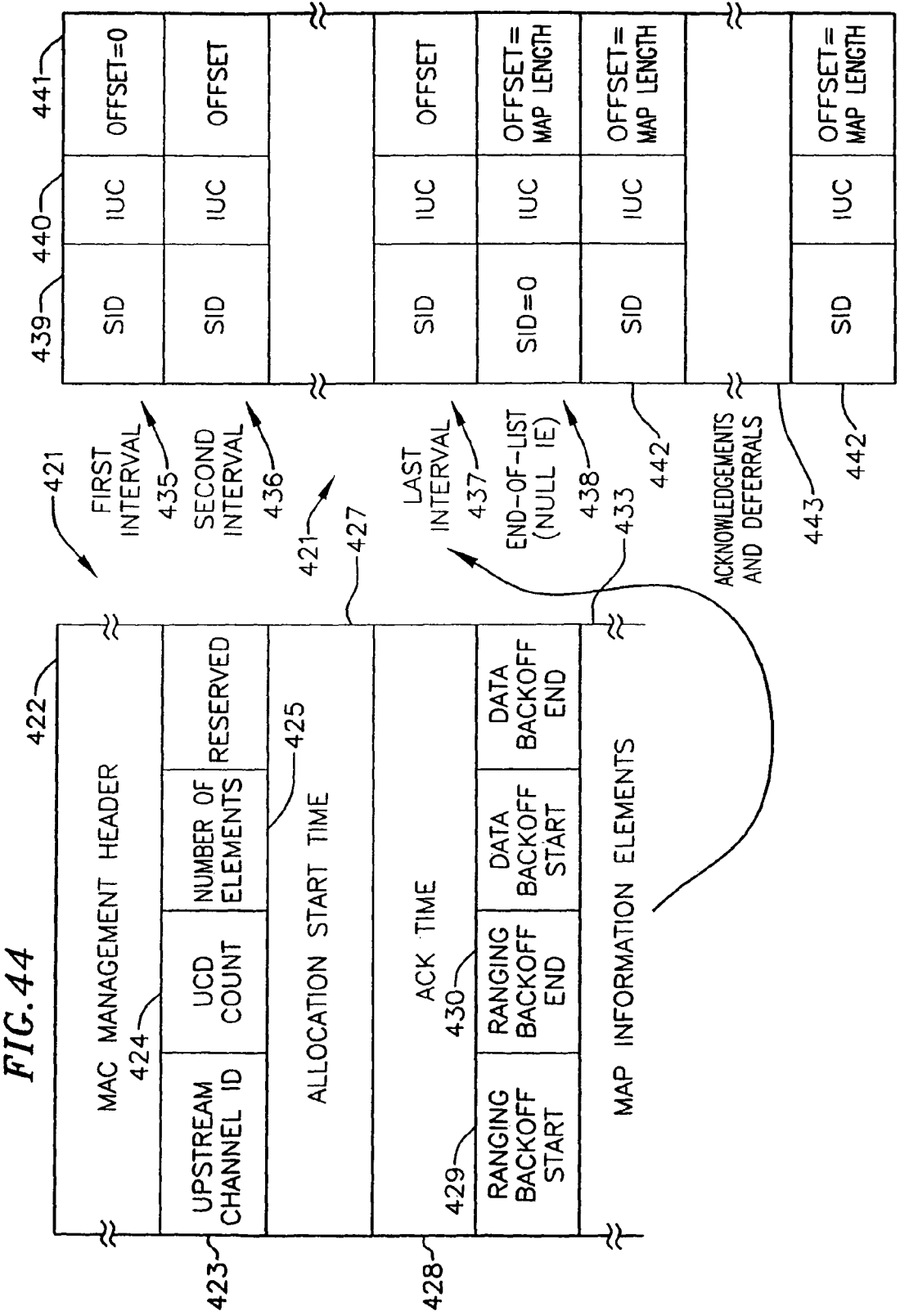
Figure 45:
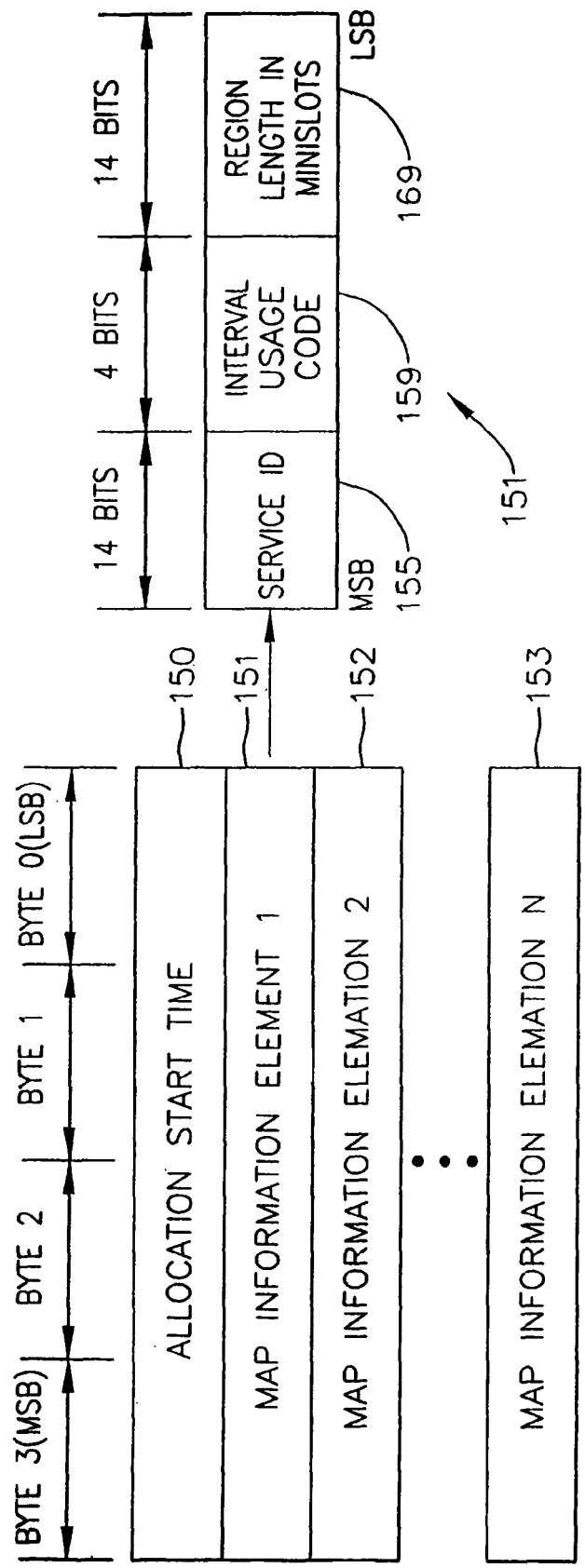
Figure 46:
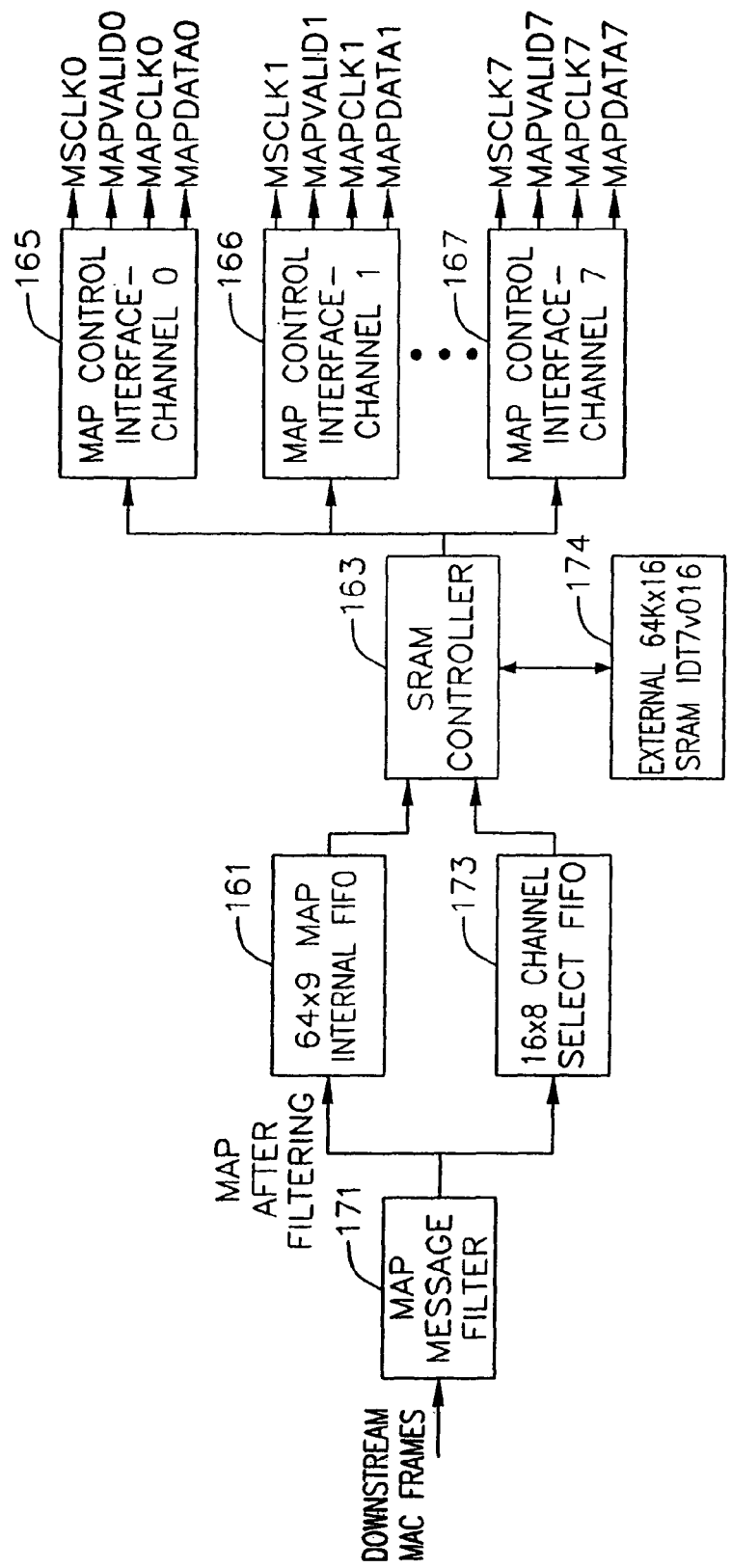
Figure 47:
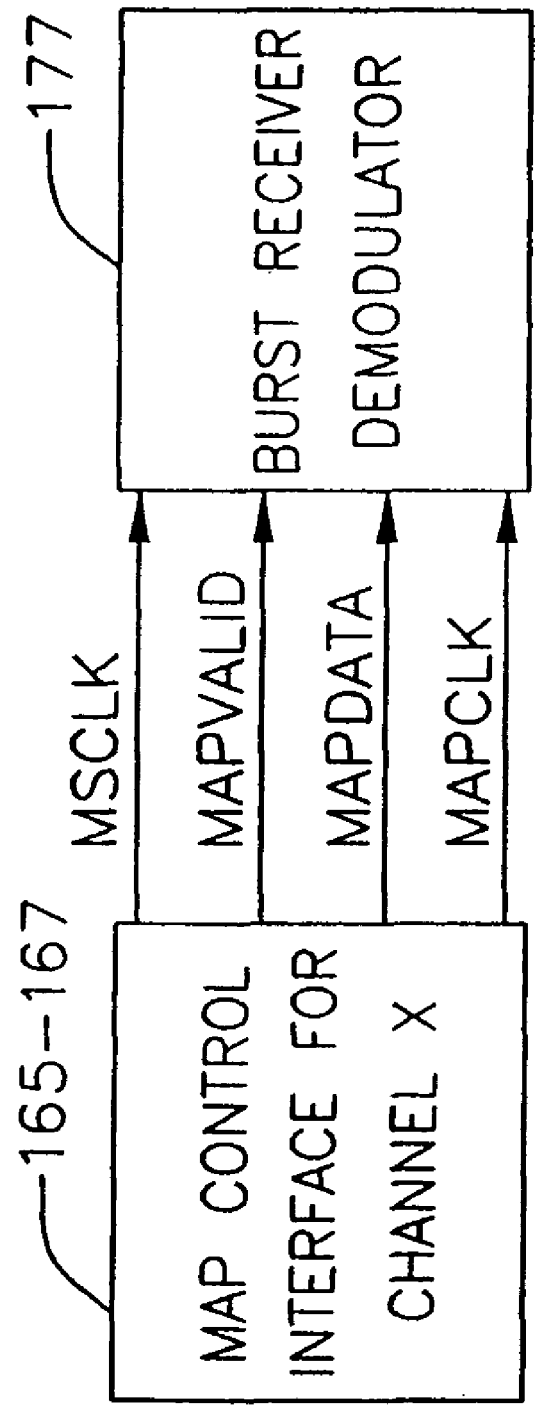
Figure 48:
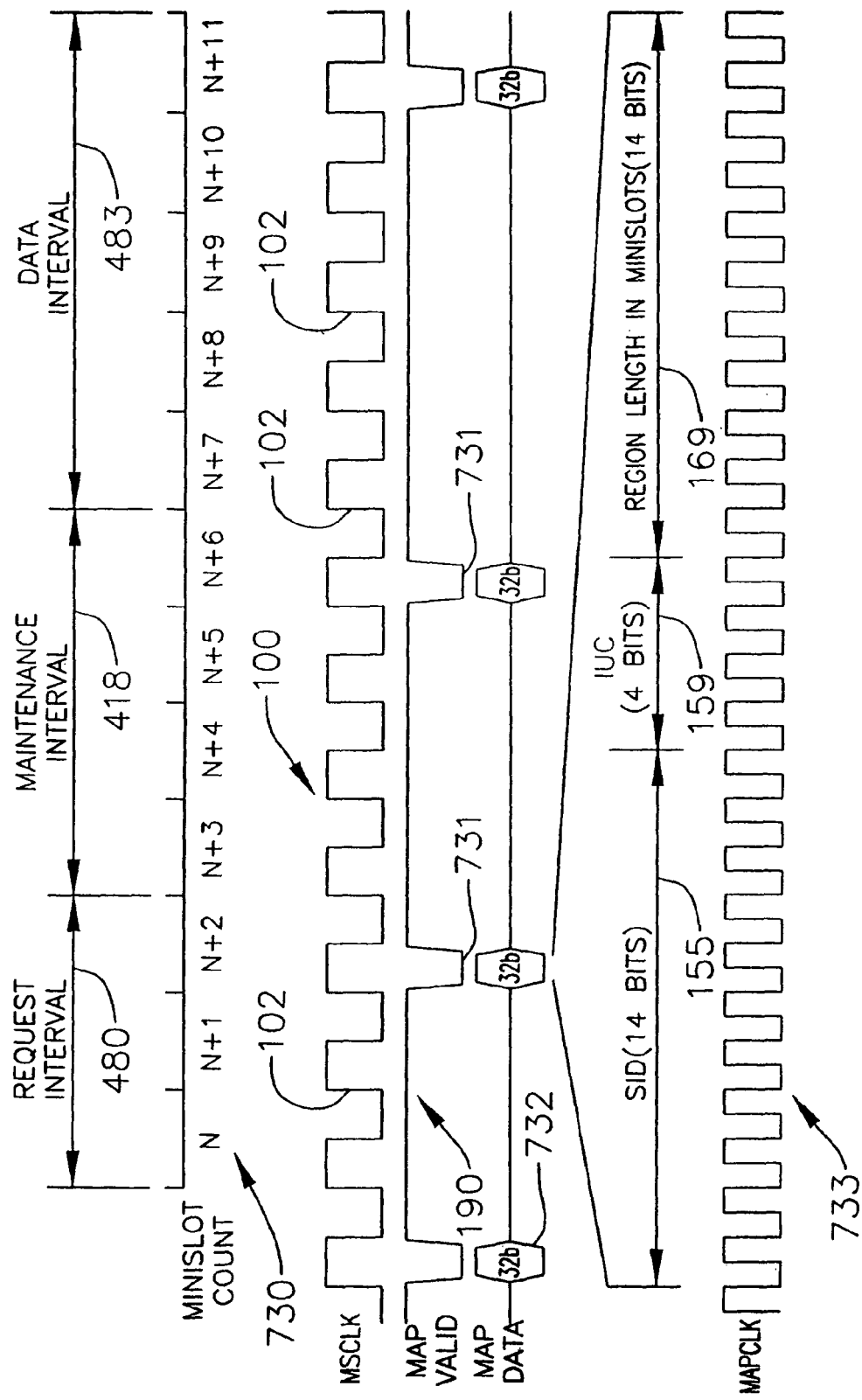
Figure 49:
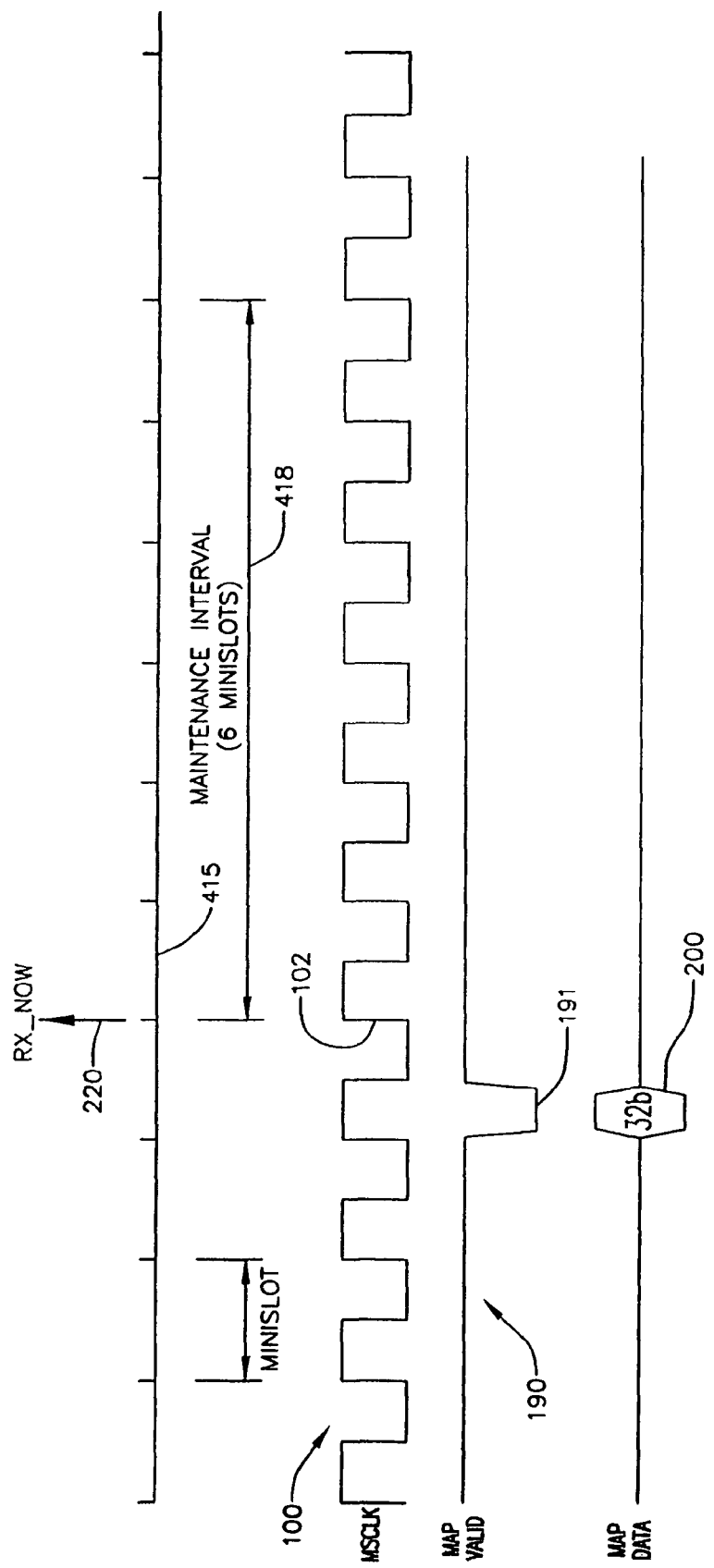
Figure 50:
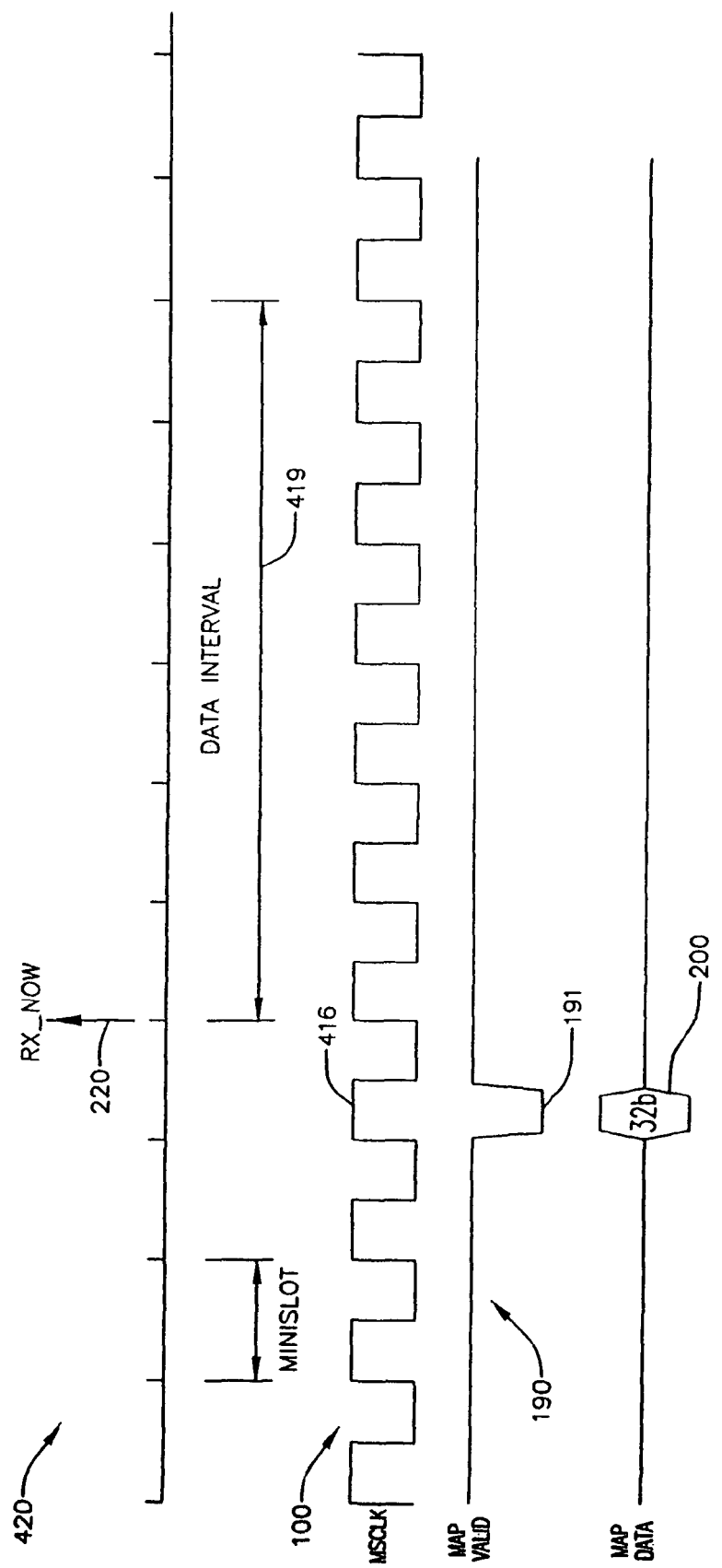
Figure 51:
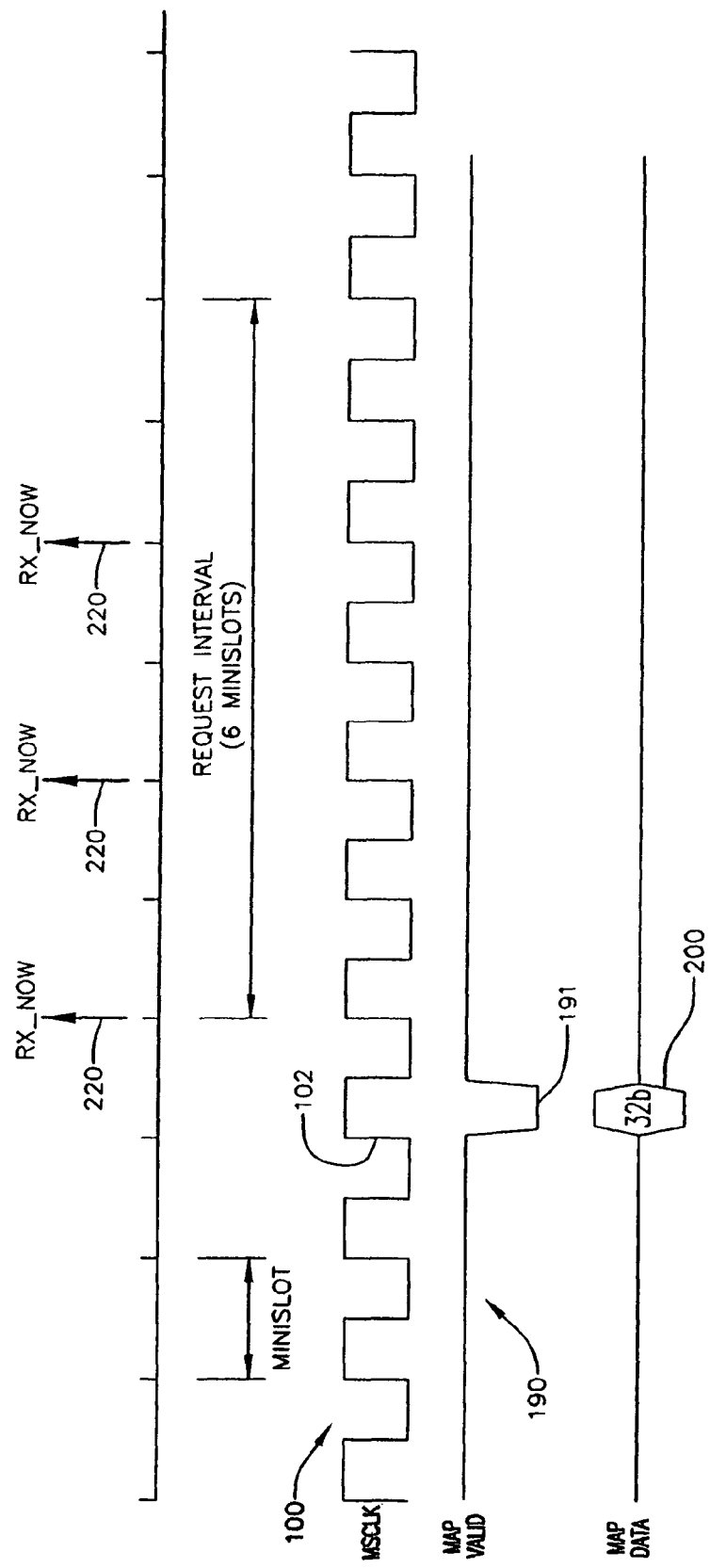
Figure 55:
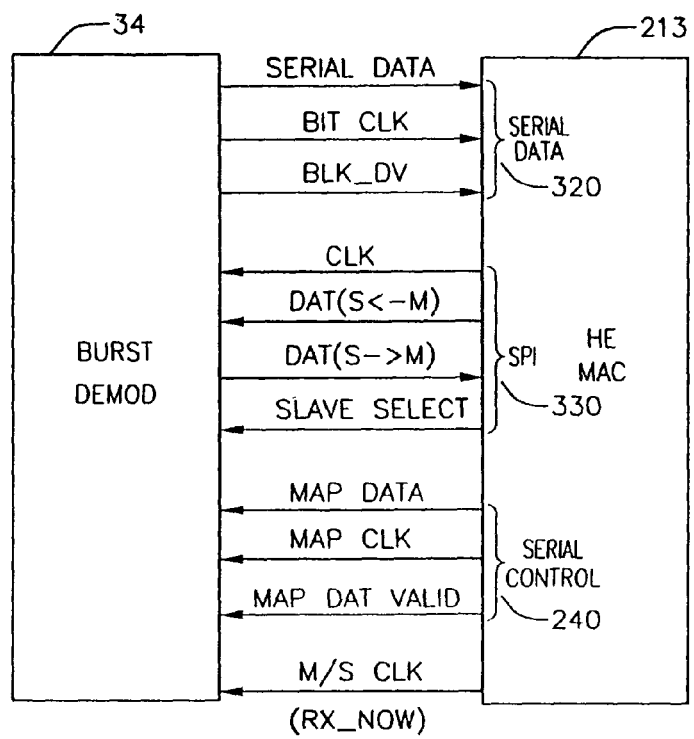
Figure 56:
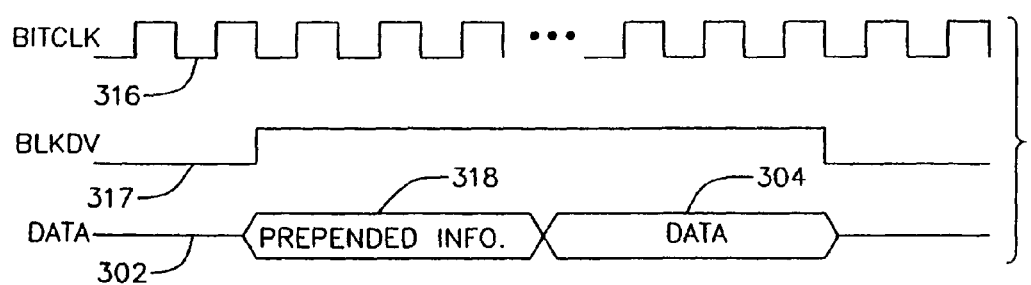
Figure 60:
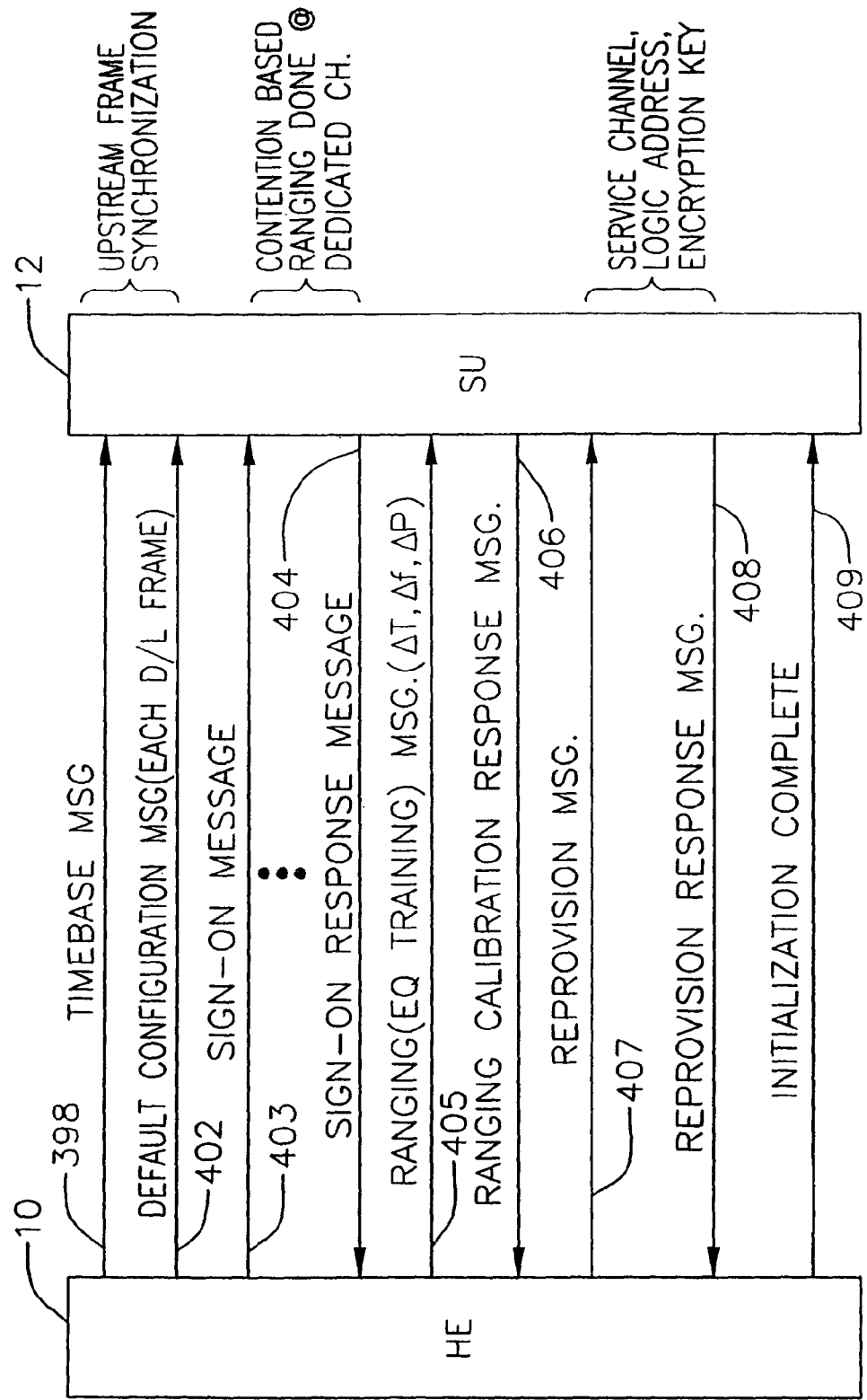
Figure 61:
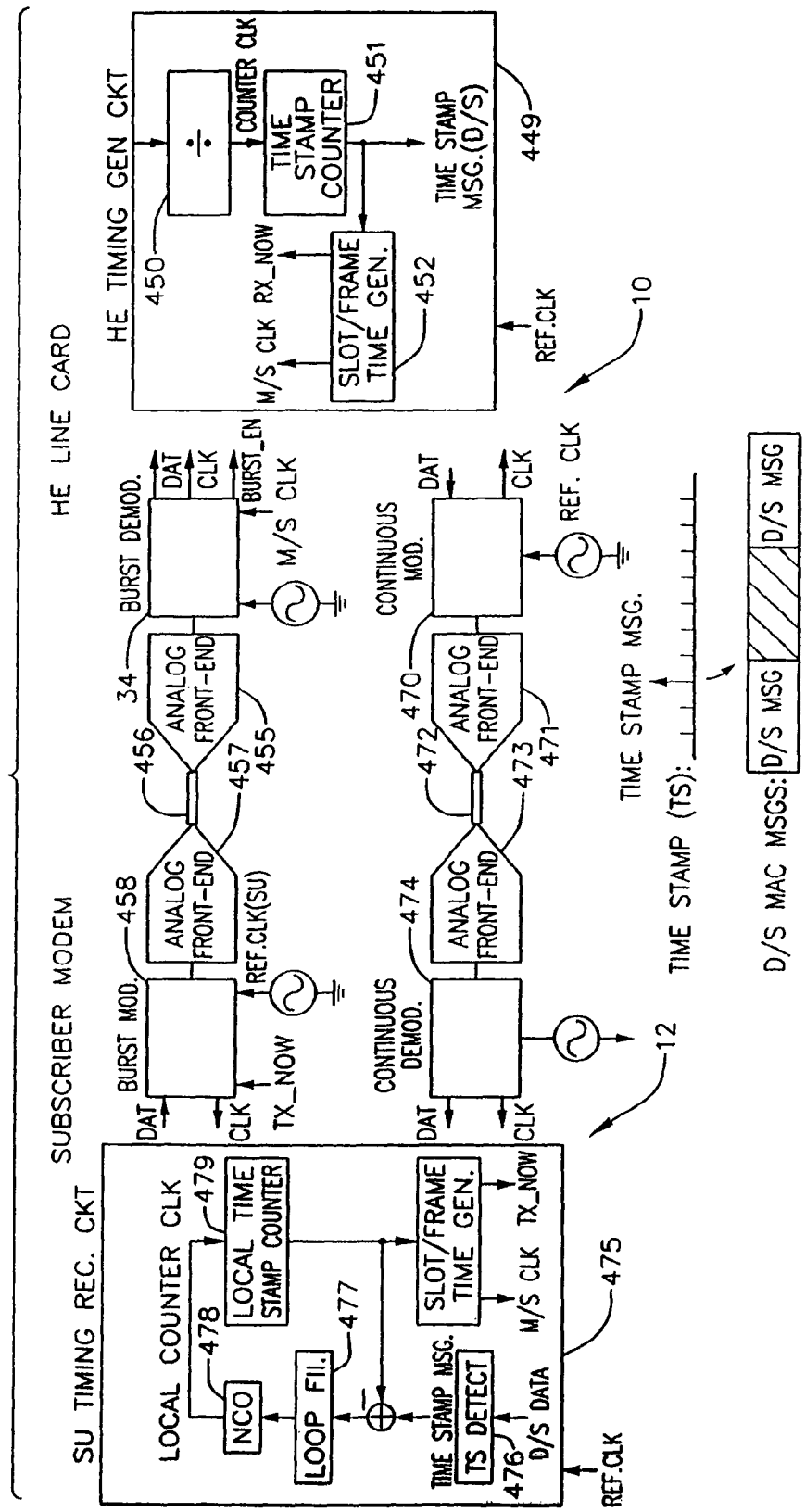
Figure 62:
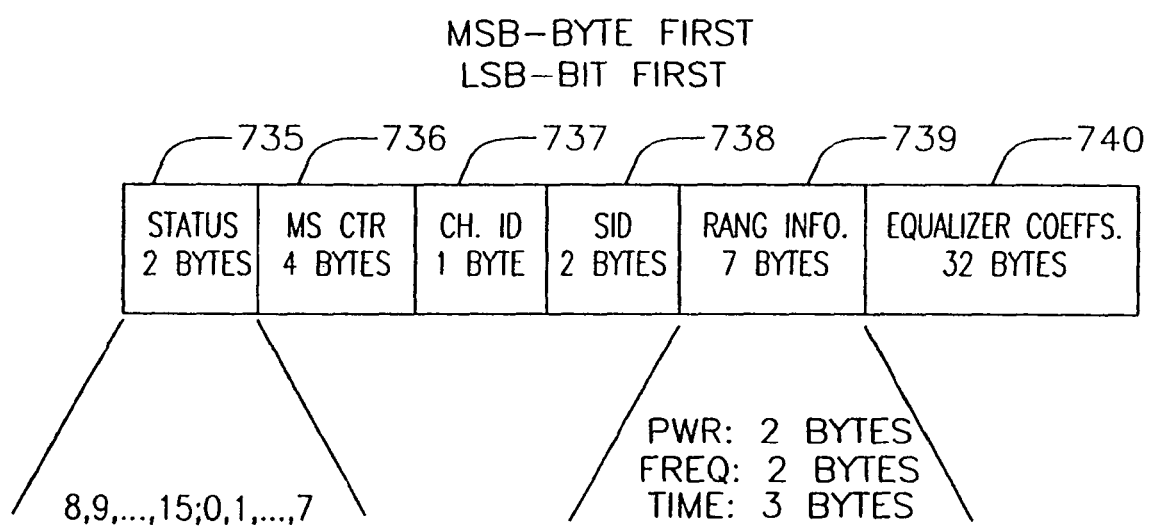
Figure 64:
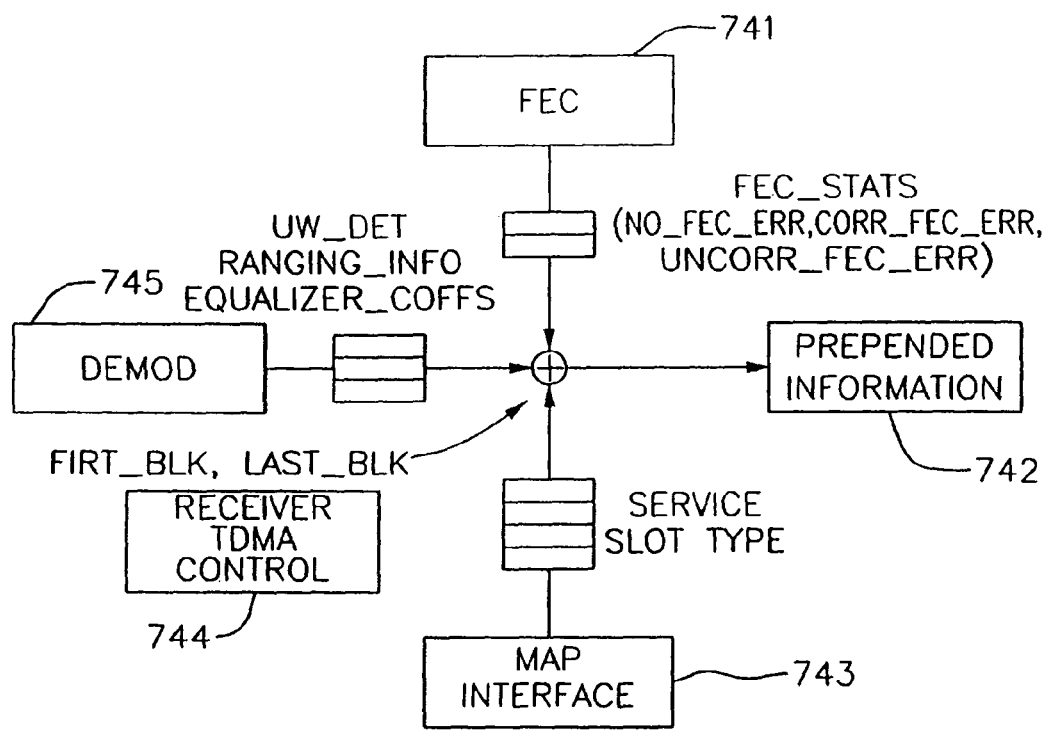
Figure 65:
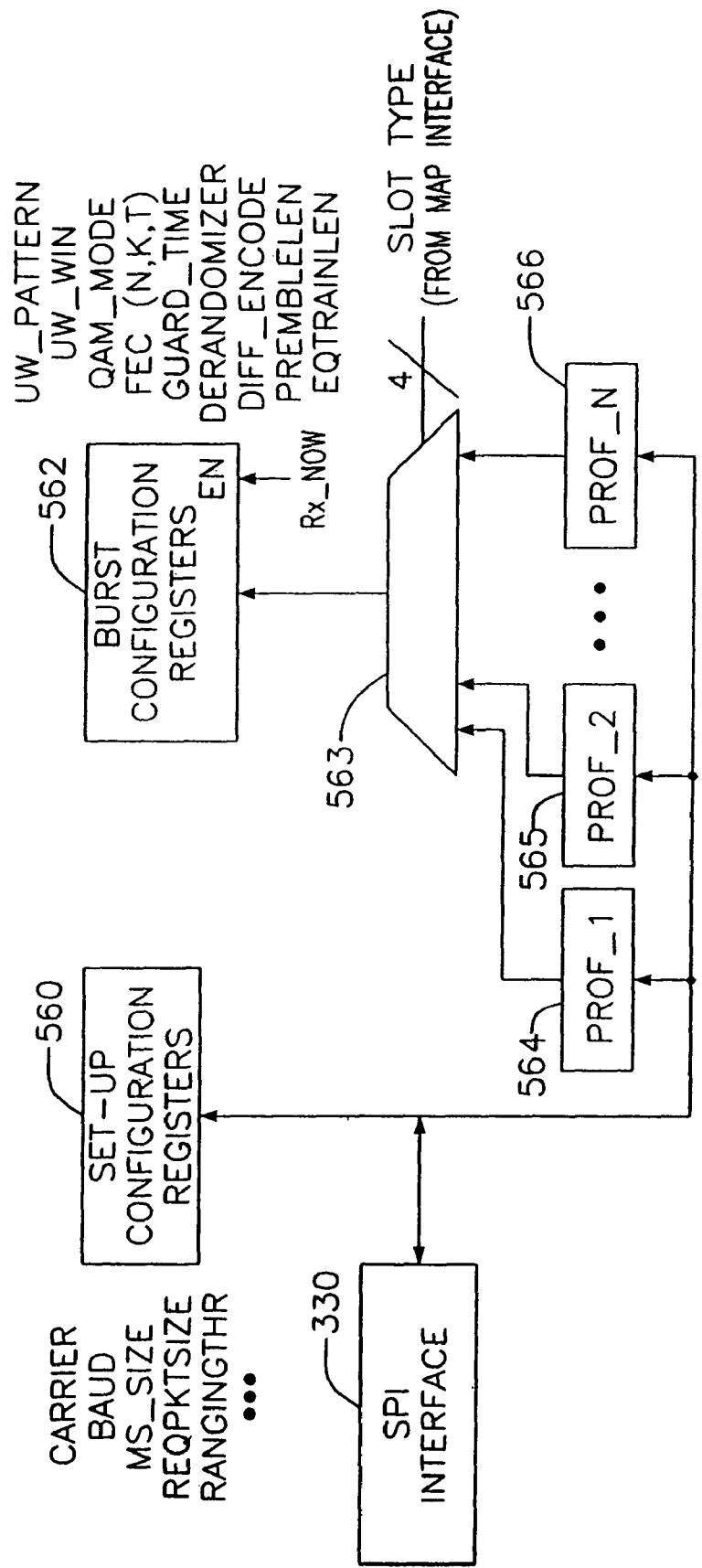
Figure 66:
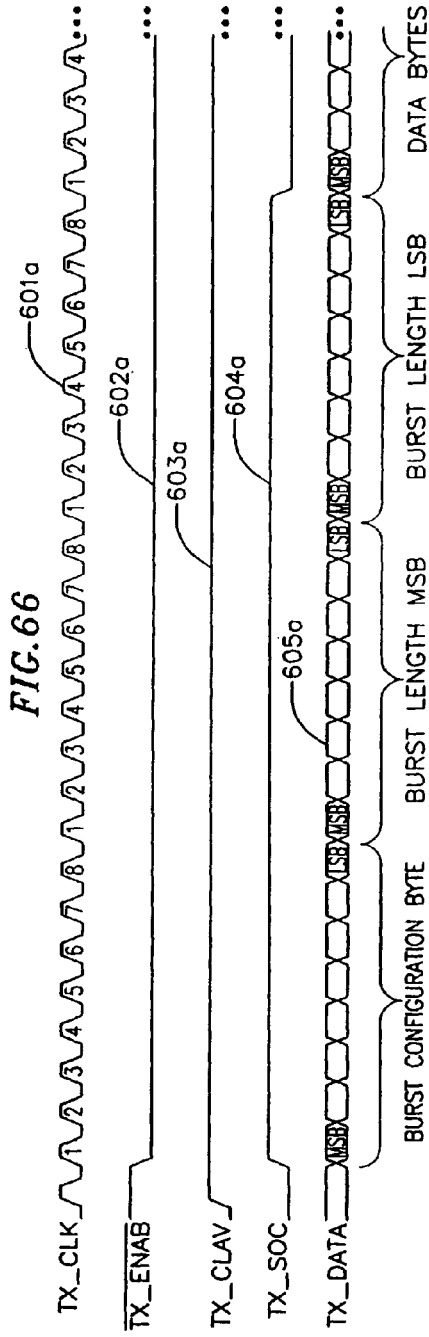
Figure 67:
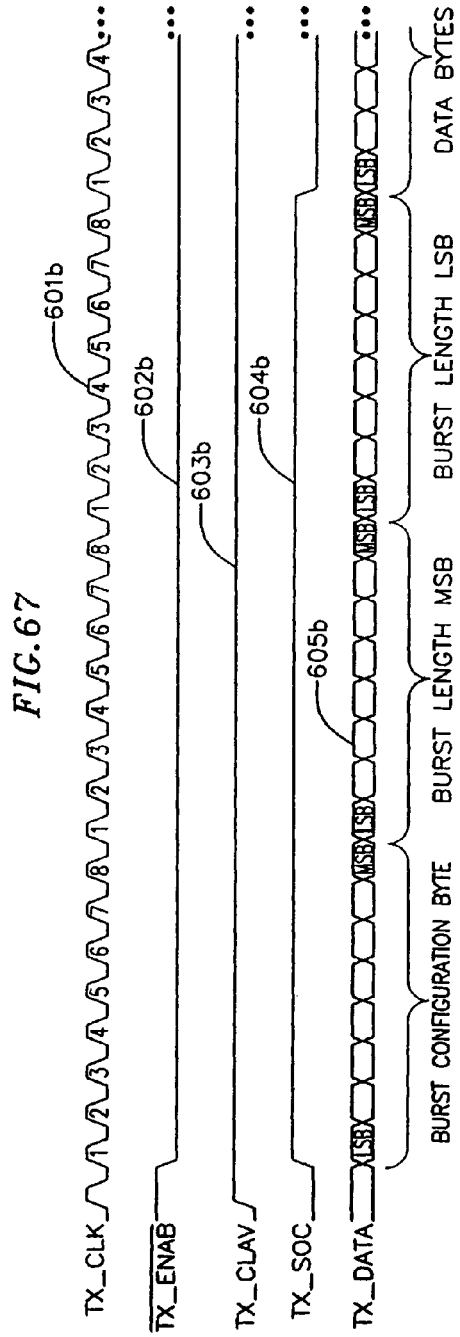
Figure 68:
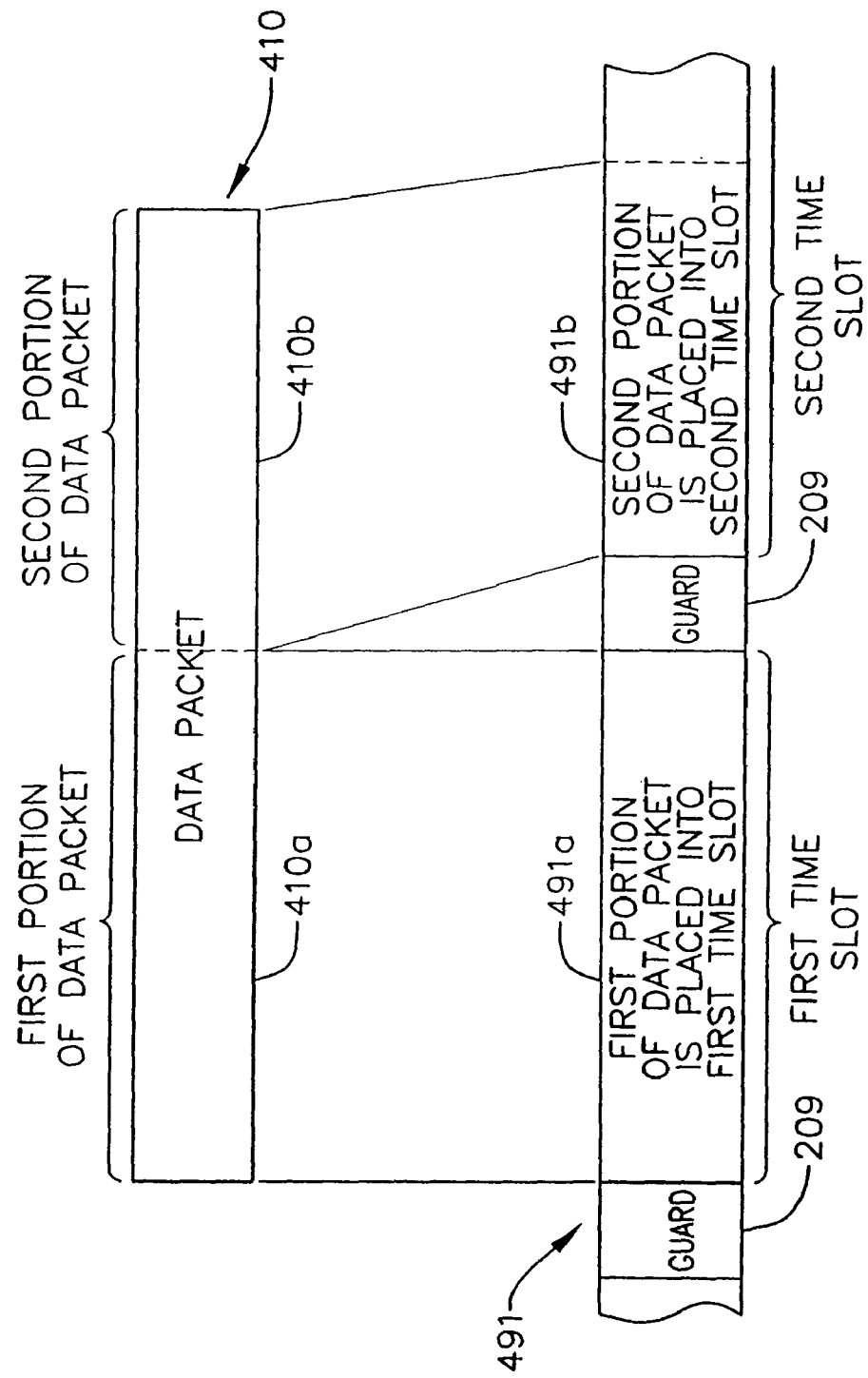
Figure 69:
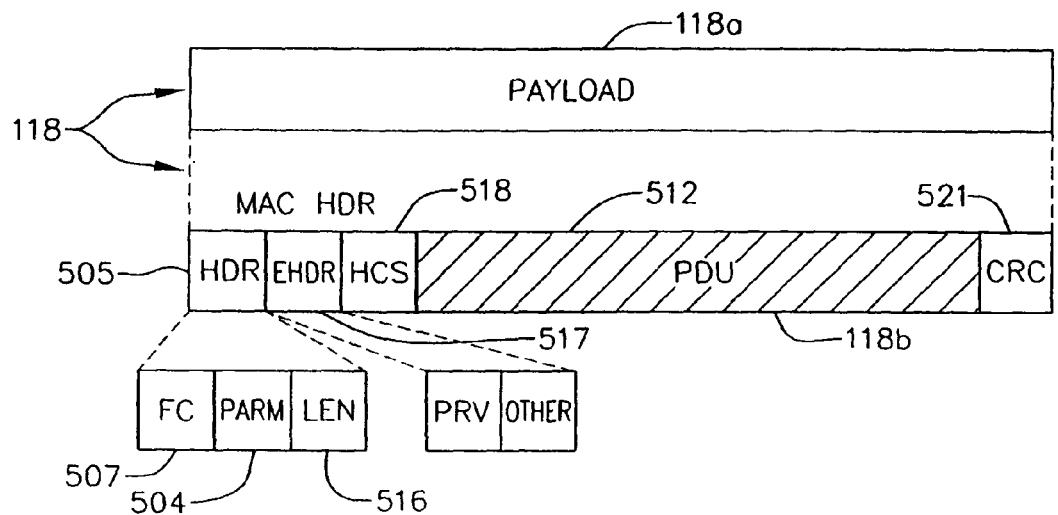
Figure 70:
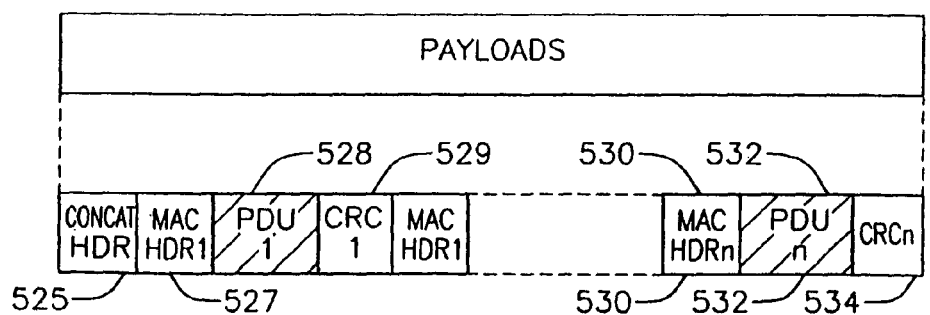
Figure 71:
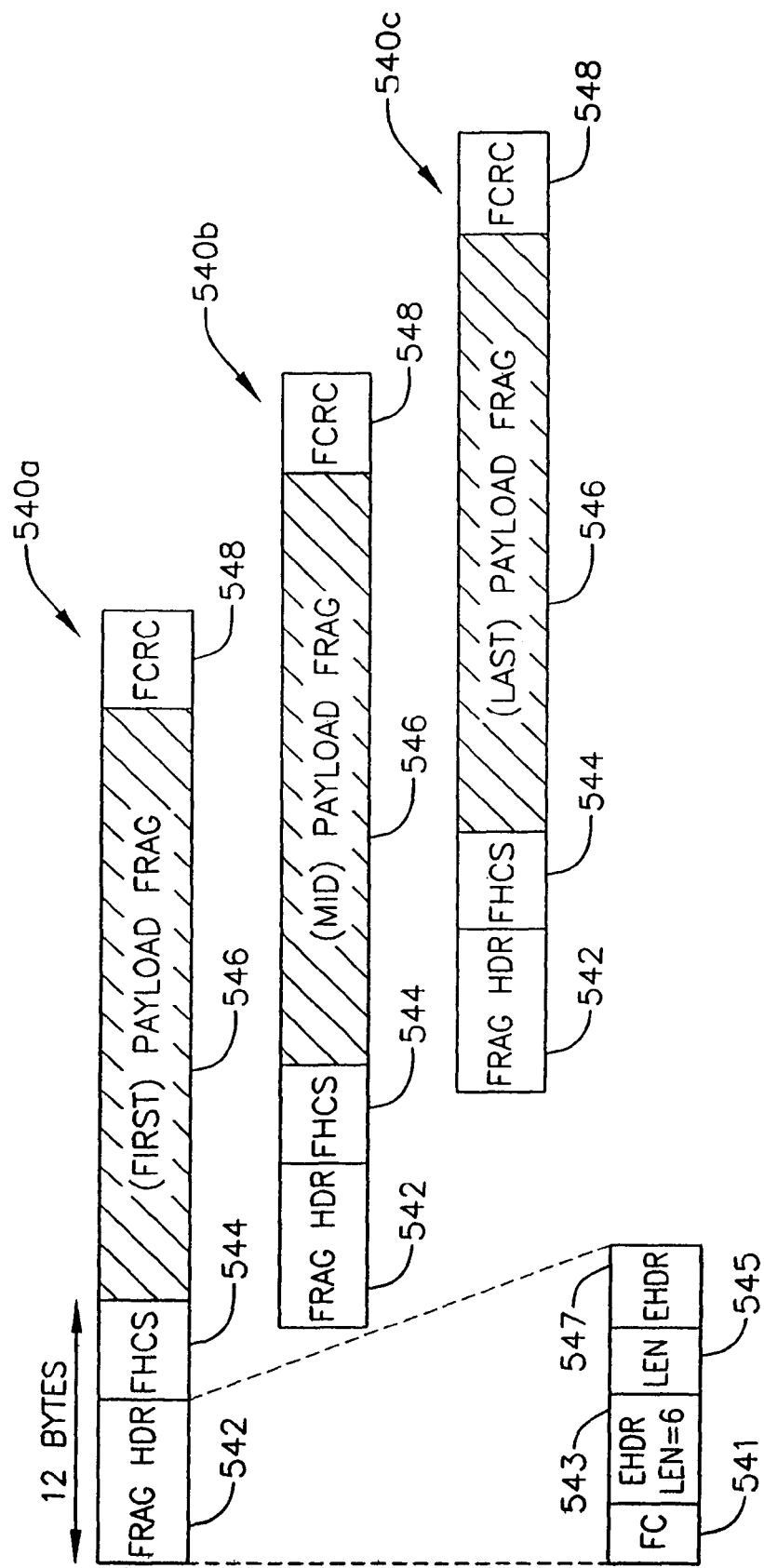
Figures 72, 73:
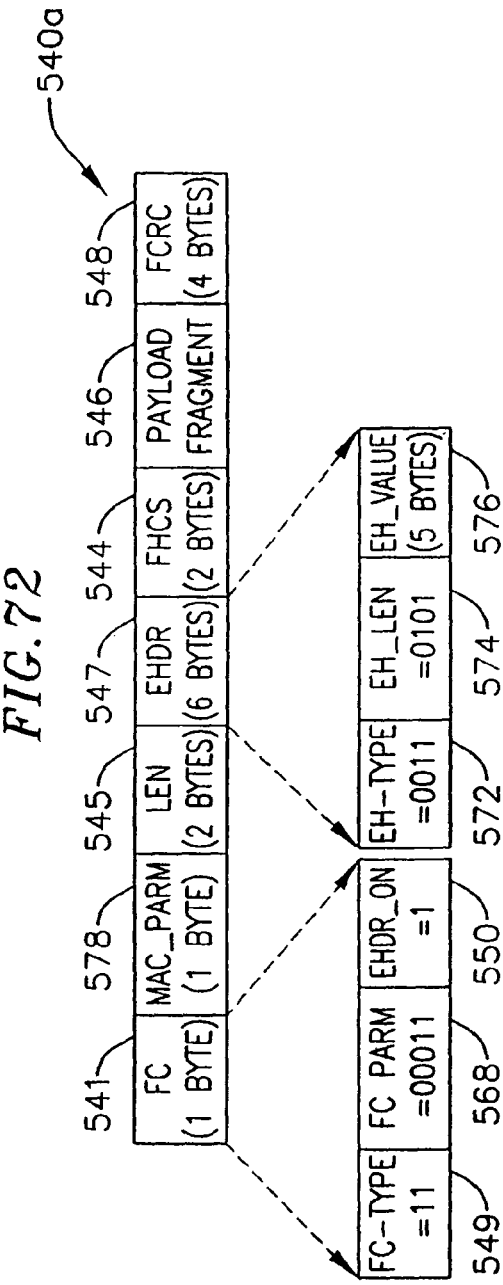
Figure 75:
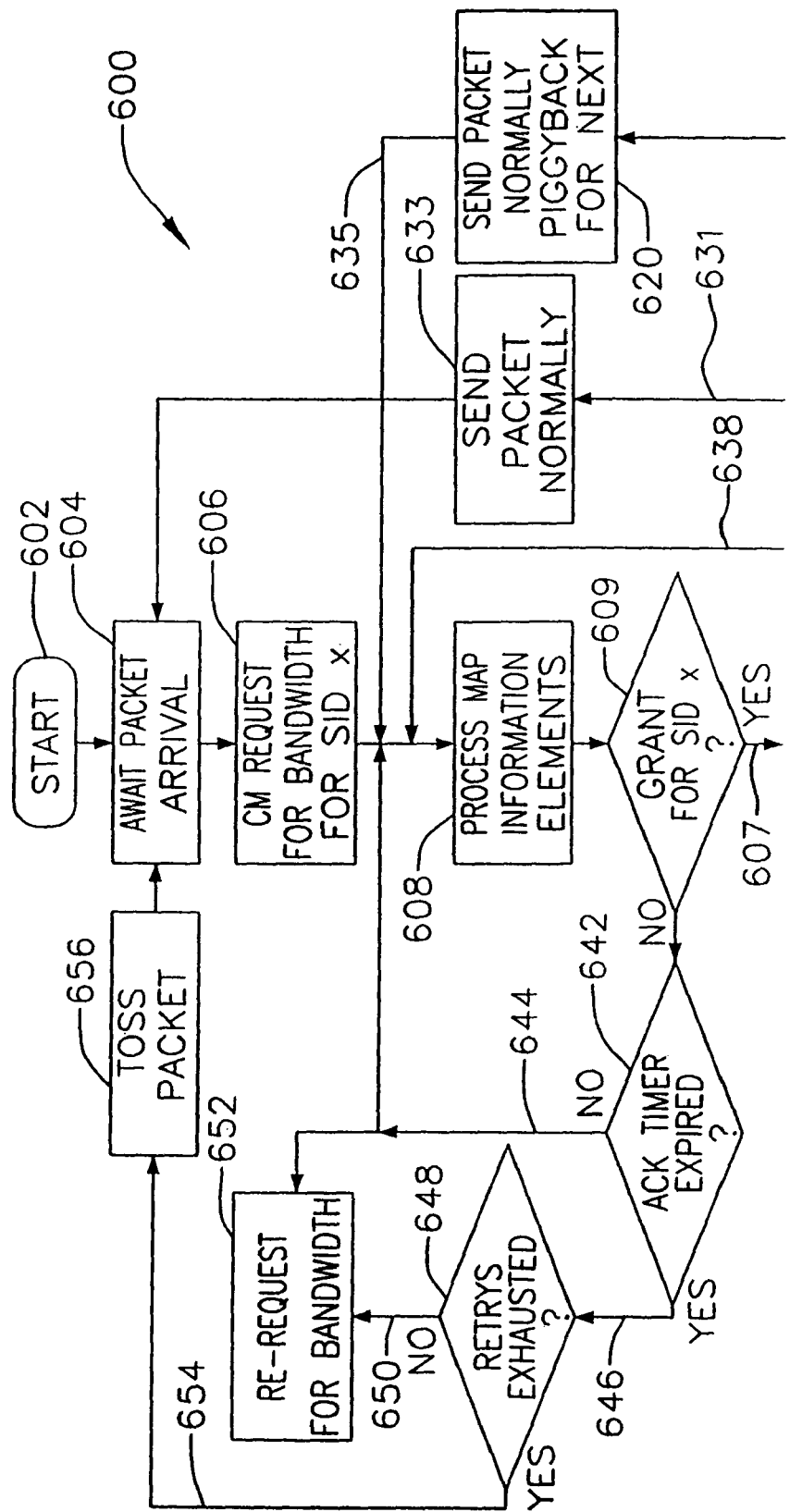
Figure 76:
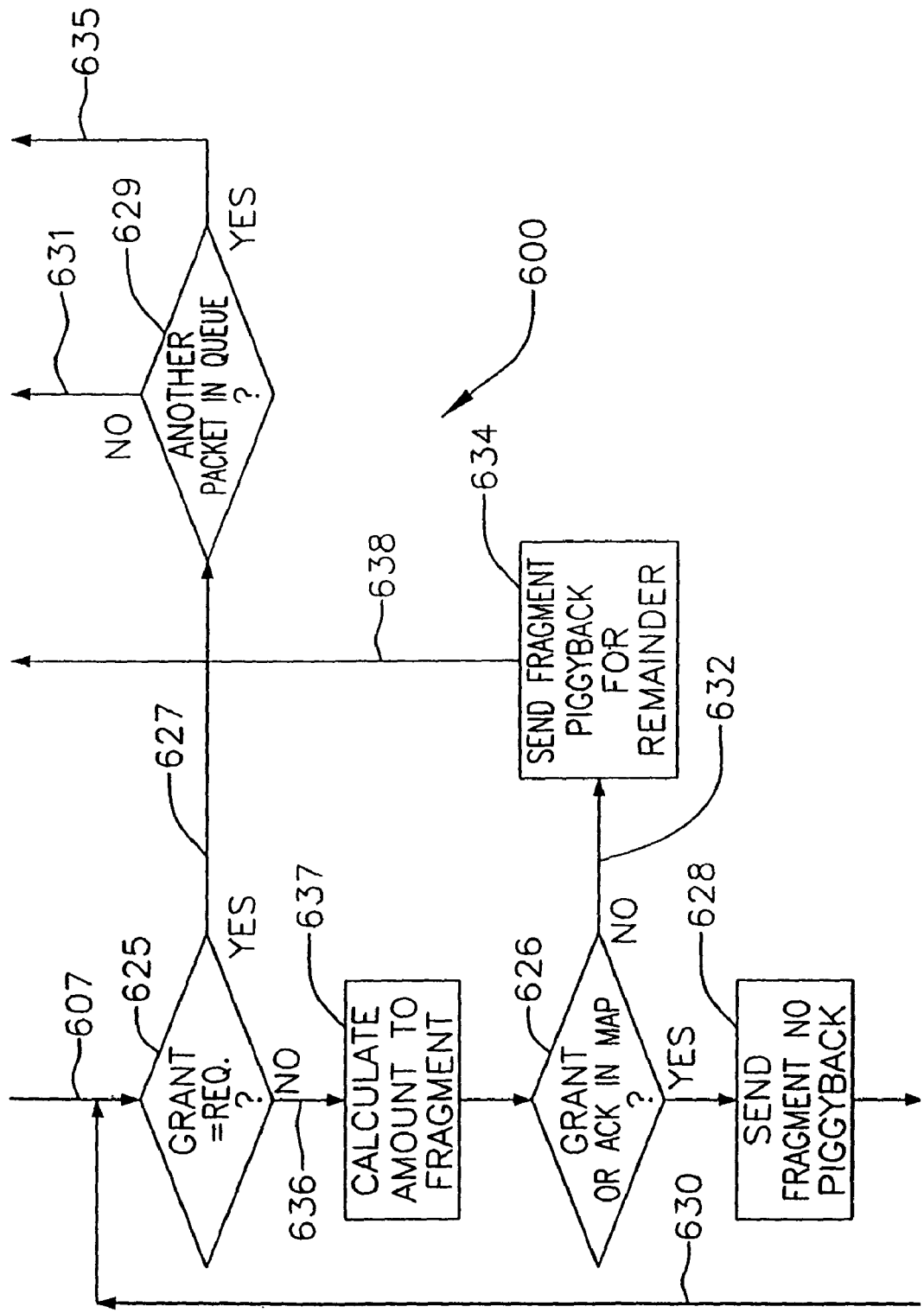
Figure 77:
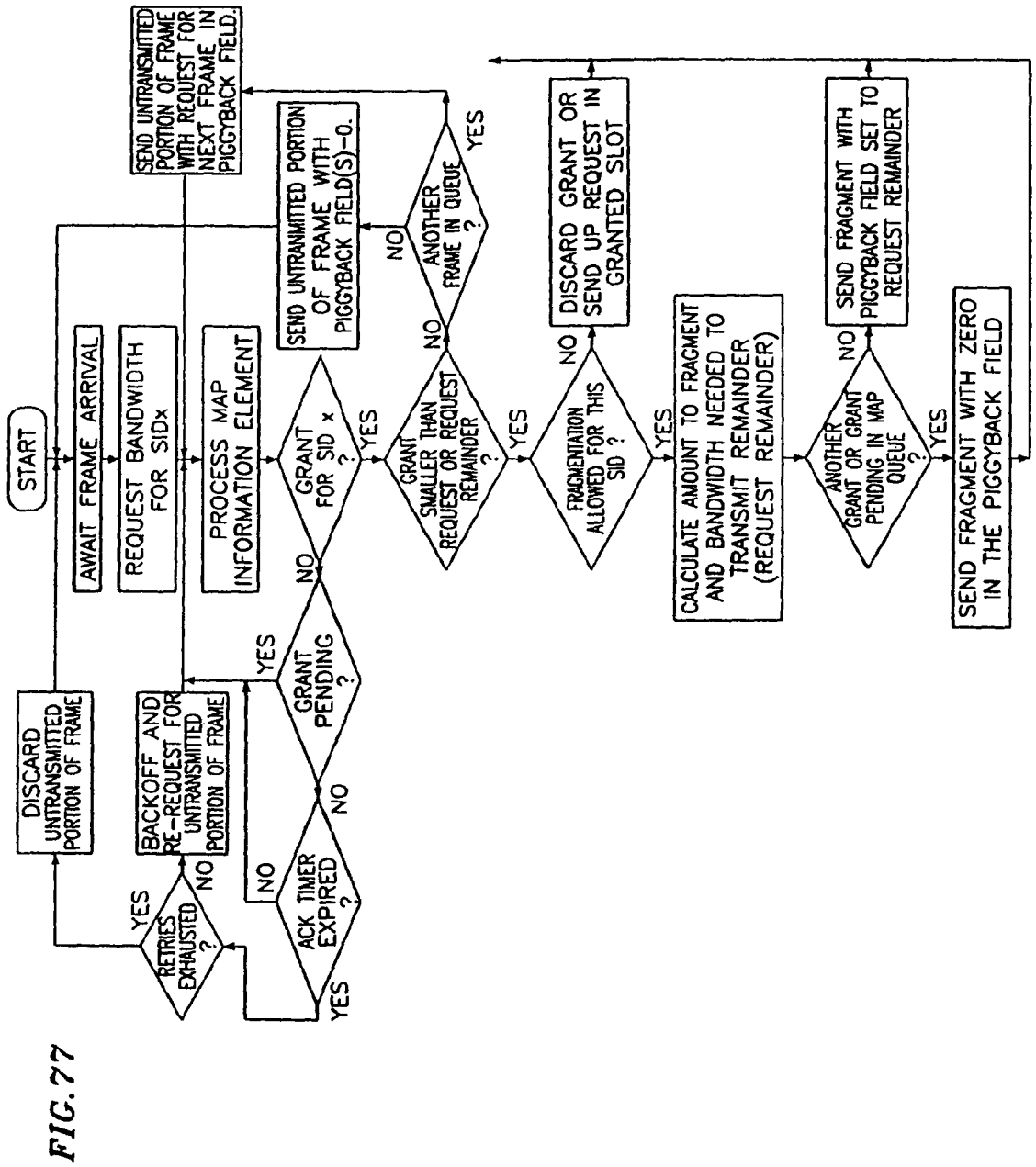
Figure 78:
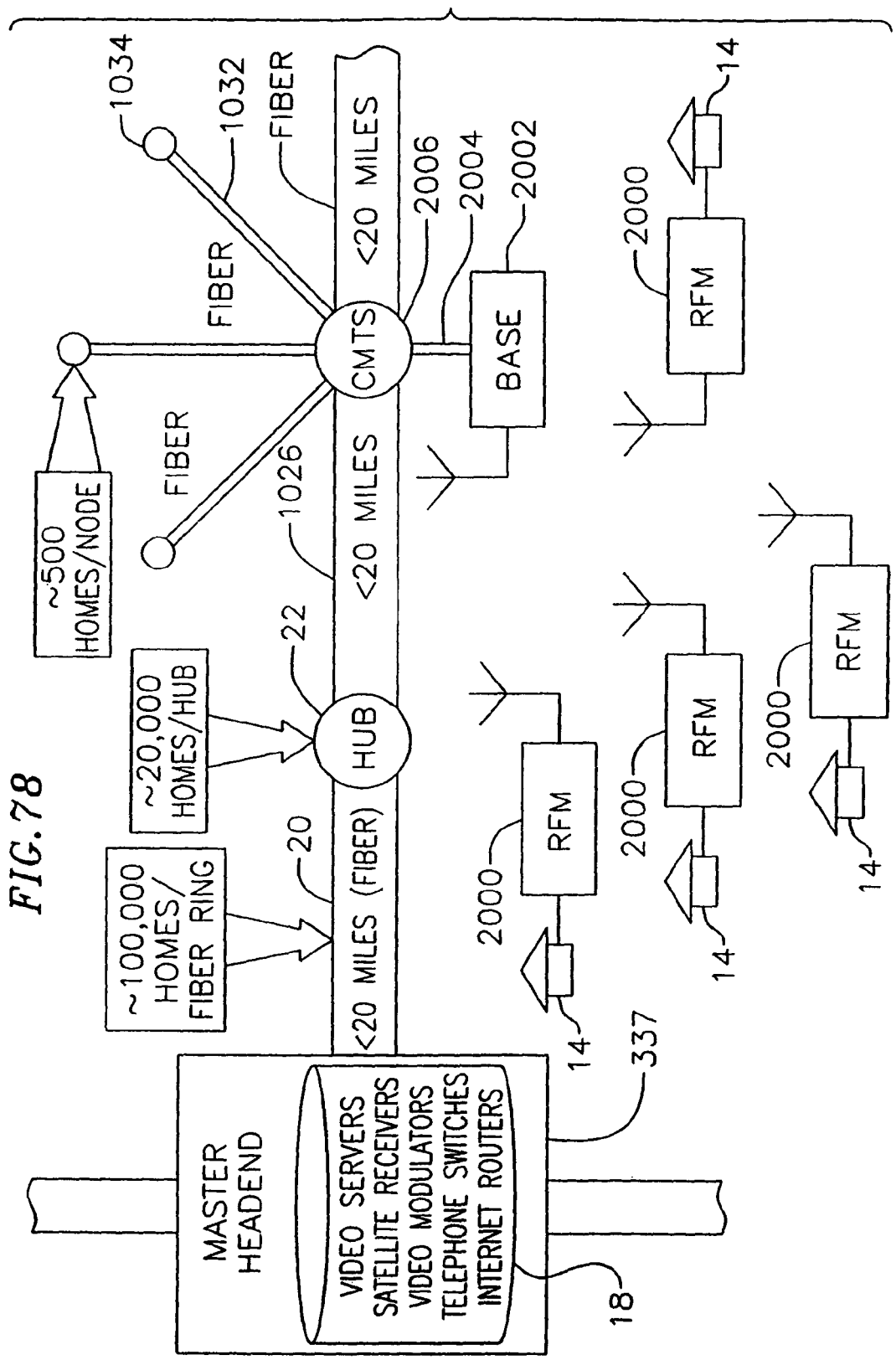
Figure 79:
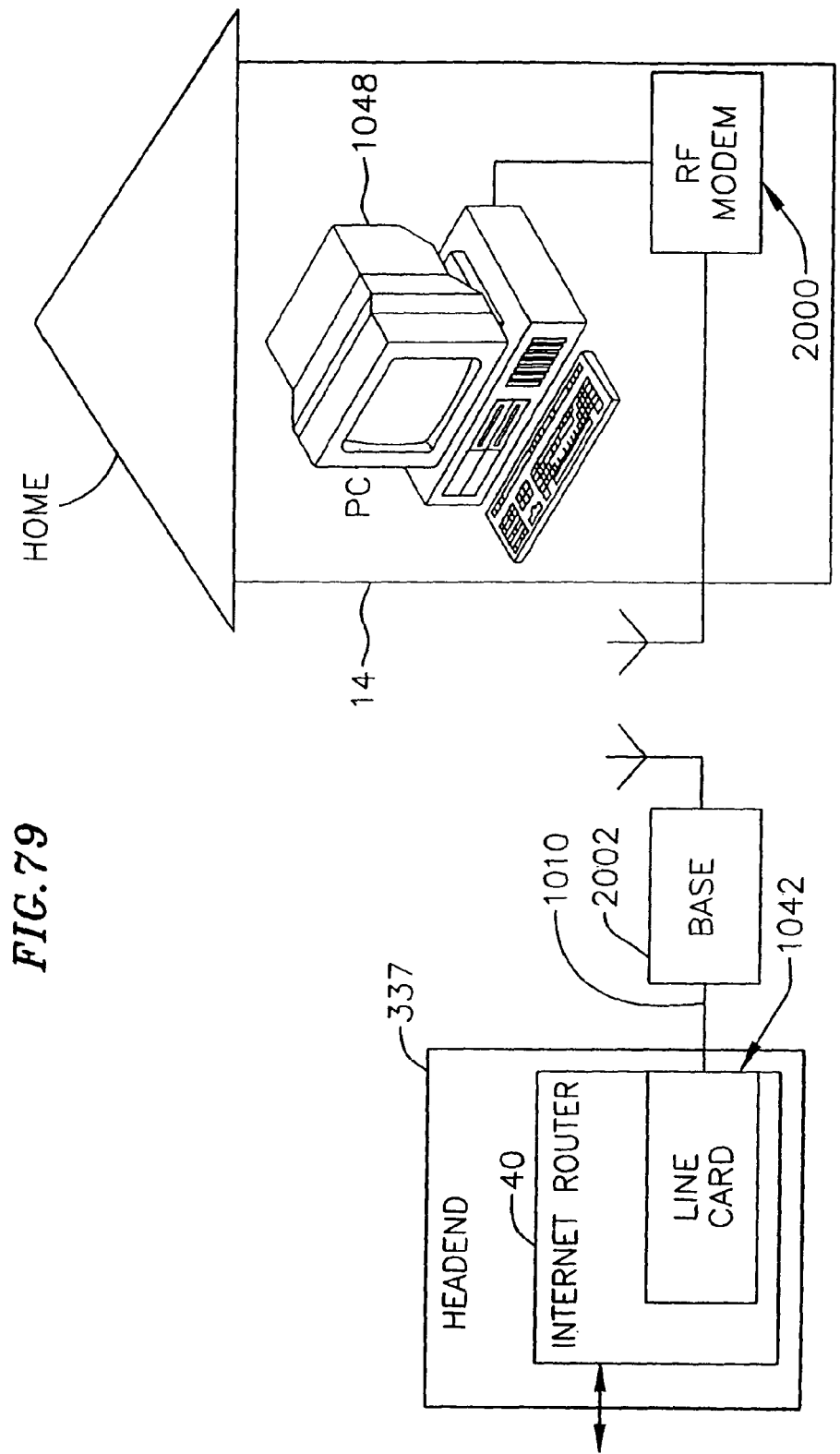
Figure 80:
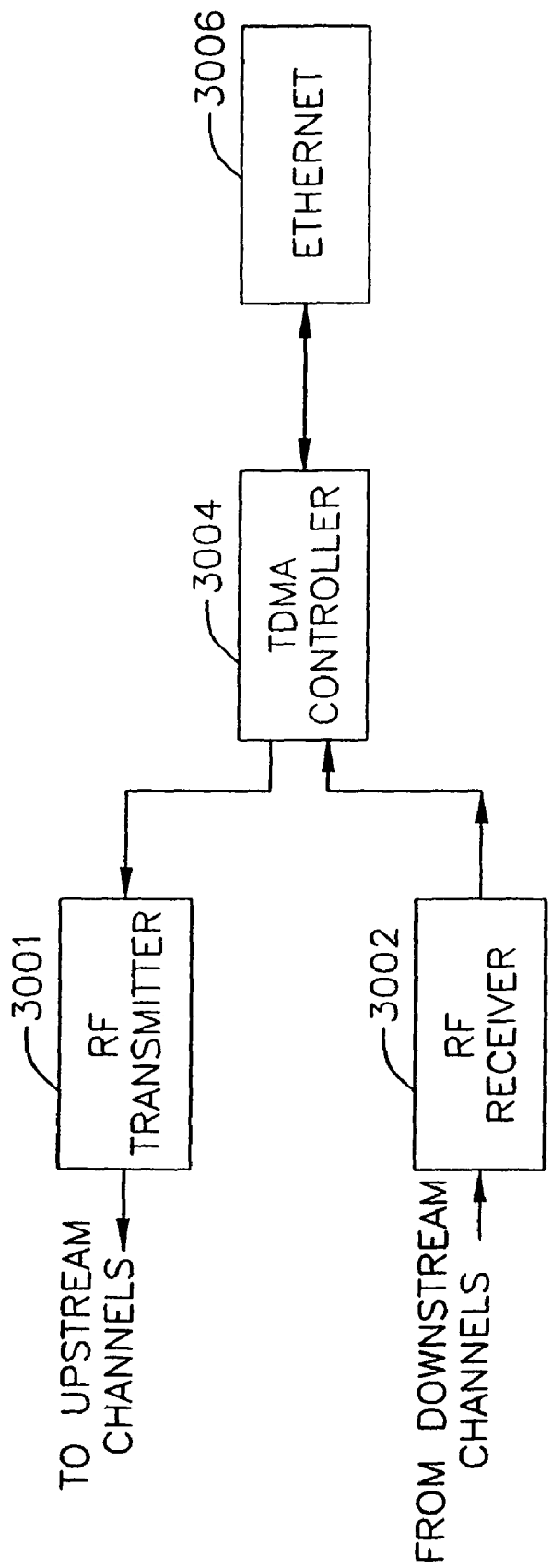
Figure 81:
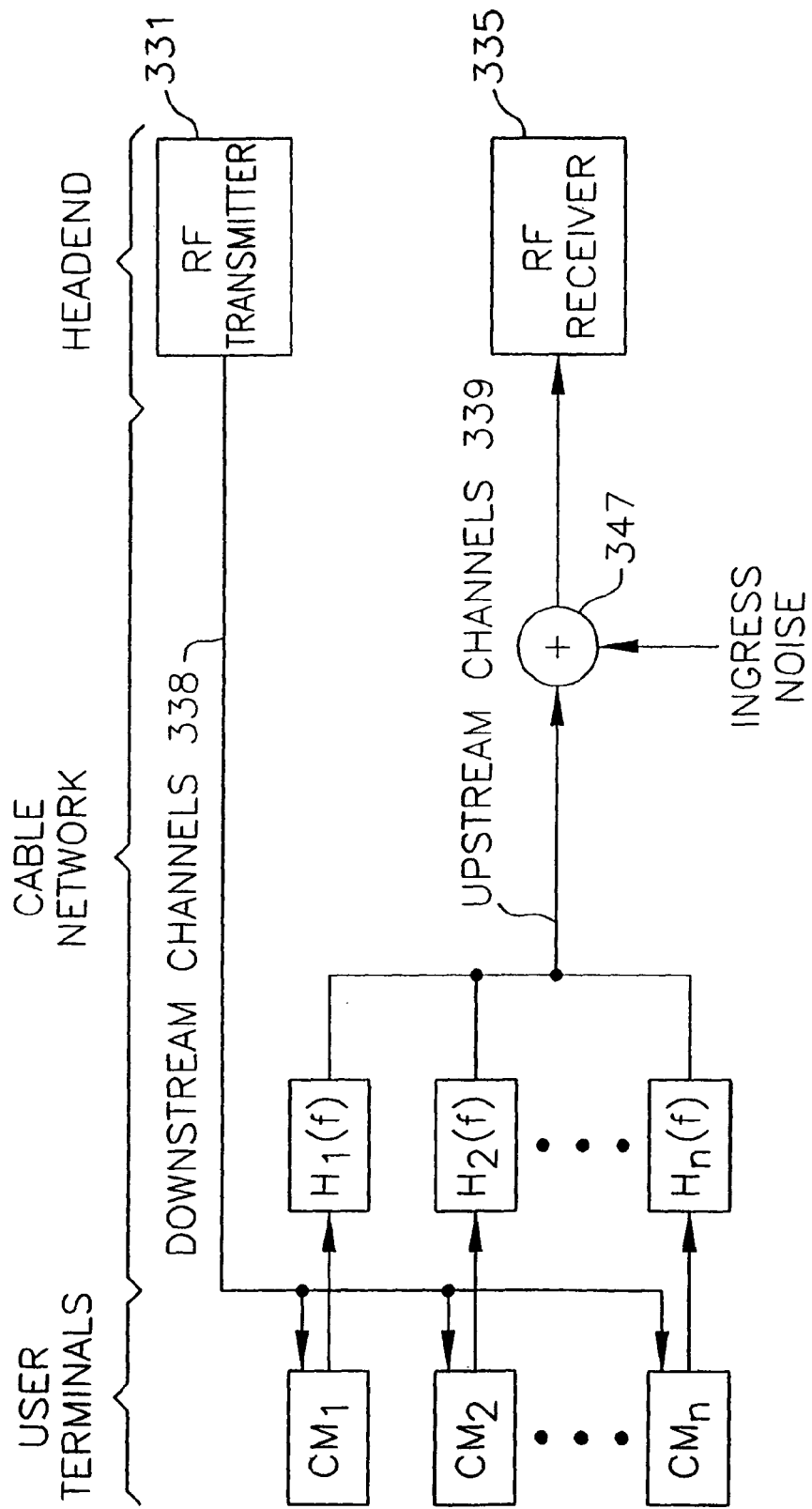
Figure 82:
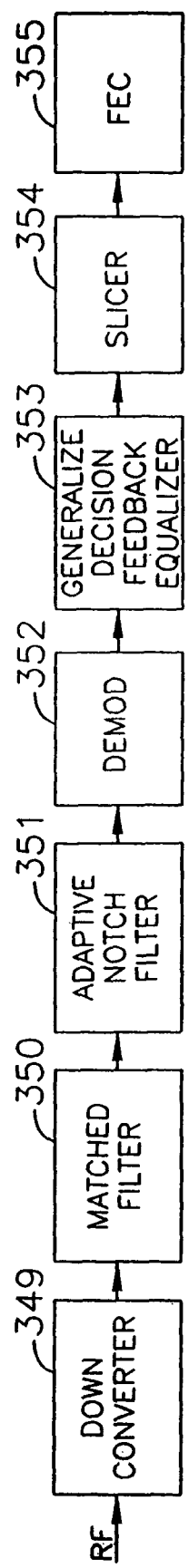
Figure 83:
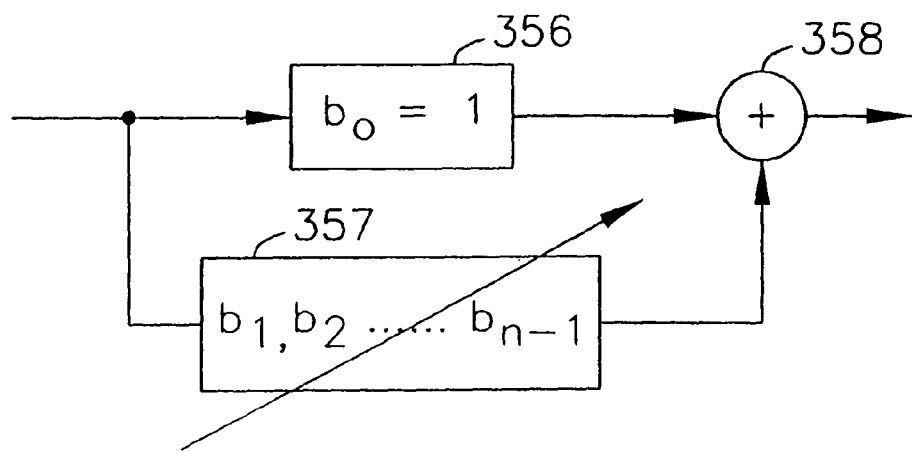
Figure 84:
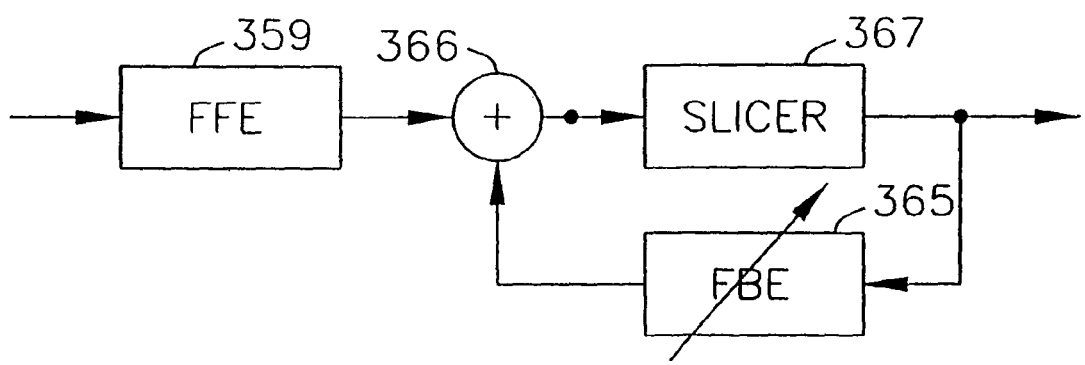
Figure 85:
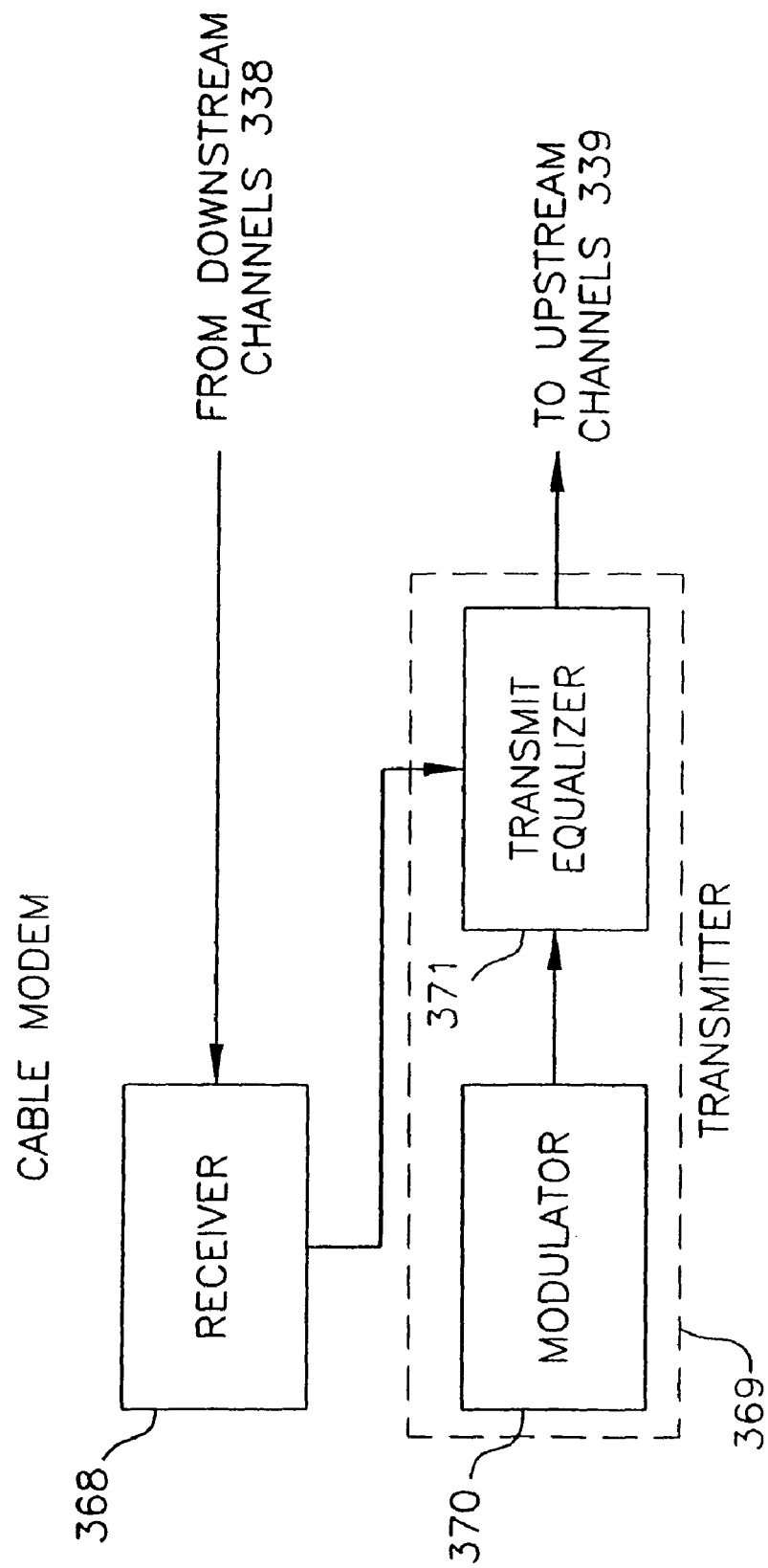
Figure 86:
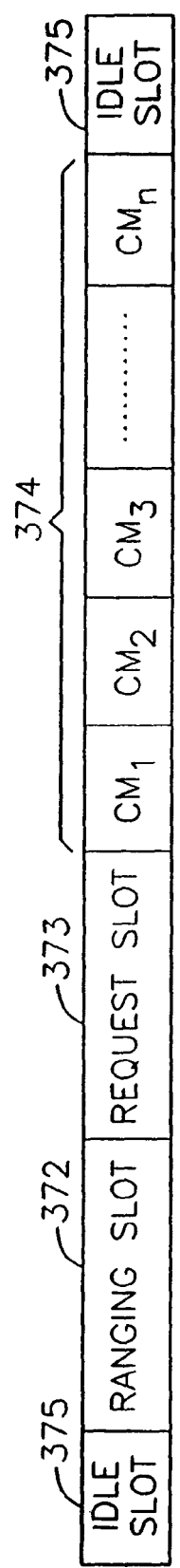
Figure 87:
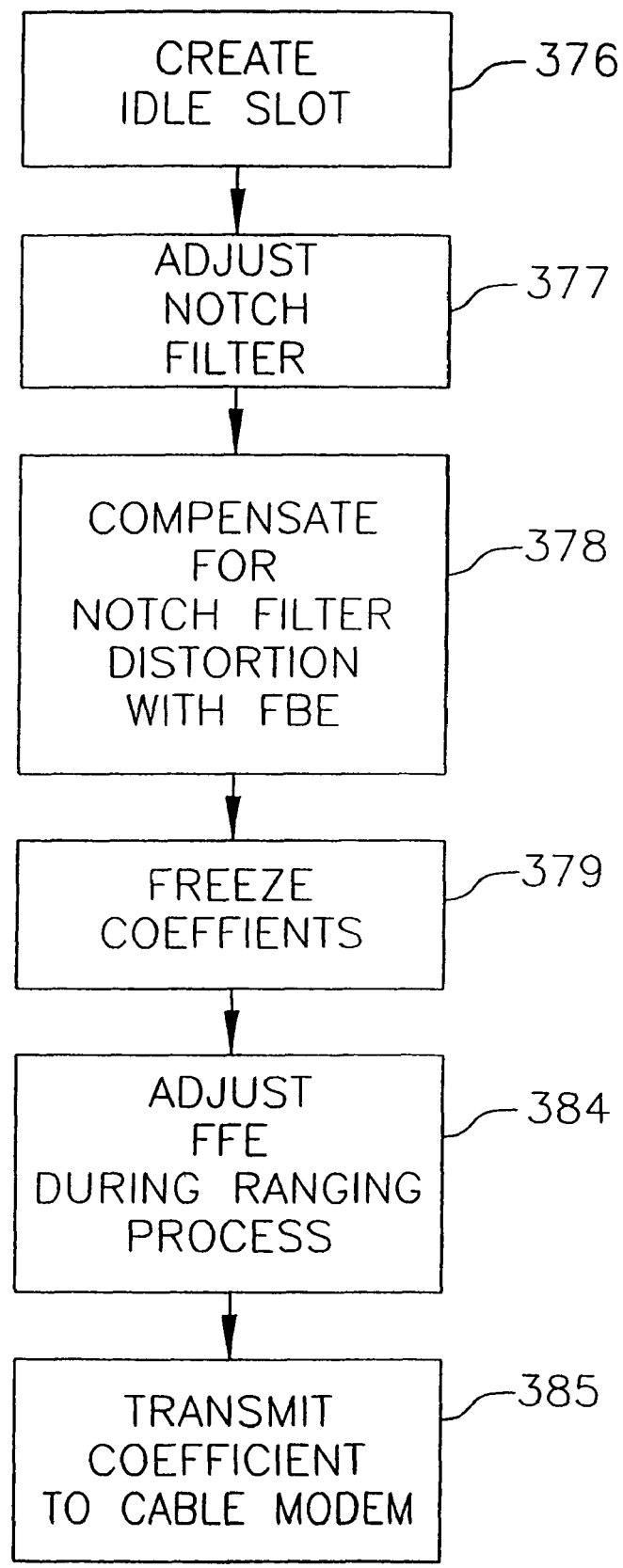
Figure 88A:
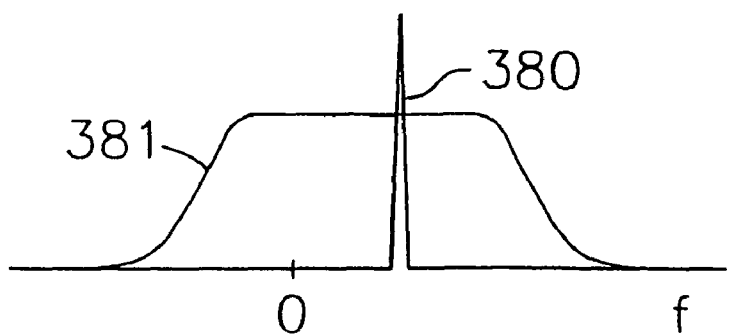
Figure 88B:
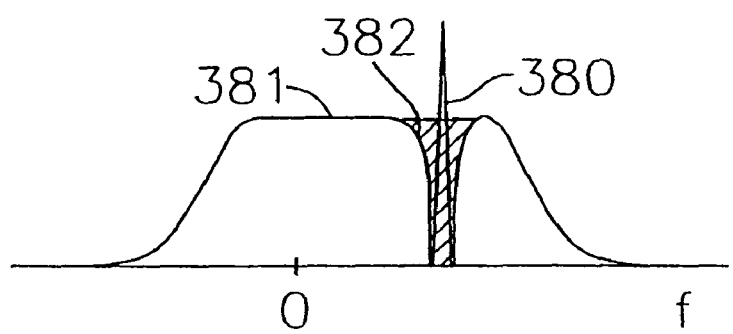
Figure 88C:
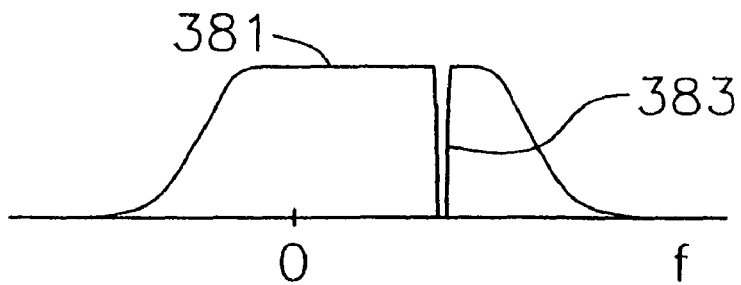
Figure 89A:
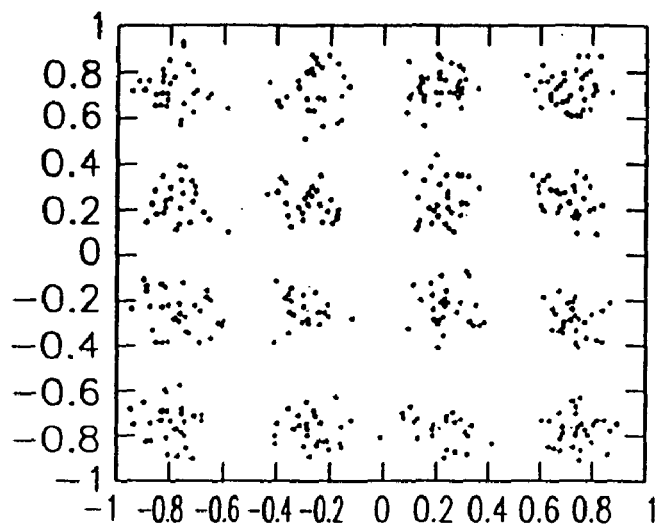
Figure 89B:
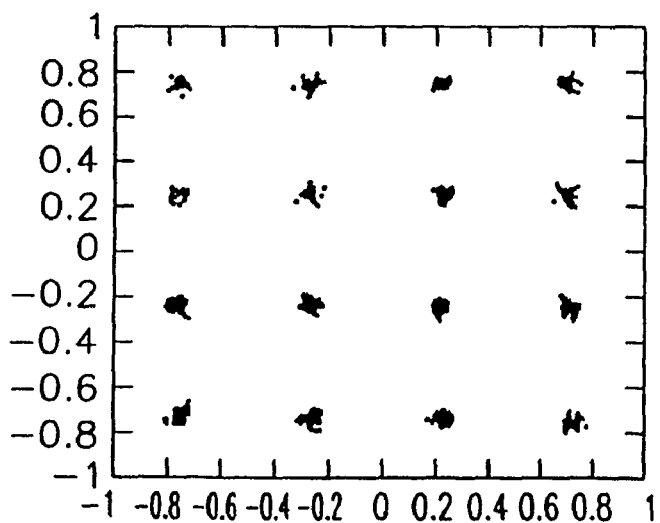
Figure 90A:
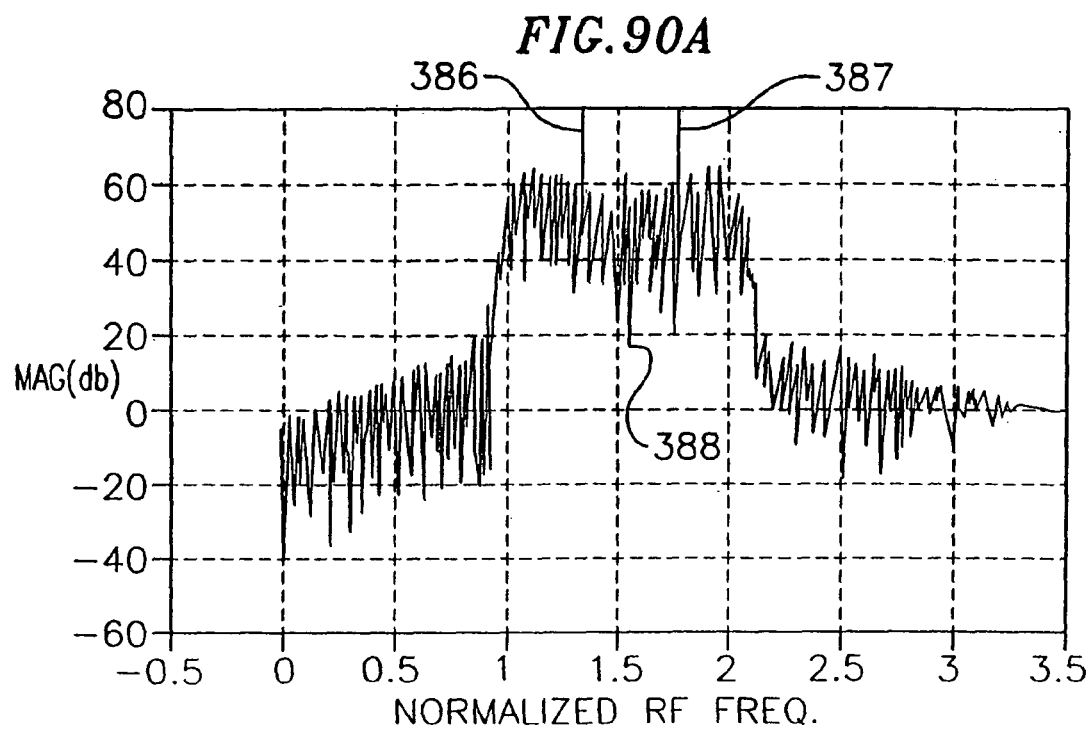
Figure 90B:
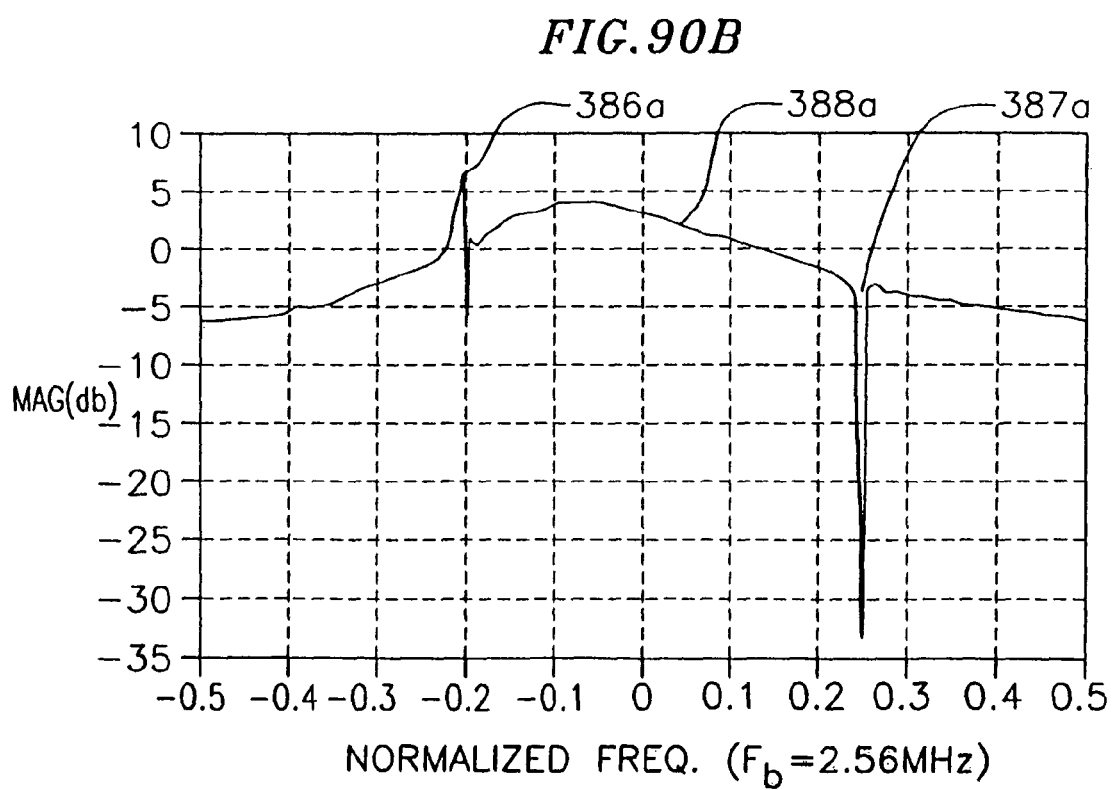

FIGS. 7A and 7B are block diagrams of a sub-system at the subscriber modem for receiving packets with encrypted data and control information, parsing the encrypted data from the control information, decrypting the encrypted data and separately storing the decrypted data and the control information and for restoring the packets with the encrypted data and the control information at the subscriber modem for transmission to the headend;

FIGS. 8A and 8B are block diagrams of a sub-system similar to that shown in FIGS. 7A and 7B (but at the headend) for providing a parsing of the signal packets received from the subscriber modem and a decryption of the encrypted data parsed from the packets and for providing an encryption of data for transmission to the subscriber modem and a reformulation of the packets from the encrypted data and the control information;

FIG. 9 is a block diagram in some additional detail of a burst receiver shown as a single block in FIG. 4;

FIG. 10 is a block diagram in significantly increased detail of the burst receiver shown as a single block in FIG. 4;

FIG. 11 is a schematic diagram illustrating the round trip transmission delay between a headend and a subscriber modem;

FIG. 12 is a flowchart showing the software level synchronization control of a cable modem;

FIG. 13 is a flowchart showing the hardware level synchronization control of a cable modem;

FIG. 14 shows a continuous data stream, such as that which may be received by a conventional continuous receiver;

FIG. 15 shows a plurality of data bursts separated by guard bands, such as those transmitted by cable modems to a cable modem termination system according to time division multiple access (TDMA);

FIG. 16 shows in further detail an exemplary data burst of FIG. 15;

FIG. 17 shows the QPSK preamble of FIG. 16 in further detail;

FIG. 18 is a block diagram of a contemporary phase locked loop;

FIG. 19 is a block diagram of a fractional symbol timing loop in a typical digital receiver, wherein the matched filter is within the loop;

FIG. 20 is a block diagram of the fractional symbol timing loop of the present invention, wherein the matched filter has been moved outside the fractional symbol timing loop;

FIG. 21 is a block diagram showing a burst receiver having a fractional symbol timing loop, a carrier phase correction loop and an amplitude estimator so as to effect fast acquisition of data packets;

FIG. 22 is a block diagram showing a burst receiver having a fractional symbol timing loop, a carrier phase correction loop and an amplitude estimator, wherein the matched filter has been moved outside of the fractional symbol timing loop;

FIG. 23 is a block diagram of a phase detector gain boosting logic circuit wherein the amplitude of a signal input to a phase detector is monitored by a sensor and the amplitude of the signal to the low pass filter of the loop is controlled by the output of the sensor;

FIG. 24 is a timing diagram showing the use of a single contemporary clock signal to provide timing for a sampling circuit contemporary clock signal (FIG. 24-A) to provide timing for a sampling circuit and also showing the use of two out-of-phase clock signals (FIG. 24-B), wherein and also showing the use of two out-of-phase clock signals, wherein one of the two out-of-phase clock signals will always have a timing relationship relative to the input binary signal to effect sampling of the input binary signal;

FIG. 25A is a schematic block diagram of a system for allocating different portions of a dynamic range of power between analog and digital states in the system;

FIG. 25B is a schematic block diagram of an RMS estimator that is used to derive a variable gain amplifier setting;

FIG. 26 is a block diagram of a prior art technique showing a plurality of contemporary demodulators coupled to demodulate data which is input from a transmission medium such as a fiber optic or coaxial cable and which is coupled to provide the demodulated data as an output thereof;

FIG. 27 is a block diagram of one aspect of the present invention, showing a monitoring circuit coupled to monitor a plurality of upstream channels for at least one parameter which is indicative of channel quality;

FIG. 28 is a block diagram of a prior art upstream burst receiver and medium access control (MAC) showing modulated data input from a transmission medium, such as a coaxial cable, to the upstream burst receiver and showing digital data output from the MAC;

FIG. 29 is a block diagram showing an aspect of the present invention;

FIG. 30 is a chart showing RS coding gain for various T's using 16-QAM with K equals 64 bytes;

FIG. 31 is a schematic drawing providing an example of fine frequency agility, wherein the frequency spectrum is divided into a plurality of closely spaced channels;

FIG. 32 is a flowchart showing dynamic channel allocation control flow;

FIG. 33 is a flowchart showing CMTS dynamic channel allocation control flow;

FIG. 34 is a simplified block diagram showing the MAC/PHY interface of the present invention;

FIG. 35 is a schematic representation of a data packet showing the positioning of the data or payload therein and also showing the location of a guard band;

FIG. 36 is a schematic diagram showing the formation of an exemplary MAP which is transmitted by the cable modem termination system (CMTS) to all of the cable modems on a particular channel so as to facilitate communication of the cable modems with the cable modem termination system according to a time division multiple access (TDMA) protocol which avoids collisions among data packets from different cable modems;

FIG. 37 is a schematic diagram showing the formation of frames by a cable modem in response to receipt of a MAP, such as that shown in FIG. 36;

FIG. 38 is a flowchart showing the operation of the cable modem termination system in separating high priority requests and low priority requests received from cable modems;

FIGS. 39 and 40, taken together, define a flowchart showing the operation of the cable modem termination system in granting requests from cable modems to transmit data from the cable modems to the cable modem termination system;

FIGS. 41 and 42, taken together, define a block diagram of that portion of the cable modem termination system which receives requests from the cable modems and which generates MAPs in response to these requests and also shows a plurality of cable modems which receive the MAPs and which generate frames in accordance with the MAPs;

FIG. 43 is a graphical representation of the relationship of the minislots which define the request interval, maintenance interval and data interval with respect to the minislot clock (MSCLK);

FIG. 44 is a graphical representation of the MAP message format prior to message filtering;

FIG. 45 is a graphical representation of the MAP message format after message filtering;

FIG. 46 is a block diagram showing the architecture of the shared SRAM-based MAC interface for eight upstream channels;

FIG. 47 is a block diagram showing the MAP timing control interface signals which are transmitted from the MAP to the demodulator of the burst receiver;

FIG. 48 is a graphical representation of the relationship between the minislots which define the request interval, the maintenance interval and the data interval with respect to the minislot clock, MapValid signal and MapData and also showing the MAP clock;

FIG. 49 is a graphical representation of the relationship between the minislots which define the maintenance interval, the minislot clock, the MapValid signal and MapData and also showing the timing of the receive now (Rx now) signal;

FIG. 50 is a graphical representation of the relationship between the minislots which define the data interval, the minislot clock, the MapValid signal and MapData and also showing the timing of the receive now (Rx now) signal;

FIG. 51 is a graphical representation of the relationship between the minislots which define the request interval, the minislot clock, the MapValid signal and MapData and also showing the timing of the receive now (Rx now) signals;

FIG. 52 is a graphical representation showing the prepended information when the first block TDMA transmission bit is set;

FIG. 53 is a graphical representation showing the prepended information when the equalizer prepend bit is set, thereby increasing the prepended information by 32 bytes (for a total length of 48 bytes) with respect to FIG. 52;

FIG. 54 is a table showing the statistics and the calculation used for each slot definition;

FIG. 55 is a block diagram of the MAC/PHY interface;

FIG. 56 is a graphical representation showing the relationship of the bit clock with respect to the burst valid indicator (B1kDV) and the data;

FIG. 57 is a graphical representation showing the MAP serial interface field definitions;

FIG. 58 is a graphical representation showing the format of the prepended data;

FIG. 59 shows the signaling for the data/control MAC/PHY interface at the subscriber cable modem;

FIG. 60 is a block diagram showing the sign-on sequence for the cable modem initialization process;

FIG. 61 is a block diagram showing the relationship of the cable modem to the cable modem termination system;

FIG. 62 is a graphical representation showing the contents of the prepended information;

FIG. 63 is a table showing the definitions of the bit fields for the status bytes in the prepended information;

FIG. 64 is a block diagram showing the burst demodulator status information processing flow;

FIG. 65 is a block diagram showing the burst detector SPI bus interface;

FIG. 66 is a timing diagram showing one mode of the generic byte base serial input with control information prepended;

FIG. 67 is a timing chart showing another mode the generic byte base serial input with control information prepended;

FIG. 68 is a schematic diagram showing the fragmentation of a data packet of a cable modem into first and second portions thereof, wherein the first portion of the data packet is placed in a first time slot allocated by the cable modem termination system and the second portion of the data packet is placed in a second time slot allocated by the cable modem termination system;

FIG. 69 is a schematic diagram of a complete packet according to the present invention, which is used to transmit data from a cable modem to a cable modem termination system;

FIG. 70 is a schematic diagram of a plurality of complete packets according to the present invention, used to transmit data on a concatenated basis from a cable modem to the cable modem termination system;

FIG. 71 is a schematic diagram of a plurality of packet fragments transmitted from a cable modem to the cable modem termination system, wherein the packet fragments form, in composite, a complete packet;

FIG. 72 shows the format of one of the packets of FIG. 71 in further detail;

FIG. 73 and FIG. 74, taken together, define a table providing further detail of the fragmentation format of a frame which incorporates a packet;

FIGS. 75 and 76, taken together, define a flowchart showing how a cable modem and a cable modem termination system cooperate to facilitate the fragmentation of packets by the cable modem for transmission to the cable modem termination system;

FIG. 77 is a flowchart illustrating the fragmentation process;

FIG. 78 is a modification of FIG. 1 adapting the invention to wireless transmission;

FIG. 79 is a modification of FIG. 2 adapting the invention to wireless transmission;

FIG. 80 is a schematic diagram of a single integrated circuit chip adapted to practice the invention;

FIG. 81 is a schematic block diagram of a bidirectional cable transmission system;

FIG. 82 is a schematic block diagram of a portion of the RF receiver at the headend of the cable system shown in FIG. 81;

FIG. 83 is a schematic block diagram of the adaptive notch filter shown in FIG. 82;

FIG. 84 is a schematic block diagram of the generalized decision feedback equalizer (DFE) shown in FIG. 82;

FIG. 85 is a schematic block diagram of a portion of one of the cable modems shown in FIG. 81;

FIG. 86 is a diagram of the TDMA slots for transmitting information in an upstream channel of the cable system shown in FIG. 81;

FIG. 87 is a block diagram of a method for reducing noise in the cable system shown in FIG. 81;

FIGS. 88A-88C are frequency response diagrams illustrating common noise (such as ingress) cancellation according to the method shown in FIG. 87;

FIGS. 89A and 89B are diagrams of a 16-QAM constellation before and after noise cancellation according to the method shown FIG. 87; and FIGS. 90A and 90B are frequency response diagrams illustrating both ingress and individual noise compensation according to the method shown in FIG. 87.

DETAILED DESCRIPTION OF THE INVENTION

Introduction

In a cable modem system, a headend or cable modem termination system (CMTS) is located at a cable company facility and functions as a modem which services a large number of subscribers. Each subscriber has a cable modem (CM). Thus, the cable modem termination system must be capable of facilitating bidirectional communication with any desired one of the plurality of cable modems.

As used herein, the cable modem termination system (CMTS) is defined to include that portion of a headend which facilitates communication with a plurality of cable modems. A typical cable modem termination system includes a burst receiver, a continuous transmitter and a medium access control (MAC).

The cable modem termination system communicates with the plurality of cable modems via a hybrid fiber coaxial (HFC) network, wherein optical fiber provides communication to a plurality of fiber nodes and each fiber node typically serves approximately 500 to 2,000 subscribers, which communicate with the node via coaxial cable. A plurality of subscribers communicate with the fiber node via a common or shared coaxial cable. It is this sharing of the common coaxial cable which necessitates that the number of cable modems attached thereto be limited so as to mitigate the likelihood of undesirable bit rate reductions which inherently occur when an excessive number of cable modems communicate simultaneously over a single coaxial cable.

The hybrid fiber coaxial network of a cable modem system utilizes a point-to-multipoint topology to facilitate communication between the cable modem termination system and the plurality of cable modems. Frequency domain multiple access (FDMA)/time division multiplexing (TDM) is used to facilitate communication from the cable modem termination system to each of the cable modems, i.e., in the downstream direction. Frequency domain multiple access (FDMA)/time domain multiple access (TDMA) is used to facilitate communication from each cable modem to the cable modem termination system, i.e., in the upstream direction.

The cable modem termination system includes a downstream modulator for facilitating the transmission of data communications therefrom to the cable modems and an upstream demodulator for facilitating the reception of data communications from the cable modems.

The downstream modulator of the cable modem termination system utilizes either 64 QAM or 256 QAM in a frequency band of 54 MHz to 860 MHz to provide a data rate of up to 56 Mbps.

Since the upstream channel has a much lower data rate requirement, the upstream demodulator uses either QPSK or 16 QAM in a frequency range of 5 MHz to 42 MHz to provide a data rate of up to 10 Mbps.

The asymmetric data throughput defined by the upstream channel requiring a much lower data rate than the downstream channel results from the inherently larger amount of data which is communicated via the downstream channel during pay-per-view, Internet access and the like, wherein a video signal is communicated via the downstream channel, while only control signals such as those associated with viewing of the video signal are communicated via the upstream channel. Thus, the downstream channel requirement may exceed 1.5 Mbps, while the upstream channel requirement may be as low as 16 Kbps.

Similarly, each cable modem includes an upstream modulator for facilitating the transmission of data to the cable modem termination system and a downstream demodulator for receiving data from the cable modem termination system. The upstream modulator of each cable modem uses either QPSK or 16 QAM within the 5 MHz to 42 MHz bandwidth of the upstream demodulator and the downstream demodulator of each cable modem utilizes either 64 QAM or 256 QAM in the 54 MHz to 860 MHz bandwidth of the downstream modulator (in North America).

Contemporary cable modem systems operate on a plurality of upstream channels and utilize time division multiple access (TDMA) in order to facilitate communication between a plurality of cable modems and a single cable modem termination system on each upstream channel. Typically, between 250 and 500 cable modems communicate with a single cable modem termination system on a given upstream channel.

In order to accomplish TDMA for upstream communication, it is necessary to assign time slots within which cable modems having a message to send to the cable modem termination system are allowed to transmit. The assignment of such time slots is accomplished by providing a request contention area in the upstream data path within which the cable modems are permitted to contend in order to place a message which requests additional time in the upstream data path for the transmission of their message. The cable modem termination system responds to these requests by assigning time slots to the cable modems making such a request, so that as many of the cable modems as possible may transmit their messages to the cable modem termination system utilizing TDMA and so that the transmissions are performed without undesirable collisions.

Because of the use of TDMA, the cable modem termination system must use a burst receiver, rather than a continuous receiver, to receive data packets from cable modems via upstream communications. As those skilled in the art will appreciate, a continuous receiver can only be utilized where generally continuous communications (as opposed to burst communications as in the present invention) are performed, so as to substantially maintain timing synchronization between the transmitter and the receiver, as is necessary for proper reception of the communicated information. During continuous communications, timing recovery is a more straightforward process since signal acquisition generally only occurs at the initiation of such communications. Thus, acquisition is generally only performed in continuous receivers once per continuous transmission and each continuous transmission may be very long.

However, the burst communications inherent to TDMA systems require periodic and frequent reacquisition of the signal. That is, during TDMA communications, the signal must be reacquired for each separate burst transmission being received.

Since continuous receivers generally only acquire the signal once, the need to minimize acquisition time is much less critical in continuous receivers than in burst receivers, wherein acquisition must be performed for each separate burst, and therefore occurs quite frequently. Thus, there is a strong motivation to minimize acquisition time in burst receivers, so as to enhance overall data transmission efficiency and throughput. As such, it is beneficial to provide techniques which enhance the speed at which data packets transmitted according to TDMA methodologies may be acquired by a burst receiver, such as that of a cable modem termination system.

Burst Receiver for Cable Modem System and Synchronization

Referring now to FIG. 1, a hybrid fiber coaxial (HFC) network 1010 facilitates the transmission of data between a headend 1012, which includes at least one cable modem termination system, and a plurality of homes 1014, each of which contains a cable modem. Such hybrid fiber coaxial networks are commonly utilized by cable providers to provide Internet access, cable television, pay-per-view and the like to subscribers.

Approximately 500 homes 1014 are in electrical communication with each node 1016, 1034 of the hybrid fiber coaxial network 1010, typically via coaxial cables 1029, 1030, 1031. Amplifiers 1015 facilitate the electrical connection of the more distant homes 1014 to the nodes 1016, 1034 by boosting the electrical signals so as to desirably enhance the signal-to-noise ratio of such communications and by then transmitting the electrical signals over coaxial cables 1030, 1031. Coaxial cable 1029 electrically interconnects the homes 1014 with the coaxial cables 1030, 1031, which extend between amplifiers 1015 and nodes 1016, 1034.

Each node 1016, 1034 is electrically connected to a hub 1022, 1024, typically via an optical fiber 1028, 1032. The hubs 1022, 1024 are in communication with the headend 1012, via optical fibers 1020, 1026. Each hub is typically capable of facilitating communication with approximately 20,000 homes 1014.

The optical fibers 1020, 1026 extending intermediate the headend 1012 and each hub 1022, 1024 defines a fiber ring which is typically capable of facilitating communication between approximately 100,000 homes 1014 and the headend 1012.

The headend 1012 may include video servers, satellite receivers, video modulators, telephone switches and/or Internet routers 1018, as well as the cable modem termination system. The headend 1012 communicates via transmission line 1013, which may be a T1 or T2 line, with the Internet, other headends and/or any other desired device(s) or network.

Referring now to FIG. 2, a simplified block diagram shows the interconnection of the headend 1012 and an exemplary home 1014, wherein a cable modem 12 communicates with a cable modem termination system, embodied as a line card 1042, via hybrid fiber coaxial network 1010.

More particularly, a personal computer 1048, disposed within the home 1014, is connected via cable 1011 to the cable modem 12 which communicates via coaxial cable 1017 with the hybrid fiber coaxial network 1010, which in turn communicates via optical fiber 1020 with the cable modem termination system (CMTS) including line card 1042 of the headend 1012. Internet router 1040 facilitates communication between the headend 1012 and the Internet or any other desired device or network.

Figure 3:
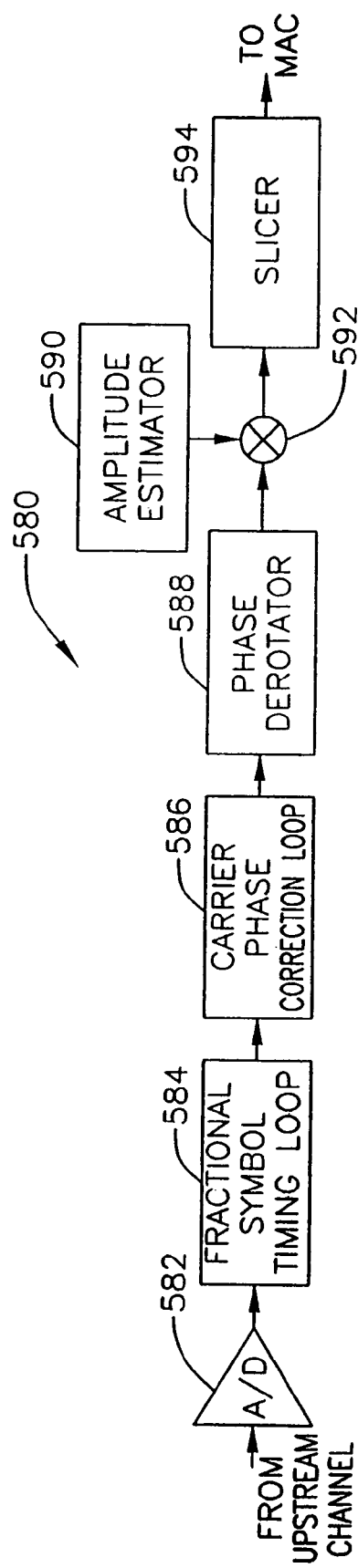

Referring now to FIG. 3, the present invention includes a cable modem termination system (defined by line card 1042 of FIG. 2) which communicates with a plurality of cable modems 12. Cable modem termination system (CMTS) 10 has an enhanced data packet acquisition burst receiver 580.

Burst receiver 580 includes an analog front-end such as an analog-to-digital converter 582 which receives analog data packets from an upstream channel and which converts the analog data packets into digital data packets, a fractional symbol timing loop 584 which determines a fractional symbol timing correction and applies the fractional symbol timing correction to the data packets, a carrier phase correction loop 586 which determines a carrier phase correction and applies the carrier phase correction to the data packets, a phase derotator 588 which corrects phase errors in the symbols of the data packets, and a conventional coherent amplitude estimator 590 which provides an amplitude correction by a conventional estimation process and applies the amplitude correction to the data packets via multiplier 592 prior to the data packets being provided to slicer 594. This process is described in detail below.

Figure 6A:
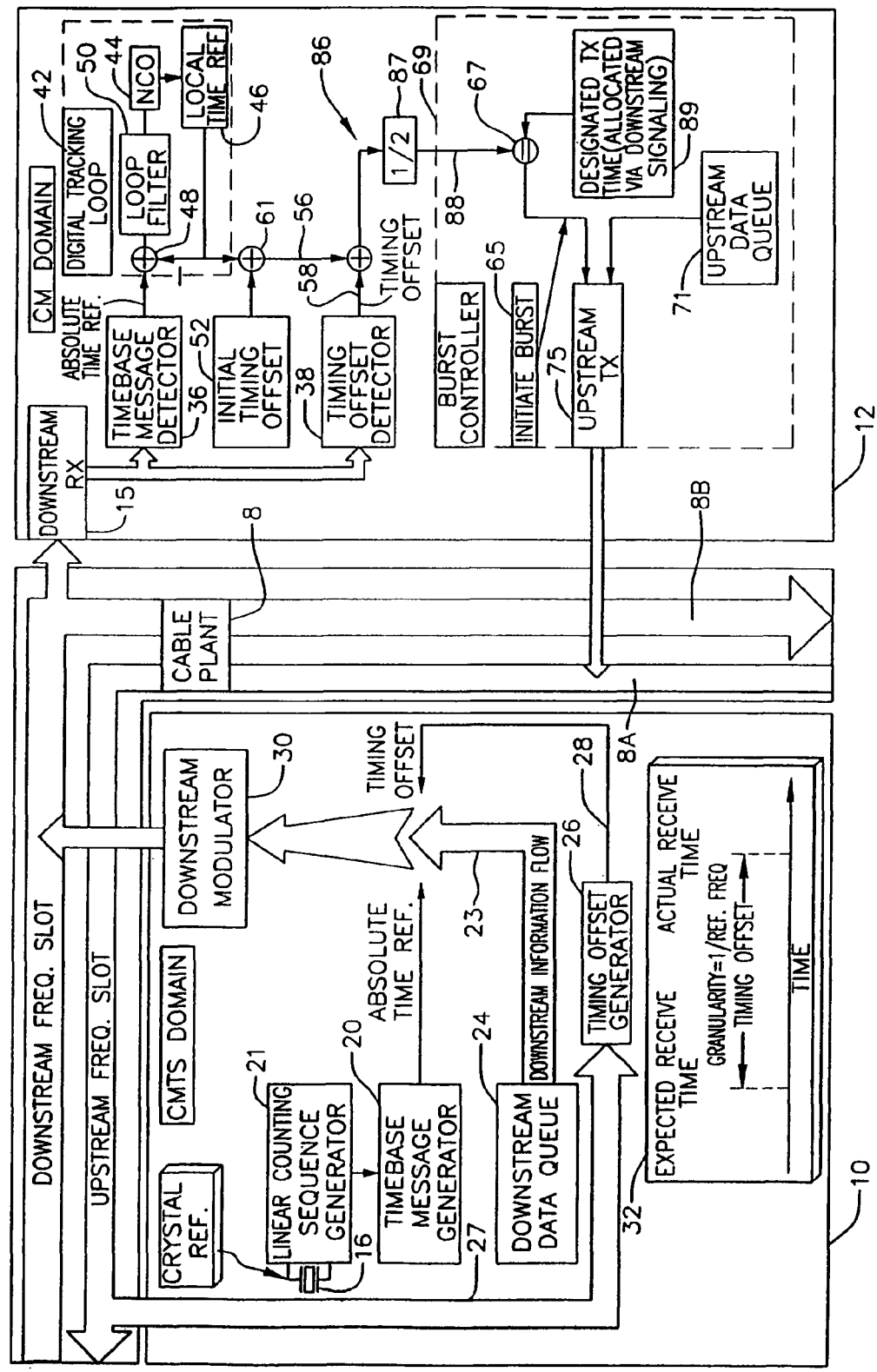
FIG. 6A is a block diagram showing a cable modem termination system and a representative cable modem communicating with one another via a cable plant.

The timestamp generation at the CMTS and the upstream timing recovery logic at the CM, and the flow of timestamp message are shown in FIG. 6A. Although only one cable modem 12 is shown in FIG. 6A for clarity, the cable modem termination system 10 actually communicates bidirectionally with a plurality of such cable modems 12. Such communication as discussed herein may actually occur between the cable modem system and the plurality of cable modems by communicating simultaneously with the cable modems on a plurality of separate frequency channels.

This aspect of the invention primarily addresses communication of a plurality of different cable modems on a single frequency channel in a serial or time division multiplexing fashion, wherein the plurality of cable modems communicate with the cable modem termination system sequentially. However, it will be appreciated that while this plurality of cable modems is communicating on one channel with the cable modem termination system (using time division multiple access or TDMA), many other cable modems may be simultaneously communicating with the same cable modem termination system on a plurality of different channels (using frequency division multiplexing/time division multiple access or FDM/TDMA)

In a typical cable modem system, a single cable modem termination system including line card 1042 (FIG. 2) will typically communicate with between 250 and 500 cable modems 12. Thus, the cable modem system of the present invention includes a plurality of cable modems 12. Although the following description generally discusses the operation of a single cable modem termination system including line card 1042 and a single cable modem 12, those skilled in the art will appreciate that a plurality of cable modem termination systems including line cards 1042 and cable modems 12 may similarly be utilized.

The cable modem termination system 10 communicates with each of the cable modems 12 via a cable plant 8, which typically includes a hybrid fiber coaxial (HFC) network in which optical fiber facilitates communication from the cable modem termination system 10 to a plurality of hubs, each of which distribute signals from the optical fiber to a plurality of coaxial cables. Each hub may be located at a distance of up to approximately 100 miles from either the cable modem termination system 10 or from the next hub along the optical fiber.

Optionally, a plurality of cable modem termination systems may be synchronized with respect to one another so as to facilitate communication between any desired cable modem termination system and any desired cable modem(s).

According to one aspect of the present invention, the cable modem termination system 10 includes a crystal oscillator timing reference 16 which provides an output to a linear counting sequence generator 21. It is this timing reference 16 to which each of the cable modems 12 must be synchronized. The linear counting sequence generator 21 is incremented by the output of the crystal oscillator timing reference 16 and maintains a count representative of the number of cycles provided by the crystal oscillator timing reference 16 since the linear counting sequence generator 21 was last reset. According to the present invention, the linear counting sequence generator 21 includes a free-running counter having a sufficient count capacity to count for several minutes before resetting.

A timebase message (timebase message and timestamp message are used interchangeably herein) generator 20 receives the count of the linear counting sequence generator 21 to provide an absolute time reference which is inserted into the downstream information flow 23 provided by downstream data queue 24, as discussed in detail below. The timebase message generator 20 performs a modulo function, i.e., a sawtooth pattern as a function of time, and the counter clock is generated by the oscillator with very tight accuracy.

Slot timing offset generator 26 receives a timing offset (ranging signal) message 27 from each individual cable modem 12 with which the cable modem termination system is in communication. The slot timing offset generator 26 provides a slot timing offset 28 which is representative of a slot timing offset between the cable modem termination system 10 and the cable modem 12 and inserts the slot timing offset 28 into the downstream information flow 23. The slot timing offset 28 is calculated by determining the position of the slot timing offset from the expected time of message 27 within a dedicated timing slot of the upstream communications, as discussed in detail below. The timing offset generator 26 encodes the timing offset (ranging error) detected by the upstream receiver into a slot timing offset message.

Slot timing offset messages are sent only after the frequency of the local reference clock has been acquired by the cable modem.

Downstream modulator 30 primarily modulates the downstream information flow 23. Absolute time references are inserted at quasi-periodic intervals as determined by a timestamp send timer in the form of a binary up counter 31 (FIG. 6C). A slot timing offset 28 is inserted shortly after the arrival of a slot timing offset message 27.

The time line 32 of the cable modem termination system 10 shows that the slot timing offset 28 is the difference between the expected receive time and the actual receive time of the slot timing offset message 27.

According to one embodiment of the present invention, each cable modem 12 includes a downstream receiver 15 for facilitating demodulation of the data and timestamp message, and timing recovery of downstream communications from the cable modem termination system 10. The output of the downstream receiver 15 is provided to timebase message detector 36 and slot timing offset detector 38. The downstream information (any data communication, such as a file transfer or MPEG video signal) received by the downstream receiver 15 is also available for further processing, as desired.

The timebase message detector 36 detects the timebase message generated by timebase message generator 20 of the cable modem termination system 10. Similarly, the slot timing offset detector 38 detects the slot timing offset 28 generated by the slot timing offset generator 26 of the cable modem termination system 10. The timebase message detector 36 provides an absolute time reference which is representative of the frequency of the crystal oscillator timing reference 16 of the cable modem termination system 10. The absolute time reference is provided to a digital tracking loop 42 which provides a substantially stable clock output for the cable modem 12 which corresponds closely in frequency to the frequency of the crystal oscillator timing reference 16 of the cable modem termination system 10. Thus, the digital tracking loop 42 uses the absolute time reference, which is representative of the frequency of the crystal oscillator timing reference 16, to form an oscillator drive signal which drives a numerically controlled oscillator 44 in a manner which closely matches the frequency of the crystal oscillator timing reference 16 of the cable modem termination system 10, as discussed in detail below.

A difference between the absolute time reference and the output of a local time reference 46, which is derived from the numerically controlled oscillator 44, is formed by a differencer 48. This difference defines a frequency error value which represents the difference between the clock of the cable modem 12 (which is provided by local time reference 46) and the clock of the cable modem termination system 10 (which is provided by crystal oscillator timing reference 16).

This frequency error value is filtered by loop averaging filter 50 which prevents undesirable deviations in the frequency error value from affecting the numerically controlled oscillator 44 in a manner which would decrease the stability thereof or cause the numerically controlled oscillator 44 to operate at other than the desired frequency. The loop filter 50 is configured so as to facilitate the rapid acquisition of the frequency error value, despite the frequency error value being large, and then to reject comparatively large frequency error values as the digital tracking loop 42 converges, i.e., as the output of the local timing reference 46 becomes nearly equal to the absolute time reference, thereby causing the frequency error value to approach zero.

According to one embodiment of the present invention, an initial slot timing offset 52 is added by summer 61 to the output of the local time reference 46 to provide a partially slot timing offset corrected output 56. The partially slot timing offset corrected output 56 of summer 61 is then added to slot timing offset 58 provided by slot timing offset detector 38 to provide slot timing offset and frequency corrected time reference 86. The timing offset correction is a simple addition which adds two message values. Such simplified operation is facilitated only when the resolution of the timing offset message is equal to or finer than that of the timestamp message.

The initial slot timing offset 52 is merely an approximation of the expected slot timing offset likely to occur due to the propagation and processing delays, whose approximate values have been predetermined. After frequency conversion using the phase locked loop and timebase message error, the slot timing offset 58 provides a final correction which is calculated by the cable modem termination system 10 in response to the cable modem termination system 10 receiving communications from the cable modem 12 which are not properly centered within their desired timing slots, as discussed in detail below.

Scaler 87 scales the frequency corrected time reference 86 so as to drive upstream transmitter 69 at the desired slot timing.

Time reference 88 is compared to the designated transmit time 89 which was allocated via downstream communication from the cable modem termination system 10 to the cable modem 12. When the time reference 88 is equal 67 to the designated transmit time, then an initiate burst command 65 is issued and the upstream data queue 71 is modulated to form upstream transmission 75.

The timing offset (error) message is generated by the cable modem termination system. The timing offset (error) is simply the difference between the expected time and the actual arrival time of the message during the ranging slot at the cable modem termination system receiver.

Figure 6B:
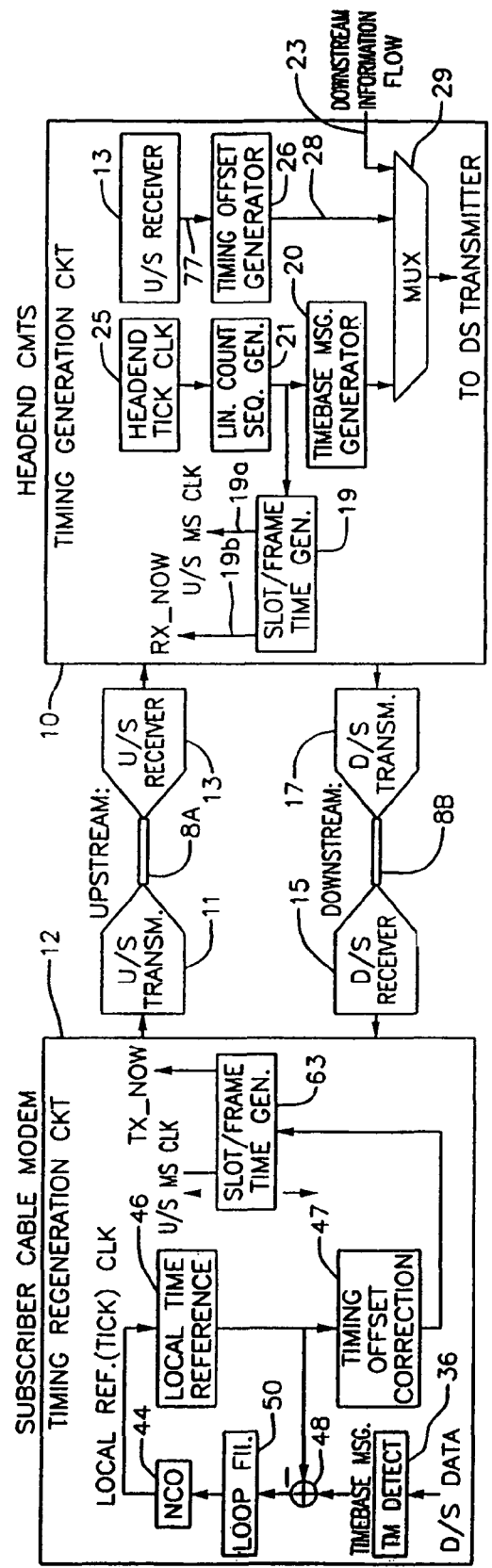
FIG. 6B is a block diagram showing the cable modem termination system and cable modem of FIG. 2 in further detail.
Figure 6C:
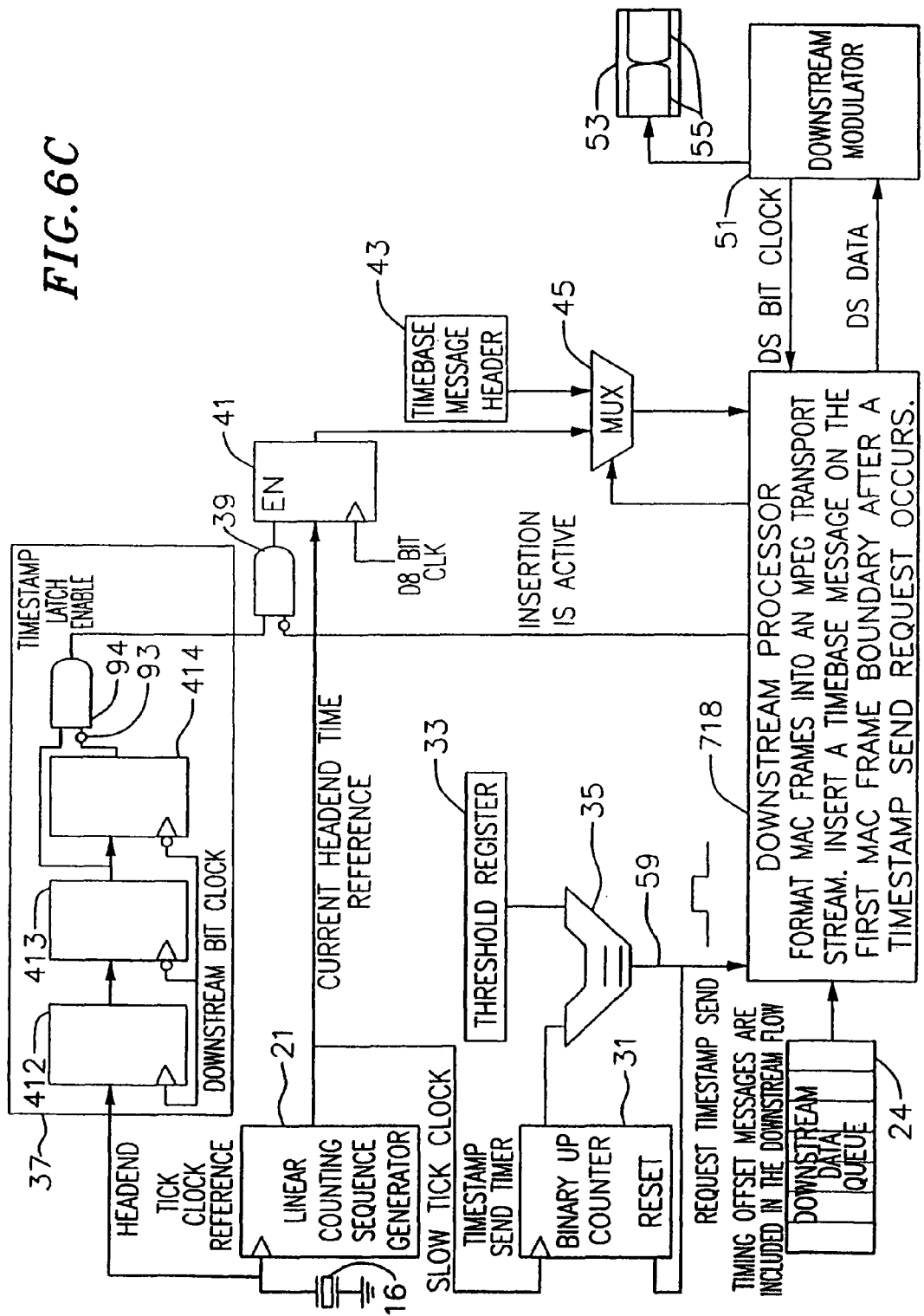
FIG. 6C is a block diagram showing the cable modem termination system of FIG. 2 in further detail.

Referring now to FIG. 6B, the cable modem termination system 10 and the cable modem 12 are described in further detail. The multiplexer 29 of the cable modem termination system 10 combines downstream information flow 23 with slot timing offset message 28 from slot timing offset generator 26 and with an absolute time reference from timebase message generator 20 to provide downstream communications to the downstream transmitter, which includes downstream modulator 30 (FIG. 6A).

The slot timing offset generator 26 receives a slot timing offset signal 77 from the upstream receiver 13. The location of the slot timing offset signal within a time slot of an upstream communication defines the need, if any, to perform a slot timing offset correction. Generally, a slot timing offset value will be transmitted, even if the actual slot timing offset is O. When the slot timing offset signal is desirably located within the time slot, and does not extend into guard bands which are located at either end of the time slot, then no slot timing offset correction is necessary.

However, when the slot timing offset signal extends into one of the guard bands of the time slot of the upstream communication, then a slot timing offset message 28 is generated by the slot timing offset generator 26, which is transmitted downstream to the cable modem 12 where the slot timing offset message 28 effects a desired correction to the time at which upstream communications occur, so as to cause the slot timing offset signal and other transmitted data to be positioned properly within their upstream time slots.

The headend tick clock 25 includes the crystal reference 16 of FIG. 6A and provides a clock signal to linear counting sequence generator 21. Slot/frame time generator 19 uses a clock signal provided by count sequence generator 21 to provide both a minislot clock 19a and a receive now signal 19b. The absolute time reference from generator 20 is the clock by which the message slots are synchronized to effect time division multiple access (TDMA) communications from each cable modem 12 to the cable modem termination system 10. At the CM, a Transmit now signal is generated at the beginning of each minislot of a transmission (FIG. 6l). At the CMTS, a Receive now signal is similarly generated at the beginning of a received packet (FIGS. 49-51).

A minislot is a basic medium access control (MAC) timing unit which is utilized for allocation and granting of time division multiple access (TDMA) slots. Each minislot may, for example, be derived from the medium access control clock, such that the minislot begins and ends upon a rising edge of the medium access control clock. Generally, a plurality of upstream symbols define a minislot and a plurality of minislots define a time division multiple access slot.

The cable modem 12 receives downstream data from the downstream channel 8B. A timebase message detector 36 detects the presence of a timebase Message in the downstream data.

Slot timing offset correction 47 is applied to data transmitted on upstream channel 8A prior to transmission thereof from the subscriber cable modem 12. The slot timing offset correction is merely the difference between the actual slot timing offset and the desired slot timing offset. Thus, the slot timing offset correction is generated merely by subtracting the actual slot timing offset from the desired offset. Slot/frame timing generator 63 controls transmission of the upstream data queue 71 (FIG. 6A) at the designated transmit time 89 (FIG. 6A).

Summer 48 subtracts the local time reference 46 from the timebase message and provides an output to a loop filter 50 which drives numerically controlled oscillator 44, as discussed in detail below.

Upstream transmitter 11 facilitates the transmission of upstream channels 8A from the subscriber cable modem 12 and upstream receiver 13 facilitates the reception of the upstream channels 8A by the cable modem termination system 10.

Downstream transmitter 17 facilitates the transmission of downstream channels 8B from the cable modem termination system 10 to the cable modem 12 where downstream receiver 15 facilitates reception thereof.

Referring now to FIG. 6C, the cable modem termination system 10 is shown in further detail.

As discussed above, the crystal oscillator timing reference 16 provides an output to linear counting sequence generator 21 which increments to provide a count representative of the frequency of the crystal oscillator timing reference 16. The counter 21 also provides a substantially jitterless headend reference which provides a clock signal for downstream data transmissions from the cable modem termination system 10. The jitterless headend reference is synchronized to the downstream symbol rate via synchronizer 37 which includes counters 412, 413, 414, inverter 93 and AND gate 94 which cooperate according to well-known principles to provide a timestamp latch enable to AND gate 39 to enable latch 41.

The linear counting sequence generator 21 provides its count to latch 41. Latch 41 provides the count from the linear counting sequence generator 21 to multiplexer 45 when an enable is provided to latch 41. The enable is provided to latch 41 when the synchronizer 37 provides a high output and the downstream processor 718 provides a low output to AND gate 39. The count from the linear counting sequence generator 21 is combined with a timebase message header 43 by multiplexer 45 and the combined count and timebase message header is provided to the downstream processor 718. The downstream processor 718 provides a control signal to the multiplexer 45 to cause the multiplexer 45 to provide the count from the linear counting sequence generator 21 and the timebase message header 43 to the downstream processor 718 only when the downstream processor 718 is ready to insert the count and the timebase message header 43 into a downstream data communication.

Binary up counter 31 functions as a timestamp send timer so as to cause the count or absolute time reference (FIG. 6A) from the linear counting sequence generator 21 to be inserted into a downstream communication in a generally periodic fashion. The binary up counter 31 receives a count from the linear counting sequence generator 21. When the count of the binary up counter 31 equals a value stored in the threshold register 33, equality comparator 35 provides a request timestamp send to the downstream processor 718. It is important to note that the timestamp includes the absolute time reference (FIG. 6A).

However, the downstream processor 718 does not immediately insert every combined count and timebase message header from multiplexer 45 into a downstream communication when the request timestamp send 59 is provided by the equality comparator 35 to the downstream processor 718. Rather, the downstream processor 718 waits until any downstream message presently being transmitted is finished so as to prevent undesirable fragmentation thereof.

The downstream processor 718 provides downstream data, including downstream communications from the downstream data queue 24, a count from the linear counting sequence generator 21, and a timebase message header 43 from multiplexer 45 to the downstream modulator 51, which modulates the data, count, and timebase message header to form a downstream data communication 53 which includes a plurality of individual messages 55. Some of these individual messages 55 includes communicated data such as file transfers and MPEG video and some of these messages 55 include timestamps and/or slot timing offsets to facilitate synchronization of a selected cable modem 12 with the cable modem termination system 10.

In this manner, a count which is representative of the frequency of the crystal oscillator timing reference 16 is transmitted from the cable modem termination system 10 to each cable modem 12.

The output of the linear counting sequence generator 21 is divided down to provide a frequency reduced slow tick clock output signal.

Figure 6D:
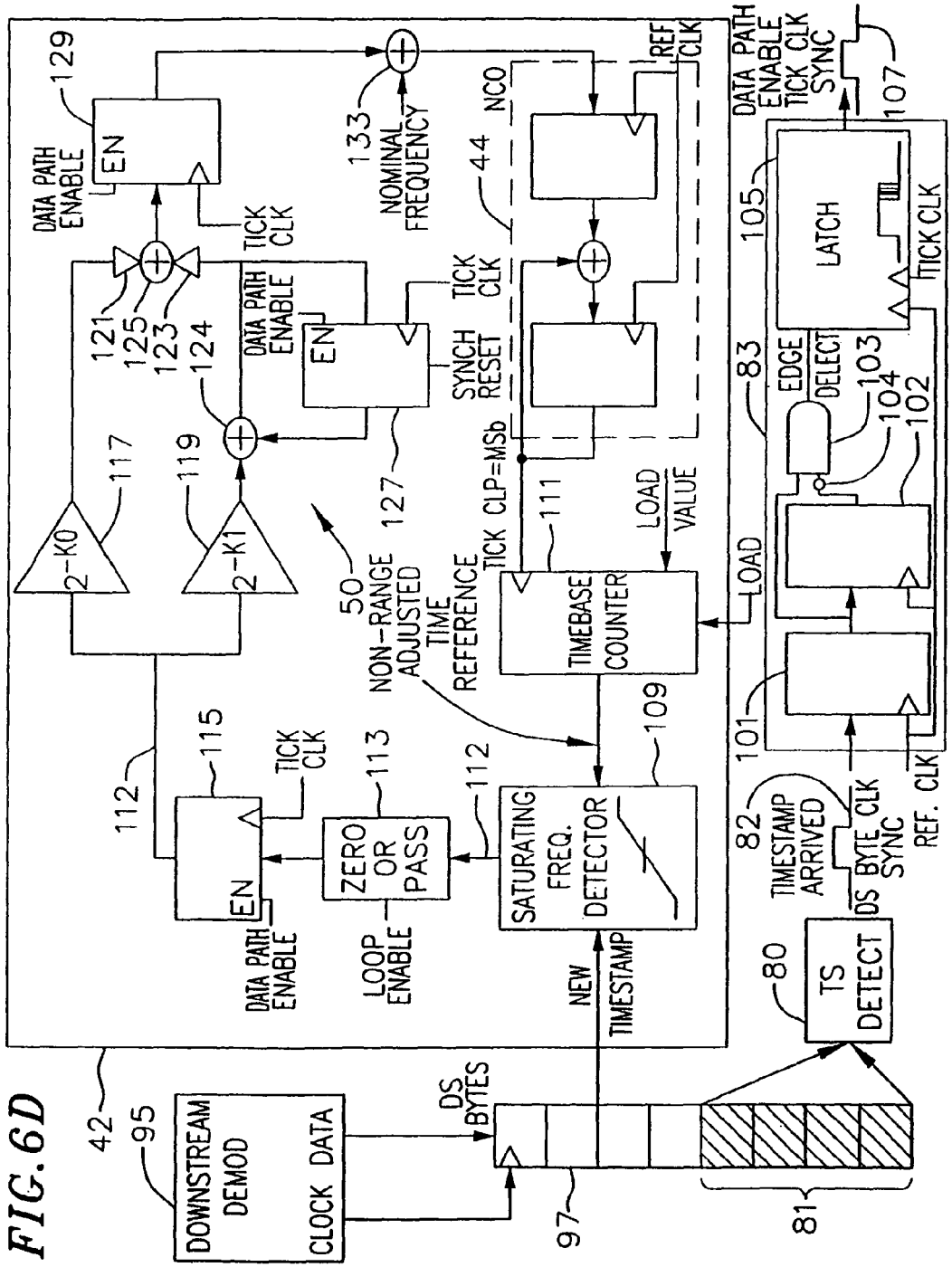
FIG. 6D is a block diagram showing the cable modem of FIG. 3 in further detail.

Referring now to FIG. 6D, an exemplary timing recovery circuit of a cable modem is shown in further detail. Downstream demodulator 95, which forms a portion of downstream receiver 15 of FIG. 6B, provides clock and data signals which are derived from downstream channels 8B (FIG. 6A). The data signals include downstream bytes which in turn include the count or timestamp 97 and timebase message header 81 transmitted by the cable modem termination system 10. Slot timing offset messages are included in the downstream flow of downstream data.

Timestamp detector 80 detects the presence of a timestamp header 81 among the downstream bytes and provides a timestamp arrived signal 82 which functions as a downstream byte clock sync. The timestamp arrived signal 82 is provided to synchronizer 83 which includes register 101, register 102, AND gate 103, inverter 104 and latch 105, which stretches the input and generates a tick clock synch pulse 107. Synchronizer 83 synchronizes the timestamp arrived signal 82 to the clock of the cable modem 12, to provide a data path enable tick clock sync pulse 107 for enabling the digital tracking loop 42.

When the digital tracking loop 42 is enabled by the pulse 107 from the synchronizer 83 in response to detecting a timestamp header by timestamp detector 80, then the timestamp, which is a count provided by the linear counting sequence generator 21 of FIG. 6C, is provided to the digital tracking loop 42 and the digital tracking loop 42 is enabled so as to process the timestamp.

A differencing circuit or saturating frequency detector 109 compares the timestamp to a count provided to the saturating frequency detector 109 by timebase counter 111 which is representative of the frequency of numerically controlled oscillator 44. The saturating frequency detector 109 provides a difference signal or frequency error value 112 which is proportional to the difference between the frequency of the numerically controlled oscillator 44 of the cable modem and the crystal oscillator reference 16 of the cable modem termination system.

If the difference between the timestamp and the value of the timebase counter 111 is too large, then the difference is saturated to a maximum or minimum level depending on the sense of the excessive difference.

Detector 109 is coupled by a zero or pass connection 113 to latch 115. Responsive to a loop enable signal, the difference provided by the detector 109 is provided to latch 115 when a global enable is provided thereto. The loop enable is set active when functioning of the digital tracking loop is desired.

Latch 115 provides the frequency error value 112 to a loop filter which includes multipliers 117 and 119, scalers 121 and 123, summers 124, 125 and latch 127.

The multipliers 117 and 119 include shift registers which effect multiplication by shifting a desired number of bits in either direction. Scalers 121 and 123 operate in a similar manner. The loop filter functions according to well-known principles to filter out undesirable frequency error values, such that they do not adversely affect the stability or operation of numerically controlled oscillator 44. Thus, the loop filter tends to smooth out undesirable deviations in the frequency error value signal, so as to provide a more stable drive signal for the numerically controlled oscillator 44.

According to one embodiment of the present invention, the multipliers 117 and 119 can be loaded with different coefficients such that the bandwidth of the loop filter may be changed from a larger bandwidth during initial acquisition to a smaller bandwidth during operation. The larger bandwidth used initially facilitates fast acquisition by allowing frequency error values having larger deviations to be accepted. As the digital tracking loop 42 converges, the frequency error value tends to become smaller. At this time, frequency error values having larger deviations would tend to decrease stability of the digital tracking loop 42 and are thus undesirable. Therefore, different coefficients, which decrease the bandwidth of the loop filter, are utilized so as to maintain stability of the digital tracking loop 42.

A table showing an example of coarse and fine coefficients KO and K1 which are suitable for various different update rates and bandwidths are shown in FIG. 6E.

The output of the loop filter is provided to latch 129. The output of latch 129 is added to a nominal frequency by summer 133 so as to define a drive signal for numerically controlled oscillator 44.

Those skilled in the art will appreciate that the addition of a frequency offset, if properly programmed to a normal frequency, will decrease the loop's acquisition time. This is due to the fact that the final value of the accumulated value of latch 127 will be closer to its initial value.

The nominal frequency is generally selected such that it is close in value to the desired output of the numerically controlled oscillator 44. Thus, when the numerically controlled oscillator 44 is operating at the desired frequency, the filtered frequency error value provided by latch 129 is nominally zero.

Referring now to FIG. 12, a flowchart showing the two levels of control, i.e., coarse lock and fine lock, of the digital tracking loop 42 is provided. As mentioned above, the coarse lock utilizes coefficients for the multipliers 117 and 119 which provide a large bandwidth of the loop filter which is suitable for the acquisition of the frequency error value so as to initiate tracking, while the fine coefficients provide enhanced stability of the numerically controlled oscillator 44, so as to prevent undesirable fluctuations in the output thereof. According to one exemplary embodiment of the present invention, a hardware control level, i.e., utilizing coarse coefficients for the multipliers 117 and 119, achieves a coarse frequency lock and then a software level changes the loop coefficients to achieve a final, low jitter frequency lock. At the hardware level, a state of frequency lock implies that the difference between arriving timebase message values and the clock, i.e., output of the numerically controlled oscillator 44, of the cable modem 12 is below a predetermined or programmable error threshold. Software lock implies that a final low jitter lock state has been achieved.

The process for achieving coarse frequency lock or (sync=1) is now described. After starting 200, the cable modem 12 first waits 201 for the loop or data path enable 107 (FIG. 6D) before becoming active. After the first timebase message arrives, then the first timebase message 202 is loaded 203 into the timebase counter 111 (FIG. 6D) of the digital tracking loop 42. This allows the digital tracking loop 42 to be initiated with a value which produces a zero frequency error value, so as to facilitate faster acquisition and prevent undesirable swings in the output of the numerically controlled oscillator 44. Thus, when the data path enable 107 is detected by the digital tracking loop 42, then the next arriving timestamp is loaded into the timebase counter of the cable modem 12 and the digital tracking loop 42 then waits 204 for the next timebase message to arrive.

Loading 203 of the initial timebase message into the timebase counter 111 enhances acquisition time because it forces the counter 111 of the cable modem 12 to have a value close to that of the linear counting sequence generator 21 of the cable modem termination system 10. When the next timebase message arrives 204, the number of messages that have arrived thus far are compared 205 to a programmable threshold. If the number of messages (acquisition count) is less than the programmable threshold (acquisition threshold), then the acquisition count is incremented 206. If the number of messages received so far (acquisition count) is greater than the programmable threshold (acquisition threshold), then the current timebase error is checked 207 against an error threshold to determine whether or not sync can be declared (sync=1). If the timebase error is below the threshold, then hardware coarse lock has been achieved and sync becomes active. The cable modem 12 then waits for the next timebase message to arrive. If the new timebase error exceeds the error threshold, then the cable modem 12 returns to the initial or start state 200, resets the acquisition count and the loop integrator value, i.e., the value stored in latch 127, and the acquisition process begins again.

Referring now to FIG. 13, the software level of control occurs within a local processor and affects the digital tracking loop 42 via register writes to the loop filter's linear and integrator coefficients. The loop filter's linear coefficient is that coefficient placed in multiplier 117 and the loop filter's integrator coefficient is that coefficient placed in multiplier 119. Loading different sets of coefficients into a loop filter changes the loop filter's bandwidth, as discussed above.

Thus, coarse coefficients give the digital tracking loop 42 a relatively large bandwidth, which enables quick acquisition of frequency error values, while narrower loop bandwidths reject frequency error values representative of noisier variations in the error metric, thereby smoothing the digital tracking loop's 42 response. It is important to note that smooth response of the digital tracking loop 42 is important in achieving low jitter between the cable modem 12 and the cable modem termination system 10.

According to the present invention, before enabling the hardware acquisition control, the first stage of software acquisition control includes estimation 300 of the timestamp interarrival time, which is particularly estimated by averaging the timestamp interarrival time over a plurality, e.g., 10 to 50 arrivals. This estimation is important because the coarse and fine coefficients are obtained from the table shown in FIG. 6E, where they are dependent upon the update rate, i.e., timestamp interarrival time.

After interarrival time is estimated as represented by a block 300, then the software controller enters an initialization state as represented by a block 301 wherein a trial counter (which counts the number of acquisition attempts thus far) is reset, the tracking loop 42 is disabled and the latch 127 of the loop integrator is reset.

Next, the trial counter is incremented and checked as represented by a block 303 to see if the number of acquisition attempts is less then a predetermined threshold. If the threshold is exceeded, then the controller takes a NO path back to block 300 and performs interarrival estimation again. Otherwise, the controller takes a YES path and the coarse coefficients are loaded as represented by a block 305 into the multipliers 117 and 119 of the digital tracking loop 42 and the loop is enabled. The software controller then waits as represented by a block 307 for the same number of timestamps to arrive as does the hardware controller, after which the sync bit that comes from the hardware controller is checked as represented by a block 309 to determine whether or not coarse lock has been achieved.

If sync is active (is equal to 1), then fine loop coefficients are loaded as represented by a block 310 and a programmable amount of time is allowed to lapse as represented by a block 311 before a sync bit is checked once again. As represented by a block 313, the track error threshold value is loaded. The track error threshold is used to determine whether or not the tracking loop 42 is receiving timestamps suitable for updating the frequency of the numerically controlled oscillator 44. As represented by a block 315 fine lock is checked. If fine lock is achieved the trial count is incremented via a YES path back to block 315 and further attempts to reacquire force lock can be made. Failure of fine lock causes a loop back to block 301 via a NO path and the acquisition process is restarted and also resets the trial counter. It is assumed that if fine lock has been achieved, then the interarrival estimation should be accurate.

The slot timing offset is determined by having the cable modem termination system 10 monitor a dedicated slot timing offset slot in upstream communications so as to determine the position of a slot timing offset message therein. The position of the slot timing offset message within the dedicated slot timing offset slot in the upstream communication determines the slot timing offset between the clock of the cable modem termination system 10 and the clock of the cable modem 12. Thus, the cable modem termination system 10 may use this error to cause the cable modem 12 to transmit at an earlier point in time so as to compensate for propagation and processing delays. As illustrated in FIG. 11, this slot timing offset correction is equal to 2Tpg plus Tprocess.

Initially, the slot timing offset slot includes a comparatively large time slot, i.e., having comparatively large guard times, so as to accommodate comparatively large slot timing offset error. In a normal data packet, the width of the timing offset slot may be reduced when slot timing offset errors become lower (thus requiring smaller guard bands), so as to facilitate more efficient upstream communications.

Generally, communications will be initialized utilizing a comparatively large guard time. After acquisition, when slot timing accuracy has been enhanced, then the guard time may be reduced substantially, so as to provide a corresponding increase in channel utilization efficiency.

According to a further aspect of the present invention, data packets are acquired rapidly, e.g., in an order of sixteen symbol or so, so as to facilitate enhanced efficiency of bandwidth usage. As those skilled in the art will appreciate, it is desirable to acquire data packets as fast as possible, so as to minimize the length of a header, preamble or other non-information bearing portion of the data packet which is used exclusively for such acquisition.

As used herein, acquisition is defined to include the modifications or adjustments made to a receiver so that the receiver can properly interpret the information content of data packets transmitted thereto. Any time spent acquiring a data packet detracts from the time available to transmit information within the data packet (because of the finite bandwidth of the channel), and is therefore considered undesirable.

According to the present invention, acquisition includes the performance of fine adjustments to the parameters which are defined or adjusted during the ranging processes. During the ranging processes, slot timing, carrier frequency, and gross amplitude (power) of the data packet are determined. During acquisition, these parameters are fine-tuned so as to accommodate fractional symbol timing, carrier phase correction and fine amplitude of the data packet.

Moreover, according to the present invention, a ranging process is used to control power, slot timing and carrier frequency in the upstream TDMA channel. Power must be controlled so as to provide normalized received power at the cable modem termination system, in order to mitigate inter-channel interference. The carrier frequency must be controlled so as to ensure proper channelization in the frequency domain. Slot timing must be controlled so as to mitigate the undesirable collision of data packets in the time domain and to account for differential propagation delays among different cable modems.

Fractional symbol timing is a precise modification to slot timing. In slot timing, the clocks of the cable modems are synchronized such that a data packet is transmitted within a slot defined by the cable modem termination system, so as to avoid collisions of data packets transmitted simultaneously by different cable modems. During acquisition, fractional symbol timing allows the receiver to sample symbols at the correct time. Thus, fractional symbol timing causes the receive symbols of the data packet to be aligned in time such that they are properly demodulated. As those skilled in the art will appreciate, it is important to detect the amplitude of QAM symbols at the correct time, so as to facilitate proper interpretation of the amplitude thereof.

Carrier phase correction is a fine tuning of carrier frequency correction, which is performed during the ranging process. Carrier phase correction is necessary in order for the phase derotator to properly compensate for phase errors in the received packet.

Fine amplitude correction is a more precise correction to gross amplitude correction, which is performed during a ranging process. Amplitude corrections must be applied to the incoming data packet, so as to assure that the amplitude is properly defined prior to amplitude detection by the slicer.

Thus, according to the present invention, acquiring a data packet in a cable modem termination system includes determining fractional symbol timing correction, determining carrier phase correction and determining fine amplitude correction. According to the present invention, fractional symbol timing correction is determined by a feedback loop process, carrier phase correction is determined by a loop process and fine amplitude correction is determined by an estimation process. Unlike conventional methodology where fractional symbol timing correction, carrier phase correction, and fine amplitude are all determined by an estimation or correlation technique, this architecture can take advantages of the following merits: a) the same feedback loops can be used both for acquisition and tracking of symbol timing and carrier phase, and b) the carrier phase acquisition and small frequency offset correction (important during the ranging process) can be performed by using the second-order loop architecture.

More particularly, the present invention includes determining fractional symbol timing correction via a fractional symbol timing phase locked loop which controls a phase of a signal representative of the data packet being acquired as the data packet is processed in a resampler which provides an input to a phase derotator and includes determining a carrier phase correction which is performed by a carrier phase correction phase locked loop which controls a phase of a signal representative of the data packet being acquired in the phase derotator. In this manner, the fractional symbol timing is controlled as the signal representative of the data packet being acquired is processed by the resampler and the carrier phase is controlled as the derotator performs phase correction.

The first resampler 1154 (shown in FIG. 22) provides a sample rate suitable for processing by a matched filter and/or the phase derotator. It allows the analog-to-digital converter sample rate and the symbol rate to be independent and also programmable by the resampling factor. Optionally, the matched filter processes the signal representative of the data packet being acquired before the resampler which provides a sample rate suitable for carrier phase recovery and a separate resampler 1146 (shown in FIG. 22) is used to perform fast clock phase recovery, as discussed in detail below.

The matched filter compensates for the effects produced by a shaping filter of the cable modem transmitter which provided the data packet being acquired, according to well-known principles.

Thus, according to one aspect of the present invention, the signal representative of the data packet being acquired is processed by a first resampler to provide a sample rate suitable for the matched filter. Then, a signal representative of the data packet being acquired is processed by the matched filter. Then, the signal representative of the data packet being acquired is processed by a second resampler to provide a sample rate suitable for the phase derotator which the phase of the signal representative of the data packet being acquired is processed by a phase derotator to effect correction of a phase of either the in-phase (I) or quadrature (Q) channel of a QAM signal while the phase of the signal representative of the data packet being acquired is controlled by a carrier phase correction phase locked loop. Then, the signal representative of the data packet being acquired is multiplied by an estimated amplitude correction factor to provide a signal suitable for processing by the slicer. Then, the signal representative of the data packet being acquired is processed by the slicer to effect demodulation of an amplitude component of the I or Q channel of the QAM signal.

Optionally, the input gain (or phase detector gain) of the fractional symbol timing phase locked loop and/or the carrier phase correction phase locked loop by sensing an amplitude input to a phase detector of the loop and modifying the amplitude of the input to the loop filter.

As those skilled in the art will appreciate, loop filters tend to be amplitude sensitive since the coefficients selected therefor may not be valid if the input to the phase detector has an amplitude which is substantially different from that for which the coefficients were selected. The use of coefficients which are not suitable for the input amplitude to the phase detector may therefore result in undesirably increased acquisition time of the signal being acquired.

According to the present invention, use of the fractional symbol timing feedback loop and the carrier phase loop with minimum loop delay, as well as the fine amplitude estimation process, facilitate the acquisition of a data packet having a preamble which is sixteen symbols or less in length.

According to the present invention, the preamble includes a binary pattern 1111 and a unique word 1112 (FIG. 17). Further, according to the present invention, both the binary pattern and the unique word are modulated using quadrature phase shift keying (QPSK). Thus, the entire preamble is modulated using QPSK.

The fractional symbol timing and the carrier phase are determined using the binary pattern of the preamble. The fine amplitude correction is determined using the unique word of the preamble.

According to one aspect of the present invention, as shown in FIG. 24, the fractional symbol timing acquisition is accelerated by utilizing two offset symbol sampling clocks and selecting that offset symbol sampling clock which provides samples having the highest absolute value at the beginning of each burst. As those skilled in the art will appreciate, when only a single symbol sampling clock is utilized, the phase of the symbol sampling clock may be such that samples of the alternating binary pattern are taken at times when the alternating binary pattern is near the transition point, i.e., has a value which is approximately zero, and the sample levels are therefore ambiguous or difficult to reliably determine.

Thus, when only one symbol sampling clock is utilized, the phase of that single symbol sampling clock must be varied until the alternating binary pattern is properly acquired. As those skilled in the art will appreciate, varying the phase of the single sampling clock until the alternating binary pattern is properly acquired (has sufficient amplitude) is undesirably time consuming and thus results in a greater acquisition time of the alternating binary pattern of the preamble.

The use of two offset symbol sampling clocks, particularly when the two offset symbol sampling clocks are offset approximately 180 degrees with respect to one another, inherently causes one of the two symbol sampling clocks to sample when the amplitude of the alternating binary pattern is sufficient to reliably determine the information content thereof. Thus, according to this aspect of the present invention, two offset symbol sampling clocks, each having a phase difference of approximately 180 degrees with respect to the other, are utilized and that clock which provides the best, e.g., highest amplitude (absolute value) is utilized in the sampling process for the alternating binary pattern of the preamble. The use of two offset symbol sampling clocks thus substantially shortens the acquisition time of the alternating binary pattern.

Referring now to FIG. 4, the cable modem termination system 1042 (typically defined by the line card of FIG. 2) comprises a burst receiver 292 for receiving data packets in the upstream data flow, a continuous transmitter 290 for broadcasting to the cable modems 12 via the downstream data flow and a medium access control (Headend MAC) 60 for providing an interface between the burst receiver 292, the continuous transmitter 290 and other headend communications devices such as video servers, satellite receivers, video modulators, telephone switches and Internet routers 1018 (FIG. 1).

Each cable modem 12 (FIG. 2) comprises a burst transmitter 294 for transmitting data to the cable modem termination system including line card 1042 via downstream data flow, a continuous receiver 296 for receiving transmissions from the cable modem termination system including line card 1042 via the upstream data flow and medium access control (Subscriber MAC) 90 for providing an interface between the burst transmitter 294, the continuous receiver 296 and subscriber communications equipment such as a PC 1048 (FIG. 2), a telephone, a television, etc.

The burst receiver 292, Headend MAC 60 and continuous transmitter 290 of the cable modem termination system including line card 1042 and the burst transmitter 294, Subscriber MAC 90 and continuous receiver 296 of each cable modem may each be defined by a single separate, integrated circuit chip.

Figure 5A:
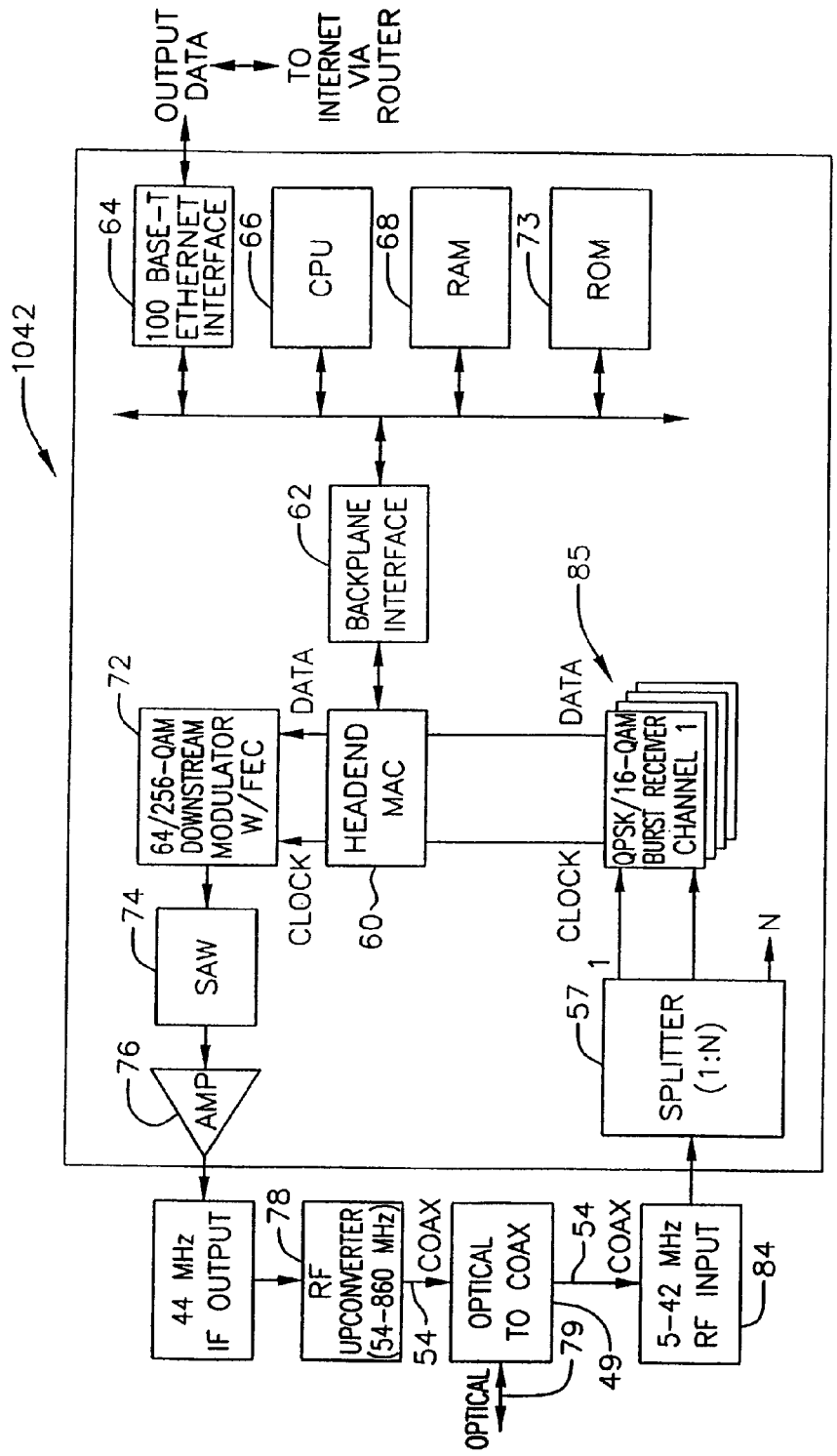
FIG. 5A is a schematic block diagram showing the interconnections of the burst receiver, medium access control (MAC) and transmitter downstream modulator within a cable modem termination system.

Referring now to FIG. 5A, the cable modem termination system including line card 1042 of FIG. 2 is shown in further detail. The cable modem termination system including line card 1042 is configured to receive signals from and transmit signals to an optical fiber 79 of the hybrid fiber coax (HFC) network 1010 (FIG. 2) via optical-to-coax stage 49, which is typically disposed externally with respect to the cable modem termination system including line card 1042. The optical-to-coax stage 49 provides an output to the 5-42 MHz RF input 84 via coaxial cable 54 and similarly receives a signal from the RF upconverter 78 via coaxial cable 54.

The output of the RF input 84 is provided to splitter 57 of the cable modem termination system including line card 1042, which separates the 5-42 MHz RF input into N separate channels. Each of the N separate channels is provided to a separate QPSK/16-QAM burst receiver channel 85.

Each separate QPSK/16-QAM burst receiver channel 85 is in electrical communication with the headend MAC 60. The headend MAC 60 is in electrical communication with backplane interface 62 which provides an interface to ROM 73, RAM 68, CPU 66, and 100BASE-T Ethernet interface 64.

The headend MAC 60 provides clock and a data output to the downstream modulator 72 which provides an output to amplifier 76 through surface acoustic wave (SAW) filter 74. Amplifier 76 provides an output to 44 MHz IF output, which in turn provides an output to the RF upconverter 78.

Each burst receiver 85 is configured so as to be capable of receiving both QPSK (4-QAM) or 16-QAM signals. The QPSK signals provide 2 bits per symbol, wherein each bit has ±1 amplitude levels. The 16-QAM signals provide 4 bits per symbol, each bit having a ±1 or ±3 amplitude level.

However, the description and illustration of a burst receiver configured to accommodate QPSK and 16-QAM inputs is by way of illustration only and not by way of limitation. Those skilled in the art will appreciate that other modulation techniques, such as 32-QAM, 64-QAM and 256-QAM may alternatively be utilized.

Figure 5B:
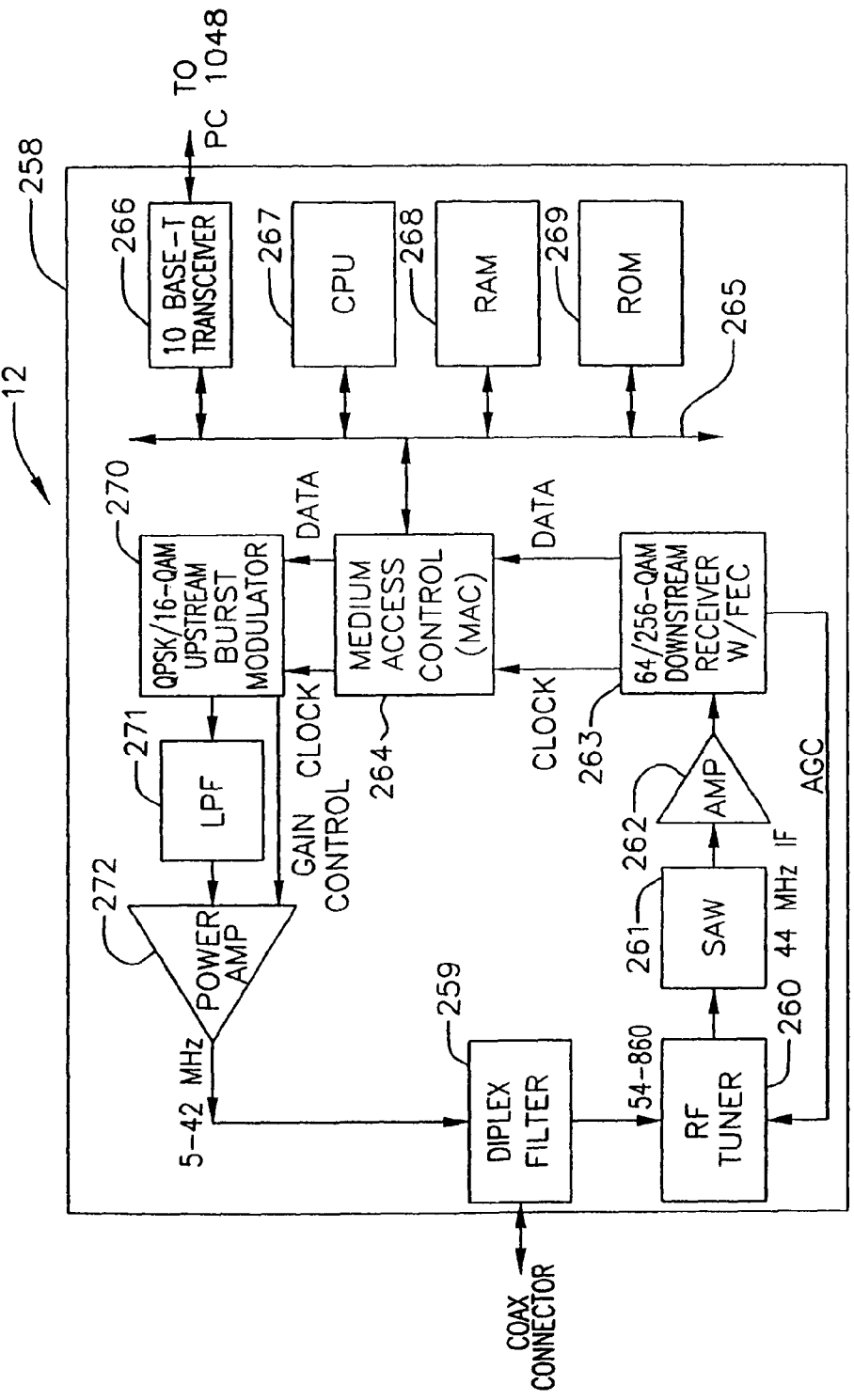
FIG. 5B is a schematic block diagram showing the construction of the cable modem, shown in FIG. 2, at the subscriber, such as the home.

The cable modem 12 in FIG. 2 is shown in detail in FIG. 5B within a rectangle 258. The system shown in FIG. 5B includes a diplex filter 259. The systems shown in FIGS. 5A and 5B can be combined into a single block diagram by rotating FIG. 5B through an angle of 180 degrees so that the diplex filter 259 appears in inverted form at the right end and by then disposing the sheets adjacent each other.

The signals from the diplex filter 259 in the range of 54-860 MHz pass to an RF tuner 260 and then to a surface acoustic waver filter (SAW) 261 which provides signals at a suitable frequency such as approximately 44 MHz to an amplifier 262. The amplified signals pass to a 64/256-QAM downstream receiver 263 with forward error correction (FEC). Automatic gain controls are provided from the receiver 263 to the tuner 260. Clock and data signals then pass from the receiver 263 to a medium access controller (MAC) 264 which introduces signals through an interface 265 to individual ones of a 10 Base-T transceiver 266, a CPU 267, a random access memory (RAM) 268 and a read only memory (ROM) 269.

The signals from the individual ones of the 10 Base-T transceiver 266, the CPU 267, the RAM 268 and the ROM 269 pass through the interface 265 to the medium access controller (MAC) 264. The signals from the MAC controller 264 are then introduced to a QPSK-16QAM upstream burst modulator 270 with forward error correction. The signals from the burst modulator 270 are provided to a low pass filter 271 which passes signals in the range of 5-42 MHz when the system is used in North America. The low pass signals are then introduced to a power amplifier 272, the output from which is provided to the diplex filter 259. The gain in the power amplifier 272 is regulated by the burst modulator 270.

In order to provide an enhanced understanding of the invention, certain terminology used in this application will now be defined. A "MAP" is provided from the headend 10 to the subscriber modem 12. A MAP defines a next frame. A "frame" is a generic term to define a group or a multiple number of slots.

FIGS. 7A and 7B are block diagrams showing at the subscriber cable modem 12 the encrypting and decrypting system discussed herein. In FIG. 7A, data packets with encrypted data and control information are received at the cable modem 12 from the headend 10 by the receiver 296 (also shown in FIG. 4). The control information may illustratively indicate the information provided in a request contention region 486, a CM tx opportunity region 488 or a maintenance region 490, all shown in FIG. 36. The data packets are then introduced to a downstream processor 342 which parses the data and the control information and introduces the encrypted (parsed) data through a line 343 (FIGS. 7A and 7B) to a downstream decryptor 344 (FIG. 7B). The decrypted data is then introduced from a downstream (D/S) direct memory access (DMA) 306 through a memory interface 308 in a DMA controller 312 to a first area in a static random access memory (SRAM) 314. The control information also passes through a DMA 391 and the memory interface 308 in the DMA controller 312 to a second area in the SRAM 314.

When data is to pass from the SRAM 314 to the headend 10, the decrypted data and the control information are read from the separate areas in the SRAM and are passed through an upstream direct memory access (DMA) 522 in the DMA controller 312. An upstream header processor 319 introduces decrypted information from the SRAM 314 to an upstream header processor 319. The decrypted data is then encrypted in an upstream data encryption standard (DES) circuit 321. The encrypted data from the DES 321 and the control information from the upstream header processor 319 then respectively pass through lines 322 and 323 (FIGS. 7A and 7B) to an upstream control 324 in FIG. 7A.

The upstream control 324 provides an interface which receives timing from a timing regeneration circuit (TRC) 341 to control the time when the encrypted data passes from the DES circuit 321. The encrypted data and the control information are then combined in the transmitter 325 (also shown as transmitter 294 in FIG. 4) at the subscriber modem 12 to form the extended packets. A serial peripheral interface) 326 provides an interface for control information between the upstream control 324 and an SPI bus leading to a tuner and EEPROMS.

Each individual subscriber has an encryption unique to that subscriber. This encryption is encoded by the headend 10 in packets sent to that individual subscriber and is decoded by the individual subscriber. In like manner, the encryption is encoded by the subscriber modem 12 in extended packets sent by the individual subscriber to the headend 10 and is decoded by the headend.

FIGS. 8A and 8B are block diagrams similar to those shown in FIGS. 7A and 7B. However, FIGS. 8A and 8B show the system at the headend 10 for encrypting the data in packets sent by the headend to the individual subscriber modem 12 and for decrypting the packets sent by the individual subscriber modem to the headend. The system shown in FIGS. 8A and 8B may be disposed on an integrated circuit chip.

As shown in FIGS. 8A and 8B, packets of data may be introduced to the headend 10 by a data queue 327 in a server external to the integrated circuit chip or may be introduced to the memory from a local bus interface 328 or a CPU interface in the chip. The interface 328 provides a control for a direct memory access (DMA) engine 329 similar in construction to the DMA 306 in FIG. 7B. The packets from the data queue 327 are stored in a downstream (D/S) data buffer or FIFO 533. The packets are parsed by a downstream parser 364 and the data in the parsed packets is encrypted by a DES encryption engine 535. The encryption is different for each individual subscriber modem 12 and is controlled by a DRAM access controller 531, which accesses a key DRAM 728.

The encrypted data from the DES encryption engine 535 are introduced to a cyclic redundancy code/header check sum (CRC/HCS) inserter 361. The CRC/HCS inserter 361 provides a parity check to make certain that the packet is complete. The CRC/HCS inserter 361 combines the encrypted data from the DES encryption engine 535 and the other control information from the downstream parser 364 in the extended packet. The extended packets meeting the tests of the CRC/HCS inserter 361 are passed through a line 389 in FIGS. 8A and 8B and are stored in a downstream transmit buffer TxFIFO 390 in FIG. 8B. The stored information and timing information from a timing generation circuit 341 are introduced to a downstream controller 392, which arbitrates between data and timing information.

The signals from the downstream controller 392 pass through a downstream (D/S) data interface 396 to the transmitter 537 external to the integrated circuit chip. The transmitter 537 transmits the packets downstream to the subscriber modem 12 identified by the encryption in the packets. A serial peripheral interconnection provides an interface for control information, but not data, between the integrated circuit chip (FIG. 8A) and the transmitter 537 and between the integrated circuit chip and a plurality (e.g., eight) of receivers 394, which are external to the integrated circuit chip.

An upstream (U/S) data interface 395 is connected between each of receivers 394 and a corresponding upstream receive (U/SRx) buffer memory (Rx FIFO) 555. The information in the buffer memory 555 is introduced to an upstream channel arbiter 397. The arbiter 397 selects the packets from one of the eight receivers at each instant in accordance with the source of the data provided in a MAP FIFO 274. For example, the packets from one of the receivers 394 may be selected when the packets are marked with the code for that receiver in the MAP for that channel.

The packets passing through the arbiter 397 are stored in the FIFO 523 in FIG. 8A and are introduced from the FIFO 523 through a line 431 to an upstream parser 557. The parser 557 passes the data to a DES data decryption engine 434 and the other (e.g., control) information to a cyclic redundancy code/header check sum (CRC/HCS verification) stage 444. The DES decryption engine 434 decrypts the encrypted data under the control of the DRAM access controller 531 and passes the decrypted data to the CRC/HCS stage 444. The CRC/HCS stage 444 combines the decrypted data and the other information to re-form the extended packets and passes the reformed packets to a buffer or FIFO 445. The packets then pass through the DMA engine 329 to the host system memory disposed externally of the integrated circuit chip in a server.

A serial peripheral interface (SPI) controller 426 in FIG. 8A corresponding to the serial peripheral interface (SPI) 326 in FIG. 7A is connected to the local bus interface 328 to provide an interface for control information to write into the data queue 327. A management information base (MIB) 432 stores statistical errors produced by the stage relating to undetected data packets, uncorrectable data packets and signal-to-noise ratios in data packets, for use in connection with FIGS. 32 and 33.

The burst receiver used to practice this invention is shown as the block 292 in FIG. 4. As shown in FIG. 4, the burst receiver is disposed at the headend 10 to receive packets of symbols from the subscriber modem 12. As illustrated in FIG. 35, Each packet includes a preamble 720, a unique word 721, an equalizer train 722, a payload 723, and a guard time 724.

The preamble may be limited to as few as 16 symbols. It includes a first group of symbols which have a binary alternating sequence in a particular pattern to provide for a fast synchronization of the headend 10 to the carrier frequency of the signals from the subscriber modem 12. It may also include symbols which distinguish the subscriber modem 12 from the other subscriber modems on the channel.

The unique word 721 is in a distinctive symbol pattern to indicate the end of the preamble 720 and the beginning of the payload 723. The payload 723 may be of variable size depending upon the length of the communication from the subscriber modem 12 to the headend 10. The equalizer train 722 may be provided between the unique word 721 and the payload 723. The equalizer train 722 may be in a random sequence. It is provided during the initialization period to train the equalizer to provide proper coefficients to the subscriber modem 12.

Additional details in the construction of the burst receiver 292 are shown in FIG. 9. In FIG. 9, incoming radio frequency (IN RF) signals are introduced on a line 460 to a downconvert stage 514 which converts the signals to an intermediate frequency. The signals then pass to a demodulator 448 which recovers the modulated data. The signals from the data demodulator 448 are introduced to an equalizer 453 which may illustratively be for constellations designated as 16-QAM.

The signals from the equalizer 453 are introduced to a preamble processing stage 520. The stage 520 processes the preamble 720 to provide for a very fast synchronization of the headend 10 to the frequency of the carrier signals from the subscriber modem 12. This is important in insuring that the headend 10 will process all of the data symbols in the packets from the subscriber modem 12.

The stage 520 also provides a ranging operation on the symbols transmitted from the subscriber modem 12 to the headend 10. One aspect of this ranging operation is to determine the time between the transmission of the symbols from the headend 10 to the subscriber modem 12 and the transmission of symbols from the headend to the subscriber in response to the symbols transmitted from the headend to the subscriber.

Since the distance between the headend 10 and the subscriber modem 12 may be as great as approximately one hundred (100) miles, the time between the transmission of symbols from the headend 10 to the subscriber modem 12 and the response of the subscriber to the headend may be large. Until this time is determined and a window is provided at the headend around this determined time, the headend 10 cannot operate effectively in processing the symbols from the subscriber.

The ranging operation involves the determination at the burst receiver of such parameters as the ranging offset measurement, the equalizer coefficients, the burst power level, the slot timing error and the carrier frequency offset. The signals from the stages 520 are introduced to the demodulator 448.

In addition to being introduced to the stages 520, the signals from the equalizer 453 are introduced to a de-randomizer 275. The de-randomizer 275 de-interleaves the signals which have been previously interleaved at the subscriber modem 12 to prevent data from the subscriber from being lost as a result of noise in the cable. The de-randomized signals then pass to a Reed-Solomon (RS) decoder 524 which corrects for errors in the packets. The signals then pass through MAC 60 (also shown in FIG. 4) to an output line 526.

Reference is made to FIG. 10 for additional details of the burst receiver shown in FIG. 9. These additional details include a fine mixer 462 which processes the received quadrature phase signals on the lines 538 and 540. The fine mixer 462 also receives signals from a direct digital frequency synthesizer (DDFS) 463 which is constructed in a well known manner to provide signals for mixing with the signals on the lines 538 and 540 to provide beat frequency signals.

The quadrature phase signals from the fine mixer 462 respectively pass through low pass filters 464 and 465 to a clock frequency recovery stage 552. The clock frequency recovery stage may include a phase locked loop with a numerically controlled oscillator to provide a fast recovery of the frequency of the carrier signals from the subscriber modem 12. A phase locked loop with a numerically controlled oscillator may be generally known in the prior art but not for the purpose of providing a fast recovery of the frequency of the carrier signals from a subscriber such as the subscriber modem 12.

The quadrature phase signals from the clock frequency recovery stage 552 pass to decimation filters 554 and 466. The decimation filters 554 and 466 change the frequency of the signals from the clock frequency recovery stage 552 to a suitable frequency such as four (4) times the symbol rate. The signal then pass to Nyquist filters 558 and 467. The Nyquist filters 558 and 467 constitute matched filters which provide signals at the desired frequency.

The signals from the Nyquist filters 558 and 467 are in turn introduced to a clock phase recovery stage 468. The clock phase recovery stage 468 may include a phase locked loop with a numerically controlled oscillator to provide a recovery of the phase of the carrier signals from the subscriber modem 12. A phase locked loop with a numerically controlled oscillator may be generally known in the prior art, but not for the purpose of providing a fast phase recovery of the carrier signals from a subscriber such as the subscriber modem 12.

There are significant differences between the prior art and applicant's system involving frequency and phase recovery of the carrier signals from the subscriber 12. These differences cause applicant to recover the frequency and phase of the carrier signals significantly faster than in the systems of the prior art. Applicant's system provides separate clock frequency recovery and clock phase recovery stages and disposes the Nyquist filters between the clock frequency recovery and clock phase recovery stages. In the prior art, clock frequency recovery and clock phase recovery stages are combined into a single stage and the Nyquist filters are disposed after this single stage.

A power estimator and start-of-burst detector stage 276 receives signals from a stage 481 designated as "Ranging Process." The ranging process is described in detail below. The start-of-burst detector responds to start-of-burst signals which are initially provided in the packet 719 in FIG. 35 at the headend 10 to indicate the time between the transmission of symbols from the headend 10 to the subscriber modem 12 and the reception of return signals by the headend from the subscriber. These start-of-burst signals are preferably start-of-burst signals in the same pattern as provided by the headend 10 to the subscriber modem 12 but they may be in other patterns without departing from the scope of the invention. As previously discussed, the distance between the headend 10 and the subscriber modem 12 may be as great as one hundred (100) miles. This involves a total delay of approximately one and six tenths milliseconds (1.6 ms) between the transmission of signals from the headend 10 to the subscriber modem 12 and the return of signals from the subscriber to the headend.

FIG. 11 illustrates the delay between the transmission of signals from the headend 10 designated HE to the subscriber modem 12 designated SU and the return of signals from the subscriber to the headend. In FIG. 11, time is indicated along the horizontal axis and distance along the vertical axis. The signal is shown as being transmitted from the headend 10 at a time 482 as a downstream message to the subscriber modem 12. The subscriber modem 12 then processes the message during a time 484 designated as "T process". After processing the message, the subscriber modem 12 then sends an upstream message, which is received at the headend 10 at a time 493. The transmission time between headend 10 and subscriber modem 12 is designated Tpg. The contention resolution interval (CRI) is the sum of 2Tpg and "T process". A ranging window 495 is provided at the headend to indicate the time period during which the headend 10 would ordinarily expect to receive the return signals from the subscriber modem 12. As shown, the duration Tdd of the window 495 encompasses the time period "T process". A time indication 499 is shown at the middle of the window 495 to indicate the time that the return signal from the subscriber modem 12 would ordinarily be expected at the headend 10.

The start-of-burst signals initially transmitted from the headend 10 to the subscriber modem 12 are in a simple binary pattern. Signals are then transmitted by the subscriber modem 12 to the headend 10, preferable in the same pattern as the start-of-burst signals transmitted from the headend to the subscriber. In order for the headend 10 to act upon these signals, the signals have to be above a particular power level. They indicate to the headend 10 the that the subscriber modem 12 is going to be sending, preferably immediately thereafter, to the headend 10 signals for initial maintenance. These initial maintenance signals are indicated at 490 in FIG. 36.

Thereafter, the headend 10 sends maintenance signals periodically to the subscriber 12. The time periods allocated by the headend to the subscriber modem 12 for this subsequent maintenance can be quite precise because of the action of the time-of-burst signals in determining the time between the transmission of signals from the headend 10 to the subscriber modem 12 and the return of the signals from the subscriber to the headend.

The signals from the stage 468 in FIG. 10 are introduced to a tracking loop 575 which provides a phase locked loop for the payload 723 in the packets 719 in FIG. 35. The signals from the tracking loop pass to clock generator logic 501 as do the signals from a fast clock recovery circuit 579. The tracking loop 575, the clock generator logic 501 and the fast clock recovery circuit 579 facilitate the operation of the clock phase recovery stage 468 in recovering the phase of the carrier signals from the subscriber modem 12.

The signals from the tracking loop 575 also pass to a phase read only memory (ROM) 503. The memory 503 also receives signals from a fast carrier recovery stage 581. The stage 581 may include a phase locked loop for processing the preamble 720 in the packets 719 in FIG. 35 on a fast basis to recover the frequency of the carrier signal. The phase ROM 503 and the stage 581 are included in a derotator (FIGS. 21 and 22) that provides a carrier phase derotation of the signals from the fast carrier recovery stage 581. Such derotators are well known in the art.

The quadrature phase signals from the stage 468 are respectively coupled by a carrier phase de-rotator stage 577 to a pair of multipliers 583 and 509 and to an input terminal of an amplitude estimator 585. The signals from the amplitude estimator 585 are also introduced to the multipliers 583 and 509. The amplitude estimator interpolates the derotated quadrature phase signals from the stage 581 to determine the peaks of these derotated signals. The amplitude estimator 585 then decimates the interpolations between the peaks so that only the peaks remain.

The peak signals from the amplitude estimator 585 are then introduced to an equalizer 596 which operates in a well known manner to eliminate from the peak signals noise from extraneous sources and noise from reflections in the line between the headend 10 and the subscriber modem 12. Equalizers corresponding to the equalizer 596 are known in the art. The operation of the equalizer 596 is controlled by an equalizer control 598.

The quadrature phase equalizer signals then pass to slicers 511 and 513, which are known in the art. The slicers 511 and 513 provide a plurality of amplitude levels depending upon the constellation (e.g., 4-QAM, 16-QAM) of the signals being processed and select the individual one of these amplitude levels closest in amplitude levels to the amplitudes of the peak signals from the amplitude estimator 585.

The outputs from the slicers 511 and 513 pass to a base band processor 587 and to a unique word detector 515. The unique word (UW) detector 515 detects the end of the preamble 720 and the beginning of the payload 723 in the packets 719 in FIG. 35. The output from the unique word detector 515 is introduced to the base band processor 587 to control the operation of the processor. Among other functions, the base band processor 587 provides forward error correction to correct errors in the payload 723 in the packets 719 in a well known manner.

The burst receiver 292 shown in FIGS. 9 and 10 has certain important advantages. It provides for a determination by the headend 10 of the frequency and phase of the carrier signals from the subscriber modem 12 in as few as sixteen (16) symbols in the preamble 723 (FIG. 35), not counting the start-of-burst signals initially included in the preamble. This is advantageous because it is important to acquire a fast acquisition of symbols in each packet 723, particularly since the burst receiver 292 is acquiring data from different subscriber modem in successive regions in each frame. If the symbols in each packet are not acquired fast, valuable information may be lost.

The burst receiver 292 also provides for ranging functions (e.g., slot timing, power level, carrier frequency (FIG. 4) after the determination of the timing interval, by the start-of-burst signals, between the transmission of signals from the headend 10 to the subscriber modem 12 and the return of the signals to the headend has been determined. The burst receiver 292 shown in FIGS. 9 and 10 also provides for each subscriber to send and receive the signals in the packets 719 in programmable constellations (e.g., QPSK, 16-QAM) in accordance with the signal-to-noise ratio in the line between the subscriber modem 12 and the headend. It further provides for different subscriber modems in the same channel to send and receive signals in the packets in different constellations and at different baud rates (e.g., 160 K Baud, 5.12 M Baud). This is true even within successive regions in the same frame. This occurs on a subscriber-by-subscriber basis for the different subscriber modems in the channel.

As previously described each channel includes a plurality of subscriber modems, each of which can operate with different constellations and at different baud rates. Furthermore, as shown in FIG. 31, the subscriber modem in different channels can operate in a range of frequencies from five megahertz (5 MHz) to forty-two megahertz (42 MHz) in North America and at frequencies even higher than forty-two-megahertz (42

MHz) in foreign countries. This causes differences of power between the signals in the subscriber modem in different channels to have a range as fifty decibels (50 db). This is a considerable dynamic range in power. It would be accordingly difficult to compensate in a single stage for such a considerable difference.

This invention provides a system for compensating in a simple and efficient manner for differences in power as much as fifty decibels (50 db) between subscriber modems in different channels. The system accomplishes this by providing a portion of the compensation while the signals are in analog form and by providing the remaining portion of the compensation after the analog signals have been converted to a digital form.

A system for accomplishing the objectives discussed in the previous paragraph is shown in FIGS. 25A and 25B. It includes a filter 610 having a filtering range of approximately five megahertz (5 MHz) to forty-two megahertz (42 MHz) corresponding to the frequency range of the channels in North America. The signals from the filter 610 are introduced to an analog amplifier 612.

The differences in the level of power in the filter 610 and the analog amplifier 612 for different subscriber modems 12 may be high because the signals are provided through the entire range of frequencies in the channels. (See FIG. 31 for the range of frequencies in the channels.) A suitable portion of the dynamic range of power of approximately fifty decibels (50 db) for the different subscriber modems 12 is handled in the filter 610 and the analog amplifier 612. For example, this portion may be approximately twenty decibels (20 db). This is accomplished by setting the gain threshold of the analog stages so that power is obtained from the amplifier 612 only above a specified level represented by the threshold.

The signals from the filter 610 are also introduced to an analog-to-digital (A/D) converter 614. The signals from the converter 614 pass to a wide band power estimator 616. The output of the power estimator 616 is introduced to a stage 618 for regulating gain. The output from the stage 618 passes to an input to the analog amplifier 612. The output of the analog amplifier 612 is connected to a burst demodulator 519. The A/D converter 614, the wide band power estimator 616, the gain regulating stage 618 and the burst demodulator 519 are included in the burst receiver 292 which is indicated in FIGS. 25A and 25B by broken lines.

The power estimator 616 measures the power of the signals from the subscriber modem 12 at each frequency in a channel. This can be accomplished by shifting the frequency of the power estimator 616 through the different frequencies in the channel. In this way, the power estimator 616 measures the average power of the signals transmitted in the channel by the subscriber modem 12 to the headend 10. The gain regulating stage 618 regulates the value of this average power at a particular value. The regulated gain is introduced to the analog amplifier 612 which amplifies the signal from filter 610 and introduces the amplified signal to the burst demodulator 519. In this way, the burst demodulator 519 handles the remaining portion of the dynamic range of power. This may illustratively be approximately thirty decibels (30 db) when the dynamic range of power for the subscriber modem 12 in the different channels is approximately fifty decibels (50 db).

When the burst receiver 292 receives one of the packets 719 from the subscriber modem 12, it determines if the unique word 721 matches the pattern for the unique word at the burst receiver. If such a match occurs, this indicates that the applicable payload 723 follows in the packet 719. A count is then made of a particular number of symbols from the end of the unique word in the direction toward the preamble. This count may include a portion of the preamble. The amplitude of the signals in each of these symbols is then determined and the average of these amplitudes in each of these symbols is then computed.

The average amplitudes for the different symbols are then added and the sum is divided by the number of symbols involved in the computation to obtain a resultant value. This value is inverted and the inverted value is latched. The latched value is used to recover the payload 723 to offset any difference between a desired amplitude and an actual amplitude for the bits in the payload symbols. For example, if the resultant value is 2. the inverted value is accordingly and this value is latched. So one-half ( ) of the amplitude of each bit in each symbol is used as the amplitude value of the bit.

To determine a power value that is used for correction in FIG. 4, a count is made of a particular number of symbols from the beginning of the unique word in the direction toward to the preamble. This count may include a portion of the preamble. The average power in each symbol in the count is then determined and the average power in the different symbols is added to obtain a resultant value. This resultant value is divided by the particular number of symbols to obtain the correctional value that is used in obtaining the power level at the subscriber modem 12 as shown in FIG. 4 and described above.

Referring now to FIG. 14, a contemporary, continuous transmission is shown wherein a series of contiguous payloads 1101, such as those defined by data packets, are concatenated to define a generally continuous data stream 1100. Because the data stream 1100 is generally continuous, e.g., does not contain periodic interruptions, acquisition only occurs infrequently, such as during startup or initialization.

The contemporary data stream 1100 as shown in FIG. 14 is suitable for point-to-point transmission, such as between a single transmitter and a single receiver.

Referring now to FIG. 15, data bursts 1105 define a discontinuous data stream 1103. The data bursts 1105 are typically defined by data packets and are separated by guard bands 1107.

The area between guard bands 1107 where the data bursts 1105 are located is defined by a time division multiple access (TDMA) time slot which the cable modem termination system including line card 1042 pre-assigns to cable modems 1046 which have previously requested such time slots in order to facilitate upstream communications. The guard bands 1107 provide some tolerance between adjacent time slots, so as to mitigate the occurrence of undesirable data collisions between adjacent data packets.

It is possible, such as in light data traffic conditions, that one or more adjacent time slots might be empty, thereby further increasing the time between adjacent data bursts.

Because the data bursts 1105 are discontinuous, each data packet which defines a data burst must be reacquired by the burst receiver 85 (FIG. 5A).

The discontinuous nature of such time division multiple access (TDMA) upstream communications is thus due to the fact that a plurality of different cable modems are competing for upstream channel bandwidth. Since the upstream channel is divided into a plurality of time slots, so as to accommodate the plurality of cable modems transmitting in the upstream channel, it is difficult, if not impossible, to define a single, continuous upstream data transmission.

Thus, the discontinuous nature of the upstream data communication necessitates the use of a burst receiver which is capable of re-acquiring each individual data packet.

Referring now to FIG. 16, the data packet which defines each data burst 1105 comprises a QPSK or QPSK-like preamble (i.e., a subset of 16-QAM constellations) 1109 and a 16-QAM payload 1110. The QPSK preamble 1109 is an order of sixteen symbol symbols long. It is during this sixteen symbol QPSK preamble 1109 that acquisition by the burst receiver 85 takes place. It is during acquisition that fractional symbol timing correction, carrier phase correction and fine amplitude correction are determined, so as to facilitate proper and reliable demodulation of the 16-QAM payload 1110.

Referring now to FIG. 17, the QPSK preamble 1109 comprises a binary pattern 1111 (better shown in FIG. 24) and a unique word 1112. The binary pattern 1111 of the QPSK preamble 1109 is used in the recovery or acquisition of fractional symbol timing and carrier phase. The unique word is used in the recovery or acquisition of fine amplitude. The unique word also optionally provides an identification of the transmitting cable modem 1046.

Fractional symbol timing correction and carrier phase correction are both determined by fast feedback loop processes. According to the present invention, fractional symbol timing correction is performed by a fractional symbol timing phase locked loop and carrier phase correction is performed by a carrier phase correction phase locked loop, both of which are discussed in detail below.

Referring now to FIG. 18, a contemporary phase locked loop 1120 comprises a phase detector 1122 to which a first signal is provided at input 1124. The signal provided to the first input 1124 is a signal having some degree of timing information. The timing of the signal provided to input 1124 may not be stable and/or may not be comprised of well-defined, substantially noiseless pulses, such as those of an oscillator or a clock.

When it is desired to provide a comparatively stable, well-defined noiseless reference signal, such as that which may be used to facilitate sampling in an analog-to-digital converter, it is necessary to use the original signal to facilitate timing recovery.

The phase detector 1122 provides an output which is proportional to a difference in phase between the signal provided at input 1124 and a feedback signal provided at input 1125. Because the output of the phase detector 1122 typically comprises an undesirable high frequency component, loop filter 1127 is used to assure that only desirable low frequency components of the output of the phase detector 1122 are provided to voltage controlled oscillator 1129. The output of voltage controlled oscillator 1129 is provided as a reference signal or the second input 1125 to phase detector 1122. The output of voltage controlled oscillator 1129 also forms the desired comparatively stable, well-defined, substantially noise-free reference for use in such applications as clocking or sampling.

Referring now to FIG. 19, a simplified phase locked loop 1140a typically used in a digital receiver, which includes a matched filter 1145a in addition to the standard phase locked loop components of a loop filter 1148, a numerically controlled oscillator 1149 and phase detector 1147, is shown. The phase locked loop shown in FIG. 19 is a somewhat simplified version of the fractional symbol timing correction phase locked loop of FIG. 22, which likewise includes a matched filter.

It is important to understand that the matched filter 1145a of the simplified phase locked loop 1139a inherently represents an undesirable time delay, and thus, undesirably increases acquisition time of the phase locked loop 1139a.

Referring now to FIG. 20, according to one aspect of the present invention (shown in detail in FIG. 22), the matched filter 1145a is moved outside of the phase locked loop 1140b so as to remove the undesirable time delay from the loop and thereby improve the acquisition time thereof. The phase locked loop shown in FIG. 20 is a somewhat simplified version of the fractional symbol timing correction phase locked loop of FIG. 22, wherein the matched filter has been moved outside of the phase locked loop.

Referring now to FIG. 21, according to one aspect of the present invention, a burst receiver circuit 1139a comprises a fractional symbol timing phase locked loop 1140a, a carrier phase correction phase locked loop 1141 and an amplitude estimator circuit 1142. As shown in FIG. 21, the matched filter 1145a of the fractional symbol timing phase locked loop 1140a is inside the phase locked loop defined by resampler 1146, phase detector 1147, loop filter 1148 and numerically controlled oscillator 1149. According to this aspect of the present invention, the matched filter 1145a introduces an undesirable time delay, thereby inhibiting fast acquisition of the fractional symbol timing.

The burst receiver 1139a shown in FIG. 21 includes an analog-to-digital converter 1150, a down converter which includes a direct digital frequency synthesizer 1151 and a mixer or multiplier 1152, and a low pass filter 1153 for removing unwanted high frequency components which result from the mixing process of the down converter.

The carrier phase correction phase locked loop 1141 includes the phase derotator 1160, phase detector 1161, loop filter 1162 and numerically controlled oscillator 1163, which operate as discussed above with respect to FIG. 9 so as to provide a phase reference signal to the phase derotator 1160 which corrects error in the carrier phase and small residual frequency error of the data packet which otherwise would tend to cause errors in the amplitude demodulation or slicing process.

Conventional coherent amplitude estimator circuit 1142 includes a conventional coherent amplitude estimator 1165 which operates according to well-known principles to provide an amplitude estimate or correction factor after fractional symbol timing and fine carrier frequency synchronization have been achieved.

The amplitude estimate or correction factor is applied to the data packet via multiplier 1166 before the data packet is input to equalizer 1170 which compensates for channel spectral deficiencies which would otherwise inhibit reliable amplitude demodulation by the slicer 1171.

Referring now to FIG. 22, burst receiver 1139b is identical to burst receiver 1139a with the exception that matched filter 1145b is outside of both phase locked loop 1140b, so as to avoid the undesirable inherent introduction of a delay in acquisition time caused by placing the matched filter 1145b within the timing recovery loop 1140a as shown in FIG. 21. This mitigates undesirable delays within the fractional symbol timing loop caused by the matched filter. The minimum delay in the loop is essential for fast burst acquisition using the feedback loop architecture. An open-loop resampler is also required to resample the input signal relative to the symbol rate, independent of the ADC sample clock rate. Since the matched filter 1145b is placed ahead of resampler 1146 of the fractional symbol timing phase locked loop 1140b, a second resampler 1154 must be provided ahead of matched filter 1145b so as to provide the digitized data burst to the matched filter 1145b at a proper sample phase of the data.

Referring now to FIG. 23, phase detector gain boosting logic may optionally be provided so as to further enhance the speed at which acquisition occurs. As those skilled in the art will appreciate, the loop filter 1201 of a phase locked loop 1200 is sensitive to the amplitude of the signal provided thereto. That is, the coefficients selected for the loop filter 1201 must be appropriate for the amplitude of the signal provided to the loop filter 1201 in order to assure rapid acquisition of the signal input to the phase locked loop 1200.

In order to assure that the amplitude of the signal input to the loop filter 1201 is within a desired range, i.e., is appropriate for the coefficients selected for the loop filter 1201, a sensor and amplitude control 1202 monitors the amplitude of the voltage input to phase detector 1203 and modifies, via mixer or multiplier 1204, the amplitude of the signal input to loop filter 1201 which provide an output to NCO 1205. Thus, when the amplitude of the signal input to the phase detector 1203 is too low, then the sensor and amplitude control 1202 increases the amplitude of the signal input to loop filter 1201 such that the amplitude of the signal input to loop filter 1201 is within a desired range which is appropriate for the coefficients thereof. Similarly, when the sensor and amplitude control 1202 senses that the amplitude of the signal input to the phase detector 1203 is too high, then the sensor and amplitude control 1202 reduces the amplitude of the signal input to the loop filter 1201, such that the amplitude of the signal input to the loop filter 1201 is within the desired range for the coefficients of the loop filter 1201.

Referring now to FIG. 24, a timing recovery accelerator enhances the speed at which the binary preamble is acquired by assuring that the samples taken by the sampling circuit are taken at a time which assures reliable detection of the amplitude of the binary signal of the preamble.

According to contemporary practice, a single clock signal 1300 (waveform A) is used to clock the sample circuit such that the sample circuit samples the binary preamble on the rising edge 1301 of the clock signal 1300, for example. However, in those instances when the rising edge 1301 occurs near the zero or transition point 1310 of the binary pattern 1111 preamble 1109, then the amplitude of the binary pattern 1111 may not provide high enough phase detector gain to facilitate reliable amplitude detection thereof.

According to contemporary practice, when this occurs the clock for the sample circuit is shifted in phase until reliable detection of the amplitude of the binary preamble occurs. However, as those skilled in the art will appreciate, such shifting of the phase of the clock for the sample circuit is undesirably time consuming and thus, undesirably increases the acquisition time of the binary preamble.

The present invention uses two offset symbol sampling clocks 1302a and 1302b (waveform B). Both of the offset symbol sampling clocks 1302a and 1302b effect sampling by the sample circuit on the rising edges 1303a and 1303b, thereof respectively. The two offset symbol sampling clocks 1302a and 1302b are out-of-phase with one another, such as by 180 degrees. Therefore, at least one of the two offset symbol sampling clocks 1302a and 1302b must have a rising edge 1303a, 1303b which occurs when the amplitude of the binary preamble 1111 is near its maximum and can therefore be reliably detected.

According to the present invention, that offset symbol sampling clock which provides samples having the highest absolute value (to account for the negative voltage peaks) at the beginning of each burst (FIG. 24) is selected to provide a clock for the sample circuit. As those skilled in the art will appreciate, by utilizing two offset symbol sampling clocks and selecting that offset symbol sampling clock which provides the highest absolute value, the need to vary the phase of the symbol clock for the sampling circuit is eliminated and the speed at which acquisition is performed is substantially enhanced.

Thus, the present invention includes a receiver architecture having two resampler circuits. One is an open-loop resampler for the symbol clock frequency resampling and the other is a closed-loop resampler for symbol clock phase acquisition.

It is worthwhile to point out that two different power estimation processes may be performed by the burst receiver. The burst receiver may perform a narrow band power estimation and/or a wide band power estimation.

The narrow band power estimation relates to a particular symbol rate and is utilized to measure the narrow band channel noise power level, as a part of the channel estimate which is used to determine channel quality.

The wide band power estimate relates to the overall upstream band, typically from 5-42 MHz and may be used to determine the analog front-end gain setting. Generally, it is desired that the analog front-end gain setting be configured to handle up to 50 dB of dynamic range at the upstream cable plant.

Referring now to FIG. 25B, a wide band RMS power estimator includes analog-to-digital converter 1350 which receives a wide band input. The analog-to-digital converter 1350 provides an output to absolute value block 1351 which takes the absolute value of the input thereto and provides an output to leaky integrator 1352 which integrates the signal and provides an output to an enable gate 1353.

The wide band RMS power estimator provides a coarse estimation which is used for initial variable gain amplifier setting.

A narrow band RMS power estimator is typically included after the Nyquist filters and provides an average power of the I and Q channels. According to an exemplary embodiment, the narrow band RMS power estimator has a 2-byte output and a relatively large time constant, of the order of tens of thousands of symbols. Noise channel power estimation in an idle channel for spectrum management typically has a deviation of approximately 2 to 3 dB.

Robust Techniques for Optimal Upstream Communication

A plurality of upstream channels are periodically monitored for at least one parameter which is indicative of channel quality. A first modulation method is used for each upstream channel for which the monitored parameter(s) indicate that channel quality is above a predetermined threshold value and a second modulation method is used for each upstream channel for which the monitored parameter(s) indicate that channel quality is below the predetermined threshold value. The first modulation method utilizes a larger constellation size than the second modulation method, such that a higher data rate is achieved when the channel quality is good enough to support the higher data rate.

Further, the present invention provides in another aspect a method and apparatus for optimizing the efficiency of upstream data communications by dividing an upstream spectrum into a plurality of upstream channels, wherein each upstream channel has a bandwidth of less than or equal to approximately 0.5 MHz. The upstream channels are periodically monitored for at least one parameter which is indicative of the quality of each monitored upstream channel. Communications are moved from a used channel an unused channel when the monitored parameter(s) indicate that the quality of the used channel is below a predetermined threshold. In this manner, noisy channels tend to be avoided and communications occur on higher quality channels which are capable of supporting higher data rates. The present invention in another aspect provides a method and apparatus for tending to optimize upstream communication efficiency wherein a communications channel having upper and lower frequency bounds is defined in an attempt to determine an optimal bandwidth of the channel given constraints imposed by the presence of adjacent channels, as well as constraints imposed by narrowband interference. Data rate is thus enhanced by varying the symbol rate of communications performed via the channel in a near-continuous manner, i.e., by varying the upper and/or lower frequency bounds, so as to enhance the bandwidth and thereby enhance the efficiency with which the available frequency spectrum is utilized.

Thus, according to the present invention, the data rate of the upstream channel tends to be optimized, so as to enhance the data communication efficiency of the upstream channel.

The present invention provides enhanced upstream data rates by utilizing a constellation which is efficient in view of transmission medium conditions, by providing fine frequency agility based upon channel quality monitoring so as to enhance the effectiveness with which the limited bandwidth of the upstream channel is utilized, and by providing nearly continuous symbol rate switching so as to facilitate the usage of an enhanced symbol rate which is compatible with line conditions.

The method and apparatus for communicating information from a plurality of cable modems to a cable modem termination system are illustrated in FIGS. 27 and 29-32, which depict certain exemplary embodiments thereof. FIGS. 26 and 28 depict prior art contemporary communications circuitry.

Referring now to FIG. 26, according to contemporary practice a cable modem termination system includes a plurality of demodulators $700a$-$700n$ which receive modulated data which is input from a plurality of cable modems via a common transmission medium. The demodulators $700a$-$700n$ provide a demodulated data output for the frequency division multiplexed (FDM) upstream channels via which data is transmitted from the plurality of cable modems to the cable modem termination system (CMTS). The cable modems communicate with the cable modem termination system via time division multiple access (TDMA), wherein a plurality of cable modems communicate with each demodulator $700a$-$700n$ and wherein the cable modems associated with each demodulator $700a$-$700n$ are distinguished from those associated with a different demodulator via frequency division multiplexing (FDM).

Referring now to FIG. 27, according to the present invention monitoring circuit 336 of the cable modem system 10 monitors the ability of each FDM channel to reliably transmit data at a desired data rate. That is, a parameter which is indicative of channel quality is periodically monitored so as to determine the ability of the channel to facilitate upstream data communications. The channel monitoring function is, for example, incorporated into each individual burst receiver, of which there are typically eight per cable modem termination system. The averaging and statistic gathering function is may be common to all channels, and thus may reside separate from the individual burst receivers.

As used herein, channel quality is defined as the ability of a channel to transmit data reliably thereon, such that higher quality channels transmit data reliably at a higher data rate than lower quality channels.

When a quality of the channel, such as signal-to-noise (SNR) is determined to be above a predetermined threshold value, then a first modulation method is utilized for that upstream channel. When the quality of a channel is determined to be less than that of the predetermined threshold value, then a second modulation method is utilized. The first modulation method is capable of providing a higher data rate than the second modulation method. According to the illustrated embodiment of the present invention, first modulation method has a larger constellation size than the second modulation method. According to the exemplary embodiment of the present invention, the first modulation method encompasses 16-QAM and the second modulation method encompasses QPSK (4-QAM). Thus, according to the present invention, a constellation size is selected which is dependent upon transmission medium characteristics, such that the data rate of communications on each channel tends to be enhanced.

Alternatively, more than two different modulation methods may be utilized. Thus, a plurality of different modulation methods, wherein each individual modulation method is generally better suited for a different range of channel quality, may be utilized. In this manner, the efficiency of data communications is yet further enhanced.

The modulation method utilized for each upstream channel is communicated from the monitoring circuit 336 to each demodulator $700a$-$700n$ of the cable modem termination system and is also inserted into the downstream message flow such that the modulation method is communicated to each cable modem 12, thereby facilitating modulation by each cable modem with the desired modulation method. Thus, each cable modem 12 includes a demodulator 715 for demodulating downstream data transmissions from the cable modem termination system 10 and also includes a modulator 716 for modulating upstream data transmissions. A control circuit 717 of the cable modem 12 controls the modulation method utilized by the modulator 716 and also controls the physical layer parameters such as forward error correcting gain and guard time.

According to one exemplary embodiment of the present invention, the step of periodically monitoring a plurality of channels contemplates periodically monitoring a signal-to-noise ratio for each of the monitored channels. The signal-to-noise ratios are monitored over a plurality of separate communications bursts and an average of the signal-to-noise ratios is formed from the individual measurements. This average is compared to the predetermined threshold value so as to determine whether or not a change is to be made to the modulation method.

In an exemplary aspect of the invention, the predetermined signal-to-noise ratio threshold value is approximately 20 dB. Thus, if the signal-to-noise ratio is equal to or greater than 20 dB, then the first modulation method is utilized and when the signal-to-noise ratio is less than 20 dB, then the second modulation method is utilized.

In particular, the monitoring circuit 336 defines a portion of the cable modem termination system. Alternatively, the monitoring circuit 336 may be separate from the cable modem termination system, but might be located generally proximate thereto, such that an accurate assessment of each channel's ability to transmit data may be performed.

According to another exemplary embodiment of the present invention, the step of periodically monitoring a plurality of channels contemplates periodically monitoring channel noise power. Thus, channel noise power may be monitored and compared to a predetermined threshold value so as to determine which modulation method is to be utilized. Channel noise may be monitored in addition to signal-to-noise ratio (SNR) and/or any other desired parameter which is indicative of channel quality, such as channel statistics. Thus, any desired combination of parameters indicative of channel quality may be utilized according to the method of the present invention.

According to yet another exemplary embodiment of the present invention, the step of periodically monitoring a plurality of channels contemplates periodically monitoring channel statistics for each of the monitored upstream channels. Examples of the statistics which may be monitored for each upstream channel include the number of packets undetected, the number of packets with corrected errors, the number of packets with uncorrected errors, the number of forward error correction blocks with corrected errors, and the number of forward error correction blocks with uncorrected errors. Combinations of these criteria and/or other desired criteria may similarly be monitored. Thus, it will be appreciated that such channel statistics provide an indication of the quality of an upstream channel which may be utilized to determine which modulation method may be utilized to reliably and efficiently transmit data upon that channel.

Optionally, at least one physical layer parameter of a channel may be changed in response to a change in quality of the channel. For example, forward error correcting gain and/or the guard time associated with a channel may be changed in response to a change in the quality of the channel. This change in the physical layer parameter may be either in addition to or separate from any change in modulation methods.

Although periodic monitoring of one or more parameters indicative of channel quality is performed according to the exemplary embodiment of the present invention, those skilled in the art will appreciate that continuous monitoring at such parameters may alternatively be utilized, if desired.

Referring now to FIG. 28, a prior art method for receiving modulated data at a cable modem termination system from a transmission medium, such as a coaxial cable, and for converting that received modulated data into digital data suitable for computer use includes demodulating the modulated data via an upstream burst receiver 333 and providing the demodulated data to medium access control (MAC) 213. Medium access control (MAC) 13 controls access of the cable modem termination system to the transmission medium and provides a digital data output representative of a message transmitted from a cable modem.

The upstream burst receiver is configured so as to be capable of demodulating both QPSK and 16-QAM modulation formats within a TDMA frame. According to contemporary methodology, the upstream burst receiver 333 is configured so as to demodulate modulated data from the transmission medium according to a single, predetermined modulation method. The predetermined modulation method must be selected such that it provides reliable data transmission for a wide range of transmission medium conditions. Of course, this necessitates that a modulation technique which provides reliable data transmission even under the worst expected transmission medium conditions must be utilized. As those skilled in the art will appreciate, such a modulation technique, QPSK for example, does not provide the enhanced data rates which may be possible when better medium conditions are present. That is, when only a single modulation method is utilized, then data rate must typically be sacrificed in order to provide the desired reliability.

Thus, in order to limit interruptions to upstream communications, cable modem systems typically utilize an upstream modulation method which is compatible with the lowest expected channel quality. However, as those skilled in the art will appreciate, such worst case modulation methods (QPSK, for example) are inherently inefficient at higher channel qualities. The modulation methods used for lower channel qualities provide reduced bit rates, while the modulation methodology suitable for higher channel qualities provide higher bit rates.

It is important to recognize that upstream data communications are characterized by a plurality of different time division multiplexed channels, wherein each individual channel originates from a different cable modem or a different group of cable modems. Because the transmission path between the cable modem termination system and each individual cable modem is not identical (even though a common coaxial cable may be utilized along some portion of the path), variations in channel quality occur. Thus, a wide variation in channel quality among channels, i.e., cable modems, is typical. These variations may occur because, for example, some of the cable modems and/or their links to the common coaxial cable are located proximate noise sources.

Referring now to FIG. 29, according to the present invention the cable modem termination system includes a spectrum management/allocation circuit 340 which at least periodically monitors the plurality of upstream channels for at least one parameter which is indicative of channel quality. For example, spectrum management/allocation circuit 340 may receive signal-to-noise ratio or channel power values from the upstream burst receiver 333. Alternatively, the spectrum management/allocation circuit 340 receives packet/FEC status from an upstream MAC/PHY channel statistics circuit 334. The upstream MAC/PHY channel statistics circuit 334 receives the output of the upstream burst receiver prior to the output of the upstream burst receiver being provided to the medium access control 213 and the upstream MAC/PHY channel statistic circuit 334 calculates the packet/FEC statistics, which is then provided to spectrum management/allocation circuit 340.

Any desired combination of signal-to-noise ratio, channel power, packet statistics and/or forward error correction statistics may be utilized as the parameter which is indicative of channel quality.

Such monitoring of the signal-to-noise (SNR), channel power, and/or packet/FEC statistics facilitates the determination of which modulation method, e.g., QPSK or 16-QAM, is to be utilized as long as the quality of the channel is deemed to be sufficiently good to facilitate the use of such modulation methods. When the quality of the channel is insufficient to facilitate the use of the smallest constellation size, i.e., QPSK, then the spectral allocation of the channel is changed, as discussed in detail below.

Optional averaging circuit 346 averages a plurality of signal-to-noise (SNR) or channel power measurements to compensate for short term fluctuations therein.

When a change in modulation method is indicated, then the new modulation method is transmitted from a switch circuit 345 of the spectrum management/allocation circuit 340 to the upstream burst receiver 333 and is also transmitted to the affected cable modem via downstream message flow, as mentioned above.

When the quality of a channel is determined to be sufficiently poor (such that even QPSK will not provide reliable data transmission), then that channel may be moved to a different frequency allocation. When this occurs, the new upstream channel frequency is transmitted to the upstream burst receiver 333 and is also transmitted to the affected cable modem via downstream message flow.

A bandwidth selection circuit 348 of the spectrum management/allocation circuit 340 thus facilitates the implementation of fine frequency agility and the switch 345. The bandwidth selection circuit 348 determines the bandwidth of each downstream channel and the switch 345 effects switching to the desired channel by the upstream burst receiver 333. The upstream spectrum is divided into a plurality of upstream channels and wherein each channel is characterized as having a bandwidth which is less than or equal to 0.5 MHz.

According to the fine frequency agility aspect of the present invention, the spectrum management/allocation circuit 340 monitors the upstream channels for at least one parameter which is indicative of the quality of each monitored upstream channel and moves communications from a used channel to an unused channel when the monitored parameter indicates that the quality of the used channel is below a predetermined threshold value.

Thus, according to the present invention, 16-QAM is the baseline or default modulation method and QPSK is the fall-back modulation method, which is utilized only when channel quality is insufficient to support upstream data transmission utilizing 16-QAM. Channel reallocation is the fall-back method used when channel quality is insufficient for the use of QPSK.

The use of 16-QAM enhances channel bandwidth efficiency by a factor of 2, typically from approximately 1.6 bits/Hz to approximately 3.2 bits/Hz, while providing approximately 25 percent excess bandwidth. For example, the use of 16-QAM provides up to 20.48 Mbps at 5.12 Mbaud.

However, it is important to appreciate that the detection of 16-QAM is much more difficult than the detection of QPSK, since the demodulation is amplitude sensitive, as well as phase sensitive when utilizing 16-QAM, whereas demodulation is only phase sensitive when utilizing QPSK.

It is expected that the above discussed combination of variable constellation size and fine frequency agility, i.e., dynamic channel allocation, will enhance channel bandwidth efficiency substantially.

It is important to understand that the upstream bandwidth in a hybrid fiber/coaxial (HFC) network is a scarce resource. The bandwidth itself is comparatively small (approximately 37 MHz as compared to the much greater bandwidth of approximately 814 MHz for the downstream band). The upstream band is shared by a plurality of cable modems and may be shared by other services, such as cable telephony, as well. Further, channel impairment such as ingress noise make burst transmission difficult.

Thus, the use of spectrum management according to the present invention facilitates reconfiguration of radio frequency (RF) channels in a manner such that the RF channels are not impaired by ingress or the like and also are not utilized by other services. When channel impairments such as ingress noise do occur, the channel can be reconfigured or moved to an unaffected radio frequency or channel.

According to the present invention, on-going channel monitoring, based upon the use of packet-based statistics and/or signal-to-noise ratio (SNR) and/or channel noise power is performed by the upstream receiver or cable modem termination system. By performing such monitoring at the cable modem termination system, spectrum analysis is provided at a single location and the need for an expensive, external spectrum management unit is eliminated.

Examples of the types of statistical information which may be utilized by the spectrum management/allocation circuit 340 to determine whether channel quality is sufficient to support 16-QAM, sufficient to support QPSK, or channel quality is insufficient to support either 16-QAM or QPSK and the channel must therefore be moved to a different spectral allocation, e.g., frequency band are provided below:

| Statistics |
|---|
| Number of packets (total) |
| Number of packets undetected (no unique word) |
| Number of packets with corrected errors |
| Number of packets with uncorrectable errors |
| Number of FEC blocks (total) |
| Number of FEC blocks with corrected errors |
| Number of FEC blocks with uncorrectable errors |

Referring now to FIG. 30, upstream channel quality information can also be used to facilitate the changing of physical layer parameters in real time. FIG. 30 shows Reed Solomon coding gain for various T's for 16-QAM where K=64 bytes. It is clear that as coding gain increases (increasing T), the probability of incurring a data transmission error P(e) decreases for any given signal-to-noise ratio.

The ability to change physical layer parameters in real time allows a given channel to be optimized when the channel quality is not low enough so as to require either a change in modulation method or to necessitate that the channel be moved. Thus, according to the present invention, forward error correction (FEC) coding gain is increased and/or longer guard times are provided so as to facilitate reliable data transmission on such channels. Of course, it is understood that as the number of forward error correcting parity bytes is increased, coding gain is correspondingly increased for a given size of the information bytes.

Referring now to FIG. 31, the upstream transmitter of each cable modem and the burst receiver of the cable modem termination system utilize fine frequency agility so as to enhance the overall data throughput of the upstream band. Fine frequency agility includes both channel reallocation (so as to avoid channels having poor quality) and the definition of channels with a fine frequency resolution (so as to enhance the efficiency with which the frequency spectrum is divided among channels).

Thus, according to the present invention, fine frequency agility facilitates the definition of channels in the upstream band with a resolution of a few Hz. According to the present invention, upstream channels are characteristically defined in increments of about 1.0 Hz. Such fine tuning capability is particularly beneficial in the low frequency portion of the upstream band, where narrowband ingress is frequently present.

The use of such fine frequency agility facilitates the precise definition of upstream channels such that the usable upstream bandwidth is enhanced. That is, upstream channels can be defined such that the bandwidth of each upstream channel is as large as possible without including those portions of the upstream frequency spectrum which include narrowband interference. Thus, such fine tuning of the available spectrum mitigates waste due to unused, but otherwise good, i.e., not noisy, bandwidth proximate narrowband ingress. Such waste inherently results from the use of coarser spectrum division.

The ability to define upstream channels in this manner is substantially dependent upon the resolution with which the channels may be defined. Thus, the finer the resolution for defining the channels, the more readily such channels may be defined in a manner which optimizes the bandwidth (by mitigating waste of the available spectrum) thereof while still excluding undesirable narrowband interference.

Further, the carrier frequency may be fine tuned so as to avoid such interference in a non-uniform fashion. That is, each individual channel in the upstream band need not have the same bandwidth. Rather, non-uniform bandwidths may be utilized so as to tend to optimize the overall upstream data throughput.

It is important to note that the existing DOCSIS/IEEE specification only facilitates the allocation of upstream symbol rates (which are proportional to the upstream channel bandwidths) according to powers-of-two. That is, each greater symbol rate is, according to DOCSIS/IEEE specifications, twice that of the preceding symbol rate. Thus, the DOCSIS/IEEE specifications do not facilitate enhancement of overall data throughput, as does the present invention. According to the present invention, symbol rates, e.g., bandwidths, may be varied in a nearly continuous manner, e.g., in 1.0 Hz increments. The ability to change symbol rates in such a near-continuous manner is a direct result of such fine frequency agility, wherein the bandwidth of each upstream channel can be defined to a resolution of a few Hz.

The ability to vary the upstream symbol rate according to other than powers of two is particularly important where multiple data rates, such as those frequently required by modem applications, are not themselves defined in powers of two.

Further, in the upstream band, where undesirable ingress in a channel frequently inhibits uniform channelization, being able to vary the data rate in a generally arbitrary manner allows data carrier frequencies to be positioned in between two narrowband interferences in a manner which tends to optimize the bandwidth thereof, so as to enhance overall data throughput of the upstream band.

An example of variable symbol rates between 100 kBaud to 5.12 Mbaud which are supported by the upstream channel is provided below:

| Symbol Rate (kysm/sec.) | Channel Width (kHz, α = 25%) | QPSK Date Rate (kbits/sec.) | 16-QAM Date Rate (kbits/sec.) |
|---|---|---|---|
| 128 | 160 | 256 | 512 |
| 160 | 200 | 320 | 640 |
| 256 | 320 | 512 | 1,024 |
| 320 | 400 | 640 | 1,280 |
| 512 | 640 | 1,024 | 2,048 |
| 640 | 800 | 1,280 | 2,560 |
| 1,024 | 1,280 | 2,048 | 4,096 |
| 1,280 | 1,600 | 2,560 | 5,120 |
| 2,048 | 2,560 | 4,096 | 8,192 |
| 2,560 | 3,200 | 5,120 | 10,240 |
| 4,096 | 5,120 | 8,192 | 16,384 |
| 5,120 | 6,400 | 10,240 | 20,480 |

As further shown in FIG. 31, a bad radio frequency (RF) channel 701 is moved to an unused portion 702 of the spectrum when the channel power, e.g., spectral density, of the bad channel exceeds a predetermined threshold level 703 or when any other monitored parameter indicates that channel quality is below a predetermined threshold. In this manner, channels are reallocated to portions of the spectrum having a higher quality and data throughput is enhanced.

The band, i.e., portion of the spectrum, to which such a channel is moved is the best channel available at that time. In this manner, channelization tends to utilize the best available channels and the data rates supported by each such best available channel tend to be maximized. Thus, the overall upstream data rate is substantially enhanced.

Alternatively, when a channel is moved away from a spectral location where the measured parameter which is indicative of channel quality indicates that the quality of the channel is below the predetermined threshold, then the new channel may be assigned by any desired method or even may be assigned arbitrarily, as long as the quality of the spectral location to which the channel is moved is above the predetermined threshold.

Referring now to FIG. 32, dynamic channel allocation control flow starts at block 704. The process continues for a predetermined evaluation time as shown by decision block 705, wherein a loop is incurred until the predetermined evaluation time has been exceeded. The evaluation time is that time during which upstream channels are monitored, so as to determine whether or not they are suitable for continued and/or future use. The evaluation time may be determined empirically.

During the evaluation time, if the number of undetected packets exceeds a predetermined threshold, as shown by decision block 706, then the signal-to-noise ratio is checked. If the signal-to-noise ratio is less than a predetermined threshold, then the symbol rate and constellation for a new, unused upstream channel is determined as shown in block 712 and a channel reallocation message is sent to all cable modems in the frequency channel as shown in block 714.

If the signal-to-noise ratio is not less than the threshold, then the modulation for the upstream channel is changed to QPSK as shown in block 711.

Similarly, when the number of uncorrectable packets exceeds a predetermined threshold as shown in decision block 707, then the signal-to-noise ratio is compared to a predetermined threshold as shown in decision block 710 and symbol rate and constellation for a new upstream channel is determined as shown in block 712 when the signal-to-noise ratio is less than the predetermined threshold and the channel modulation method is changed to QPSK when the signal-to-noise ratio is not greater than the predetermined threshold, as shown in block 710.

When the signal-to-noise ratio is less than a predetermined threshold as shown in decision block 708, then the number of corrected packets is checked. When the signal-to-noise ratio is not greater than the predetermined threshold, then the process repeats. When the number of corrected packets is greater than a predetermined threshold as shown in decision block 709, then the signal-to-noise ratio is checked with respect to the predetermined threshold as shown in decision block 710. When the number of corrected packets is not greater than the predetermined threshold, as shown in decision block 709, then the process repeats.

A spectrum analyzer 713 may be used to define the next available channel. The next available channel is that unused channel which is best suited for upstream communications. The local spectrum analyzer 713 may determine which unused channel is best suited for next use by looking at the signal, or the power thereof, which is present upon the used channel. Of course, that unused channel having the lowest signal or power is most likely best suited for use next.

Referring now to FIG. 33, CMTS dynamic channel allocation control flow is shown. Dynamic channel allocation starts 660, then waits 661 while two independent flow paths execute. According to the left flow path, a determination is made if the channel being monitored is bad, as shown in decision block 662. If the channel is not bad, then the process returns to the wait 661 state while right control path continues to execute. If the channel is bad, then the constellation is set to QPSK as shown in block 663 and ingress cancellation is applied on a per channel basis as shown in block 664. Intersymbol interference (ISI) mitigation is applied on a per user basis as shown in block 665.

If the signal-to-noise ratio is greater than a predetermined QPSK threshold, as indicated in decision block 666, then a final constellation is assigned as shown in block 671 and the left control path returns to the wait state 661.

If the signal-to-noise ratio is not greater than the QPSK threshold, then the next available channel is provided, as shown in decision block 667. The spectrum manager 668 controls this function. As shown by block 670, the next available channel is assigned as the new channel for upstream transmission. If no next channel is available, then a new symbol rate is assigned as shown in block 669.

As shown in the right control path, after the wait state 661 is entered, then each channel is checked on a per user basis as shown in block 672. If each channel, on a per user basis, is not found to be bad, then the wait state 661 is re-entered. If a channel is found to be bad on a per user basis, then ISI mitigation is employed on a per user basis as shown in block 673.

The channel quality evaluation criteria include the use of undetected packets as indicating a bad SNR, uncorrectable packets as indicating a marginal SNR and corrected packets as indicating an acceptable SNR. The equalizer acquisition time is configured such that ISI equalization is performed in less than 100 symbols and the ingress canceller is effective in 100 to 1,000 symbols.

It is understood that the exemplary method and apparatus described herein and shown in the drawings represents only presently illustrative embodiments of the invention. Indeed, various modifications and additions may be made to such embodiments without departing from the spirit and scope of the invention. For example, those skilled in the art will appreciate that various other measures of channel quality may be utilized for determining which modulation method is to be utilized upon a given channel and to determine whether or not the spectral allocation of the channel should be changed. For example, the reliability with which various different types of messages are received may be measured so as to provide such an indication of channel quality. Further, various different modulation methods, other than QPSK and 16-QAM, may be utilized. For example, the present invention may be utilized with 32-QAM, 64-QAM and 256-QAM. Thus, these and other modifications and additions may be obvious to those skilled in the art and may be implemented to adapt the present invention for use in a variety of different applications.

Cable Modem Termination System Upstream MAC/PHY Interface

Referring now to FIG. 34, the present invention generally includes an interface between the physical layer burst receiver 332 and the MAC 213 of a cable modem termination system 10 which is in communication with a plurality of cable modems 12. The interface between the burst receiver 332 and the MAC 213 includes a data interface for communicating data from the burst receiver 332 to the MAC 213, an error information interface for communicating error information from the burst receiver 332 to the MAC 213 and a slot timing and data type interface for communicating information from the MAC 213 to the burst receiver 332, as described in detail.

Referring now to FIG. 36, the contents of a MAP protocol data unit (PDU) 487 are shown. The MAP PDU 487, which is transmitted on the downstream channel by the cable modem termination system 10 (FIG. 27) to all of the cable modems 12 on a given frequency channel, contains the time slot allocations for at least some of the cable modems 12 which have previously sent a request to transmit one or more data packets to the cable modem termination system 10. When the channel bandwidth is sufficient, in light of the number of such requests received by the cable modem termination system 10, then the cable modem termination system 10 allocates a time slot for each such requesting cable modem 12.

Further, the MAP PDU 487 at least occasionally defines at least one request contention region 486 and generally also contains a plurality of cable modem transmit opportunities 488 within the upstream channel 491. A maintenance region 490 may also be defined by the MAP PDU 487 within the upstream channel 491, as discussed in detail below.

The request contention region 486 includes at least one time area within which the cable modems 12 transmit their requests to transmit data packets to the cable modem termination system 10. Each of the cable modem transmit opportunities 488 define a time slot within which a designated cable modem 12 is permitted to transmit the data packet for which it previously sent a request to the cable modem termination system 10.

Additionally, one or more optional transmit contention regions (not shown) may be provided wherein cable modems 12 may contend for the opportunity to transmit data therein. Such transmit contention regions are provided when sufficient bandwidth is left over after the MAP PDU 487 has allocated transmit opportunities 488 to all of those cable modems 12 which have requested a time slot allocation. Thus, transmit contention regions are generally provided when upstream data flow is comparatively light.

The upstream channel 491, is divided into a plurality of time intervals 110, each of which may optionally be further subdivided into a plurality of sub-intervals 489. The upstream channel 491 is thus partitioned so as to facilitate the definition of time slots, such that each of a plurality of cable modems 12 may transmit data packets to the cable modem termination system 10 without interfering with one another, e.g., without having data collisions due to data packets being transmitted at the same time.

Thus, the use of a MAP 487 PDU facilitates the definition of time slots 92. Each time slot 92 may be used for any desired predetermined purpose, e.g., as a request contention region 486 or a transmit opportunity 488. Each time slot 92, as defined by a MAP PDU 487, includes a plurality of time intervals 110 and may additionally comprise one or more sub-intervals 489 in addition to the interval(s) 110. The number of intervals 110 and sub-intervals 489 contained within a time slot 92 depends upon the contents of the MAP PDU 487 which defines the time slot 92. The duration of each interval 110 and sub-interval 489 may be defined as desired. Optionally, each sub-interval 489 is approximately equal to a media access control (MAC) timing interval. Each MAP PDU 487 defines a frame and each frame defines a plurality of slots 92.

The beginning of each sub-interval 489 is aligned in time with the beginning of each interval 110 and each interval 110 typically contains an integral number of sub-intervals 489.

Typically, the request contention region 486 and each cable modem transmit opportunity 488 includes a plurality of integral time intervals 110. However, the request contention region 486 and/or the cable modem transmit opportunity 488 may alternatively include any desired combination of intervals 110 and sub-intervals 489.

Thus, according to the present invention, each request contention region 486 may be utilized by a plurality of the cable modems 12 to request one or more time slot allocations which facilitate the transmission of one or more data packets during the subsequently allocated transmit opportunity 488 of cable modem 12.

Each data packet may contain only data, although an extended data packet may be defined to include both data and a preamble. The preamble is typically stripped from an extended packet by the cable modem termination system 10 and the data in the packet is then processed by a central processing unit of the cable modem termination system 10.

The duration of the request contention region 486 is typically variable, such that it may be sized to accommodate the number of cable modems 12 expected to request time slot allocations from the cable modem termination system 10. The duration of the request contention region 486 may thus be determined by the number of requests transmitted by cable modems as based upon prior experience.

The allocation of time slots 92 defined by cable modem transmit opportunities 488 may optionally be defined, at least in part, on the basis of priorities established by the cable modem termination system 10 for different cable modems 12. For example, priorities may be established for individual cable modems 12 on the basis of an election made by the subscribers, which is typically dependent upon the type of service desired. Thus, a subscriber may elect to have either a premium (high priority) service or a regular (low priority) service.

Alternatively, priorities may be established by the cable modem termination system 10 for the cable modems based upon size and number of cable modem transmit opportunities 488 historically requested by the subscribers. Thus, a cable modem that typically requires a large number of time intervals 110 may be defined as a high priority user, and thus given priority in the allocation of time slots within a cable modem transmit opportunity 488, based upon the assumption that such large usage is indicative of a continuing need for such priority, e.g., is indicative that the subscriber is utilizing cable television, pay-per-view or the like. Alternatively, the cable modem termination system may assign such priorities based upon the type of service being provided to each cable modem. Thus, for example, when cable television or pay-per-view is being provided to a cable modem, then the priority of that cable modem may be increased, so as to assure uninterrupted viewing. The priority associated with each cable modem 12 may determine both the size of time slots allocated thereto and the order in which such allocations are performed. Those allocations performed earlier in the allocation process are more likely to be completely filled than those allocations performed later in the allocation process. Indeed, allocations performed later in the allocation process may go unfilled, when the bandwidth of the channel is not sufficient to facilitate allocation of time slots for all requesting cable modems 12.

Time slots which define the maintenance region 490 are optionally provided in a MAP 487. Such maintenance regions 490 may be utilized, for example, to facilitate the synchronization of the clocks of the cable modems with the clock of the cable modem termination system. Such synchronization is necessary in order to assure that each cable modem 12 transmits only within its allocated time slots, as defined by each cable modem's transmit opportunity 488.

The request contention region 486, cable modem transmit opportunity 488, and maintenance region 490 typically begin at the beginning of an interval 110 and end at the end of an interval 110. However, each request contention region 486, cable modem transmit opportunity 488, and maintenance region 490 may begin and end anywhere as desired.

Thus, according to the present invention, variable duration request contention regions 486, cable modem transmit opportunities 488 and maintenance regions 490 are provided. Such variable duration request contention regions 486, transmit opportunities 488, and maintenance regions 490 facilitate flexible operation of the cable modem system and enhance the efficiency of data communications on the cable modem system by tending to mitigate wasted channel capacity.

The current MAP 170 is transmitted in the downstream channel 485 after transmission of a previous MAP 91a and before any subsequent MAP 91b. Data, such as data packets associated with web pages, e-mail, cable television, pay-per-view television, digital telephony, etc. are transmitted between adjacent MAPs 91a, 170, 91b. The contents of each cable modem transmit opportunity 488 optionally includes data and a preamble. The data includes at least a portion of the data packet for which a request to transmit was sent to the cable modem termination system 10. The preamble typically contains information representative of the identification of the cable modem 12 from which the data was transmitted, as well as any other desired information.

The data and the preamble do not have to occupy the full time interval of the cable transmit opportunity 488. Guard bands 209 (FIG. 68) are optionally provided at the beginning and end of each slot, so as to decrease the precision with which time synchronization between the cable modem termination system and each cable modem must be performed. Thus, by providing such guard bands, some leeway is provided in the transmit time during which each cable modem inserts its data packet into the upstream channel 191.

Referring now to FIG. 37, the interrelationship of the MAC frame 179 of the MAC layer and the frames 128, each of which contain at least one, generally a plurality, of data 122 and forward error correction (FEC) 494 portions which, taken together, occupy an allocated time slot 92 (FIG. 36) which defines a request contention region 486.

Each MAC frame 179 further includes, at the physical layer, PHY overhead portion 120. The PHY overhead portion 120 contains physical layer overhead information.

Additional PHY overhead portion 126 generally follows the forward error correction (FEC) portion 494 and optionally includes a guard band 209 which reduces the accuracy with which synchronization of the cable modems must be performed. That is, the guard band of the physical overhead portion 126 provides a tolerance, such that the cable modems 12 do not have to transmit precisely within their allocated time slots 92.

Each MAC frame 179 includes at least one PHY overhead portion 120, one data portion 122 and forward error correcting (FEC) portion 494. Optionally, each MAC frame 179 may include a plurality of data portions 122 and corresponding forward error correcting (FEC) portions 494, if desired.

Referring now to FIG. 38, a block diagram shows how the cable modem termination system 10 at headend 1012 processes the priorities of requests made by the cable modems 12 to send data to the cable modem termination system 10. As indicated by block 130, the cable modem termination system 10 sends an initial or current MAP 170 (FIG. 36) based upon data previously collected from the cable modems 12 during the sending of a MAP 91a previous to the current MAP 170. At the same time, the cable modem termination system 10 sets the time for the MAP 91b subsequent to the current MAP 170. The time for the subsequent MAP 91b is based upon the time for the sending of the current MAP 170 and is set for a time after the sending of the current MAP.

As indicated by block 132, the cable modem termination system 10 collects collision statistics for the subsequent MAP 91b while the initial or current MAP 170 is being processed. These statistics indicate collisions in time between bursts from different cable modems 12. When the current time becomes greater than the subsequent MAP time, as indicated in block 131, then the MAP building process begins as indicated in block 134.

When an upstream request arrives as represented by a block 135, the requests for sending data in the subsequent MAP 91b are then processed to determine if the requests are high priority bandwidth requests (block 136 or low priority bandwidth requests (block 137). If the request is a high priority bandwidth request, the request is placed in a high priority bandwidth request queue as indicated by a block 138. If the request is a low priority bandwidth request, the request is placed in a low priority bandwidth request queue as indicated at block 139.

When a request is placed in either a high priority bandwidth request queue 138 or a low priority bandwidth request queue 139, a portion of the MAC, depicted as a line 140, provides a sequence for collecting collision statistics for the subsequent MAP 91b. Such a sequence is also provided when a request is processed and is found to be neither a high priority bandwidth request 136 nor a low priority bandwidth request 137.

Referring now to FIGS. 39 and 40, the construction of a frame is shown. As shown in block 143, requests are made by the cable modems 12 in a request contention region 486 (FIG. 36) of a first MAP for the grant or allocation by the cable modem termination system 10 to the subscribers of Information Elements (IE). An Information Element may be considered to be the same as a region. A maintenance opportunity is optionally provided as shown at block 144. Such maintenance opportunities may, for example, be used to synchronize the operation of the cable modem 12 with the operation of the cable modem termination system 10. As previously indicated, this maintenance opportunity may be provided only periodically.

A determination is then made at block 146 as to whether the high priority request queue is empty. If the answer is No with respect to the high priority request queue, a determination is then made at block 147 as to whether the frame length is less than a desired length. If the answer is Yes, the request of the subscriber to transmit data is granted and the frame length is incremented by the size of the data requested at block 148.

If the high priority request queue is empty, a determination is made at block 149 as to whether the low priority request queue is empty. If the answer is No, a determination is made at block 154 as to whether the frame length will be less than the desired length. If the answer is Yes with respect to the low priority request queue, the request of the cable modem 12 to transmit data to the cable modem termination system 10 is granted and the frame length is incremented by the size of the grant. This is indicated at block 156.

It may sometimes happen that the frame length will be at least equal to the desired length when the request with respect to the high priority request queue is introduced to the block 147. Under such circumstances, the request is not granted and a determination is then made as to whether the low priority request queue is empty. Similarly, if the frame length will be greater than the desired frame length when a request with respect to the low priority request queue is made, the request is not granted. An indication is accordingly provided on a line 157 when the high priority request queue and the low priority request queue are both empty or when the frame length will be at least as great as the desired length.

When the high priority request queue and the low priority request queue are both empty or when the frame length will be at least as great as the desired length upon the assumed grant of a request, a determination is made, as at block 158 (FIG. 40) as to whether the request queues are empty. This constitutes an additional check to make sure that the queues are empty. If the answer to such determination is No, this indicates that the frame length will be greater than the desired frame length upon the assumed grant of a request. Under such circumstances, a grant of a zero length is provided in the MAP 170 for each request in each queue. This zero length grant is provided so that the headend can notify the subscriber that the request has not been granted but was received by the headend. In effect, a zero length grant constitutes a deferral. The request was seen, i.e., not collided, but not granted yet. It will be granted in a subsequent MAP 91b.

If a determination is made as at block 158 that the request queues are empty, a determination is then made at block 162 as to whether the frame length will be less than the desired frame length. If the answer is Yes, the frame is padded to the desired length with data from a contention data region 168 (FIG. 42) in the frame, as indicated at block 164. The contention data region 168 constitutes an area of reduced priority in the frame. It provides for the transmission of data from the cable modems 12 to the cable modem termination system 10 via available slots in the frame where cable modems have not been previously assigned slots by the cable modem termination system 10. The contention data region does not require a grant by the cable modem termination system 10 of a request from a cable modem 12 as in the request contention data region 486 in FIG. 36. Since no grant from the cable modem termination system 10 is required, the contention data region 168 in FIG. 42 provides faster access to data for the subscriber than the request contention region 486. The contention data region 168 is described below in additional detail in connection with FIGS. 42 and 43.

Available slots in a frame are those that have not been assigned on the basis of requests from the cable modems 12. As indicated at block 185 in FIG. 40, the cable modem termination system 10 acknowledges to the cable modem 12 that the cable modem termination system 10 has received data from the contention data region (FIG. 41) in the frame. The cable modem termination system 10 provides this acknowledgment because the cable modem 12 would not otherwise know that such data was not involved in a data collision and has, indeed, has been received from the contention data region 168.

Referring now to FIGS. 41 and 42, a block diagram of that portion of the cable modem termination system 10 which receives requests from the cable modems 12 and which generates MAPs in response to those requests is shown.

The contention data region 168 in FIG. 42 is included in frame 179 defined by a MAP 170 (FIG. 36). The frame 179 in FIG. 42 may include a number of other regions. One region is indicated at 172 and is designated as contention requests region 486 in FIG. 36. It includes slots 181 designated as X in FIG. 42. In these slots 181, collisions between request data from different cable modems 12 have occurred. Other slots 183 in the contention request region 172 are designated as R. Valid uncollided request data is present in these slots. The contention request region 172 also illustratively includes an empty slot 175. None of the subscribers 14 has made a request in this empty slot 175.

A cable modem transmit opportunity region 176 (corresponding to the cable modem transmit opportunity region 488 in FIG. 36) may also be provided in the frame 179 adjacent the contention request area 172. As previously indicated, individual cable modems 12 are assigned slots in this area for data in accordance with their requests and with the priorities given by the cable modem termination system 10 to these requests. Optionally, the cable modem transmit opportunity region 176 may be considered as having two' sub-regions. In a sub-region 178, slots are specified for individual subscribers on the basis of requests of a high priority. Slots are specified in an area 180 for individual subscribers on the basis of requests of a low priority.

The frame 179 may optionally also include a maintenance region 182. This corresponds to the maintenance region 490 in FIG. 36. As previously described, the region 182 provides for a time coordination in the clock signals of the cable modem termination system 10 and the cable modems 12. The frame 179 additionally may optionally include a region 184 in the contention data region 168 where a collision has occurred. Valid data is provided in an area 186 in the frame where no collision occurred. A blank or empty area 188 may exist at the end of the contention data region 168 where further data could be inserted, subject to potential collisions. It will be appreciated that the different regions in the frame 179, and the sequence of these different regions, are illustrative only and that different regions and different sequences of regions may alternatively be provided.

The signals of the frame 179 from different cable modems 12a, 12b, 12c, 12d, etc. (FIG. 42) are introduced in upstream data processing through upstream channel 191 (FIGS. 41 and 42) to a TDMA demultiplexer 192 (FIG. 41) in the cable modem termination system 10. After demultiplexing, data in from the cable modems 12b, 12c, 12d, etc. pass from the demultiplexer 192 to a data interface 194. The signals at the data interface 194 are processed in an Ethernet system (not shown) or the like. The operation of the MAP generator 198 is controlled by data requests from the individual cable modems 12a, 12b, 12c, 12d, etc. and by collision information which is indicative of the cable modems 12a, 12c, 12d, etc. attempts to insert data in the contention data region 168. Thus, for example, a large number of collisions may indicate a need for a larger contention request region 172 in the subsequent MAP. Attempts to insert data in the contention data region 168 may, optionally, be utilized by the MAP generator 198 to increase the priority of any cable modem unsuccessfully attempting to transmit such data. The MAPs generated by the MAP generator 198 pass through the multiplexer 196 and are broadcast by the cable modem termination system 10 to the cable modems 12a, 12b, 12c, 12d.

A sample MAP 195 generated by the MAP generator 198 is generally indicated in FIG. 41. The MAP 195 includes a region 189 where the requests of the cable modems 12 for Information Elements (IE) within which to transmit data are indicated. As previously indicated, an Information Element (IE) may be considered to be the same as a region. The MAP 195 also includes a region 193 where the cable modem termination system 10 has granted the requests of the subscribers for Information Elements to transmit data. The MAP 195 additionally includes a contention data region 208 where the cable modem termination system 10 has given the cable modems 12 the opportunity to transmit data in available spaces or slots without specifying the open spaces or slots where such transmission is to take place. An acknowledgment region 210 is also included in the MAP 195. In this region, the cable modem termination system 10 acknowledges to the cable modem 12 that it has received data from the subscribers in the available slots in the contention data region 208. As discussed above, the cable modem termination system 10 has to provide such acknowledgment because the cable modems 12 will not otherwise know that the cable modem termination system 10 has received the data from the cable modems 12 in the contention data region 208.

After the ranging process has been performed so as to adjust the power level of at least one cable modem so as to normalize the power of a received transmission at the cable modem termination system, adjust the carrier frequency of the cable modem so as to enhance channelization in the frequency domain, and adjust slot timing of a transmission from the cable modem so as to compensate for propagation delays, data packets transmitted from the cable modem to the cable modem termination system may be acquired by the cable modem termination system.

As those skilled in the art will appreciate, contemporary cable modem termination systems include a burst receiver, a continuous transmitter and a medium access control (MAC) for controlling access of an external device, such as a computer, network, or other data serving device to the physical layer of the cable modem termination system.

In a contemporary cable modem termination system, the burst receiver merely communicates demodulated received data packets to the medium access control, which forwards the received data packets to an external device. Further communications occur between the burst receiver and the medium access control which enhance communications between a cable modem and the cable modem termination system.

More particularly, information is communicated from the MAC to the burst receiver which is representative of parameters of received time division multiple access data. According to one aspect of the present invention, the information representative of parameters of the received time division multiple access data is used by the burst receiver to facilitate processing of the received time division multiple access signal, as described in detail below.

According to another aspect of the present invention, time division multiple access communications are enhanced by communicating information from the burst receiver to the MAC. The information is representative of error conditions related to an upstream channel, as described in detail below.

More particularly, slot timing information and/or data-type information is communicated from the MAC to the burst receiver to facilitate processing of upstream data packets by the burst receiver. The slot timing information include information representative of a start time and a stop time of time division multiple access time slots. Thus, the slot timing information may include either start time and stop time, start time and duration or stop time and duration.

The slot timing and data-type information for each slot include a station or service identifier (SID) value which identifies a transmitter, e.g., cable modem, which is transmitting a data packet within the slot, the time at which the slot began and an interval usage code which defines a burst type of the data packet transmitted within the slot.

The data-type information include information representative of a QPSK/QAM modulation type which was used to modulate the upstream data packets. For example, the data-type information identifies the upstream data packet as being modulated by QPSK or 16-QAM.

As mentioned above, the communication of slot timing information and/or data-type information is performed after a ranging process, such that the power level, carrier frequency and slot timing of the received upstream data packets have been adjusted to desirable values.

According to the other aspect of the present invention, error information is communicated from the burst receiver to the MAC to estimate the channel quality. Thus, the error information facilitates spectrum allocation or channel assignments and also facilitates the making of adjustments to forward error correction gain in upstream data transmissions. Also, the communicated error information facilitates changes in guard band widths in upstream data transmissions.

The error information communicated from the burst receiver to the MAC is representative of forward error correction errors and/or packet error statistics. Information is, for example, transmitted from the burst receiver to the MAC as a series of data bursts. Error information is also, for example, transmitted from the burst receiver to the MAC as a series of data bursts. The data bursts for both the data and the error information may be, for example, transmitted at a serial clock rate of the burst receiver.

According to one exemplary embodiment of the present invention, the error information is transmitted from the burst receiver to the MAC as prepended information. Thus, the present invention optionally includes the prepending of control information to data which is sent from the burst receiver to the MAC. The prepended control information include channel statistics.

The channel statistics of the prepended information include, for example, FECOK, correctable FEC error, uncorrected FEC error, no unique word detected, collided packet, no energy, and packet length violation.

The MAC may determine additional statistics from the prepended channel statistics. Such additional statistics include, for example, number of slots, number of slots with power but no data, number of slots with bad data, number of good data slots, total number of FEC blocks, number of FEC blocks with correctable errors, number of uncorrectable FEC blocks, number of requests received, number of collided requests, number of corrupted requests, number of packets received, number of collided packets, number of corrupted packets, number of ranging messages received, number of collided ranging messages received and number of corrupted ranging messages. Referring now to FIG. 35, a sample date packet 719 includes a QPSK-like portion 725 and a QPSK or 16-QAM portion 726 comprising a payload 723. Guard times 724 are typically used between adjacent data packets. The QPSK or QPSK-like portion 725 includes a preamble 720, a unique word 721, and, optionally, an equalization training or ranging portion 722, which facilitates ranging, as described in detail above.

Referring now to FIG. 43, the upstream minislot and interval definition is shown. According to one example of the present invention, a minislot clock (MSCLK) defines a plurality of minislots 415, wherein each new minislot occurs at the rising edge 416 of the minislot clock 100. A plurality of minislots typically define each request interval 417, maintenance interval 418, and data interval 419 of a MAP 420.

The request interval 417 of the MAP 420 defines a time period during which the plurality of cable modems may contend for the transmission of a request to the cable modem termination system. The request is a request to send a specified amount of data from the cable modem to the cable modem termination system.

The maintenance interval 418 of the MAP 420 is used to facilitate housekeeping functions such as ranging, as discussed in detail above. The data interval 419 of the MAP 420 defines the time slot within which data is transferred from a particular cable modem to the cable modem termination system. It is information about this data interval 419 which is communicated from the MAC to the burst receiver according to one aspect of the present invention. This data includes information representative of the start time and the duration of the data interval 419. By communicating information representative of the start time and duration of the data interval 419 from the MAC to the burst receiver, the burst receiver is able to process incoming data packets more efficiently. Since the burst receiver knows when to expect data packets from individual cable modems, the burst receiver is able to easily separate the data packets from different cable modems from one another and to perform subsequent processing thereupon.

Many of the terms and abbreviations discussed below are explained and/or defined in the Data-Over-Cable Service Interface Specifications (DOCSIS) Radio Frequency Interface Specification SP-RFI-IO2-971008, which is the Multimedia Cable Network System (MCNS) specification for cable modem systems, the contents of which are hereby incorporated by reference.

Referring now to FIG. 44, the MAP message 421 format prior to processing by the message filter of the MAC is shown. The MAP message 421 typically contains a MAC management header 422 which contains information which facilitates desired processing by the MAC. An upstream channel ID 423 indicates which upstream frequency channel the MAP message is to be applied to. The UCD count 424 matches the value of the configuration change count of the UCD which describes the burst parameters which apply to the MAP.

The number of elements 425 provides an indication of the number of elements transmitted in this map. The allocation start time 427 indicates the effective start time from cable modem termination system initialization (in units of minislots) available for assignments according to this MAP. The acknowledgment (Ack) 428 indicates the latest time, from cable modem termination system initialization (in units of minislots) which has been processed in the upstream data communications. This time is used by the cable modems for collision detection purposes.

The ranging back-off start 429 is an initial back-off window for initial ranging contention, expressed as a power of two. Values for the ranging back-off start range from 0 to 15, wherein the highest order bits must be unused and set to 0.

The ranging back-off end 430 is the final back-off window for initial ranging contention, expressed as a power of two. Values for the ranging back-off end 430 range from 0 to 15, wherein the highest order bits must be unused and set to 0.

MAP information elements 433 define the time slots during which individual cable modems transmit on a particular upstream channel to the cable modem termination system. A plurality of intervals of the MAP, such as the first interval 435, the second interval 436, and the last interval 437, define the individual time slots.

Each interval 435-437 includes a station or service identifier (SID) value 439 which identifies the cable modem for which the interval (and therefore the time slot defined thereby, applies. SID equals 0 defines the end of the list of intervals, thus indicating that all intervals have been defined. The interval usage code (IUC) 440 defines the burst parameters to be utilized during the specified timing slot. Such burst parameters include the modulation type, e.g., QPSK or 16-QAM. The offset 441 indicates when, with respect to a common time reference, each interval begins. Offset equals 0 defines a beginning of the first interval.

Optionally, each MAP has a fixed length and format, such that unused intervals 442 may occur after the last interval 437. Acknowledgment and deferrals 443 optionally may be inserted into the list of intervals, generally after the end of list 438.

Referring now to FIG. 45, after the format of the MAP message has been filtered by the MAC for communication from the MAC to the burst receiver, the MAP message includes an allocation start time 150 and a plurality of MAP information elements 151-153. Each MAP information element generally includes a service ID 155 which identifies the cable modem for which the slot time of the MAP information applies, an interval usage code 159 which identifies the burst type utilized by the cable modem during the time slot, and also identifies the slot time, typically in units of minislots.

Referring now to FIG. 46, the architecture of an exemplary shared SRAM-based MAP interface of a MAC for eight upstream channels of an exemplary cable modem termination system is shown. A MAP message filter 171 receives downstream MAC frames which contain MAPs having the message format shown in FIG. 44, as it is constructed prior to filtering. The MAP message filter 171 filters each MAP message so as to provide a filtered MAP message having a format such as that shown in FIG. 45.

After filtering, the contents of the filtered MAP are stored in 64×9 MAP internal FIFO 161 and the channel to which the MAP message applies is stored in 16×8 channel select FIFO 173. SRAM controller 163 then controls the storage of the MAP internal FIFO 161 contents and the channel select FIFO 173 contents in an external 64K×16 SRAM 174 and then the SRAM controller 163 effects the transmission of the contents of the external 64K×16 SRAM 174 to the appropriate, e.g., proper channel, MAP control interface 165-167. Each MAP control interface 165-167 provides control signals from the MAC to one of eight burst receivers of the cable modem termination system. The control signals include minislot clock (MSCLK), Map Valid (MapValid), Map Clock (Map-Clk) and Map Data (MapData).

Instead of having an offset field which is defined in the original DOCSIS specification, two adjacent offsets are subtracted so as to compute the actual length of the interval in units of minislots.

Referring now to FIG. 47, the interface between each MAP control interface 165-167 (shown in FIG. 46) includes four conductors which provide communication from the MAP control interface to the burst receiver demodulator 177. It is important to appreciate that generally there is a dedicated MAP control interface 165-167 for each of eight burst receiver demodulators 177. Thus, there is a dedicated pair of MAP control interfaces 165-167 and burst receiver demodulators 177 for each upstream frequency channel.

Thus, FIG. 47 shows the signals for one channel of the MAP control interface between the MAC and the burst demodulator. There are a total of four signals MSCLK, MapValid, MapData, MapClk, and each of these four signals are replicated for each upstream channel. MSCLK provides the burst demodulator with a timing reference for minislots. According to the present invention, each rising edge of the MSCLK signal defines the beginning of an upstream minislot. The MapValid, MapData and MapClk form a serial interface which transfers the 32 bit MAP information element stored in memory to the demodulator of the burst receiver at the appropriate time.

As shown in FIGS. 46 and 47, minislot clock (MSCLK), Map Valid (MapValid), Map Data (MapData) and Map Clock (MapClk) signals are communicated from each MAP control interface 165-167 to each demodulator 177.

Referring now to FIG. 48, timing control of the MAP which defines the upstream request interval 480, maintenance interval 418 and data interval 483 is shown.

The minislot count 730 begins at the beginning of the request interval 480 and continues until the end of the data interval 483. The minislot clock 100 provides for the timing of the request interval 480, maintenance interval 418 and data interval 483 as discussed above. A Map Valid signal 190 transitions to a low state 731 when Map data 732 is present.

Map Data 732 may, for example, contain 32 bits of data which define a station or service identifier (SID) 155 (14 bits) which identifies the cable modem which is providing the upstream communication, an interval usage code 159 (4 bits) which defines the modulation type utilized by the cable modem, and a region length and minislots 169 (14 bits) which defines the length of the time slot which contains the data being transmitted from the cable modem to the cable modem termination system.

A Map Clock 733, typically running at a much higher rate than the minislot clock 100, defines the timing of the station or service identifier (SID) 155, the interval usage code 159 and the region length in minislots 169.

The MAP control interface of the MAC derives the starting time for each MAP interval from the allocation start time and the length of the previous MAP interval. The MAP control interface of the MAC transfers the MAP information element (IE) when its internal minislot count is less than one starting time of the MAP interval. A MAP information element (IE) is transferred, as shown by the MapValid signal going low, after the minislot count turns to N+2, and the starting time of the MAP interval for the information element (IE) being transferred is minislot N+3. For the burst demodulator, the rising edge of the minislot clock (MSCLK) signal right after a rising edge of the MapValid signal defines the beginning of the MAP interval for the MAP information element (IE) just received.

The time critical MAP interface includes two important concepts. First, the processing of the MAP message and conversion to a simplified format which is acceptable to the PHY or demodulator of the burst receiver, second, the use of a set of control signals to communicate this MAP information to the demodulator of the burst receiver utilizing a 4-signal interface.

Referring now to FIG. 49, inference of the receive now (Rx now) 220 signal for a maintenance interval 418, having a length of 6 minislots, for example, is shown. The Receive now 220 signal is provided at the beginning of a minislot 415 which is the first minislot of the maintenance interval (as shown in FIG. 49) and provides an indication that the maintenance interval has begun.

For maintenance intervals, including initial and station maintenance, and data intervals, including both short and long data intervals, the burst demodulator is configured to receive only one packet per interval. Thus, the beginning of the MAP interval represents the Receive now signal for the burst demodulator.

Referring now to FIG. 50, in a similar manner, a Receive now 220 signal is inferred for a MAP 420 and is issued at the beginning of the first minislot of the data interval 419.

Referring now to FIG. 51, a plurality of Receive now signals 220 may be associated with each request interval, since each request interval may contain a plurality of requests, each request from a different cable modem. It is assumed in this example that each request message requires two minislots to transmit.

The multimedia cable network system (MCNS) Data-Over-Cable Service Interface Specifications (DOCSIS) radio frequency interface specification (SP-RFI-IO2-971008) protocol specifies a time-division multiple access (TDMA) protocol for the upstream transmission of data packets from cable modems to a cable modem termination system. In order to send data upstream, each cable modem must request a data slot large enough to hold the desired data. The CMTS responds to such request from the cable modems with a logical message (MAP) which is broadcast to all of the cable modems on a particular frequency channel. The MAP message specifies the upstream framing structure, so as to provide individual time slots within which each cable modem may transmit. The MAP specifies which cable modems may transmit, when they may transmit, and how, e.g., using what modulation type, they may utilize to transmit. When the appropriate TDMA time slot arrives (in time) a cable modem sends a burst of data, e.g., a data packet, to the cable modem termination system. Each cable modem is typically identified by one or more station or service identifiers (SID). Each TDMA time slot is typically an integer number of minislots, wherein each minislot is an arbitrary timing reference provided by the medium access control (MAC). The MCNS protocol negotiates sets of transmission parameters between the cable modems and the cable modem termination system. The parameters define how data is formatted during upstream bursts from each cable modem to the cable modem termination system. The DOCSIS protocol currently defines six burst types which may be used in upstream communications. Each burst type defines the modulation to be utilized during such upstream communications. The burst type is constant during a particular window in time, e.g., a time slot, and the burst type is designated by an interval usage code (IUC).

The MAP message specifies which SID or cable modem has control of upstream communications on a particular frequency channel during each TDMA time slot. The MAP message also specifies the time at which the time slot begins and which interval usage code or burst type is to be used. The number of minislots allocated for a particular time slot is determined, for example, by taking the difference between the current TDMA time slot and the next TDMA time slot.

Ranging in power, slot timing and carrier frequency, as described above, is important in this TDMA communication system. Power control is required in order to normalize receive power at the cable modem termination system, so as to mitigate inter-channel interference. Controlling carrier frequency ensures proper channelization and the frequency domain for upstream communications. Collisions between data packets and the time domain are mitigated by adjusting slot timing to account for different propagation delays between the cable modem termination system and each individual cable modem on a given frequency channel.

Besides the upstream adjacent channel noise or interference sources which effect power, time and carrier frequency offsets, the upstream channel is also affected by other channel impairments, such as radio frequency interference (RFI) noise. In order to maintain adequate channel quality, channel error characteristics are monitored over time so that as the channel improves or degrades, usage may be adapted, as discussed above. High level channel adaptation algorithms use these parameters to preempt upstream channel failure by increasing forward error correction (FEC) coding gain, changing guard times and/or changing frequency. Since the upstream channel consist of many TDMA point-to-point links, the channel parameters are derived from a statistical analysis of simple accumulated measures such as FEC error and packet error statistics, as described above.

In order to support such channel quality maintenance features, the burst receiver and the MAC, according to the present invention, communicate appropriate information.

According to the present invention, MAC data is broken into FEC blocks, each FEC block is encapsulated with 2 status bytes and 0 to 46 bytes of prepended information, status byte fields are used to pass error information and enable statistics calculation and prepended data contains ranging offsets and indicates when ranging is required, as discussed in detail below.

According to the present invention, three individual interfaces between the medium access control (MAC) layer and the physical layer (PHY) or burst receiver are provided. These three individual interfaces are a shared purpose interface, e.g., either an SPI or I2C, a time critical serial interface for specifying TDMA burst information such as the station or service identifier (SID) and the interval usage code (IUC), and a dedicated data interface which is used to pass raw data and in-band control messages, as discussed in detail below.

The shared general purpose interface, typically either a SPI or an I2C, is used to configure non-time critical parameters such as burst profiles, configuration parameters and reading status.

The upstream data is transmitted from the PHY or burst receiver to the MAC using a dedicated 3-wire data interface. This interface includes a serial data line, a free-running serial clock and a burst valid indicator. Since the upstream data is processed in blocks, a single upstream transmission may be transmitted between the burst receiver and the MAC as a series of bursts at the serial clock rate.

For request and request/data regions, the demodulator of the burst receiver is expecting to receive multiple packets during the interval, and there will be multiple Receive now signals which are received by the demodulator of the burst receiver.

As shown in FIG. 43, there is a request interval of 6 minislots (3 of which are represented) and it is assumed that each upstream request message will need 2 minislots in order to transmit. Therefore, there will be a total of three Rx now signals perceived by the demodulator of the burst receiver. These Rx now signals are located with offsets of 0, 2 and 4 minislots from the beginning of the interval.

Referring now to FIG. 52, it is important to note that if the first block of a TDMA transmission bit is set, then the prepended information includes 2 status bytes, 4 timestamp bytes, 1 channel ID byte, 2 SID bytes, 2 power bytes, 2 frequency bytes and 3 time bytes. The power bytes, frequency bytes, and time bytes include a total of 7 bytes utilized for ranging offsets.

Referring now to FIG. 53, if the equalizer prepend bit is set, then the prepended information is increased by 32 bytes to provide a total length of 48 bytes, include 2 status bytes, 4 timestamp bytes, 1 channel ID byte, 2 SID bytes, 2 power bytes, 2 frequency bytes, 3 time bytes and 32 equalizer coefficient bytes.

Again, the power bytes, frequency bytes and time bytes define 7 bytes utilized for ranging offsets.

Referring now to FIG. 54, statistics are kept using counters as shown. These statistics are based upon bits [7:5] of the status bytes.

There are two important concepts with respect to the design of the MAP control interface of the MAC. The first important concept regards the processing of downstream MAP messages, wherein conversion from a format which is specified for the MCNS Data-Over-Cable Service Interface Specification (DOCSIS) to a simplified format which is easy for the MAC to process. The second concept regards the set of control signals which are communicated between the MAP interface and the burst demodulator, including how the signals are toggled so as to convey to the burst demodulator information such as when to receive a packet, the service ID (SID) associated with an incoming packet, the expected length of the region where the packet is going to show up (the time slot for the data packet), and the packet type.

Upstream bandwidth is divided into minislots, which are the smallest time unit utilized by the MAP for bandwidth requests and grants. The exact number of bytes per minislot is typically variable and is usually programmed into the MAC and the burst demodulator via a generic CPU interface or the like. In order to define the minislot reference for the burst demodulator, the MAC provides a signal called the minislot clock (MSCLK) to the burst demodulator. Each rising edge of the minislot clock signal defines the beginning of a new minislot as shown in FIG. 43.

An upstream interval generally consists of an integer number of minislots. There are a plurality of different types, e.g., six different types, of intervals currently defined by the MCNS DOCSIS specification, which include a request interval, an initial maintenance interval, a station maintenance interval, a short data interval, a long data interval, and a request/data interval, as discussed in detail below. The relationship of the request interval, maintenance interval and short and long data intervals with respect to their minislots and the minislot clock is shown in FIGS. 43 and 48-50.

As discussed above, the MAP messages contain the information which enables the burst demodulator to perform the task of receiving and separating upstream packets. A message filter module is designed to snoop all downstream packets and filter out the MAP messages contained therein. The format of the MAP messages is simplified after such filtering. FIG. 44 shows MAP message format prior to MAP message filtering and FIG. 45 shows MAP message format after MAP message filtering, as discussed in detail below.

By encapsulating each MAC/PHY block with a 2 byte header, the PHY or burst receiver can pass in-band control information to the MAC. The MAC can then use the prepended information to collect channel statistics, as well as pass link related information to higher processes, such as ranging required. This in-band control allows the headend to sense impending channel failure before such failure actually happens, thereby avoiding catastrophic data loss.

Referring now to FIG. 55, the upstream MAC/PHY interface, between the headend (HE) or cable modem termination system (CMTS) MAC 213 and the demodulator 34 of the burst receiver is shown. As discussed above, this interface includes a serial data interface 320, an SPI (or I2C) interface 330 and a serial control interface 240. The serial data interface 320 facilitates the communication of upstream data, including prepended information, from the burst demodulator to the MAC. The SPI interface 330 is utilized for general configuration of the MAC and/or burst demodulator. The serial control interface 240 is a time critical interface utilized for the transmission of time critical MAP information from the MAC to the burst demodulator.

According to the present invention, MAC data is broken into forward error correction (FEC) blocks. Each FEC block is encapsulated with 2 status bytes and 0 to 46 bytes of prepended information. Status byte fields are used to pass error information and to enable statistics calculation. The prepended data contains ranging offsets and optional equalizer coefficients. The upstream data is transmitted from the PHY (burst demodulator 34) to the MAC 213 using a dedicated 3-wire serial data interface 320. The dedicated serial data interface includes a serial data line, a free-running serial clock and a burst valid indicator. Since the upstream data is processed in blocks, a single upstream transmission may be transmitted between the demodulator of the burst receiver and the MAC as a series of data bursts at the clock rate. In addition to the serial data, the MAC needs additional information including identification as to which MAC/PHY bursts to which TDMA slots, as well as other information indicating error quality of the received TDMA transmission.

Referring now to FIG. 56, the free-running bit clock (BITCLK) 316, the burst valid indicator (BLKDV) 317, and the serial data line 302 having prepended information 318 and data 304 thereon, are shown.

Referring now to FIG. 58, the format of the prepended data with equalizer coefficients is shown. The prepended data includes 2 bytes of status flags 250, 4 bytes of timestamp 252, a 1 byte channel ID 254, a 2 byte station or service identifier (SID) 255, 7 bytes of ranging offset 256 and 32 bytes of equalizer coefficients 257. Using this prepended information, error conditions of the packet may be determined and the PHY parameters may be passed to higher level processes. Channel condition statistics may also be maintained.

Referring now to FIG. 59, the subscriber PHY interface includes two important concepts. First, control information is prepended to the actual packet data 360. This prepended information includes a burst-type byte 362 and a packet length 363, generally of 2 bytes. The subscriber re-programs the PHY for each individual burst. Since this re-programming may require the exchange of significant amounts of data and must be done in real time, a particular architecture has been developed. A non-real-time general purpose interface is used to program burst types which are identified by a short ID (burst type). Only the ID and length are transferred in real-time in order to effect immediate re-programming without being impacted by the speed of external interfaces. Real-time control data is piggybacked on the transmit data interface so as to reduce complexity.

Referring now to FIG. 60, an initialization process is generally utilized wherein a plug-and-play-like sign-on or registration sequence is utilized between the headend or cable modem termination system 10 which includes the burst receiver 332 and MAC 213 (FIG. 34) and the subscriber or cable modem 12. According to this initialization process, a timebase message 398, a default configuration message 402 and a sign-on message 403 are communicated from the cable modem termination system 10 to the cable modem 12 during initialization. A default configuration message (ranging channel frequency, transmission rate, initial power level, contention-based access slot information, etc.) is sent for each downloaded frame and the timebase message and default configuration message facilitate upstream time configuration.

A sign-on message 403 transmitted from the cable modem termination system 10 to the cable modem 12 facilitates contention based ranging performed upon a dedicated channel. Typically, the cable modem 10 responds with a sign-on response message 404. Then ranging 405 is initiated by the headend 10 to determine slot timing corrections, carrier frequency corrections, and power corrections. Ranging calibration responses 406 are transmitted from the cable modem 12 to the headend 10.

Service channel, logic address and encryption key information are transferred between the cable modem termination system 10 and the cable modem 12 via re-provision message 407 transmitted from the cable modem termination system 10 to the cable modem 12 and via re-provision response message 408 transmitted from the cable modem 12 to the cable modem termination system 10. When the process is complete, an initialization complete message 409 is transmitted from the cable modem termination system 10 to the cable modem 12.

Referring now to FIG. 61, the MAC framing and the PHY or burst receiver framing are decoupled and upstream frame synchronization is based on timestamp messages (msgs). The cable modem termination system 10 generates a timestamp message which is utilized by a subscriber cable modem 12 to effect timing synchronization such that proper slot timing is facilitated. The output from a headend timing generation circuit 449 is reduced in frequency by a divider 450 and is used by a timestamp counter 451 to generate slot/frame timing 452. The slot/frame timing is transmitted via continuous modulator 470 through analog front end 471 over a desired downstream frequency channel 472, typically utilizing a hybrid fiber coax (HFC) network to the analog front end 473 of a desired subscriber cable modem 12. A continuous demodulator 474 demodulates the slot/frame time and provides it to a timing recovery circuit 475 which utilizes a timestamp detector 476 to provide the slot/frame timing to a digital timing loop defined by loop filter 477, numerically controlled oscillator 478 and local timestamp counter 479. The loop generates slot/frame timing for use by the subscriber cable modem 12 in generating upstream TDMA messages.

Thus, the subscriber cable modem 12 is capable of transmitting upstream data via burst modulator 458 and analog front end 457 in a desired upstream channel 456, typically via a hybrid fiber coax (HFC) network to the analog front end 455 of the cable modem termination system, wherein the message is demodulated by burst demodulator 34.

Referring now to FIG. 57, the MAP serial interface (MAC to PHY) field definition includes a service ID 496 of 14 bytes, a slot type 497 of 4 bytes and a slot region length 498 of 14 bytes.

Referring now to FIG. 62, the prepended information (form PHY to MAC) includes status information 735 of 2 bytes, minislot control 736 signal of 4 bytes, a channel ID 737 of 1 byte, a station or service identifier (SID) 738 of 2 bytes, ranging information 739 of 7 bytes and equalizer coefficients 740 of 32 bytes.

Referring now to FIG. 63, each MAC/PHY burst is tagged with 2 status bytes as indicated.

Referring now to FIG. 64, burst demodulator status information processing flow is shown. Forward error correction (FEC) 741 and demodulation information 745 are added to prepended information 742, and receiver TDMA control 744 is provided by MAP interface 743. The forward error correction 741 information includes forward error correction statistics such as: no forward error correction errors (No FEC ERR), correctable forward error corrected errors (Corr FEC Err), and uncorrectable forward error correction errors (Uncorr FEC Err).

The MAP interface information 743 includes service slot type information. The receiver TDMA control 744 includes information indicative of the first and last block of information. The demodulator information 745 includes unique word detected, ranging information and equalizer coefficients.

Referring now to FIG. 65, the burst demodulator SPI bus interface is shown. The SPI interface 330 provides set-up information to configuration registers 560. The set-up configuration includes the carrier frequency, the baud rate, the minislot size, the required packet size, and ranging thresholds.

The SPI interface 330 also provides burst configuration information to burst configuration registers 562 via multiplexer 563 and data registers 564, 565 and 566. The burst configuration information includes unique word pattern, unique word window, QAM mode, forward error correction parameters, such as N, K and T, guard time, de-randomizer information, differential encoding information, preamble length and equalizer training length.

Referring now to FIG. 66 (a detailed drawing of FIG. 59), the generic byte base serial input interface at the upstream MAC/PHY interface at the subscriber cable modem with control information prepended and TXS2P=1, includes the standard ATM signals of transmit clock (TX CLK) 601a, transmit enable bar (TX ENAB) 602a, transmit cell available (TX_CLAV) 603a, transmit start-of-cell (TX_SOC) 604a, and transmit data (TX_DATA) 605a. When the control bit, TXS2P is set to equal 1, then transmitted data (TX_DATA) 605a is transmitted most significant bit (MSB) first.

Referring now to FIG. 67 (another detailed drawing of FIG. 59), the transmit clock (TX CLK) 601b, transmit enable bar (TX ENAB) 602b, transmit cell available (TX_CLAV) 603b, transmit start-of-cell (TX_SOC) 604b and transmit data (TX_DATA) 605b are shown when TXS2P is set to zero. When TXS2P is set to 0, then the least significant bit (LSB) is transmitted first.

Although the present invention is described and illustrated herein as providing acquisition in 16 symbols or less, the present invention may also be utilized to provide acquisition in greater than 16 symbols. For example, the present invention may be utilized to provide acquisition in 24 symbols. Thus, use of the present to provide acquisition in 16 symbols or less is by way of example only and not by way of limitation.

Data Packet Fragmentation in a Cable Modem System

Data packets are transmitted from the cable modems to the cable modem termination system within time slots which are allocated by the cable modem termination system and wherein a data packet is fragmented or divided among a plurality of time slots when a time slot which is sufficiently large to contain the data packet cannot be defined due to data flow and bandwidth constraints.

Referring now to FIG. 68, the fragmentation of a data packet by a cable modem into first and second portions thereof is shown, wherein the first portion of the data packet is placed in a first time slot allocated by the cable modem termination system and the second portion of the data packet is placed in a second time slot allocated by the cable modem termination system.

As shown in FIG. 68, a data packet 410 which is too large to fit within a first time slot 491a is fragmented by an appropriate device such as a cable modem such that a first portion 410a of the data packet 410 is placed in the first time slot 491a and the remaining or second portion 410b of the data packet 410 is placed within the second time slot 491b of the upstream channel 491.

For example, if the maximum size of each time slot 491a, 491b is 256 symbols and the data packet 410 conforms 300 symbols, then 256 symbols of the data packet 410 are put into the first time slot 491a and the remaining 44 symbols are put into the second time slot 491b.

This placing of the data packet 410, whether fragmented or not, within the allocated time slots 491a and 491b prevents undesirable collisions among a plurality of such data packets transmitted by a corresponding plurality of cable modems upon a given frequency channel. The use of guard bands 209 in the upstream channel 491 tend to further mitigate the occurrence of such undesirable collisions by providing an unused time space between each time slot of the upstream channel 491 so as to accommodate differences in synchronization between the cable modem termination system and the various cable modems.

The assignment of such time slots is accomplished by providing a request contention area in the upstream data path within which the cable modems are permitted to contend in order to place a message which requests additional time in the upstream data path for the transmission of their message. The cable modem termination system responds to these requests by assigning time slots to the cable modems making such a request, so that as many of the cable modems as possible may transmit their messages to the cable modem termination system utilizing TDMA and so that the transmissions are performed without undesirable collisions. This time slot assignment by the cable modem termination system is known as a grant because the cable modem termination system is granting a particular cable modem permission to use a specific period of time in the upstream.

The cable modem termination system usually tries to match the grant to the request so that the cable modem is given sufficient bandwidth for its transmission.

It is not always possible for the cable modem termination system to allocate a sufficiently large time slot in response to a request from the cable modem so as to contain all of the data packet for which the request was sent. This insufficiently large time slot allocation is referred to as a partial grant. This may happen, for example, when upstream traffic between the cable modems and the cable modem termination system is heavy. Thus, in such instances, it is desirable to divide or fragment the data packet among a plurality of such time slots. Another example is when the cable modem termination system supports constant bit rate services, such as voice, in the upstream direction. These services require grants at periodic intervals. When supporting these types of services, the cable modem termination system may need to send a partial grant to one modem in order to schedule a constant bit rate service for another modem.

It is desirable to define a system for fragmenting data packets which minimizes wasted bandwidth. In accordance with the present invention, a technique is provided for fragmenting data packets in a cable modem system wherein data packets larger than an allocated time slot are split among a plurality of time slots.

In response to receiving the request, the cable modem termination system allocates a time slot for transmission of at least a portion of the data packet from the cable modem to the cable modem termination system. Alternatively, the allocation may be performed by a different device, e.g., a device other than the cable modem termination system, referred to herein generally as a dynamic time slot controller.

Information representative of the time slot is transmitted from a dynamic time slot controller, such as the cable modem termination system, to the cable modem.

At least a portion of the data packet is transmitted from the cable modem to the cable modem termination system within the allocated time slot. Transmitting at least a portion of the data packet from the cable modem to the cable modem termination system within the time slot mitigates undesirable collisions between data packets which are transmitted by different cable modems to the cable modem termination system upon a common frequency channel. Thus, the simultaneous transmission of data packets by different cable modems upon a common frequency channel is prevented.

When the time slot allocated for the transmission of the data packet from the cable modem to the cable modem termination system is sufficient for transmission of only a portion of the data packet for which the request was transmitted, then the cable modem transmits only a portion of the data packet for which the request was transmitted and the cable modem termination system allocates at least one additional time slot and transmits to the cable modem information representative of the additional time slot(s), so as to facilitate transmission of the remaining portion of the data packet from the cable modem to the cable modem transmission system.

Occasionally, due to bandwidth constraints and the amount of data flow on a given channel, it is not possible to allocate a time slot which is sufficient for transmission of the entire data packet for which a request was received by the cable modem termination system. Rather than denying the request altogether, according to the present invention, a time slot is allocated by the dynamic time slot controller so as to facilitate the transmission of at least a portion of the data packet from the cable modem to the cable modem termination system. One or more additional time slots are then allocated to facilitate transmission of the remaining portion of the data packet from the cable modem to the cable modem termination system. Thus, the remaining portion of the packet may be split or fragmented among a plurality of such additional time slots, if necessary.

Briefly, upstream data transmission on an upstream channel is initiated by a request made by a cable modem for a quantity of bandwidth, i.e., a plurality of time slots, to transmit data comprising a message. The size of the request includes payload, i.e., the data being transmitted, and overhead, such as preamble, FEC bits, guard band, etc. After the request is received at the headend, the CMTS grants bandwidth to the requesting cable modem and transmits the size of the grant and the specific time slots to which the data is assigned for insertion to the requesting cable modem. If the grant is smaller than the size of the request, i.e., a partial grant, the cable modem senses this condition and separates data into two or more fragments for transmission. If the cable modem has not received an additional grant or grant pending prior to the transmission time of the partial grant, the cable modem inserts a request for additional bandwidth into the fragment header. This bandwidth request, called a piggyback request, is for the amount of bandwidth required to send the remainder of the packet. If the cable modem has received an additional grant or grant pending prior to the transmission time of the partial grant, the cable modem assigns a value of zero to the piggyback request field in the fragment header. The cable modem transmits the first fragment in the assigned time slots. The cable modem treats each subsequent grant in the same manner. If additional grants (or grant pendings) are enqueued at the cable modem during the transmission time of a fragment, the cable modem does not include a piggyback request. If additional grants are not enqueued at the cable modem during the transmission time of a packet or fragment, the cable modem inserts a piggyback request for enough bandwidth to transmit the remainder of the packet being fragmented. The piggyback field of the last fragment of a packet can be used to transmit a request for the amount of bandwidth necessary to transmit the next packet enqueued at the cable modem.

The CMTS can operate in either of two different modes: multiple grant mode or piggyback mode. In multiple grant mode, the CMTS must retain the state of fragmentation for each modem. The CMTS allots bandwidth to the requesting cable modem and determines the amount of data required to fill the allotted bandwidth, taking into account the overhead required to transmit the fragment, and sends a partial grant for the fragmented data to the cable modem. The CMTS also transmits to the cable modem a partial grant for the remaining data fragment if there is bandwidth available in the current MAP or a grant pending if bandwidth must be provided by a subsequent MAP. A grant pending signal is sent in each subsequent MAP until the grant can be fulfilled. In this mode, the cable modems insert fragmented data pursuant to the grants as determined by the CMTS.

In multiple grant mode, the CMTS does not need to retain the state of fragmentation for each modem. The CMTS allots bandwidth to the requesting cable modem and the requesting cable modem determines the amount of data required to fill the allotted bandwidth, taking into account the overhead required to transmit the fragment. The requesting cable modem inserts such data in the assigned time slots and checks for partial grants or pending grants from the CMTS. If there are none, this is a signal to the cable modem that the piggyback mode should be used. The requesting cable modem inserts a request for the remainder of the data, including the amount of remaining data, in a piggyback field of the fragment header transmitted to the CMTS. (In the multiple request mode, the piggyback field that accompanies a transmitted data fragment is set to zero.) Responsive to the request in the piggyback field the CMTS transmits another grant to transmit data to the requesting cable modem. If the allotted time slots are insufficient to transmit the entire data fragment, the process is repeated until all the data has been transmitted. In the piggyback mode, the cable modem retains the state of fragmentation, i.e., it keeps track of the remainder of the data to be transmitted during the fragmentation process.

In summary, the cable modem is capable of operating either in the multiple grant mode or the piggyback mode, depending on how the CMTS allocates grants. If the CMTS generates partial grants or pending grants, this is sensed by the cable modem and the cable modem operates in the multiple grant mode. If the CMTS does not generate partial grants or pending grants, this is sensed by the cable modem and the cable modem operates in the piggyback mode.

The size of the payload that can be transmitted in a specified number of time slots depends on the burden imposed by the data transmission format. This size is called the burdened PHY length. In one embodiment, the burdened PHY length is determined by a forward lookup table using the total length of the data in bytes as an index. Each time a request is made by a cable modem, the forward lookup table is accessed using the total length and the burdened PHY length is retrieved for transmission to the CMTS as the request. Grants are transmitted to the cable modems in terms of burdened PHY length. The total length of the data in bytes that can be transmitted pursuant to a grant is determined by a reverse lookup table using the burdened PHY length as an index. The forward and reverse lookup tables are created each time that the burst profile changes and are stored in memory for use in processing requests and grants at the cable modem. Alternatively, the conversion between total length and burdened PHY length could be carried out as described in U.S. Provisional Application No. 60/489,998, filed on Jan. 15, 1998.

Referring now to FIGS. 69 to 76, different aspects of an improved system in which the cable modems 12 and the cable modem termination system 10 cooperate to fragment packets of the data transmitted from the cable modems 12 to the cable modem termination system 10 are shown. FIG. 69 specifically shows a complete one of the extended packets 118. The extended packet 118 is indicated in a block form at 118a to show schematically the length of the extended packet. Details of the extended packet are indicated at 118b in FIG. 69. As shown, the extended packet 118b includes a header portion 505. The header portion 505 may be further defined by fields constituting a frame control (FC) 507, a fragmentation MAC Header (PARM) 504 and a total length (LEN) 516 of the extended packet. The functions of the fields 507, 504 and 516 and the specific implementation of these fields in binary coding are shown in FIG. 73.

The extended packet 118b includes an extended length field or segment (EHDR) 517 which indicates the length of the data in the extended data packet and which provides for the performance of a number of additional functions shown in FIG. 74. For example, the field 517 may include flags to indicate the first and last fragments in the packet 118b when the packet is fragmented.

The extended packet 118b may also include a MAC Header Check Sequence (HCS) 518 which consists of 2 bytes and which insures the integrity of the sequence in the header in a known manner. The header check sequence 518 is followed by data (PDU) 512 (the complete payload) in the extended packet 118b. The data 512 is shown in cross-hatched lines in FIG. 69. A cyclic redundancy check (CRC) 521 follows the data 512. A cyclic redundancy check such as 521 is known in the prior art to provide an additional check for insuring that the information in the packet 118b is complete.

FIG. 70 is a schematic diagram of a concatenation of a number of complete extended packets (such as that of FIG. 69) provided by one of the cable modems 12. The concatenation is indicated by a concatenation header 525 which is followed by the information for the first of the extended packets in the concatenation. This information includes a header (MAC HDR1) 527 for the first one of the concatenated packets, a payload (PDU) 528 for the first one of the concatenated packets and a cyclic redundancy check 529 for the first one of the concatenated packets. Similar information is provided for the successive ones of the extended packets in the concatenation. The last one (the nth) of the extended packets in the concatenation is indicated by a MAC header (MAC HDRn) 530, a payload (PDUn) 532 and a cycle redundancy check (CRCn) 534. The payload 528 and 532 are indicated in cross-hatched lines.

FIG. 71 is a schematic diagram of a plurality of data packet fragments transmitted from the cable modem 12 to the cable modem termination system 10, wherein the data packet fragments form, in composite, a complete data packet. FIG. 71 schematically shows different fragmentary portions, generally indicated at 540a, 540b and 540c, of a complete packet such as the complete packet 118b in FIG. 69. Each of the fragmentation portions, 540b and 540c includes a fragmentation header 542, a fragmentation header check sequence 544, a payload fragment 546 and a fragmentation check redundancy cycle 548. Thus, the fragmentary portions 540a, 540b and 540c form, in composite, the complete payload for the packet 118.

Each of the fragmentation headers 542 includes a frame control (FC) 541, a segment (EHDR LEN) 543 indicating the length of the fragmentation header 542, a length segment (LEN) 545 indicating the length of the fragmentation header 542 and an extended header (EHDR) 547 containing additional information about the fragment.

FIG. 72 shows the fragmentary portion 540a in additional detail. As shown in FIG. 72, the fragmentary portion 540a includes the frame control (1 byte) 541, a MAC_PARM (1 byte) 578, the indication (LEN) (2 bytes) 545, the extended header (EHDR) (6 bytes) 547, the header check sequence (FHCS) (2 bytes) 544, the payload fragment 546 and the fragment cyclic redundancy check (FCRC) (4 bytes) 548. The MAC_PARM 578 indicates the length of the EHDR 547.

The frame control 541 is shown in FIG. 72 as including an FC type 549. The FC type 549 indicates a media access controller (MAC) specific header. The FC PARM 568 provides a fragmentation MAC header. The EHDR_ON 550 indicates that a fragmentation EHDR follows. LEN indicates the total length of the fragment including the payload, EHDR and FCRC.

The EHDR portion 547 may be considered as including an extended header-type (EH-Type) segment 572 which indicates the type of data in the fragmentary portion 540a. For example, the type of information in the fragmentary portion 540a may constitute unencrypted fragmentation data or encrypted fragmentation data. Another segment in the EHDR portion is indicated at 574 and is designated as EH_LEN. It indicates the length of the EHDR. An additional segment 576 is designated as EH_Value. It provides different types of information. For example, it includes a binary bit (or flag) which is set to a binary 1 to indicate a first fragment for the payload in the extended packet 118b and another bit (or flag) which is set to a binary 1 to indicate the last fragment for the payload in the extended packet. These bits are provided with a binary 0 for intermediate data fragments between the first data fragment and the last data fragment in the extended packet 118b. These flags for the fragments shown in FIG. 71 would be F=1, L=0 for 540a, F=O, L=0 for 540b, and F=O, L=1 for 540c.

The segment 576 also includes a sequence number which is incremented for each fragment of a packet. This sequence number can be set to zero for the first fragment within a packet or continue counting from the last fragment of the last packet transmitted for this modem. This sequence number is used by the cable modem termination system to detect lost fragments during packet reassembly.

FIGS. 73 and 74 provide a table indicating, in a first column, the different types of fields shown in FIG. 72. FIGS. 73 and 74 also include a second column designated as Usage.

This column indicates the different sub-fields (if any) shown in FIGS. 69-72 for the different fields specified in the first column of FIGS. 73 and 74 and specifies the operations in such sub-fields. The number of bits in the sub-fields is indicated in a third column in FIGS. 73 and 74. The number of bytes specified for each of the fields in the first column of FIG. 74 is shown in the fourth column of FIG. 74.

FIGS. 75 and 76 define a flowchart, generally indicated at 600, in block form and show how the cable modem 12 and the cable modem termination system 10 cooperate in the fragmentation of the payload 118a for packets transmitted by the cable modem 12 to the cable modem termination system 10. The operation of the blocks in the flowchart 600 is initiated at a start block 602. As indicated at block 604 in FIG. 75, the cable modem 12 then awaits a packet from an external source. For example, the external source may be a personal computer (PC) 1048 (FIG. 2) at the home 14 (FIG. 78) of a subscriber. As shown in block 606, the cable modem 12 then submits to the cable modem termination system 10 a bandwidth request for enough time slots to transmit the packet. Upon receipt of the request, the cable modem termination system sends a grant or partial grant to the cable modem in the MAP.

The cable modem 12 then checks at block 609 to determine if the cable modem termination system 10 has granted the request, or any portion the request, from the cable modem 12. In block 609, SID is an abbreviation of Service Identification. If the answer is Yes (see line 607 in FIGS. 75 and 76), the cable modem 12 then determines if the cable modem termination system 10 has granted the full request from the cable modem 12 for the bandwidth. This corresponds to the transmission of the complete data packet from the cable modem 12 to the cable modem termination system 10. This is indicated at block 625 in FIG. 76.

If the answer is Yes, as indicated at block 625 in FIG. 76, the cable modem 12 determines if there is another packet in a queue which is provided to store other packets awaiting transmission to the cable modem termination system 10 from the cable modem 12. This determination is made at block 629 in FIG. 76. If there are no other packets queued, as indicated on a line 631 in FIGS. 75 and 76, the cable modem 12 sends the packet without a piggyback request to the cable modem termination system 10 (see block 633 in FIG. 75) and awaits the arrival of the next packet from the external source as indicated at 604. If there are additional packets queued as indicated by a line 635 in FIGS. 75 and 76, the cable modem 12 sends to the cable modem termination system 10 the packet received from the external source and piggybacks on this transmitted packet a request for the next packet in the queue. This is indicated at 620 in FIG. 75. The cable modem then returns to processing MAPs at 608 looking for additional grants. The cable modem termination system 10 then processes the next request from the cable modem.

The cable modem termination system 10 may not grant the full request for bandwidth from the cable modem 12 in the first MAP 170. The cable modem termination system 10 then provides this partial grant to the cable modem 12. If the CMTS operates in multiple grant mode, it will place a grant pending or another grant in the MAP in addition to the partial grant it sends to the cable modem. The cable modem processes the MAPs as shown in block 608 and sees the grant in line 607. The grant is smaller than the request as on 636 so the cable modem calculates the amount of the packet that will fit in the grant as in block 637. With a multiple grant mode CMTS, the cable modem will see the partial grant with an additional grant or grant pending in subsequent MAPs as in line 607. The cable modem then sends the fragment, without any piggyback request as shown in block 628 and line 630 to the cable modem termination system 10.

The cable modem return to processing map information elements in 608 until it gets to the next grant. The cable modem then repeats the process of checking to see if the grant is large enough as shown in block 625.

If the next grant is not large enough, the cable modem repeats the process of fragmenting the remaining packet data and, as in 626, checking to see if it needs to send a piggyback request based on additional grants or grant pendings in the MAP.

If the grant is large enough to transmit the rest of the packet on line 627, the cable modem checks to see if there is another packet enqueued for this same SID. If so, the cable modem sends the remaining portion of the packet with the fragmentation header containing a piggyback request for the amount of time slots needed to transmit the next packet in the queue as shown in block 620. The cable modem then returns to processing the MAP information elements. If there is not another packet enqueued for this SID, then the cable modem sends the remaining portion of the packet with fragmentation header containing no piggyback request as shown in 633. The cable modem then returns to 604 to await the arrival of another packet for transmission.

When the cable modem termination system 10 partially grants the request from the cable modem 12 in the first MAP and fails to provide an additional grant or grant pending to the cable modem 12 in the first MAP, the cable modem will not detect additional grants or grant pendings as on line 632. The cable modem 12 then sends to the cable modem termination system 10 a fragment of the data packet and a piggyback request for the remainder as in 634. When the cable modem has transmitted the fragment with the piggybacked request as shown on line 638, the cable modem returns to processing MAP information elements as in 608 while waiting for additional grants. When the cable modem termination system receives the fragment with the piggybacked request, the cable modem termination system must decide whether to grant the new request or send a partial grant based on the new request. This decision is based on the scheduling algorithms implemented on the cable modem termination system.

Any time during the request/grant process, the cable modem termination system could fail to receive a request or the cable modem could fail to receive a grant for a variety of reasons. As a fail safe mechanism, the cable modem termination system places an acknowledgment time, or ACK time, in the MAPs it transmits. This ACK time reflects the time of the last request it has processed for the current MAP. The cable modem uses this ACK time to determine if its request has been lost. The ACK timer is said to have "expired" when the cable modem is waiting for a grant and receives a MAP with an ACK time later in time than when the cable modem transmitted its request. As the cable modem is looking for grants at 609, if the ACK time has not expired as on 644, the cable modem returns to processing the MAPs as in 608. If the ACK timer does expire as on 646, the cable modem checks to see how many times it has retried sending the request in 648. If the number of retries is above some threshold, the retries have been exhausted as on 654 and the cable modem tosses any untransmitted portion of the packet at 656 and awaits the arrival of the next packet. If the ACK timer has expired and the number of retries have not been exhausted as in arrow 650, the cable modem uses a contention request region to transmit another request for the amount of time slots necessary to transmit the untransmitted portion of the packet as in 652. The cable modem then returns to processing the MAPs.

The operation of the cable modem in transmitting fragmented data is illustrated by the following example considered with FIG. 77.

1. (Requesting State)—CM wants to transmit a 1018 byte packet. CM calculates how much physical layer overhead (POH) is required and requests the appropriate number of minislots. CM makes a request in a contention region. Go to step 2.
2. (Waiting for Grant)—CM monitors MAPs for a grant or grant pending for this SID. If the CM's ACK time expires before the CM receives a grant or grant pending, the CM retries requesting for the packet until the retry count is exhausted—then the CM gives up on that packet. Go to step 3.
3. (First Fragment)—Prior to giving up in step 2, the CM sees a grant for this SID that is less than the requested number of minislots. The CM calculates how much MAC information can be sent in the granted number of minislots using the specified burst profile. In the example in FIG. 77, the first grant can hold 900 bytes after subtracting the POH. Since the fragment overhead (FRAG HDR, FHCS, and FCRC) is 16 bytes, 884 bytes of the original packet can be carried in the fragment. The CM creates a fragment composed of the FRAG HDR, FHCS, 884 bytes of the original packet, and an FCRC. The CM marks the fragment as first and prepares to send the fragment. Go to step 4.
4. (First Fragment, multiple grant mode)—CM looks to see if there are any other grants or grant pendings enqueued for this SID. If so, the CM sends the fragment with the piggyback field in the FRAG HDR set to zero and awaits the time of the subsequent grant to roll around.—to step 6. If there are not any grants or grant pendings, go to step 5.
5. (First Fragment, piggyback mode)—If there are no other grants or grant pendings for this SID in this MAP, the CM calculates how many minislots are required to send the remainder of the fragmental packet, including the fragmentation overhead, and physical layer overhead, and inserts this amount into the piggyback field of the FRAG HDR. The CM then sends the fragment and starts its ACK timer for the piggyback request. In the example in FIG. 19, the CM sends up a request for enough minislots to hold the POH plus 150 bytes (1018−884+16). Go to step 6.
6. (Waiting for Grant). The CM is now waiting for a grant for the next fragment. If the CM's ACK timer expires while waiting on this grant, the CM should send up a request for enough minislots to send the remainder of the fragmented packet, including the fragmentation overhead, and physical layer overhead. Go to step 7.
7. (Receives next fragment grant)—Prior to giving up in step 6, the CM sees another grant for this SID. The CM checks to see if the grant size is large enough to hold the remainder of the fragmented packet, including the fragmentation overhead and physical layer overhead. If so, go to step 10. If not, go to step 8.
8. (Middle Fragment, multiple grant mode)—Since the remainder of the packet (plus overhead) will not fit in the grant, the CM calculates what portion will fit. The CM encapsulates this portion of the packet as a middle fragment. The CM then looks for any other grants or grant pendings enqueued for this SID. If either are present, the CM sends the fragment with the piggyback field in the FRAG HDR set to zero and awaits the time of the subsequent grant to roll around.—go to step 6. If there are not any grants or grant pendings, go to step 9.
9. (Middle Fragment, piggyback mode). The CM calculates how many minislots are required to send the remainder of the fragmented packet, including the fragmentation overhead and physical layer overhead, and inserts this amount into the piggyback field of the FRAG HDR. The CM then sends the fragment and starts its ACK timer for the piggyback request. Go to step 6.

Reference is made to FIGS. 78 and 79 for a description of another embodiment of the invention. In this embodiment, there are wireless transmission links between homes 14 and HFC network 1010. Each of homes 14 is equipped with radio frequency modem (RFM) 2000. A base station 2002 is in wireless RF contact with RFM's 2000. The wireless architecture is similar to a cellular phone system. Code division multiple access (CDMA) transmission could be used between RFM's 2000 and base station 2002. Base station 2002 is connected by a fiber 2004 to a CMTS hub 2006. Hub 2006 is part of HFC network 1010. Otherwise the components in FIGS. 78 and 79 are the same, and bear the same reference numerals, as those described in connection with FIGS. 1 and 2. As illustrated in FIG. 78, CMTS hub 2006 can be integrated in the same cable system that also services CM's connected by fiber to hub 22. Thus, upstream and/or downstream channels can be installed in a home without physically laying cable all the way to the home. If desired, the downstream channel could be fiber because of the large bandwidth requirement, and the upstream channel could be wireless because there is a smaller bandwidth requirement.

The described functions of cable modems 1046 and RF modems 2000 could be carried out on a single integrated circuit chip as illustrated in FIG. 80. In this chip the output of an RF transmitter 3001 feeds the upstream channels of HFC network 1010. The downstream channels of HFC network 1010 feed the input of an RF receiver 3002. A time division multiple access (TDMA) controller 3004 is connected to the input of the transmitter. The output of receiver 3002 is connected to TDMA controller 3004. An ethernet 3006 serves as an interface between TDMA controller 3004 and a PC or other binary signal processing device. TDMA controller 3004 could be an application specific circuit or a microprocessor programmed to perform the described CMTS functions, including fragmentation. It is understood that the exemplary data packet fragmentation described herein and shown in the drawings represents only presently desired embodiments of the invention. Indeed, various modifications and additions may be made to such embodiments without departing from the spirit and scope of the invention. For example, requests to transmit data from cable modems need not be received by the cable modem termination system and the MAP need not be generated by the cable modem termination system, but rather requests may be received by an autonomous device, which operates independently of the cable modem termination system, and the MAPs may be generated by this or another autonomous device. Thus, these and other modifications and additions may be obvious to those skilled in the art and may be implemented to adapt the present invention for use in a variety of different applications. The described fragmentation capability can be enabled or disabled in the cable modems on a selective basis. Specifically, when a cable modem transmits a registration message to the CMTS at the time that the cable modem enters service, the acknowledging response of the CMTS includes a signal that either enables or disables fragmentation. If fragmentation is enabled, the cable modem and the CMTS operate as described above to fragment data to be transmitted upstream. If fragmentation is disabled, the cable modem only transmits data to the headend if the granted amount of bandwidth is the same as or larger than the bandwidth required to transmit the data. Alternatively, if fragmentation is disabled, the CMTS only transmits a grant if the requested bandwidth is the same as or smaller than the bandwidth available for transmission to the headend.

Method and Apparatus for Reducing Noise in a Bidirectional Cable Transmission System In FIG. 81 a bidirectional radio frequency (RF) cable transmission system has a large number of user terminals connected by a cable network to a headend or a cable modem termination system (CMTS). Cable modems (CM1, CM2, . . . CMn) are located at the respective user terminals. An RF transmitter 331 and an RF receiver 335 are located at the headend. RF transmitter 331 is connected by a number of downstream channels 338 of the cable network to cable modems CM1, CM2, . . . CMn. Cable modems CM1, CM2, . . . CMn are connected by upstream channels 339 to RF receiver 335. As represented by blocks H1(f), H2(f), . . . Hn(f), the individual upstream channels 339 are impaired by user specific noise associated with the respective cable modems such as multi-path reflections and the like. In addition, as represented by a summing junction 347, upstream channels 339 are also impaired by common noise such as, ingress noise, during upstream transmission. The invention reduces the common noise symbolized by summing junction 347 and the individual noise symbolized by H1(f), H2(f), . . . Hn(f).

As shown in FIG. 82, RF receiver 335 at the headend has a down converter 349 that shifts the RF signal on the selected upstream channel 339 to baseband. After passing through a matched filter 350, the baseband signal is coupled to an adaptive notch filter 351, which is described in more detail below in connection with FIG. 83. Adaptive notch filter 351 is coupled by a demodulator 352 to a generalized decision feedback equalizer (DFE) 353, which is described in more detail below in connection with FIG. 84. The output of DFE 353 is connected to a slicer 354, which determines the quantized value of the signal. The output of slicer 354 is fed to forward error correction (FEC) circuitry 355. The output of FEC 355 is the transmitted data in binary form.

As illustrated in FIG. 83, adaptive notch filter 351 is a linear monic filter having a fixed main tap 356 represented by the coefficient b0 and a plurality of successive variable taps 357 represented by coefficients b1, b2, . . . , bn. Taps 356 and 357 feed a summing junction 358.

As illustrated in FIG. 84, generalized DFE 353 comprises a feed-forward equalizer 359 and a feedback equalizer 365 that feed a summing junction 366. The output of summing junction 366 is coupled to a slicer 367, which determines the quantized value of the signal applied to decision feedback equalizer 353. The output of slicer 367 is coupled to the input of feedback equalizer 365 and to FEC 355 (FIG. 82). As described in more detail below, generalized DFE 353 operates in a special way. That is, rather than obtaining the coefficents of the feedforward and feedback parts together, the coefficients of the feed-forward and feedback parts are trained in a sequential manner. Also, the feedforward equalizer can take a linear equalizer structure where the main tap location can be any tap location.

As illustrated in FIG. 85, each cable modem has a receiver 368 that processes RF signals transmitted on a selected one of downstream channels 338 and a transmitter 369 that sends RF signals to the headend on a selected one of upstream channels 339. A transmit equalizer 371 is connected in series between a modulator 370 inside transmitter 369 and upstream channels 339. As described in more detail below, the coefficients for equalizer 371 are transmitted to the cable modem on one of the downstream channels 338 and coupled by downstream receiver 368 to transmit equalizer 371. Transmit equalizer 371 is also a linear equalizer structure corresponding to the feedforward equalizer 359 at the headend receiver.

FIG. 86 illustrates the TDMA time slots in a selected one of upstream channels 339. As shown, there are ranging slots 372, request slots 373, and user data slots 374. There are also idle slots 375, which are unique to the invention. The timing and frequency of slots 372-375 are determined at the headend, which sends out TDMA control messages on one of downstream channels 338 assigned to system management to establish a framing structure for the upstream channels. These TDMA control messages include information about the type of slot, i.e., ranging, request, data, or idle and the service identifier (SID) which uniquely identifies each cable modem. For a more detailed description of the upstream channel management function, reference is made to the above section "Cable Modem Termination System Upstream MAC/PHY Interface".

FIG. 87 illustrates a method for operating the apparatus in FIGS. 82-85 so as to cancel common noise such as ingress and to compensate for individual noise such as multipath noise, that impairs upstream channels 339. As depicted by a block 376, an idle slot is created by the headend when the system is powered up and thereafter from time to time whenever it is desired to re-adjust notch filter 351 (FIG. 82). The idle slot is part of the upstream TDMA framing structure created at the headend and transmitted to each cable modem on one of downstream channels 338 assigned to system management. The idle slot identifies no cable modem SID and contains no upstream signal. It can be created simply by assigning the SID of a unicast (or reservation) slot to a null value. Since the idle slot is created as part of the TDMA framing structure, its time of arrival at the headend is known. In essence, the idle slot is a known time period during which there is no signal on upstream channels 339. Any energy received by receiver 335 at the headend during this time period represents common noise such as ingress noise. Instead of using the described idle slots to create quiet periods on the upstream channels for the purpose of sensing and rejecting common noise, the headend MAC could control the cable modems by means of other types of downstream messaging to create known upstream quiet periods. In any case, since the headend MAC creates the quiet periods as part of the upstream TDMA framing structure, the MAC can control the timing of the process of adjusting notch filter 351 and FBE 365 to coincide with the quiet periods.

In FIG. 88A, this common noise is illustrated as a noise spike 380 superimposed on the frequency response 381 of the selected channel. As depicted by a block 377, during the idle slot of each of upstream channels 339, the coefficients of adaptive notch filter 351, B1, B2, . . . Bn−1, are adjusted to minimize its output by for example an LMS process. The value of main tap B0 is fixed. This tends to cancel the common noise as illustrated by a notch 382 in FIG. 88B, but introduces signal distortion into the frequency response. As depicted by a block 378, the coefficients of notch filter 377, namely, B1, B2, . . . Bn−1, are impressed upon FBE 365 without change to compensate for the distortion introduced by notch filter 351. FIG. 88C illustrates the resulting frequency response at the output of DFE 353 with a narrow sharp notch 383 that rejects the common noise. FIG. 89A represents a typical spread of signal values in a 16-QAM constellation before common noise rejection by notch filter 351 and FBE 365. FIG. 89B represents the after case. As depicted by a block 379, the coefficients of notch filter 351 and FBE 365 are frozen until next time that an idle slot is created by the headend so the described apparatus can take into account changes in the common noise in upstream channel 339. During the initial setup at a particular RF frequency chosen by the down converter 349 and when the settings of adaptive notch filter 351 are updated, the corresponding coefficients of notch filter 351, namely, B1, B2, ... Bn–1, for the selected channel are recovered and impressed upon notch filter 351 and FBE 365. As a result, adaptive notch filter 351 and FBE 365 cancel common noise in the selected channel during the data transmission interval that follows. It should be noted that this common noise cancellation is accomplished without a training sequence and applies equally to each cable modem.

As depicted by a block 384, FFE 359 is adjusted during the ranging process in preparation for upstream data transmission from each cable modem. The common noise has been canceled prior to this adjustment. When the headend assigns a ranging slot to a particular cable modem, the modem sends a packet of ranging data, including a training sequence to the headend. The training sequence is used to derive coefficients for FFE 359. These coefficients represent the frequency shaping required to compensate for the individual noise of the particular cable modem transmitting the ranging packet, i.e., the frequency shaping required to provide a flat frequency response at the output of DFE 353. As depicted by a block 385, the calculated coefficients are transmitted with the SID of the cable modem on the one of downstream channels 338 assigned to system management. These coefficients are applied to transmit equalizer 371 at the selected cable modem. It should be noted that since the common noise has been canceled prior to the adjustment, the coefficients applied to transmit equalizer 371 do not reflect any common noise rejection. Before the data is transmitted by the cable modem over the assigned one of upstream channels 339, FFE 359 is reset so the taps, except for the main tap, are set to zero. As a result, the apparatus compensates for individual noise by pre-equalization at the transmitting cable modem, while FFE 359 introduces no compensation except simple tracking.

It should be noted that DFE 353 operates sequentially in the practice of the invention. First, FBE 365 is set to compensate for the distortion introduced by notch filter 351 and frozen until it is reset. Then, FFE 359 is used to derive the coefficients for transmit equalizer 371, after which it is reset.

In an alternative embodiment, notch filter 351 oversamples the signal at the output of matched filter 350. Instead of taps spaced apart in time by the reciprocal of the baud rate of the received signal [T, 2T, 3T, ..., T(n–1)] the taps of notch filter 351 are spaced apart in time by the reciprocal of a multiple of the symbol rate, e.g., four (4) times.

In this case, only the values of the taps spaced apart in time by the reciprocal of the baud rate [T, 2T, 3T, ..., T(n–1)] can be adjusted as described above to minimize the output of notch filter 351 and the taps (both real and imaginary) between those spaced apart by the reciprocal of the baud rate (both real and imaginary) are set to zero. The main tap of notch filter 351 is fixed at real part equals one (1) and imaginary part equals zero. The tap values of FBE 365 (spaced apart in time by the reciprocal of the baud rate) are directly mapped to the adjusted tap values of notch filter 351. The over sampling of notch filter 351 facilitates acquisition of the burst signals by demodulator 352.

Reference is made to FIG. 90A for a diagram of common noise (such as ingress) spikes 386 and 387 superimposed on the frequency response of one of upstream channels 339. The effect of multi-path is shown by a sag 388 near the middle of the frequency response. FIG. 90B represents the pre-equalizing effect introduced by transmit equalizer 371 at the transmitting cable modem. This pre-equalization compensates for sag 388a in FIG. 90A and thus flattens the overall frequency response of the signal arriving at receiver 335. It also adds notches 386a and 387a at the frequencies where ingress noise is present.

Referring to FIG. 90B, the adaptive notch filter coefficients can be used via FFT processing for dynamic channel allocation with ingress cancellation to measure the inverse of the channel spectrum or to find the location of the ingress noise. This facilitates in estimating the channel quality for selecting an appropriate channel and bandwidth, as shown in FIG. 33.

As used in the claims herein, the term "idle slot" is a time period known to the headend in which no signal is being transmitted in the upstream channel. Consequently, any energy detected in the channel at the headend during this time period is common noise introduced into the cable network.

CONCLUSION

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention.

What is claimed is:

1. A base station for receiving signal bursts transmitted on an uplink channel of a wireless communication system, the base station comprising:
a demodulator configured to receive the signal bursts on the uplink channel;
a media access controller (MAC) configured to generate for downlink transmission MAP messages that assign time slots in which subscriber stations may transmit signal bursts on the uplink channel, the MAP messages including idle slots that are assigned to no subscriber stations;
a transmitter configured to transmit the MAP messages with the idle slots to the subscriber stations; and
an adaptive notch filter connected to the demodulator, wherein coefficients of the adaptive notch filter are adjusted to suppress noise on the uplink channel sensed during the idle slots.

2. The base station of claim 1, further comprising a decision feedback equalizer coupled to the demodulator and the notch filter, the decision feedback equalizer having a feedback filter using the adjusted coefficients of the adaptive notch filter to compensate for distortion introduced by the adaptive notch filter.

3. The base station of claim 2, wherein the decision feedback equalizer has a feedforward filter configured to establish pre-equalization coefficients.

4. The base station of claim 3, wherein the demodulator is configured to convert the signal bursts to binary data, the base station further comprising a signal path configured to carry the binary data from the demodulator to the MAC, the notch filter and the decision feedback equalizer being in the signal path.

5. The base station of claim 4, wherein the signal path is configured to carry both the binary data and the pre-equalization coefficients to the MAC in band such that the coefficients are appended to the binary data.

6. The base station of claim 5, wherein the pre-equalization coefficients do not reflect noise received by the demodulator, the base station further comprising an uplink transmitter configured to transmit the pre-equalization coefficients established by the feedforward filter.

7. The base station of claim 6, wherein the uplink transmitter is connected to the MAC to transmit the pre-equalization coefficients established by the feed forward filter.

8. A base station for receiving a signal transmitted in a wireless communication system on an uplink channel, the base station comprising:
 a demodulator;
 a notch filter connected to the demodulator, the notch filter having coefficients that are adjustable to cancel noise applied to the demodulator;
 a media access controller (MAC) configured to process binary data and generates for downlink transmission MAP messages that assign time slots in which subscriber stations may transmit signal bursts on the uplink channel; and
 a decision feedback equalizer coupled to the demodulator, the decision feedback equalizer including a feedforward filter configured to establish pre-equalization coefficients.

9. The base station of claim 8, wherein both binary data and pre-equalization coefficients are provided to the MAC in band such that the coefficients are appended to the binary data.

10. The base station of claim 9, wherein the pre-equalization coefficients do not reflect noise applied to the demodulator, the base station further comprising an uplink transmitter connected to the MAC to transmit the pre-equalization coefficients established by the feedforward filter.

11. A base station comprising:
 means for transmitting on a downlink channel to a plurality of subscriber stations MAP messages that assign time slots in which subscriber stations may transmit signal bursts on an uplink channel, the MAP messages including idle slots that are assigned to no subscriber stations;
 means for monitoring conditions on the uplink channel during the idle slots;
 means for compensating for the monitored conditions on the uplink channel; and
 means for receiving signal bursts on the uplink channel in response to such compensation.

12. The base station of claim 11, wherein the means for monitoring is configured to sense noise on the uplink channel during the idle slots.

13. The base station of claim 12, wherein the means for compensating is configured to adjust coefficients of a notch filter to compensate for the sensed noise on the uplink channel during the idle slots.

14. The base station of claim 13, wherein the means for compensating is further configured to adjust a feedback filter of a decision feedback filter in series with the notch filter to have the same coefficients as the notch filter to compensate for its distortion.

15. The base station of claim 14, wherein the means for compensating is further configured to adjust coefficients of a feedforward filter of the decision feedback filter based on a ranging signal of a subscriber station to compensate for intersymbol interference on the uplink channel; and
 wherein the means for transmitting is configured to transmit the adjusted coefficients on a downlink channel to the subscriber station for the purpose of pre-equalization.

16. The base station of claim 15, wherein the means for transmitting is configured to transmit the MAP messages and the adjusted coefficients on the same channel.

17. A base station comprising:
 means for compensating for noise on an uplink channel;
 means for receiving on the compensated uplink channel a ranging signal from a subscriber station of a plurality of subscriber stations;
 means for adjusting filter coefficients to compensate for intersymbol interference on the uplink channel based on the received ranging signal; and
 means for transmitting the adjusted coefficients on a downlink channel to the subscriber station for the purpose of pre-equalization of the uplink channel.

18. The base station of claim 17, wherein the means for adjusting is configured to adjust coefficients of a feedforward filter of a decision feedback filter.

19. The base station of claim 18, wherein the means for compensating is configured to adjust the coefficients of a notch filter in series with the decision feedback filter.

20. The base station of claim 19, wherein the means for compensating is further configured to adjust a feedback filter of the decision feedback filter to have the same coefficients as the notch filter to compensate for its distortion.

21. The base station of claim 20, wherein the means for transmitting is configured to transmit on a downlink channel to the subscriber stations MAP messages that assign time slots in which subscriber stations may transmit signal bursts on the uplink channel.

22. The base station of claim 21, wherein the means for transmitting is configured to transmit the MAP messages and the adjusted coefficients on the same channel.

* * * * *